United States Patent
Zhitomirskiy

(10) Patent No.: US 9,639,217 B2
(45) Date of Patent: May 2, 2017

(54) DIGITISER

(71) Applicant: Alterix Limited, Cambridge, Cambridgeshire (GB)

(72) Inventor: Victor Zhitomirskiy, Cambridge (GB)

(73) Assignee: Alterix Limited, Cambridge (GB)

(*) Notice: Subject to any disclaimer, the term of this patent is extended or adjusted under 35 U.S.C. 154(b) by 0 days.

(21) Appl. No.: 14/237,526

(22) PCT Filed: Oct. 26, 2012

(86) PCT No.: PCT/GB2012/052680
§ 371 (c)(1),
(2) Date: Feb. 6, 2014

(87) PCT Pub. No.: WO2013/117877
PCT Pub. Date: Aug. 15, 2013

(65) Prior Publication Data
US 2015/0035794 A1    Feb. 5, 2015

(30) Foreign Application Priority Data

Feb. 10, 2012  (GB) .................................. 1202355.2
May 11, 2012  (GB) .................................. 1208319.2
Oct. 5, 2012   (GB) .................................. 1217874.5

(51) Int. Cl.
G06F 3/045   (2006.01)
G06F 3/044   (2006.01)
G06F 3/041   (2006.01)

(52) U.S. Cl.
CPC ............ *G06F 3/044* (2013.01); *G06F 3/0416* (2013.01)

(58) Field of Classification Search
CPC ...... G06F 3/044; G06F 3/0416; G06F 3/0418; G06F 1/1624; G06F 1/1662;
(Continued)

(56) References Cited

U.S. PATENT DOCUMENTS 4,361,725 A   11/1982  Dagnelie et al.
5,920,309 A    7/1999  Bisset et al.
(Continued)

FOREIGN PATENT DOCUMENTS

CN   101968701   2/2011
CN   102033667   4/2011
(Continued)

OTHER PUBLICATIONS

International Search Report for International Application No. PCT/GB2012/052680 mailed Apr. 11, 2013 (9 pages).
(Continued)

*Primary Examiner* — Kumar Patel
*Assistant Examiner* — Insa Sadio
(74) *Attorney, Agent, or Firm* — Merchant & Gould P.C.

(57) ABSTRACT

A digitiser includes a grid of conductors having excitation conductors and detection conductors. Excitation circuitry applies excitation signals to selected excitation conductors; measurement circuitry obtains measurements from selected detection conductors; and processing circuitry processes measurements obtained by the measurement circuitry to detect one or more objects positioned adjacent the grid of conductors. The excitation circuitry may be arranged to operate in a cyclic manner to select each of the excitation conductors during an excitation cycle, wherein an excitation cycle includes a sequence of excitation intervals during each of which a different pair of neighboring excitation conductors is selected by the excitation circuitry and to which complementary excitation signals are applied. The excitation circuitry is arranged to polarity modulate each excitation signal using a polarity control signal so that the polarity of the excitation signal applied to a selected conductor changes during a time that the excitation conductor is selected.

22 Claims, 94 Drawing Sheets

(58) Field of Classification Search
CPC ........ G06F 1/3271; G06F 3/02; G06F 3/0238; G06F 345/173; G06F 2203/041; G06F 3/03547; G06F 3/041; G06F 3/0412; G06F 3/0414; G06F 3/046; G06F 3/047; H05K 9/0073; H05K 9/0079

See application file for complete search history.

(56) References Cited

U.S. PATENT DOCUMENTS

| | | | |
|---|---|---|---|
| 6,075,520 | A | 6/2000 | Inoue et al. |
| 2005/0109125 | A1 | 5/2005 | Hall et al. |
| 2007/0109274 | A1 | 5/2007 | Reynolds |
| 2008/0048997 | A1 | 2/2008 | Gillespie et al. |
| 2009/0009486 | A1 | 1/2009 | Sato et al. |
| 2009/0127005 | A1 | 5/2009 | Zachut et al. |
| 2009/0277696 | A1* | 11/2009 | Reynolds ............ G06F 3/03547 178/18.06 |
| 2009/0284398 | A1 | 11/2009 | Shen et al. |
| 2010/0059294 | A1 | 3/2010 | Elias et al. |
| 2010/0085326 | A1 | 4/2010 | Anno |
| 2010/0231548 | A1* | 9/2010 | Mangione-Smith .. G06F 3/0412 345/174 |
| 2010/0321336 | A1 | 12/2010 | Chou et al. |
| 2010/0327889 | A1 | 12/2010 | Matsubara |
| 2011/0084923 | A1 | 4/2011 | Chang et al. |
| 2011/0084930 | A1* | 4/2011 | Chang et al. ................. 345/173 |
| 2011/0227588 | A1 | 9/2011 | Chen et al. |
| 2011/0244049 | A1 | 10/2011 | Kuang et al. |
| 2011/0261010 | A1 | 10/2011 | Nishitani et al. |
| 2011/0279408 | A1 | 11/2011 | Urano et al. |
| 2011/0298479 | A1 | 12/2011 | Matsushima |
| 2012/0098786 | A1 | 4/2012 | Kuang |
| 2013/0169592 | A1 | 7/2013 | Chang et al. |

FOREIGN PATENT DOCUMENTS

| | | |
|---|---|---|
| EP | 0 034 976 | 9/1981 |
| EP | 2357550 | 8/2011 |
| EP | 2 463 760 | 6/2012 |
| GB | 2 450 396 | 12/2008 |
| GB | 2476362 | 6/2011 |
| JP | 60171524 | 9/1985 |
| JP | 10 149250 | 6/1998 |
| WO | WO 2008/085719 | 7/2008 |
| WO | WO 2009/133559 | 11/2009 |
| WO | WO 2010/013619 | 2/2010 |
| WO | WO 2010/029952 | 3/2010 |
| WO | 2010081069 | 7/2010 |

OTHER PUBLICATIONS

Great Britain Search Report for GB1217874.5 dated Mar. 1, 2013 (2 pages).
Great Britain Search Report for GB1208319.2 dated Sep. 20, 2012 (1 page).
Great Britain Search Report for GB1202355.2 dated Jun. 11, 2012 (3 pages).
Unknown. "Analog Data Tablet" *Hevesi, JF*, ip.com *Journal.* ISSN 1533-0001 (3 pages).

\* cited by examiner

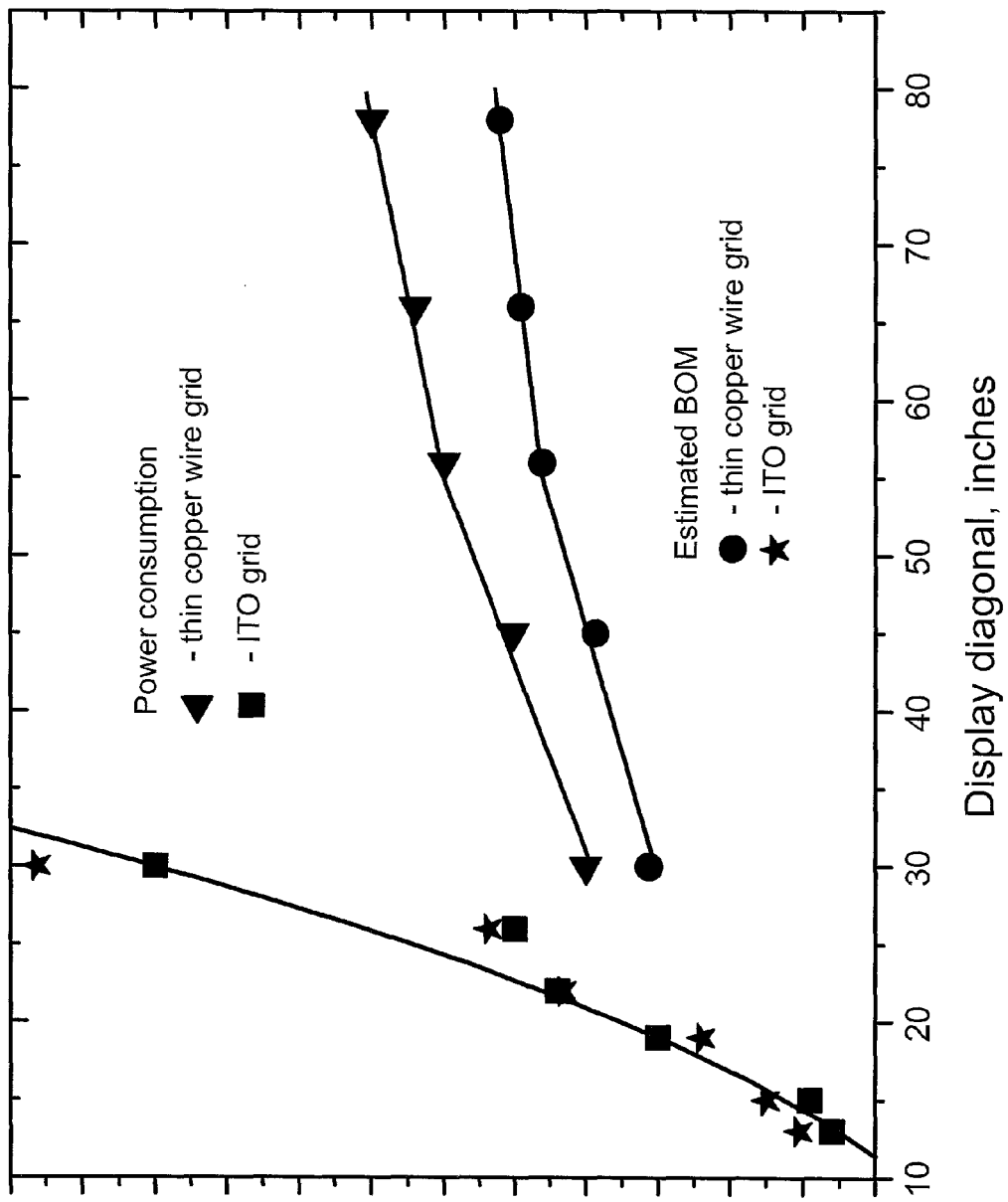

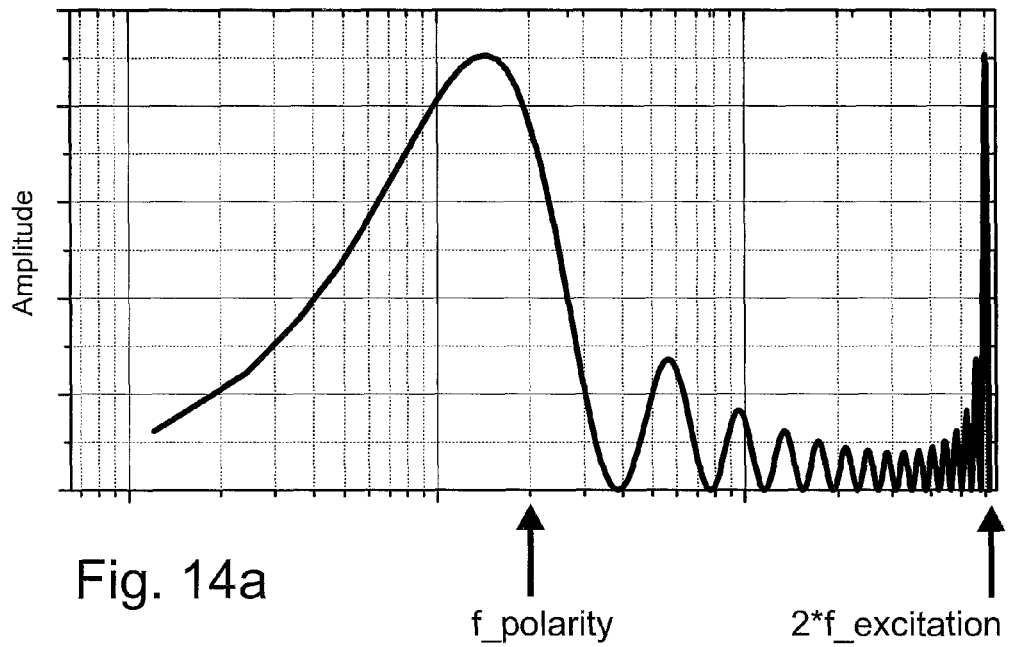
Fig. 14a      f_polarity      2*f_excitation
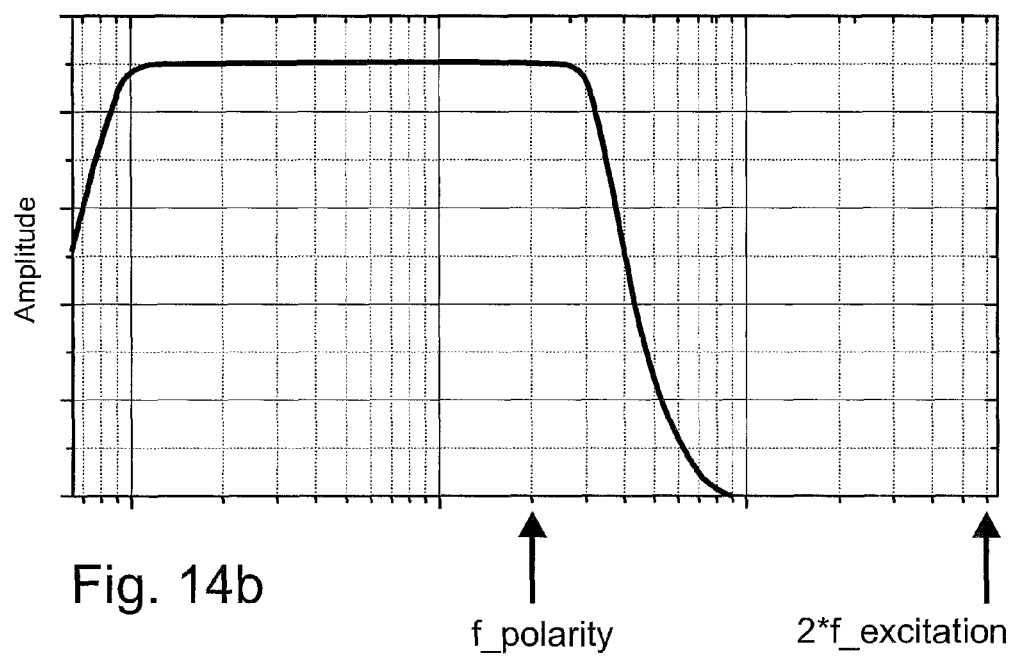
Fig. 14b      f_polarity      2*f_excitation

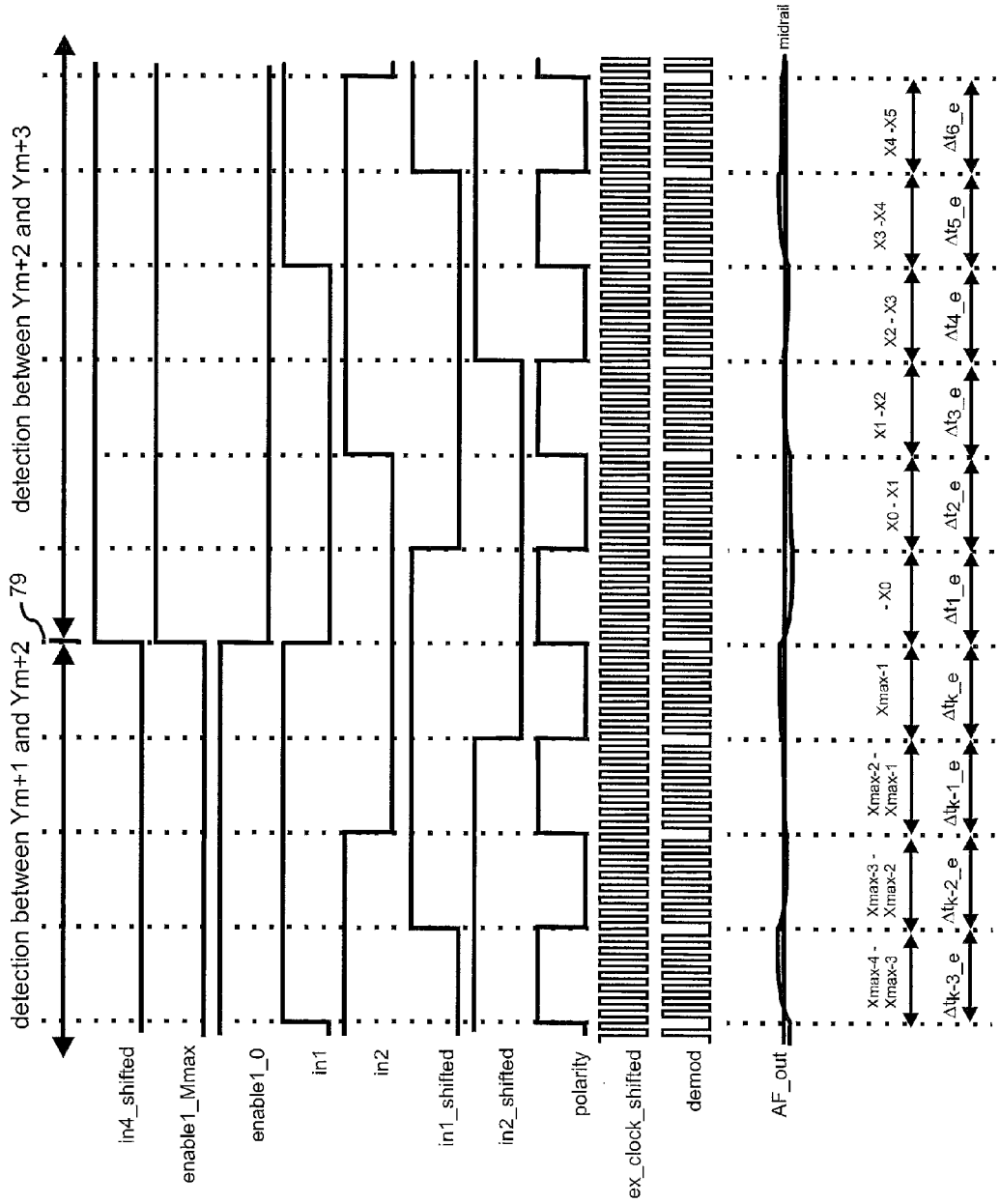

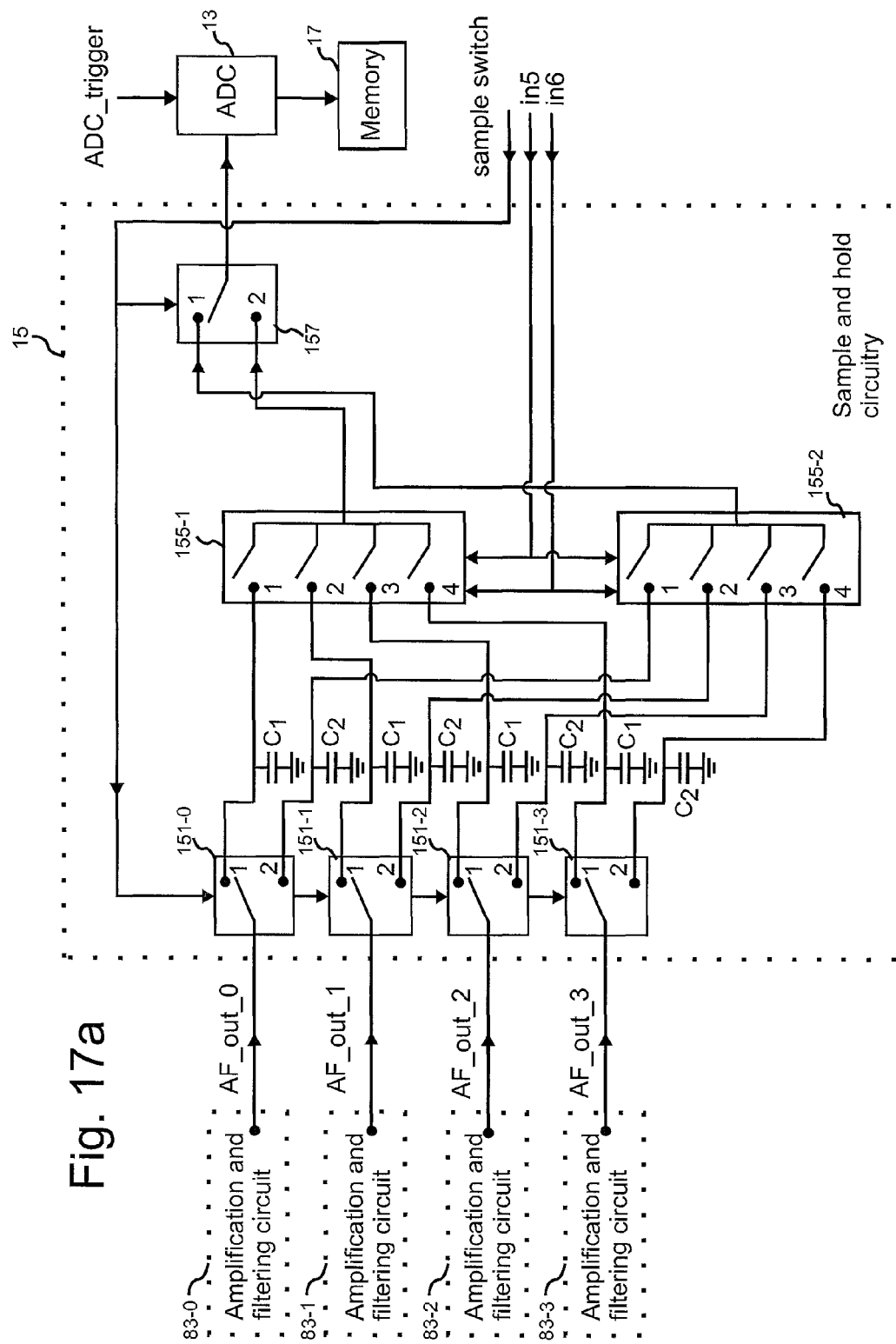

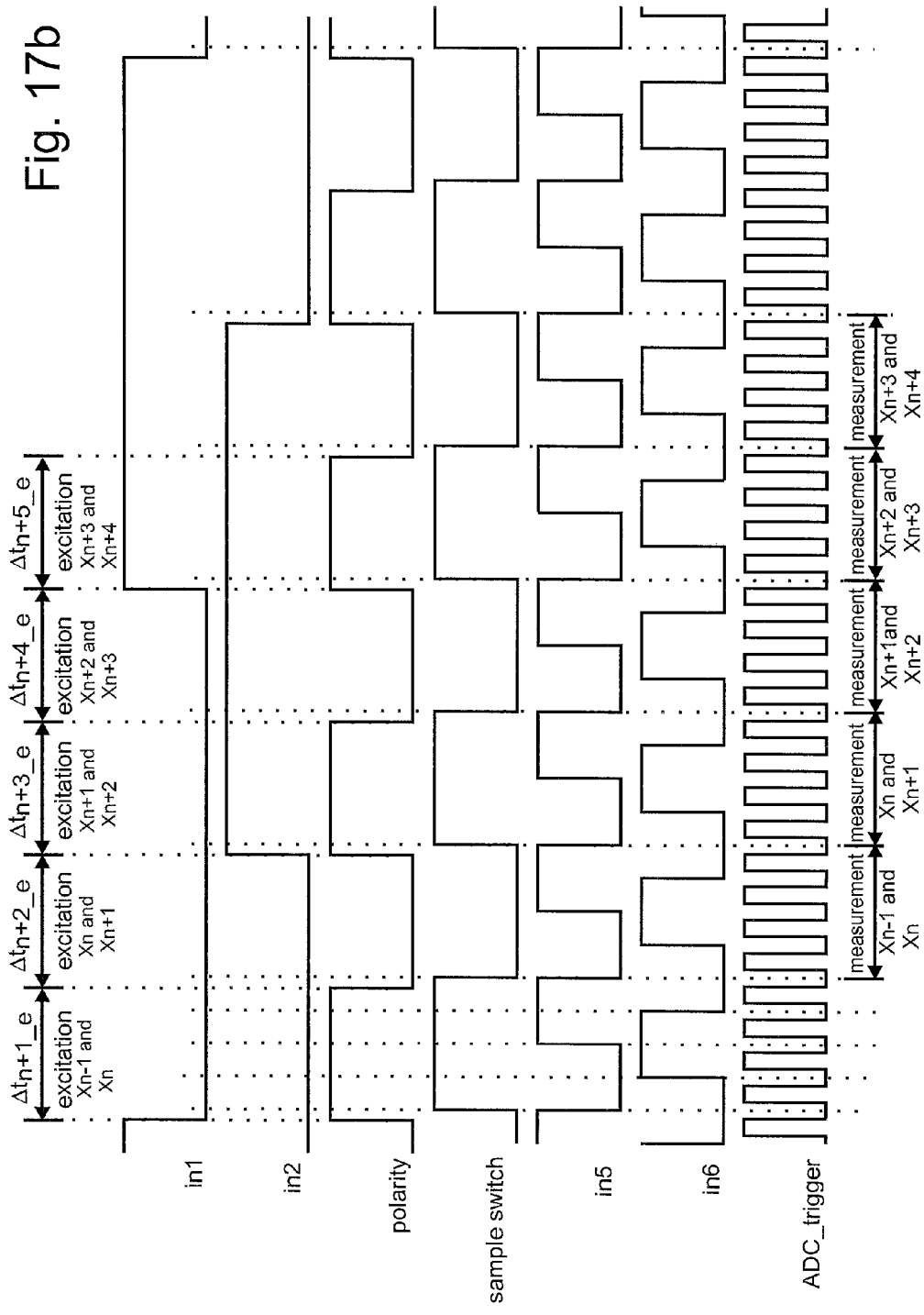

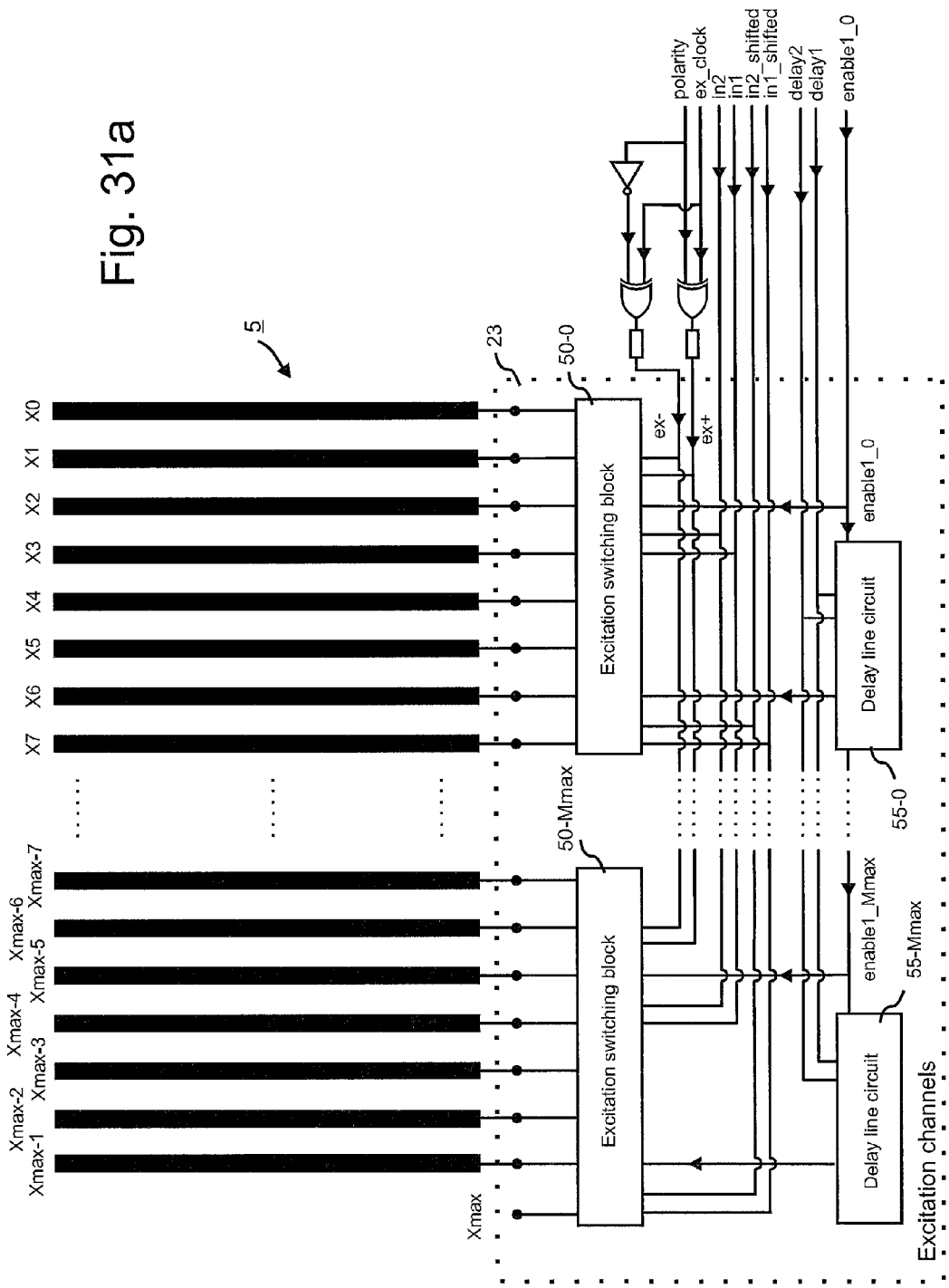

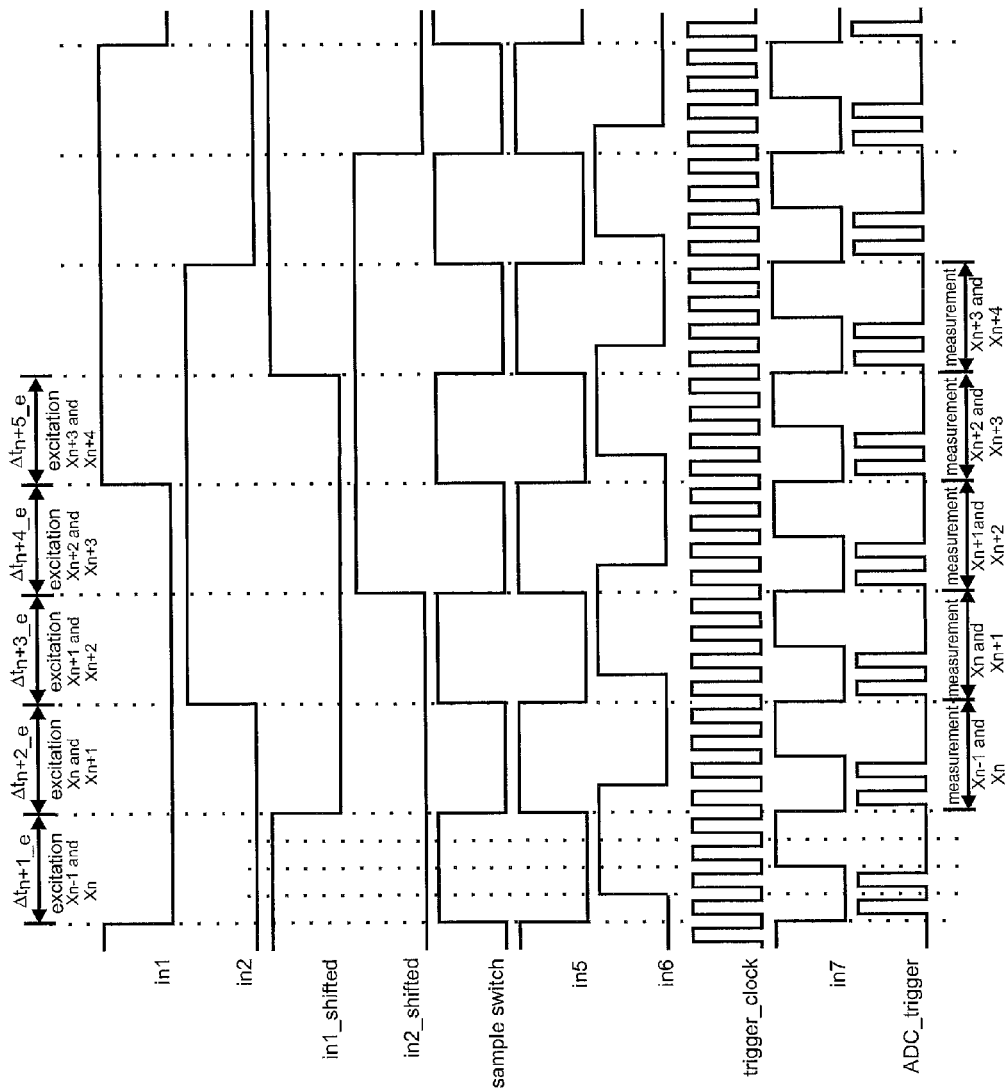

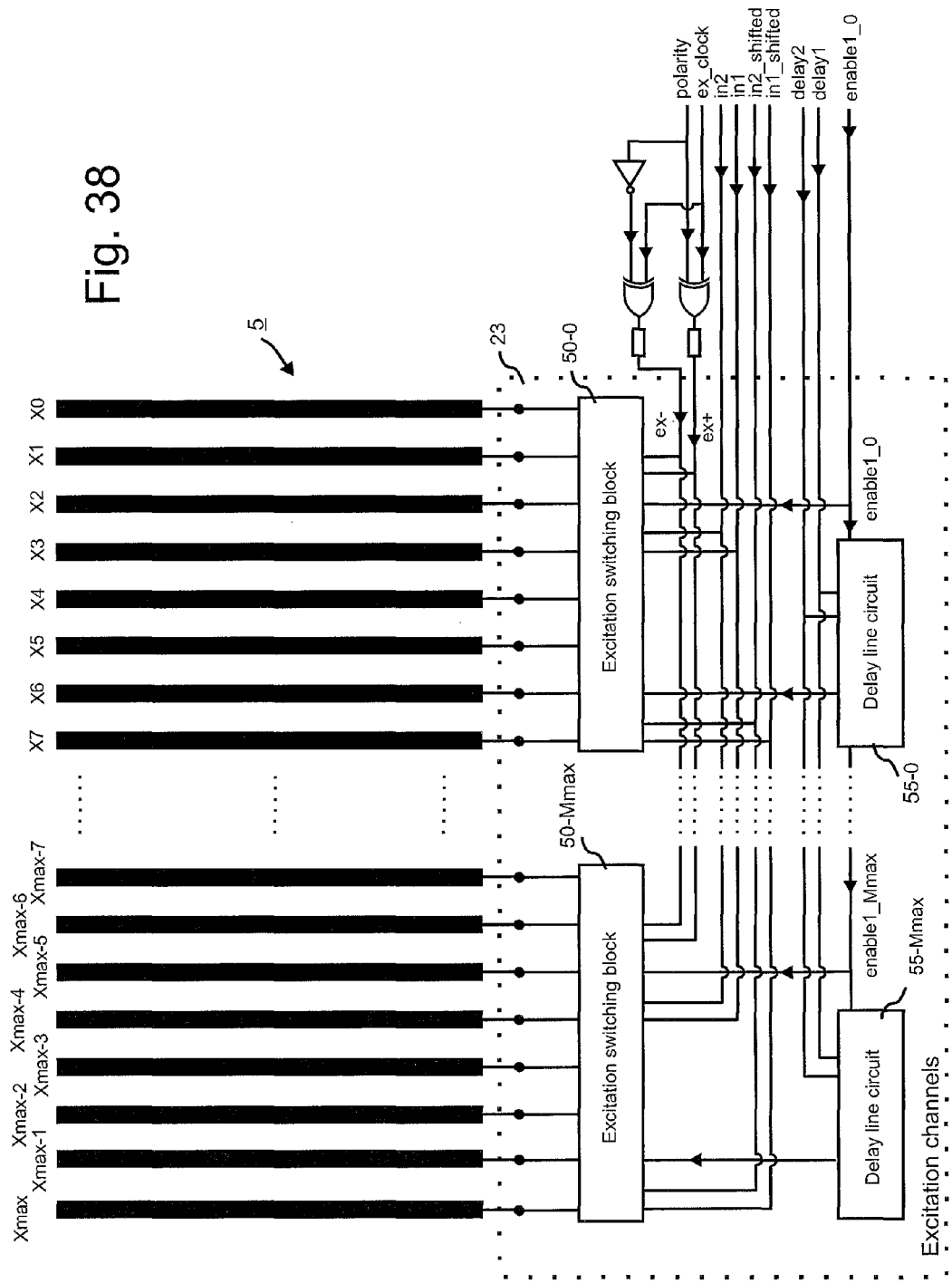

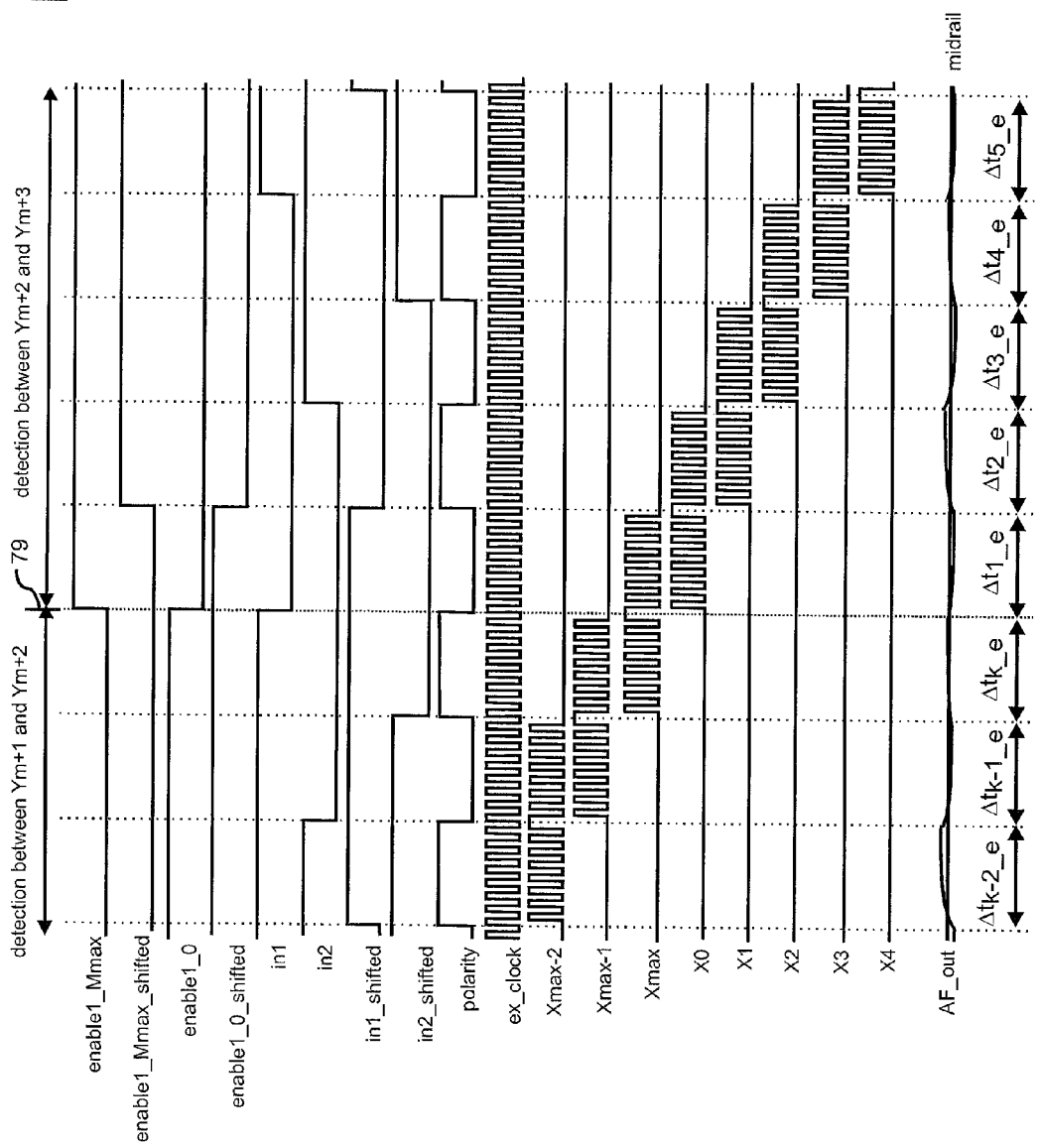

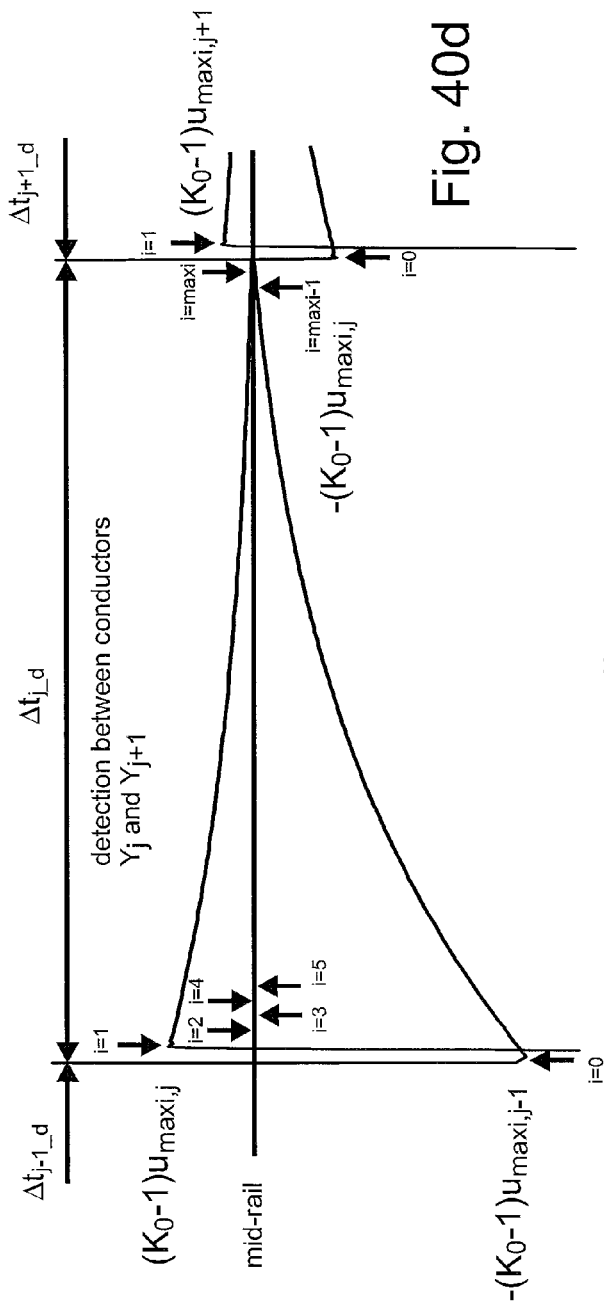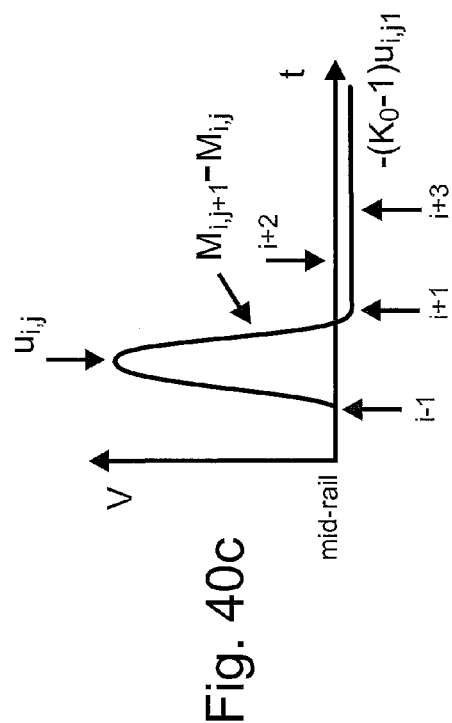

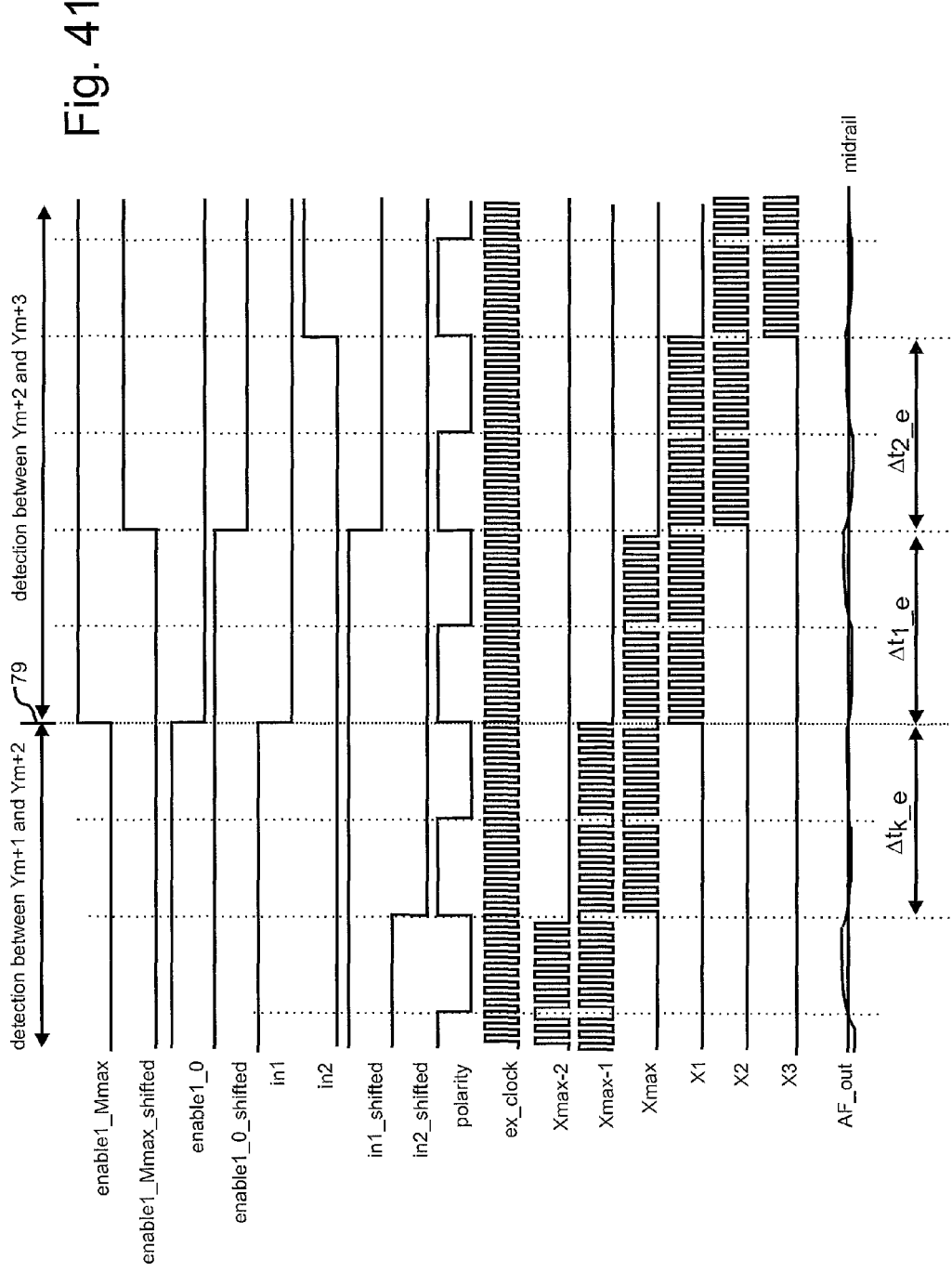

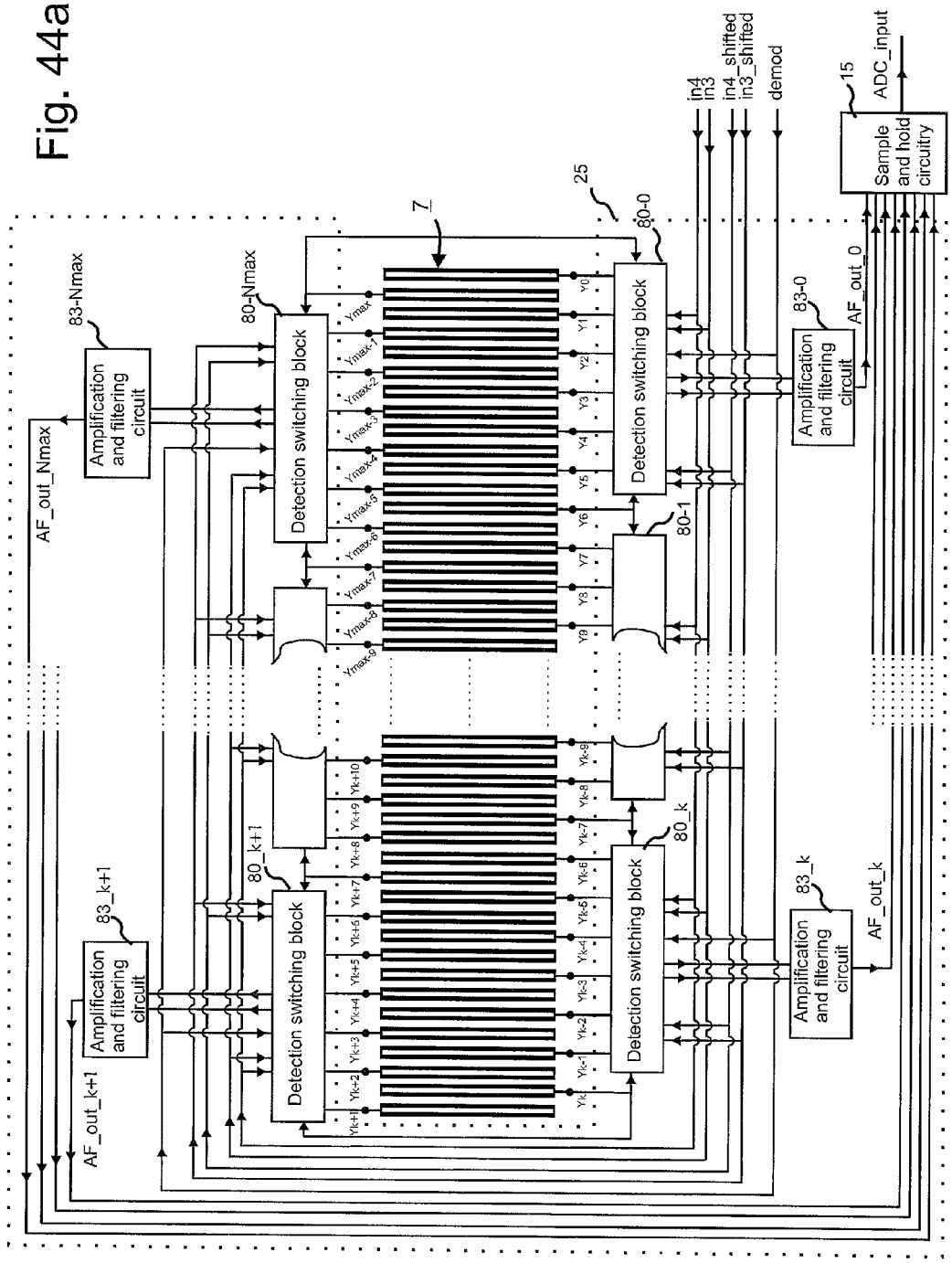

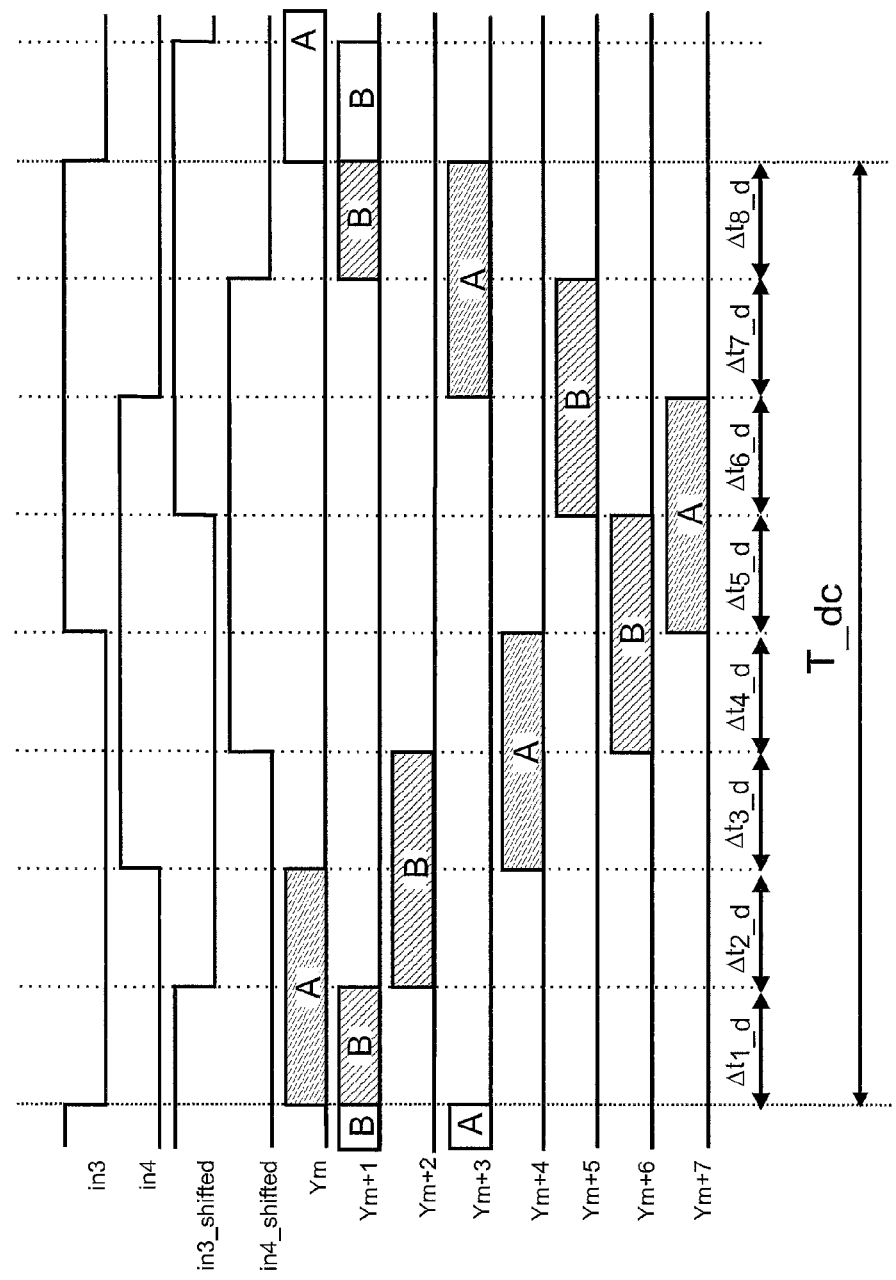

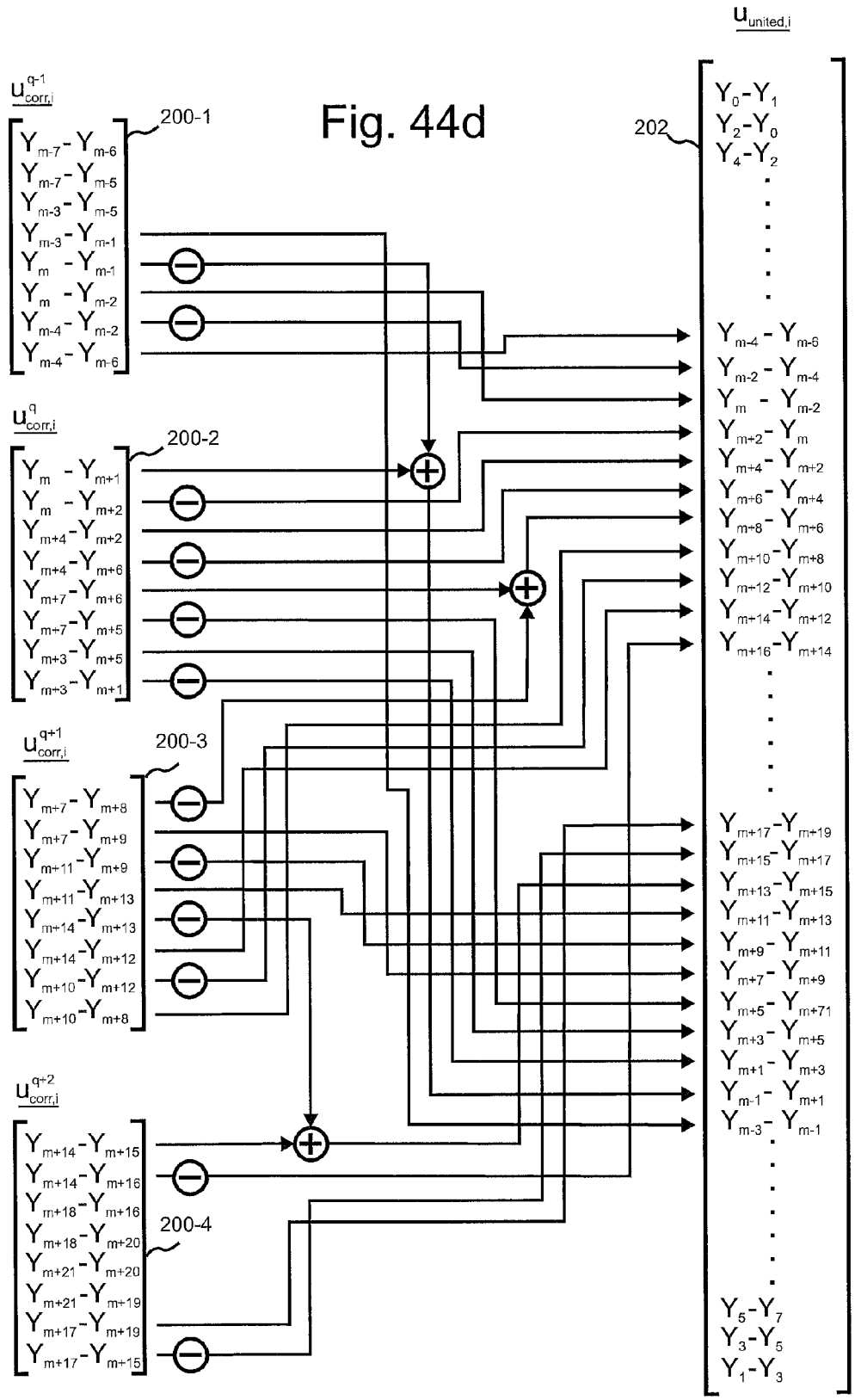

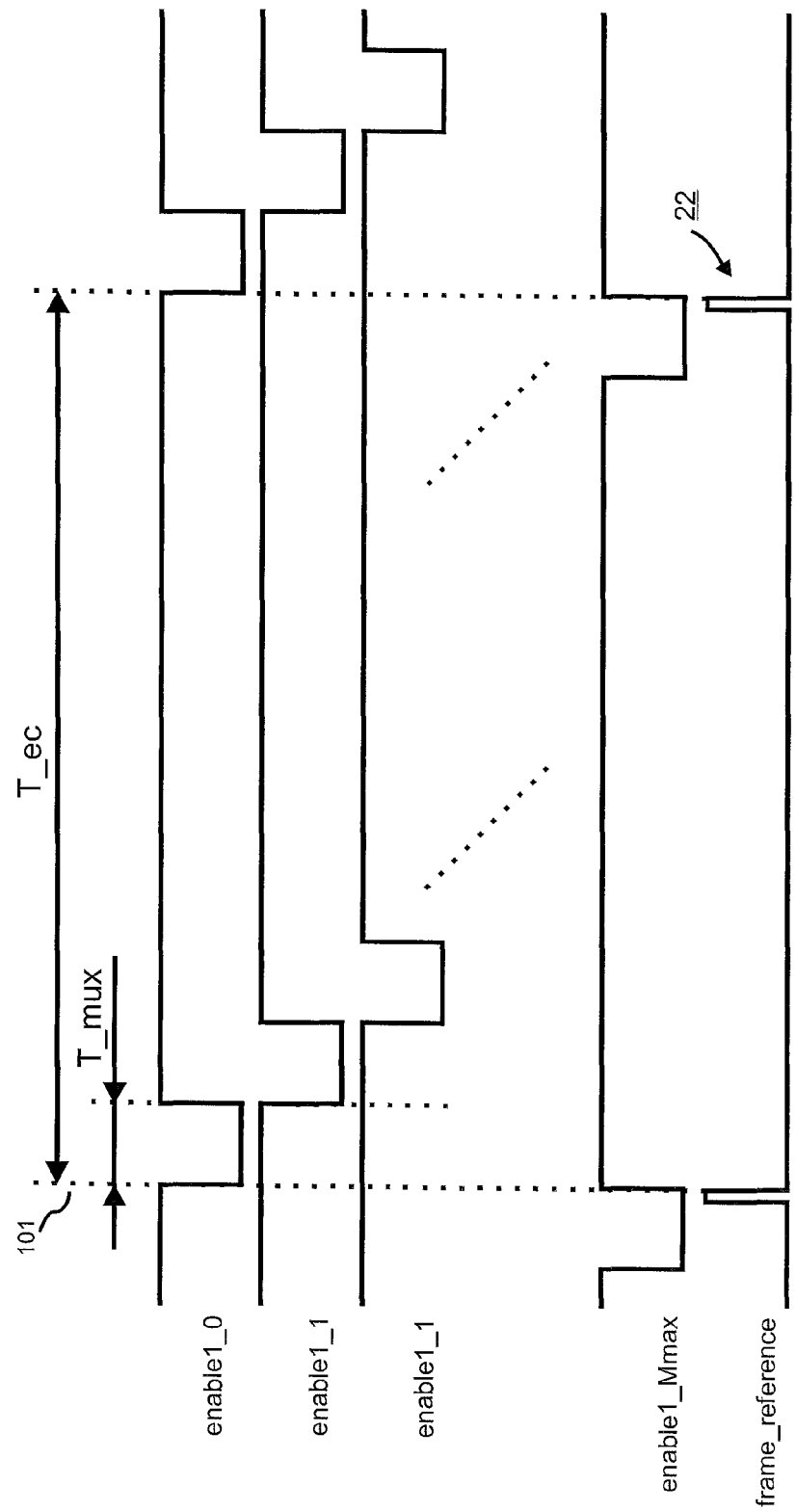

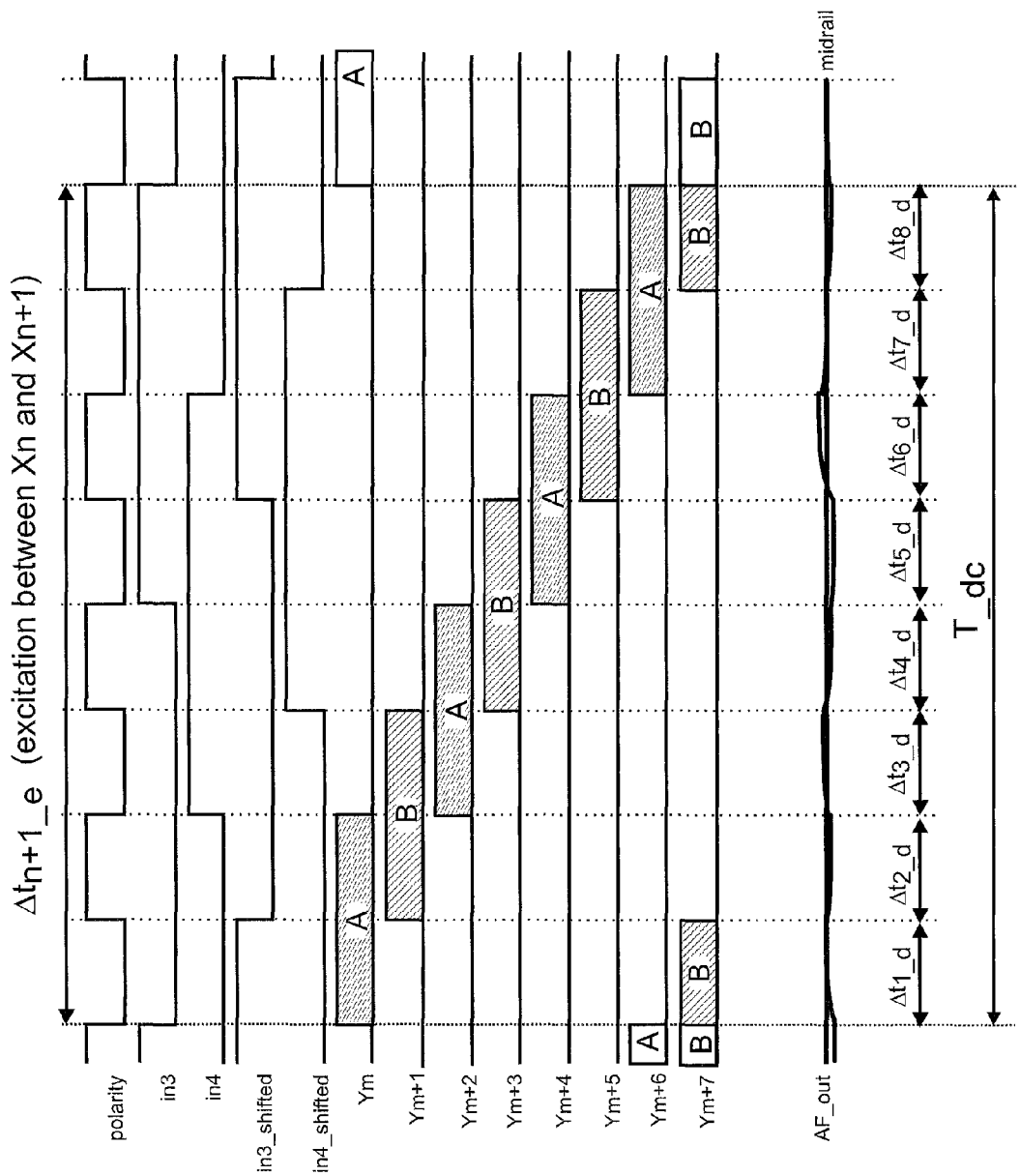

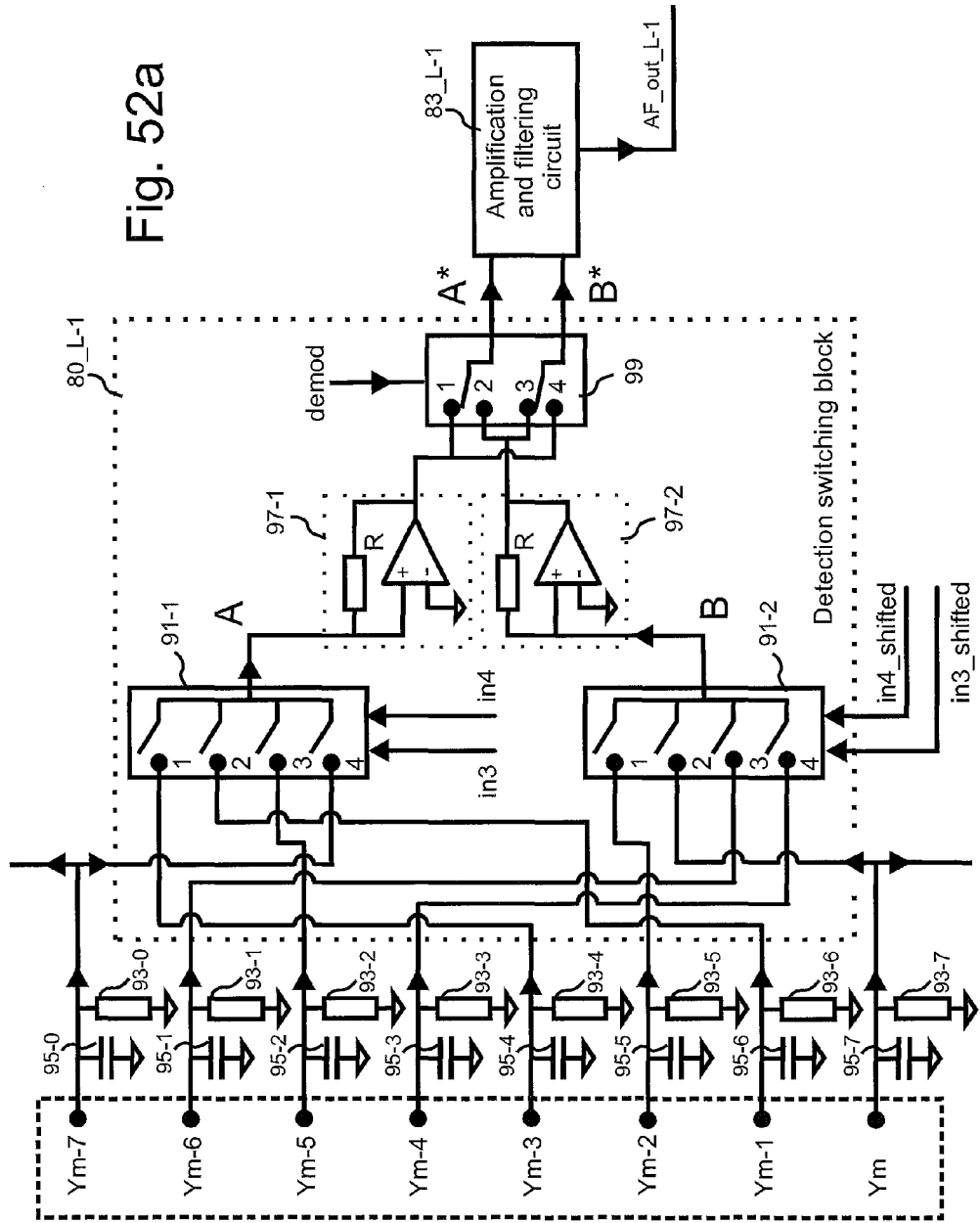

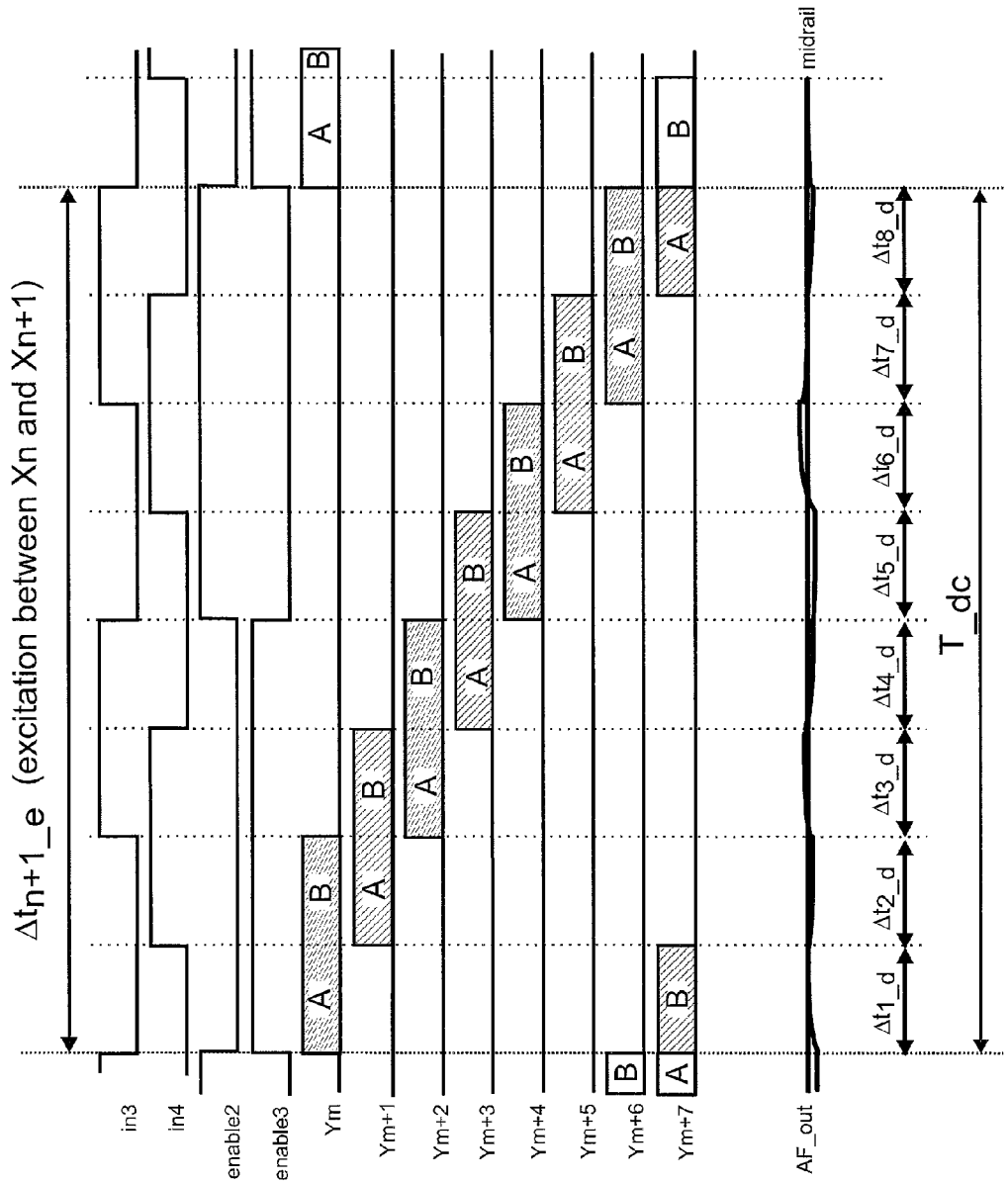

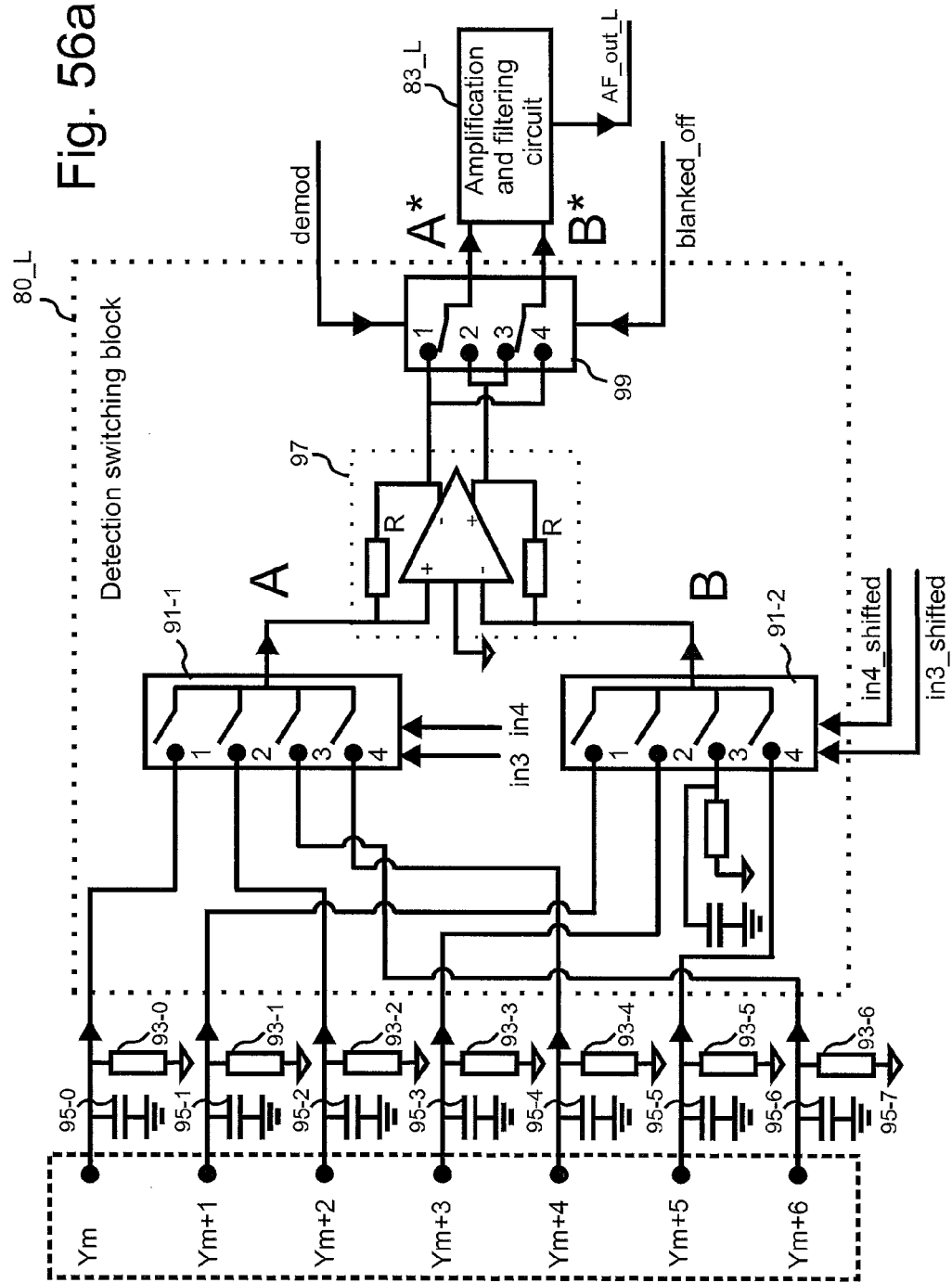

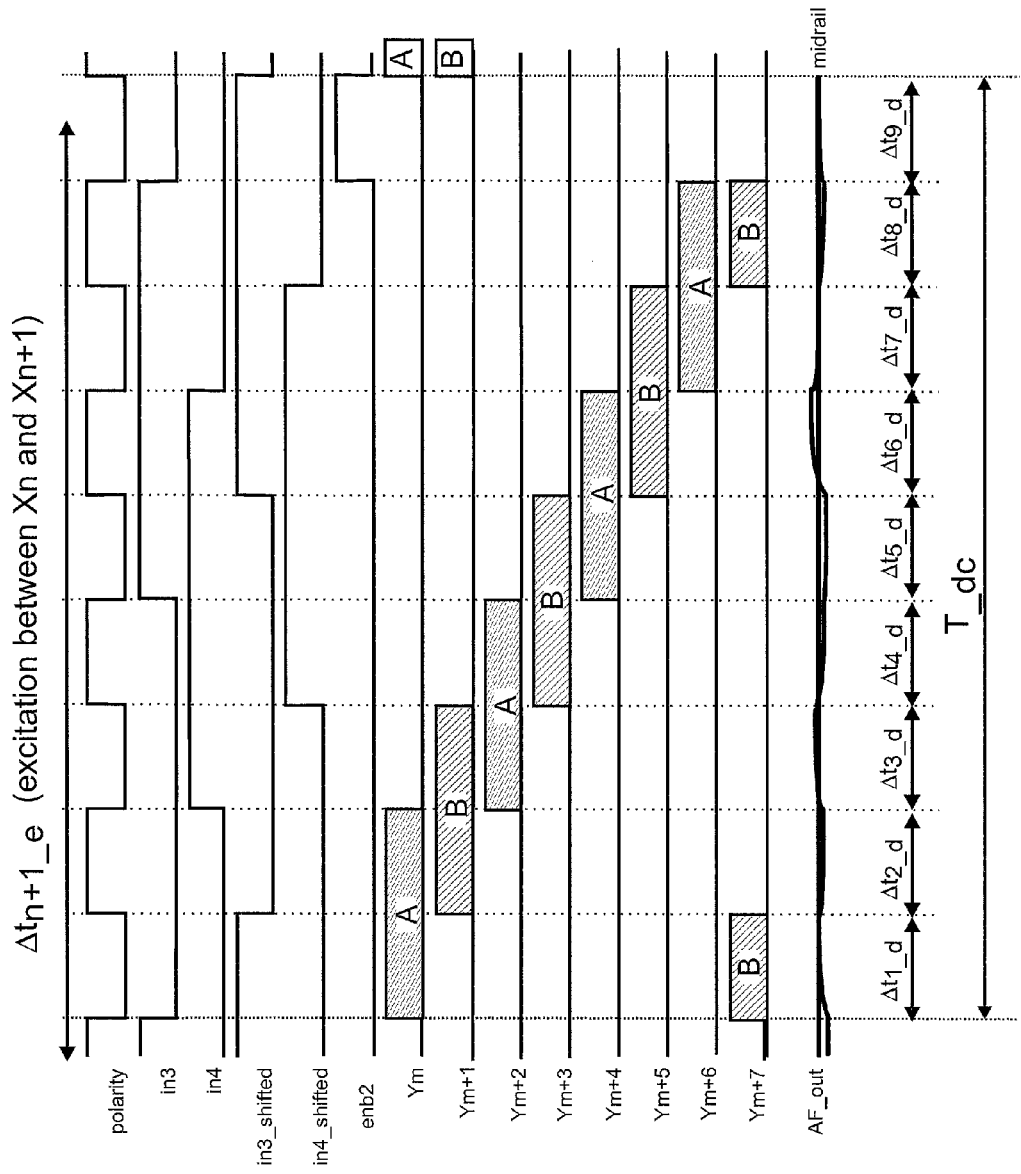

(prior art)

DIGITISER

This application is a National Stage Application of PCT/GB2012/052680, filed 26 Oct. 2012, which claims benefit of Ser. No. 1202355.2, filed 10 Feb. 2012 in Great Britain, Ser. No. 1208319.2, filed 11 May 2012 in Great Britain and Ser. No. 1217874.5, filed 5 Oct. 2012 in Great Britain and which applications are incorporated herein by reference. To the extent appropriate, a claim of priority is made to each of the above disclosed applications.

BACKGROUND

The present invention relates to a digitiser for use in a position sensor and in particular, to a digitiser for use in a capacitive touch screen.

Computer devices are well known and significant research has been made into man machine interfaces that allow humans to interact with computer devices. For example, capacitive touch pads are well known and allow a user to move a cursor around the screen by moving their finger over the touch pad. Touch screens are also well known in which an X-Y digitizer is mounted on or under the surface of a computer display and which allows the user to make selections directly on the display using either their finger or a conductive or an electromagnetic stylus. One type of digitiser commonly used in such touch screens has a grid of conductors arranged in perpendicular directions over the display screen and electronics arranged to measure the change in mutual capacitance at each intersection point formed by the crossing X-Y conductors as a finger (and/or stylus) moves over the screen. Typically, the grid pitch (centre to centre distance between adjacent conductors) is between 5 mm and 20 mm, which provides a sensing resolution that is sufficient to detect a human finger anywhere over the grid. In many applications, the conductors are formed from indium tin oxide (ITO) as these conductors are transparent. Ultra-thin copper wire is also commonly used to form the conductors of X-Y digitisers, although some users complain about being able to see the copper traces when used in smaller display screens.

Such a design of X-Y conductors is illustrated in FIG. 1a. As shown, in FIG. 1b, when an excitation voltage is applied to an X conductor, it generates an electric field that couples with a Y conductor at the intersection point between the X-Y conductor pair. The amount of coupling defines the mutual capacitance between the two conductors. When a finger (or conductive stylus) is present over or near this intersection point, as shown in FIG. 1c, some of the generated electric field couples into the finger and thereby reduces the coupling (and hence mutual capacitance) between the X-Y conductor pair. Thus electronics coupled to the grid of conductors can sense the change of mutual capacitance and thereby the presence and location of the finger over the grid.

When designing such X-Y digitisers for touch screen applications, there are a number of design challenges and tradeoffs. One challenge is that the mutual capacitance between each X-Y pair of conductors is relatively small and the change in mutual capacitance due to the presence of the finger (or stylus) is smaller still. As a result, the measurements are often swamped by other signals, such as by switching noise associated with the switching of the LCD panel over which the X-Y conductors are placed and capacitive cross-talk between adjacent conductors of the X-Y grid. The digitiser has to be designed so that the measurements can be reliably performed at a high enough update rate to support a natural drawing experience with the user's finger or stylus. The digitiser must do this whilst using low cost electronics in order to provide a low cost system for the consumer product market.

One of the major sources of unwanted error in the measurement signals is capacitive cross-talk between adjacent grid conductors. In particular, when an excitation signal is applied to one excitation conductor, that excitation signal capacitively couples with adjacent excitation conductors. Similarly, signals coupled into one detection conductor will capacitively couple into the adjacent detection conductors as well. This can lead to significant cross-talk error in the signals being measured. This cross-talk can be minimised by keeping the frequency of the excitation signal that is applied to the excitation conductor as low as possible. However, if the excitation frequency is too low, then it becomes difficult, or more expensive, to achieve the desired measurement update rate that will allow the tracking of the user's finger or stylus over time.

Further, the problems of measurement update rates and cross-talk get worse as the size of the grid increases. This is because with a larger grid, there will be more X-Y conductors (to achieve the same spatial resolution) and hence more intersection points to measure; and as each grid conductor becomes longer, its distributed resistance gets larger and the distributed mutual capacitance between adjacent wires gets larger, which in turn increases the cross-talk error as a square of the diagonal size. Thus as the size of the grid gets larger, digitisers formed using ITO conductors face greater design challenges than those that use metallic based conductors (such as copper) because ITO has a much higher resistance than a metal conductors.

A further problem with increasing size relates to the number of measurement channels that are used. In particular, in most digitiser systems, the signals from the detection conductors are multiplexed through a number (sometimes one) of separate measurement channels before being processed by a microprocessor. However, as the display gets larger, the number of X-Y conductors increases to keep the same spatial resolution. Thus more measurements have to be made and this can result in the need to increase the number of measurement channels. However, this increases the cost of the digitiser.

FIG. 2 is a plot that shows how the power consumption and the cost of an ITO based digitiser and of a metallic conductor based digitiser increases with the size of the display. As shown, for small sized displays (diagonal size less than about 40 cm), ITO provides the same performance as the metallic conductor based digitiser both in terms of power consumption and cost. A metallic conductor based digitiser of such sizes can provide an update frequency well above the nominal 100 Hz, but such performance is not required for man machine interfaces. However, with ITO based systems, the power consumption and the cost increase exponentially with increasing display size. This is because, the lower excitation frequency required by the ITO based digitiser (to minimise capacitive cross-talk error) means that more measurement channels are needed to process the signals from the grid of conductors compared with a metallic conductor based digitiser. In particular, as metallic conductor based digitisers can use higher excitation frequencies, there is more time to multiplex the signals from more detection conductors through each measurement channel—which helps to keep the cost and power consumption down. As shown in FIG. 2, the thin metallic conductor based digitiser can be implemented with a relatively modest increase in the cost and power consumption for displays having a diagonal size up to 200 cm (80"). The step change in both the cost and power consumption caused by the requirement of adding even more measurement channels become evident for metallic wire digitisers having a diagonal size above 250 cm.

Another challenge with large scale X-Y digitiser systems is the desire for the system to be able to measure simultaneously a large number of independent touches. For large diagonal displays (over 100 cm diagonal), the system might have to be able to detect over 10 different touches in order to enable a true multi-user interaction. This places further constraints on the design of the digitiser.

The inventor has designed a number of new digitisers (and parts thereof) that try to address one or more of the challenges and conflicting requirements described above. In so doing, the inventor has made a number of different inventions that are described and some of which are claimed herein. The new designs of digitiser can be used in touch screens or in separate touch pads/whiteboards. The digitisers that are described are ideally suited for use with large scale display screens having diagonal sizes greater than, for example, 38 cm (15") due to the ability of the algorithm to scale to large X-Y grids. For instance it allows to maintain an update rate of about 100 Hz whilst measuring the mutual capacitance at each node of a 320×180 X-Y grid. The application also describes a number of ways in which the grid of X-Y conductors and associated electronics can be manufactured and assembled.

SUMMARY

According to a first aspect, the present invention provides a digitiser comprising: a grid of conductors comprising a plurality of excitation conductors and a plurality of detection conductors; excitation circuitry for applying excitation signals to selected excitation conductors; measurement circuitry for obtaining a plurality of measurements from selected detection conductors; and processing circuitry for processing measurements obtained by the measurement circuitry to detect one or more objects positioned adjacent the grid of conductors.

The excitation circuitry may operate in a cyclic manner to select each of said excitation conductors during an excitation cycle, wherein an excitation cycle comprises a sequence of excitation intervals during each of which a different pair of neighbouring excitation conductors is selected by the excitation circuitry and to which complementary excitation signals are applied. Similarly, the measurement circuitry may operate in a cyclic manner to select each of said detection conductors during a detection cycle, wherein a detection cycle comprises a sequence of detection intervals during each of which a different pair of neighbouring detection conductors is selected by the measurement circuitry.

The digitiser is arranged so that for a given selected pair of excitation conductors and a given selected pair of detection conductors, the measurement obtained by said measurement circuitry comprises a double differential measurement that depends upon a difference between: i) a difference between a mutual capacitive coupling between a first one of the detection conductors of the selected pair of detection conductors and each of the excitation conductors of the selected pair of excitation conductors; and ii) a difference between a mutual capacitive coupling between a second one of the detection conductors of the selected pair of detection conductors and each of the excitation conductors of the selected pair of excitation conductors. In one embodiment the measurement circuitry comprises a demodulator for demodulating the signals obtained from the selected detection conductors and a band pass filter for filtering an output of the demodulator.

The excitation signal applied to each selected excitation conductor has an excitation frequency and the demodulator may be arranged to combine the signals obtained from the selected detection conductors with a demodulation signal that has substantially the same frequency as the excitation frequency of the excitation signal. The demodulator may combine the signals obtained from the selected detection conductors with the demodulation signal by multiplying the signals obtained from the selected detection conductors with the demodulation signal. The demodulator may multiply the signals obtained from the selected detection conductors with the demodulation signal by passing the signals obtained from the selected detection conductors through a switch that is switched with the demodulation signal.

Typically, the pass band filter will comprise one or more dc (direct current) blocking capacitors for blocking low frequency components from the demodulated signals. In this case, the processing circuitry is preferably arranged to process said measurements to correct for transients introduced into the measurements by the dc blocking capacitors.

At least one additional excitation conductor may be provided that is connected to the excitation circuitry. In this case, the excitation circuitry may select the additional excitation conductor during an excitation interval and to apply an excitation signal to the additional conductor without applying a complementary excitation signal to another excitation conductor. Similarly, the measurement circuitry may be arranged, during at least one detection interval of a detection cycle, to select the signal from a detection conductor and a known reference signal. Measurements obtained from these excitation conductors and detection conductors can provide non-differential measurements that can be used to integrate the differential measurements.

Control circuitry may also be provided that generates a blanking off signal and circuitry for disconnecting the detection conductors from the measurement circuitry in dependence upon the blanking off signal. The control circuitry is arranged so that the detection conductors are disconnected from the measurement circuitry each time the excitation circuitry selects a new pair of excitation conductors.

According to another aspect, the present invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors. The excitation circuitry may be arranged to operate in a cyclic manner to select each of said excitation conductors during an excitation cycle, wherein an excitation cycle comprises a sequence of excitation intervals during each of which a different pair of neighbouring excitation conductors is selected by the excitation circuitry and to which complementary excitation signals are applied, wherein the excitation circuitry is arranged to polarity modulate each excitation signal using a polarity control signal so that the polarity of the excitation signal applied to a selected conductor changes during a time that the excitation conductor is selected, wherein the polarity control signal is periodic and wherein the shorter of: i) the time that a detection conductor is selected, and ii) the time that an excitation conductor is selected, is an integer multiple of the period of the polarity control signal.

A digitiser according to either aspect may have excitation circuitry that selects neighbouring excitation conductors during plural consecutive excitation intervals in an overlapping manner such that during a first excitation interval a given selected excitation conductor is paired with a first neighbouring excitation conductor and during a second excitation interval the given selected excitation conductor is paired with a second neighbouring excitation conductor. The neighbouring excitation conductor may be immediately adjacent the given excitation conductor or it may be a close neighbour of the given excitation conductor.

In one embodiment, the excitation circuitry is arranged so that, during an initial excitation interval of an excitation cycle, excitation conductors are selected without overlap with excitation conductors selected in a final excitation interval of a preceding excitation cycle.

Preferably the excitation circuitry is arranged to select the excitation conductors such that an excitation conductor selected during a last excitation interval of an excitation cycle neighbours an excitation conductor selected by the excitation circuitry during a first excitation interval of the excitation cycle.

The measurement circuitry may be arranged to operate in a cyclic manner to select each of said detection conductors during a detection cycle, wherein a detection cycle comprises a sequence of detection intervals during each of which a different pair of neighbouring detection conductors is selected by the measurement circuitry. The measurement circuitry may be arranged to select neighbouring detection conductors during plural consecutive detection intervals in an overlapping manner such that during a first detection interval a given selected detection conductor is paired with a first neighbouring detection conductor and during a second detection interval the given selected detection conductor is paired with a second neighbouring detection conductor. Again the neighbouring detection conductors do not need to be immediate neighbours.

Each detection interval may correspond in duration to or is longer than one excitation cycle or each excitation interval may correspond in duration to or is longer than one detection cycle.

According to another aspect, the present invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the measurement circuitry, wherein the measurement circuitry is arranged to polarity modulate a detection signal obtained from each selected detection conductor using a polarity control signal so that the polarity of the detection signal changes during a time that the detection conductor is selected, wherein the polarity control signal is periodic and wherein the shorter of: i) the time that a detection conductor is selected, and ii) the time that an excitation conductor is selected, is an integer multiple of the period of the polarity control signal.

Circuitry may also be provided for disconnecting the detection conductors from the measurement circuitry and control circuitry that generates a blanking off signal on rising and falling edges of the polarity control signal and wherein the circuitry for disconnecting the detection conductors from the measurement circuitry is responsive to the blanking off signal so that at the times that the polarity changes due to the polarity control signal, the detection conductors are disconnected from the measurement circuitry.

In one embodiment the measurement circuitry is arranged to select the detection conductors such that a detection conductor selected during a last detection interval of a detection cycle neighbours a detection conductor selected by the measurement circuitry during a first detection interval of the detection cycle.

The measurement circuitry is preferably arranged to determine differential measurements of signals obtained from the selected pairs of neighbouring detection conductors, as this reduces common mode noise.

In one embodiment, the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle. Each measurement channel may be arranged so that, during an initial detection interval of a detection cycle, detection conductors are selected by the measurement channel that neighbour detection conductors that are selected by the measurement channel during a final detection interval of the detection cycle.

The measurement circuitry may also comprise sample and hold circuitry for sampling and holding measurements obtained from each measurement channel and an analogue to digital converter for converting measurements held by the sample and hold circuitry into corresponding digital values, wherein the sample and hold circuitry comprises a plurality of first and second capacitors, each first and second capacitor being associated with a respective measurement channel, wherein the sample and hold circuitry is arranged such that during first measurement intervals, signals from the measurement channels are applied to the associated first capacitors and during second measurement intervals, signals from the measurement channels are applied to the associated second capacitors, and wherein during the first measurement intervals the sample and hold circuitry is arranged to couple signals stored on the second capacitors to the analogue to digital converter for conversion into corresponding digital values and during the second measurement intervals the sample and hold circuitry is arranged to couple signals stored on the first capacitors to the analogue to digital converter for conversion into corresponding digital values.

The detection intervals of the different measurement channels may be staggered to allow the measurements from the different measurement channels to be converted from analogue to digital form in a time division multiplex manner using a common analogue to digital converter.

In one embodiment the excitation circuitry polarity modulates each excitation signal using a polarity control signal so that the polarity of the excitation signal applied to a selected conductor changes during a time that the excitation conductor is selected, wherein the polarity control signal is a periodic signal and wherein half the period of the polarity control signal is less than or equal to the shorter of the excitation interval and the detection interval.

Alternatively the measurement circuitry may be arranged to polarity modulate a detection signal obtained from each selected detection conductor using a polarity control signal so that the polarity of the detection signal changes during a time that the detection conductor is selected, wherein the polarity control signal is a periodic signal and wherein half the period of the polarity control signal is less than or equal to the shorter of the excitation interval and the detection interval.

The processing circuitry may be arranged to integrate at least some of the double differential measurements to generate measurements relating to the mutual capacitive coupling between at least some of the excitation conductors and at least some of the detection conductors. In this case, the processing circuit may process the double differential measurements to identify one or more areas of possible touch and may restrict integration of the double differential measurements to the measurements relating to the one or more areas of possible touch.

In one embodiment, the processing circuitry is operable to identify, for each area of possible touch, a start point and an end point, and is operable to restrict the integration of the differential measurements from the identified start point to the identified end point. This can significantly reduce the amount of data to be integrated and hence the time and processing power required.

Typically, the processing circuitry will use one of the start point and the end point for an area of possible touch to determine a first boundary condition for the integration and will use the other one of the start point and the end point to determine a correction to be applied to the integrated values. This correction can be, for example, a gradient based correction.

The processing circuitry may integrate the double differential measurement values by adding or subtracting adjacent measurement values together.

Typically, the processing circuitry will integrate measurement values obtained from adjacent excitation intervals or from adjacent detection intervals.

Preferably, the measurement values obtained from the measurement circuitry are stored in a two dimensional array, with successive measurements in one dimension of the array corresponding to the measurements obtained from adjacent excitation intervals and with successive measurements in the other dimension of the array corresponding to the measurements obtained from adjacent detection intervals. This allows for the convenient manipulation of the measurement values.

For example, the processing circuitry may integrate the measurement values along both the first dimension and the second dimension; and may subtract a respective background measurement value from each measurement prior to performing said integration.

According to another aspect, the invention provides a digitiser comprising: a grid of conductors having a plurality of excitation conductors and a plurality of detection conductors; excitation circuitry for applying excitation signals to selected excitation conductors; measurement circuitry for obtaining measurements of signals obtained from selected detection conductors; and processing circuitry for processing measurements obtained by the measurement circuitry to detect one or more objects positioned adjacent the grid of conductors; wherein the measurements obtained from the measurement circuitry comprise differential measurements and wherein the processing circuitry is operable to: process the differential measurements to identify one or more possible areas of touch and, for each possible area of touch, a start point and an end point for the possible area of touch; and integrate the differential measurements using the identified start point and end point to restrict the integration of the differential measurements to the differential measurements from the identified start point to the identified end point.

The processing circuitry may integrate the differential measurements between the start point and the end point by combining adjacent differential measurements, for example by adding or subtracting them from each other.

In one embodiment, the processing circuitry is operable to integrate adjacent measurements by weighting a measurement value obtained in one excitation interval and adding or subtracting the weighted measurement value with an integrated value obtained for a previous excitation interval, the weighting being such as to compensate for transients in the measurement circuitry caused by measurement signals from the previous excitation interval.

In the same or in another embodiment, the processing circuitry is operable to integrate adjacent measurements by weighting a measurement value obtained in one detection interval and adding or subtracting the weighted measurement value with an integrated value obtained for a previous detection interval, the weighting being such as to compensate for transients in the measurement circuitry caused by measurement signals from the previous detection interval.

The processing circuitry may be arranged to identify possible areas of touch by identifying when the differential measurements exceed a threshold level. Similarly, the processing circuitry may identify the start point and the end point by identifying a positive peak and an associated negative peak in the differential measurements and by selecting a start point and an end point such that the identified positive peak and the identified negative peak are between the start point and the end point.

Preferably, the processing circuitry is operable to integrate at least some of the differential measurements to generate measurements relating to the mutual capacitive coupling between individual excitation conductors and individual detection conductors. This allows for a more accurate identification of objects touching or close to the grid of conductors.

One of the start point and the end point for an area of possible touch may be used to determine a first boundary condition for the integration and the other one of the start point and the end point may be used to determine a correction to be applied to the integrated values.

The measurement values obtained from the measurement circuitry may be stored in a two dimensional array, with successive measurements in one dimension of the array corresponding to measurements obtained from adjacent excitation intervals and with successive measurements in the other dimension of the array corresponding to measurements obtained from adjacent detection intervals. The processing circuitry may then integrate the measurement values along one or both the first dimension and the second dimension.

In some circumstances, the processing circuitry may be arranged to re-order the data in the two dimensional array so that the position of each measurement in the two dimensional array corresponds to a position of a crossover point between an excitation conductor and a detection conductor, in the grid of conductors. This may be desirable when the excitation and/or detection conductors are not selected in the order in which they are located on the grid. This re-ordering of the data will typically be performed after integrating the data in the array.

In one embodiment, the measurement circuitry comprises a plurality of detection switching blocks, each arranged to select a subset of detection conductors, wherein one or more of the detection switching blocks share at least one detection conductor with another detection switching block and wherein the processing circuitry is operable to combine the data obtained from the detection switching blocks prior to or after performing said integration. The combining may comprise adding or subtracting data values obtained by different detection switching blocks from the shared detection conductor. In some embodiments, each detection switching block is operable to provide double differential measurements and at least one single differential measurement and wherein the integration is initiated using the single differential measurement.

In other embodiments, the measurements obtained from the digitiser comprise double differential measurements and single differential measurements distributed amongst the double differential measurements and wherein the integration is seeded using the single differential measurements.

The excitation circuitry may be arranged to operate in a cyclic manner to select each of said excitation conductors during an excitation cycle, wherein an excitation cycle comprises a sequence of excitation intervals during each of which a different excitation conductor is selected by the excitation circuitry; and wherein the processing circuitry comprises: means for determining an amplitude of a signal generated in the measurement circuitry due to the excitation of an excitation conductor at the beginning of a given excitation cycle; means for determining transient corrections to be applied to subsequent measurements obtained during the given excitation cycle from the determined amplitude and a decay profile for the transient; means for correcting subsequent measurements obtained in the given excitation cycle using the determined transient corrections; and means for detecting the one or more objects positioned adjacent the grid of conductors using the corrected measurements.

According to another aspect, the present invention provides a digitiser comprising: a grid of conductors comprising a plurality of excitation conductors and a plurality of detection conductors; excitation circuitry for applying excitation signals to selected excitation conductors; measurement circuitry for obtaining measurements of signals obtained from selected detection conductors; and processing circuitry for processing measurements obtained by the measurement circuitry to detect one or more objects positioned adjacent the grid of conductors; wherein the excitation circuitry is arranged to operate in a cyclic manner to select each of said excitation conductors during an excitation cycle, wherein an excitation cycle comprises a sequence of excitation intervals during each of which a different excitation conductor is selected by the excitation circuitry; wherein the processing circuitry is operable to: determine an amplitude of a signal generated in the measurement circuitry due to the excitation of an excitation conductor at the beginning of a given excitation cycle; determine transient corrections to be applied to subsequent measurements obtained during the given excitation cycle from the determined amplitude and a decay profile for the transient; correct subsequent measurements obtained in the given excitation cycle using the determined transient corrections; and detecting the one or more objects positioned adjacent the grid of conductors using the corrected measurements.

The excitation circuitry may excite the same excitation conductor at the end of the excitation cycle and the transient correction depends upon the amplitude of the signal generated in the measurement circuitry due to the excitation of the excitation conductor at the beginning of the given excitation cycle and an amplitude of a signal generated in the measurement circuitry due to the excitation of the same excitation conductor at the end of the previous excitation cycle.

In one embodiment, the measurement values are differential values and the processing circuitry is operable to integrate the measurement values to determine the amplitude of the signal generated in the measurement circuitry due to the excitation of the excitation conductor at the beginning of the given excitation cycle.

According to another aspect, the present invention also provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein at least one of: i) excitation conductors, and ii) detection conductors; are coupled to a reference voltage via an impedance that is at least five times smaller than the capacitive impedance between adjacent conductors of the grid. The reference voltage may be a ground voltage, a mid-rail voltage or a power supply voltage.

Typically, the excitation conductors are coupled to ground via the impedance, although different excitation conductors may be coupled to different reference voltages. For example, one or more excitation conductors may be coupled to ground and one or more excitation conductors may be coupled to a power supply voltage.

Similarly, the detection conductors are typically coupled to a mid-rail voltage via an impedance and in some cases detection conductors are coupled to plural reference voltages via different impedances. For example, detection conductors may be coupled to ground and to a mid-rail voltage.

The impedance may comprise at least one of a capacitor and a resistor. It may comprise a combination of a capacitor and a resistor connected together in parallel.

The present invention also provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein at least one of: i) the excitation conductors, and ii) the detection conductors; are coupled to a reference voltage via an impedance that does not exceed twice the impedance of individual conductors of the grid.

Another aspect of the invention provides a digitiser comprising: a grid of conductors including a plurality of excitation conductors and a plurality of detection conductors; excitation circuitry for applying excitation signals to selected excitation conductors; measurement circuitry for obtaining measurements of signals obtained from selected detection conductors; processing circuitry for processing measurements obtained by the measurement circuitry to detect one or more objects positioned adjacent the grid of conductors; and control circuitry for controlling the operation of the excitation circuitry and the measurement circuitry; wherein each excitation conductor has first and second ends, wherein the excitation circuitry is coupled to the first and second ends of at least some of the excitation conductors, wherein the control circuitry is operable to control the excitation circuitry to operate in a first mode during which the excitation circuitry applies a common excitation voltage concurrently to the first and second ends of a selected excitation conductor and wherein the control circuitry is operable to control the excitation circuitry to operate in a second mode during which the excitation circuitry applies different excitation voltages concurrently to the first and second ends of a selected excitation conductor.

Measurements obtained when the excitation circuitry is operating in the first mode may be combined with measurements obtained when the excitation circuitry is operating in the second mode to determine the position of an object that is adjacent to the grid and that is inductively coupled to the excitation conductors.

The measurements obtained when the excitation circuitry is operating in the first mode may be weighted and combined with the measurements obtained when the excitation circuitry is operating in the second mode to reduce the effect of objects that are capacitively coupled to the excitation conductors and capacitively coupled to the detection conductors. The weighting may depend on the relative position between the detection conductor from which the measurement is obtained and the excitation conductor to which the excitation signal is applied.

Preferably during the second mode, the excitation circuitry is operable to apply complementary voltages to the opposite ends of the excitation conductor. For example positive and negative voltages of the same magnitude may be applied to opposite ends of the excitation conductors in this second mode.

According to another aspect, the present invention provides a digitiser comprising: a grid of conductors having a plurality of excitation conductors and a plurality of detection conductors; excitation circuitry for applying excitation signals to selected excitation conductors; measurement circuitry for obtaining measurements of signals obtained from selected detection conductors; and processing circuitry for processing measurements obtained by the measurement circuitry to detect one or more objects positioned adjacent the grid of conductors; wherein the measurement circuitry comprises a plurality of detection switching blocks, each arranged to obtain a plurality of differential measurements and at least one non-differential measurement from signals obtained from a subset of the detection conductors; and wherein the processing circuitry is operable to integrate the differential measurements from each detection switching block using the at least one non-differential measurement obtained from the detection switching block as an initial value for the integration.

The processing circuitry may integrate separately the differential measurements obtained from each detection switching block or it may integrate them together.

Each detection switching block may be arranged to obtain first and second non-differential measurements from signals obtained from the subset of the detection conductors and the processing circuitry may integrate the differential measurements from a detection switching block using the first non-differential measurement obtained from the detection switching block as an initial value for the integration and corrects the integrated values obtained using the second non-differential measurement obtained from the detection switching block.

Typically, each detection switching block is arranged to operate in a cyclic manner to select each of the detection conductors in the subset during a detection cycle, wherein a detection cycle comprises a sequence of detection intervals during each of which each detection switching block is operable to obtain a measurement from a selected one detection conductor or from a selected pair of detection conductors.

Each detection switching block may be arranged to select neighbouring detection conductors during plural consecutive detection intervals in an overlapping manner such that during a first detection interval a given selected detection conductor is paired with a first neighbouring detection conductor and during a second detection interval the given selected detection conductor is paired with a second neighbouring detection conductor. In one embodiment, each detection switching block is arranged to select the detection conductors in its subset such that a detection conductor selected during a last detection interval of a detection cycle neighbours (on the grid of conductors) a detection conductor selected by the detection switching block during a first detection interval of the detection cycle.

In some embodiments, one or more of the detection switching blocks share at least one detection conductor with another detection switching block and the processing circuitry is operable to combine the data obtained from the detection switching blocks prior to or after performing said integration. The combining may comprise adding and/or subtracting data values obtained by different detection switching blocks from the shared detection conductor.

The present invention also provides a digitiser comprising: a grid of conductors comprising a plurality of excitation conductors and a plurality of detection conductors; excitation circuitry for applying excitation signals to selected excitation conductors; measurement circuitry for obtaining a plurality of measurements from selected detection conductors; and processing circuitry for processing measurements obtained by the measurement circuitry to detect one or more objects positioned adjacent the grid of conductors; wherein the excitation circuitry is arranged to operate in a cyclic manner to select each of said excitation conductors during an excitation cycle, wherein an excitation cycle comprises a sequence of excitation intervals during each of which a different pair of neighbouring excitation conductors is selected by the excitation circuitry and to which complementary excitation signals are applied; wherein the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle, wherein a detection cycle comprises a sequence of detection intervals during each of which a different pair of neighbouring detection conductors is selected by the measurement circuitry; wherein, for a given selected pair of neighbouring excitation conductors and a given selected pair of detection conductors, the measurement obtained by said measurement circuitry comprises a double differential measurement that depends upon a difference between: i) a difference between a mutual capacitive coupling between a first one of the detection conductors of the selected pair of detection conductors and each of the excitation conductors of the selected pair of excitation conductors; and ii) a difference between a mutual capacitive coupling between a second one of the detection conductors of the selected pair of detection conductors and each of the excitation conductors of the selected pair of excitation conductors; wherein the measurement circuitry comprises sample and hold circuitry for sampling and holding measurements obtained from each measurement channel, wherein the sample and hold circuitry comprises a plurality of first and second capacitors, wherein each measurement channel has an associated first and second capacitor, wherein the sample and hold circuitry is arranged such that during first measurement intervals signals from the measurement channels are applied to the associated first capacitors and during second measurement intervals signals from the measurement channels are applied to the associated second capacitors, and wherein during the first measurement intervals the sample and hold circuitry is arranged to couple signals stored on the second capacitors to an analogue to digital converter for conversion into corresponding digital values and during the second measurement intervals the sample and hold circuitry is arranged to couple signals stored on the first capacitors to the analogue to digital converter for conversion into corresponding digital values.

The present invention also provides a method of operating a digitiser having a grid of conductors comprising a plurality of excitation conductors and a plurality of detection conductors; excitation circuitry for applying excitation signals to selected excitation conductors; measurement circuitry for obtaining a plurality of measurements from selected detection conductors; and processing circuitry for processing measurements obtained by the measurement circuitry to detect one or more objects positioned adjacent the grid of conductors; the method comprising: operating the excitation circuitry cyclically to select each of the excitation conductors during an excitation cycle, wherein an excitation cycle comprises a sequence of excitation intervals during each of which a different pair of neighbouring excitation conductors is selected by the excitation circuitry and to which complementary excitation signals are applied; operating the measurement circuitry cyclically to select each of said detection conductors during a detection cycle, wherein a detection cycle comprises a sequence of detection intervals during each of which a different pair of neighbouring detection conductors is selected by the measurement circuitry; obtaining, for a given selected pair of neighbouring excitation conductors and a given selected pair of detection conductors, a double differential measurement that depends upon a difference between: i) a difference between a mutual capacitive coupling between a first one of the detection conductors of the selected pair of detection conductors and each of the excitation conductors of the selected pair of excitation conductors; and ii) a difference between a mutual capacitive coupling between a second one of the detection conductors of the selected pair of detection conductors and each of the excitation conductors of the selected pair of excitation conductors; demodulating signals obtained from the selected detection conductors; and high pass filtering (and preferably band pass filtering) signals output from the demodulating.

The invention also provides a method of making a transducer for use in a digitiser, the method comprising: applying a first adhesive layer on a substrate; attaching a first printed circuit board along a first edge of the substrate; laying a first set of conductors on the first adhesive layer that extend away from the first edge; using ultrasonic energy to connect mechanically and electrically the ends of the conductors of the first set to the first printed circuit board; applying a second adhesive layer on the first set of conductors; attaching a second printed circuit board along a second edge of the substrate; laying a second set of conductors on the second adhesive layer that extend away from the second edge; and using ultrasonic energy to connect mechanically and electrically the ends of the conductors of the second set to the second printed circuit board.

An ultrasonic bonder may be used to bond the ends of the conductors to the printed circuit boards. Alternatively an ultrasonic solder may be used to connect mechanically and electrically the ends of the conductors to the printed circuit board.

The present invention also provides a method of manufacturing a transducer for use is a digitiser, the method comprising: applying a first conductive strip to an insulating substrate along a Y-direction; a first arranging step of arranging one or more conductors over the insulating substrate that extend along an X-direction and that electrically connect at one end to the first conductive strip; applying a second conductive strip to the insulating substrate along the X-direction; a second arranging step of arranging one or more conductors over the insulating substrate that extend along the Y-direction and that electrically connect at one end to the second conductive strip; and cutting, etching or otherwise breaking the first and second conductive strips to form separate conductive pads to allow for connection of the conductors to electronics of the digitiser.

In one embodiment, the first arranging step lays a first conductor that extends away from and returns back to the first conductive strip one or more times, wherein the method further comprises cutting, etching or otherwise breaking the first conductor at an end remote from the first conductive strip and wherein the cutting, etching or otherwise breaking of the first conductive strip also cuts the first conductor into a plurality of electrically separate conductors that extend along the X-direction.

Similarly, the second arranging step may lay a second conductor that extends away from and returns back to the second conductive strip one or more times, wherein the method further comprises cutting, etching or otherwise breaking the second conductor at an end remote from the second conductive strip and wherein the cutting, etching or otherwise breaking of the second conductive strip also cuts the second conductor into a plurality of electrically separate conductors that extend along the Y-direction.

The one or more of the conductors may be arranged to extend in a serpentine pattern along the insulating substrate.

Typically one or more printed circuit boards are connected to the conductive pads.

A transparent layer may be provided over the conductors to sandwich the conductors between the substrate and the transparent layer.

In one embodiment, the transducer is mounted over a display to form a touch screen. In other embodiments, it is mounted under the surface of a whiteboard.

At least one of the conductive strips may be formed on an edge of the insulating substrate and a further conductive strip may be provided that overlaps with the conductive strip, which further conductive strip folds over the edge of the insulating substrate onto an opposite face of the insulating surface. In this case, the cutting, etching or otherwise breaking the first and second conductive strips also breaks the further conductive strip on both faces of the insulating substrate to provide electrically connected conductive pads on opposing faces of the insulating substrate.

Alternatively, at least one of the conductive strips is formed to overlap with an edge of the insulating substrate to provide a conductive strip on opposing faces of the insulating substrate and wherein the cutting, etching or otherwise breaking the first and second conductive strips breaks the conductive strip on both faces of the insulating substrate to provide electrically connected conductive pads on opposing faces of the insulating substrate.

In one embodiment of this aspect, the method comprises the following steps: applying a first adhesive copper busbar strip to the PVB sheet along the Y-direction; using robotic arm thermally bonding a thin metallic wire into the predefined serpentine pattern along the X-direction of the PVB sheet perpendicular to the first copper busbar; applying an additional conductive adhesive copper busbar strip on the top of the first copper busbar in order to sandwich the thin metallic wire between the two copper strips; turning over the PVB sheet and applying a second copper busbar strip to the PVB sheet along the X-direction, perpendicular to the first busbar; using robotic arm thermally bonding a thin metallic wire into the predefined serpentine pattern along the Y-direction of the PVB sheet perpendicular to the second copper busbar; cutting PVB material to the exact size; applying a much wider conductive adhesive copper strip on the top of the second busbar and tucking in the remaining width of this copper foil underneath the PVB material to present the electrical contact surface for the second busbar on both surfaces of the PVB material; and punching through the copper busbar between adjacent arms of the thin wire in order to create electrically isolated contact pads for each wire belonging to the X-Y wire grid; placing the PVB foil between two sheets of glass of slightly dissimilar size in such a manner that allows to leave exposed the PVB foil near the areas with the contact pads; applying a temporary adhesive strip to cover exposed areas of the PVB foil and the copper contact pads; carrying out the vacuum lamination of the glass at elevated temperature; removing after the lamination process the temporary adhesive strip to expose contact pads; attaching a first and second PCBs on the top of the first and second busbar; soldering contact pads of the PCB to the contact pads at the PVB; and connecting the electric cable between the first and second PCB to supply control signals for the excitation channels.

In another example of the aspect, the method comprises the following steps: applying a first layer of double-sided mounting adhesive on a surface of the cardboard; applying a first adhesive copper busbar strip to the cardboard along the Y-direction; using robotic arm bonding a thin metallic wire into the predefined serpentine pattern along the X-direction of the cardboard perpendicular to the first copper busbar; applying a second double-sided mounting adhesive over the array of bonded thin wires but without covering the first copper busbar; applying a second adhesive copper busbar strip to the cardboard along the X-direction; using robotic arm bonding a thin metallic wire into the predefined serpentine pattern along the Y-direction of the cardboard perpendicular to the second copper busbar; cutting cardboard to the exact size; applying wide conductive adhesive copper strip on the top of the first and second busbar and tucking in the remaining width of this copper foil underneath the cardboard to present the electrical contact surface for the first and second busbar on both surfaces of the cardboard; punching through the copper busbar between adjacent arms of the thin wire in order to create electrically isolated contact pads for each wire belonging to the X-Y wire grid; applying third double sided mounting adhesive over the array of bonded wires also covering the first and second busbar; attaching cardboard with the integrated wire grid to the inner surface of the white board; attaching first and second PCBs on the top of the first and second busbar; soldering contact pads of the PCB to the contact pads at the cardboard; and connecting the electric cable between the first and second PCB to supply control signals for the excitation channels.

In another example of this aspect, the method comprises the following steps: applying optically clear double-sided mounting adhesive on a surface of the protective glass; attaching first PCB along the Y-edge of the glass substrate; using robotic arm with multiple feeds for wires, bonding a regular array of thin metallic wires along the X-direction of the glass substrate perpendicular to the first PCB; terminating each wire from the created first array of thin wires at the first PCB using ultrasonic wedge bonding or ultrasonic soldering to the gold plated copper based PCB pads; applying optically clear double-sided mounting adhesive over the array of bonded thin wires; attaching second PCB along the X-edge of the glass substrate; using robotic arm with multiple feeds for wires, bonding a regular array of thin metallic wires along the Y-direction of the glass substrate perpendicular to the second PCB; terminating each wire from the created second array of thin wires at the second PCB using ultrasonic wedge bonding or ultrasonic soldering to the gold plated copper based PCB pads; spraying optically clear UV curable liquid lamination over the second array of thin metallic wires in order to seal the free adhesive surface and cure with UV light; applying extra conductive adhesive to pot the termination of thin metallic wires to PCB; attaching a flat cable between the second PCB and the first PCB to provide control signals for the excitation channels.

According to another aspect, the present invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors. In one embodiment, the excitation circuitry is arranged to operate in a cyclic manner to select each of the excitation conductors during an excitation cycle, wherein an excitation cycle comprises a sequence of excitation intervals during each of which a different pair of neighbouring excitation conductors is selected by the excitation circuitry and to which complementary excitation signals are applied, and wherein the excitation circuitry is arranged to polarity modulate each excitation signal using a polarity control signal so that the polarity of the excitation signal applied to a selected conductor changes during a time that the excitation conductor is selected. The neighbouring conductors may be adjacent each other or there may be one or more (typically one or two) intervening conductors between the selected pair.

The grid of conductors may be formed from two sets of parallel conductors lying at an angle to each other (such as 90 degrees), although this is not essential as any grid can be used.

The polarity control signal is preferably periodic and the time that an excitation conductor is selected is preferably an integer multiple of the period of the polarity control signal—so that the excitation signal applied to an excitation conductor has equal amounts of positive excitation signal and negative excitation signal.

The excitation circuitry may be arranged to select neighbouring excitation conductors during plural consecutive excitation intervals in an overlapping manner such that during a first excitation interval a given selected excitation conductor is paired with a first neighbouring excitation conductor and during a second excitation interval the given selected excitation conductor is paired with a second neighbouring excitation conductor. Such overlapping can facilitate the switching scheme used to control application of the excitation signals to the excitation conductors and simplifies the hardware design for the application of the polarity control signals to the excitation circuitry. In combination with the polarity modulation, the overlapping also maximises the achievable update for the digitiser, as positive and negative measurements for each conductor can be obtained from measurements with different neighbours.

The excitation circuitry may also be arranged so that, during an initial excitation interval of an excitation cycle, excitation conductors are selected without overlap with excitation conductors selected in a final excitation interval of a preceding excitation cycle. This helps to reduce the bandwidth requirements of the measurement circuitry, which in turn reduces the noise contained in the measurements.

In one embodiment the excitation circuitry is arranged to select the excitation conductors such that an excitation conductor selected during a last excitation interval of an excitation cycle neighbours an excitation conductor selected by the excitation circuitry during a first excitation interval of the excitation cycle. This can be achieved by scanning the excitation signal across the grid and back again one or more times.

The measurement circuitry may also be arranged to operate in a cyclic manner to select each of the detection conductors during a detection cycle, wherein a detection cycle comprises a sequence of detection intervals during each of which a different combination of detection conductors is selected by the measurement circuitry. Preferably the measurement circuitry selects one or more pairs of neighbouring detection conductors during each detection interval. As before, the neighbouring conductors may be adjacent each other or there may be one or more (typically one or two) intervening conductors between the selected pair. Preferably, the measurement circuitry determines differential measurements of signals obtained from each selected pair of neighbouring detection conductors.

The measurement circuitry may be arranged to select neighbouring detection conductors during plural consecutive detection intervals in an overlapping manner such that during a first detection interval a given selected detection conductor is paired with a first neighbouring detection conductor and during a second detection interval the given selected detection conductor is paired with a second neighbouring detection conductor.

In one embodiment, each detection interval corresponds in duration to one excitation interval; and in an alternative embodiment, each excitation interval corresponds in duration to one detection cycle.

Typically, the digitiser will include control circuitry for generating control signals for controlling selection of the excitation conductors by the excitation circuitry and for generating control signals for controlling selection of the detection conductors by the measurement circuitry. In this case, the control circuitry is preferably arranged to generate the control signals on a cyclic basis and in a free running manner independently of the processing circuitry and is arranged to send a signal to the processing circuitry each measurement cycle (such as at the end thereof) to inform the processing circuitry that measurements are ready to be processed by the processing circuitry. The control circuitry is able to write measurement data into a memory (for example using Direct Memory Access techniques) that is shared with the processing circuitry.

In an alternative embodiment, instead of applying the polarity modulation on the excitation signal, it may be applied to the detection signals obtained from the detection conductors. In this alternative, the invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors. The measurement circuitry is arranged to operate in a cyclic manner to select each of the detection conductors during a detection cycle, wherein a detection cycle comprises a sequence of detection intervals during each of which a different pair of neighbouring detection conductors is selected by the measurement circuitry, wherein the measurement circuitry is arranged to polarity modulate a detection signal obtained from each selected detection conductor using a polarity control signal so that the polarity of the detection signal changes during a time that the detection conductor is selected.

Again, the polarity control signal may be periodic and the time that a detection conductor is selected may be an integer multiple of the period of the polarity control signal. This ensures that the signals obtained from each detection conductor do not have significant low frequency content and allows the measurement circuitry to remove low frequency noise from the measurements.

In one embodiment, the measurement circuitry selects neighbouring detection conductors during plural consecutive detection intervals in an overlapping manner such that during one detection interval a given selected detection conductor is paired with a first neighbouring detection conductor and during a next detection interval the given selected detection conductor is paired with a second neighbouring detection conductor. Such overlapping can facilitate the switching scheme used to control application of the detection signals through the measurement circuitry and simplifies the hardware design for the application of the polarity control signal to the measurement circuitry.

Preferably the measurement circuitry is arranged so that, during an initial detection interval of a detection cycle, detection conductors are selected without overlap with detection conductors selected in a final detection interval of a preceding detection cycle. This helps to reduce the bandwidth requirements of the measurement circuitry which in turn reduces the amount of noise in the obtained measurements.

The measurement circuitry may be arranged to select the detection conductors such that a detection conductor selected during a last detection interval of a detection cycle neighbours a detection conductor selected by the measurement circuitry during a first detection interval of the detection cycle. This may help to facilitate the subsequent processing of the obtained measurements.

In this alternative, the excitation circuitry may also be arranged to operate in a cyclic manner to select each of the excitation conductors during an excitation cycle, wherein an excitation cycle comprises a sequence of excitation intervals during each of which a different pair of neighbouring excitation conductors is selected by the excitation circuitry. In this case, the excitation circuitry may select neighbouring excitation conductors during plural consecutive excitation intervals in an overlapping manner such that during a first excitation interval a given selected excitation conductor is paired with a first neighbouring excitation conductor and during a second excitation interval the given selected excitation conductor is paired with a second neighbouring excitation conductor.

The measurement circuitry is preferably arranged to determine differential measurements of signals obtained from the selected pairs of neighbouring detection conductors, as this reduces noise and in particular common mode noise that may otherwise cause errors in the determined position information.

According to another aspect, the invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein the measurement circuitry is arranged to operate in a cyclic manner to select each of the detection conductors during a detection cycle, wherein a detection cycle comprises a sequence of detection intervals during each of which a different pair of neighbouring detection conductors is selected by the measurement circuitry, wherein the measurement circuitry is arranged to select neighbouring detection conductors during plural consecutive detection intervals in an overlapping manner such that during one detection interval a given selected detection conductor is paired with a first neighbouring detection conductor and during a next detection interval the given selected detection conductor is paired with a second neighbouring detection conductor and wherein the measurement circuitry is arranged to determine differential measurements of signals obtained from the selected pairs of neighbouring detection conductors.

According to a further aspect, the invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein the excitation circuitry is arranged to operate in a cyclic manner to select each of the excitation conductors during an excitation cycle, wherein an excitation cycle comprises a sequence of excitation intervals during each of which a different pair of neighbouring excitation conductors is selected by the excitation circuitry and to which excitation signals with opposite polarity are applied, wherein the excitation circuitry is arranged to select neighbouring excitation conductors during plural consecutive excitation intervals in an overlapping manner such that during a first excitation interval a given selected excitation conductor is paired with a first neighbouring excitation conductor and during a second detection interval the given selected excitation conductor is paired with a second neighbouring excitation conductor and wherein the excitation circuitry is arranged to select the excitation conductors such that an excitation conductor selected during a last excitation interval of an excitation cycle neighbours an excitation conductor selected by the excitation circuitry during a first excitation interval of the excitation cycle. This arrangement helps to reduce electromagnetic interference generated by applying excitation signals to the excitation conductors of the grid whilst reducing the bandwidth requirements of the measurement circuitry.

This aspect also provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the detection circuitry, wherein the detection circuitry is arranged to select the detection conductors sequentially and in an overlapping manner from a start detection conductor to an end detection conductor and wherein the start detection conductor neighbours the end detection conductor within said grid.

According to a further aspect, the invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; and processing circuitry for processing measurements obtained by the measurement circuitry to detect one or more objects positioned adjacent the grid of conductors; wherein the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle, wherein a detection cycle comprises a sequence of detection intervals during each of which a different pair of neighbouring detection conductors is selected by the measurement circuitry; wherein the measurement circuitry comprises sample and hold circuitry for sampling and holding measurements obtained from each measurement channel, wherein the sample and hold circuitry comprises a plurality of first and second capacitors, wherein each measurement channel has an associated first and second capacitor, wherein the sample and hold circuitry is arranged such that during first measurement intervals signals from the measurement channels are applied to the associated first capacitors and during second measurement intervals signals from the measurement channels are applied to the associated second capacitors, and wherein during the first measurement intervals the sample and hold circuitry is arranged to couple signals stored on the second capacitors to an analogue to digital converter for conversion into corresponding digital values and during the second measurement intervals the sample and hold circuitry is arranged to couple signals stored on the first capacitors to the analogue to digital converter for conversion into corresponding digital values. This allows higher frequencies to be used, which in turn allows the digitiser to work with larger display areas having a larger number of measurement points to be processed.

According to a further aspect, the invention provides a digitiser comprising: a grid of conductors comprising a plurality of excitation conductors and a plurality of detection conductors; excitation circuitry for applying excitation signals to selected excitation conductors; measurement circuitry for obtaining measurements from selected detection conductors; control circuitry for generating control signals for controlling selection of the excitation conductors by the excitation circuitry and for generating control signals for controlling selection of the detection conductors by the measurement circuitry; and processing circuitry for processing measurements obtained by the measurement circuitry to detect one or more objects positioned adjacent the grid of conductors; wherein the control circuitry is arranged to generate the control signals on a cyclic basis and in a free running manner independently of the processing circuitry and is arranged to send a signal to the processing circuitry each measurement cycle to inform the processing circuitry that measurements are ready to be processed by the processing circuitry. This allows the control circuitry and the processing circuitry to be able to function at high speed even for large digitiser sizes (above 38 cm diagonal).

According to another aspect, the invention provides a digitiser comprising: a grid of conductors comprising a plurality of excitation conductors and a plurality of detection conductors; excitation circuitry for applying excitation signals to selected excitation conductors; measurement circuitry for obtaining a plurality of measurements from selected detection conductors; and processing circuitry for processing measurements obtained by the measurement circuitry to detect one or more objects positioned adjacent the grid of conductors; wherein the excitation circuitry is operable to apply a first excitation signal having a first frequency and a second excitation signal having a second frequency different to the first frequency, to the excitation conductors; wherein the measurement circuitry comprises first and second measurement channels, the first measurement channel for obtaining measurements at the first frequency and the second measurement channel for obtaining measurements at the second frequency; sampling circuitry for sampling signals output from the measurement channels using a sample switch control signal having a third frequency; and wherein the first, second and third frequencies are chosen such that the difference in frequency between the first and second frequencies is an integer multiple of the third frequency.

Typically, the first and second measurement channels will each include a band pass (or high pass) filter having a high corner frequency and the difference in frequency between the first and second frequencies is preferably several times greater than (typically at least three times greater than) the high corner frequency of the filter. The difference in frequency between the first and second frequencies may also be at least eight times greater than the third frequency.

If the first and second measurement channels each includes a filter having a high corner frequency and the difference in frequency between the first and second frequencies is less than three times greater than the high corner frequency of the filter; then the measurement circuitry is preferably designed so that when the sample switch control signal causes the sampling of the output signal from a measurement channel, the unwanted signal having a frequency corresponding to the difference in frequency between the first and second frequencies, is at or close to zero in value. Stated differently, when the difference in frequency between the first and second frequencies is less than eight times greater than the third frequency and the measurement circuitry is preferably designed so that when said sample switch control signal causes the sampling of an output signal from a measurement channel, an unwanted signal having a frequency corresponding to the difference in frequency between the first and second frequencies, is at or close to zero in value.

In one embodiment, when the difference in frequency between the first and second frequencies is less than three times greater than the high corner frequency of the filter; the processing circuitry is arranged to perform a weighted combination of measurements obtained from a pair of detection conductors from the first and second measurement channels, where the weighting is chosen to reduce the effect of the unwanted signal having a frequency corresponding to the difference in frequency between the first and second frequencies. Stated differently, when the difference in frequency between the first and second frequencies is less than eight times greater than the third frequency the processing circuitry may be arranged to perform a weighted combination of measurements obtained from a pair of detection conductors from the first and second measurement channels, where the weighting is chosen to reduce the effect of an unwanted signal having a frequency corresponding to the difference in frequency between the first and second frequencies. The weighted combination may be performed as follows:

$$v_{ij\ corrected}^{I} = v_{ij}^{I} - \sigma * v_{ij}^{II}$$

$$v_{ij\ corrected}^{II} = (v_{ij}^{II} - \sigma * v_{ij}^{I}) * f^{I}/f^{II}$$

where $v_{ij}^{I}$ is the measurement obtained from the first measurement channel; $v_{ij}^{II}$ is the measurement obtained from the second measurement channel; $\sigma$ is the weighting; $f^{I}$ is the first frequency; and $f^{II}$ is the second frequency.

According to another aspect, the invention provides a digitiser comprising: a grid of conductors comprising a plurality of excitation conductors and a plurality of detection conductors; excitation circuitry for applying excitation signals to selected excitation conductors; measurement circuitry for obtaining a plurality of measurements from selected detection conductors; and processing circuitry for processing measurements obtained by the measurement circuitry to detect one or more objects positioned adjacent the grid of conductors; wherein the excitation circuitry is operable to apply a first excitation signal having a first frequency and a second excitation signal having a second frequency different to the first frequency, to the excitation conductors; wherein the measurement circuitry comprises first and second measurement channels, the first measurement channel for obtaining measurements at the first frequency and the second measurement channel for obtaining measurements at the second frequency; sampling circuitry for sampling signals output from the measurement channels using a sample switch control signal having a third frequency; wherein the difference in frequency between the first and second frequencies is less than eight times greater than the third frequency; and wherein the processing circuitry is arranged to perform a weighted combination of measurements obtained from a pair of detection conductors from the first and second measurement channels, where the weighting is chosen to reduce the effect of an unwanted signal having a frequency corresponding to the difference in frequency between the first and second frequencies.

As those skilled in the art will appreciate, these various aspects of the invention may be provided separately or they may be combined together in one embodiment. Similarly, the modifications and alternatives described above are applicable to each aspect of the invention and they have not been repeated here for expediency.

BRIEF DESCRIPTION OF THE DRAWINGS

These and other aspects of the invention will become apparent from the following detailed description of embodiments and alternatives that are described by way of example only, with reference to the following drawings in which:

FIG. 2 is a plot illustrating the rise in power consumption and increase of the cost of the digitiser with the size of the display diagonal, for different conductor technologies;

FIG. 14a schematically illustrates a spectrum of the signal obtained after demodulation that is to be amplified and filtered by the amplification and filtering circuit shown in FIG. 13;

FIG. 14b illustrates a desired filter response for the amplification and filtering circuit shown in FIG. 13 that can be used to filter the signal from the demodulator to remove the high frequency demodulation components whilst maintaining the signal components that will vary with the presence of the user's finger;

FIG. 15 illustrates the form of various control signals and the form of an output signal from the amplification and filtering circuit at the end of one detection interval and at the start of the next detection interval;

FIG. 17a is a block diagram illustrating in more detail the main components of sample and hold circuitry used to sample and hold the signals obtained from the amplification and filtering circuits for conversion into digital values by an analogue to digital converter;

FIG. 17b is a signal diagram illustrating control signals used to control the sample and hold circuitry shown in FIG. 17a and illustrating an analogue to digital converter trigger signal used to trigger the analogue to digital converter to make a conversion;

FIG. 31a schematically illustrates alternative excitation circuitry used to apply excitation signals to the excitation conductors in which the polarity control signal is applied to the excitation signals that are applied to the excitation conductors;

FIG. 37 is a signal diagram illustrating the control signals used to control the sample and hold circuitry shown in FIG. 36 and illustrating an analogue to digital converter trigger signal used to control the triggering of the analogue to digital converter;

FIG. 38 illustrates alternative excitation circuitry used to excite the excitation conductors of the grid shown in FIG. 3 in which there is no extra multiplexor input;

FIG. 39 illustrates timing diagrams and signals applied to the excitation conductors with the circuitry shown in FIG. 38 and showing the form of an output obtained from the amplification and filtering circuit;

FIG. 40c is a plot illustrating a transient response to one excitation interval related to the excitation conductor $X_i$;

FIG. 40d is a transient response to the excitation of conductor Xmax energised at the end and the beginning of each excitation interval;

FIG. 41 illustrates the control and excitation signals applied in this embodiment and a signal obtained from one of the amplification and filtering circuits at the boundary between two detection intervals;

FIG. 44a illustrates a further alternative way of connecting the detection conductors through the detection switching blocks;

FIG. 44c is a timing diagram illustrating an overall detection cycle in which a differential measurement is obtained between different pairs of detection conductors shown in FIG. 44b;

FIG. 44d schematically illustrates the way in which data obtained from adjacent detection switching blocks are re-ordered prior to integration by the measurement and processing unit;

FIG. 46 is a timing diagram illustrating the control signals used to control the multiplexing of the excitation signals to the excitation conductors in this embodiment;

FIG. 47b is a circuit diagram illustrating an alternative amplification and filtering circuit used to amplify and filter a differential measurement obtained from a selected pair of detection conductors according to the switching circuitry shown in the FIG. 47a;

FIG. 50 is a timing diagram for a modification to the embodiment of FIGS. 45 to 49 in which there is no spare input to the detection switching block;

FIG. 52a is a circuit diagram illustrating the connection of detection conductors to switching multiplexers used in a switching block that is adjacent to the switching block shown in FIG. 33;

FIG. 52b is a timing diagram illustrating the timings when the signals from the different detection conductors are multiplexed through the switching block shown in FIG. 52a;

FIG. 55b is a timing diagram illustrating the way in which the signals from the detection conductors shown in FIG. 55a are switched through the switching circuitry and showing an output from the amplification and filtering circuit;

FIG. 56a is a block diagram illustrating switching circuitry used in this alternative embodiment to control the switching of signals obtained from pairs of detection conductors using a dedicated blanked-off signal for disconnecting amplification and filtering circuit from the detection switching block at and immediately after the edges of the polarity control signal;

FIG. 59c is a timing diagram illustrating the way in which the new enable signal enb2 is used to achieve the de-phasing between the boundaries of the detection cycle T_dc and the boundaries of the excitation window $\Delta t_{n+1}$_e.

DETAILED DESCRIPTION

First Embodiment
Overview

Figure 3:
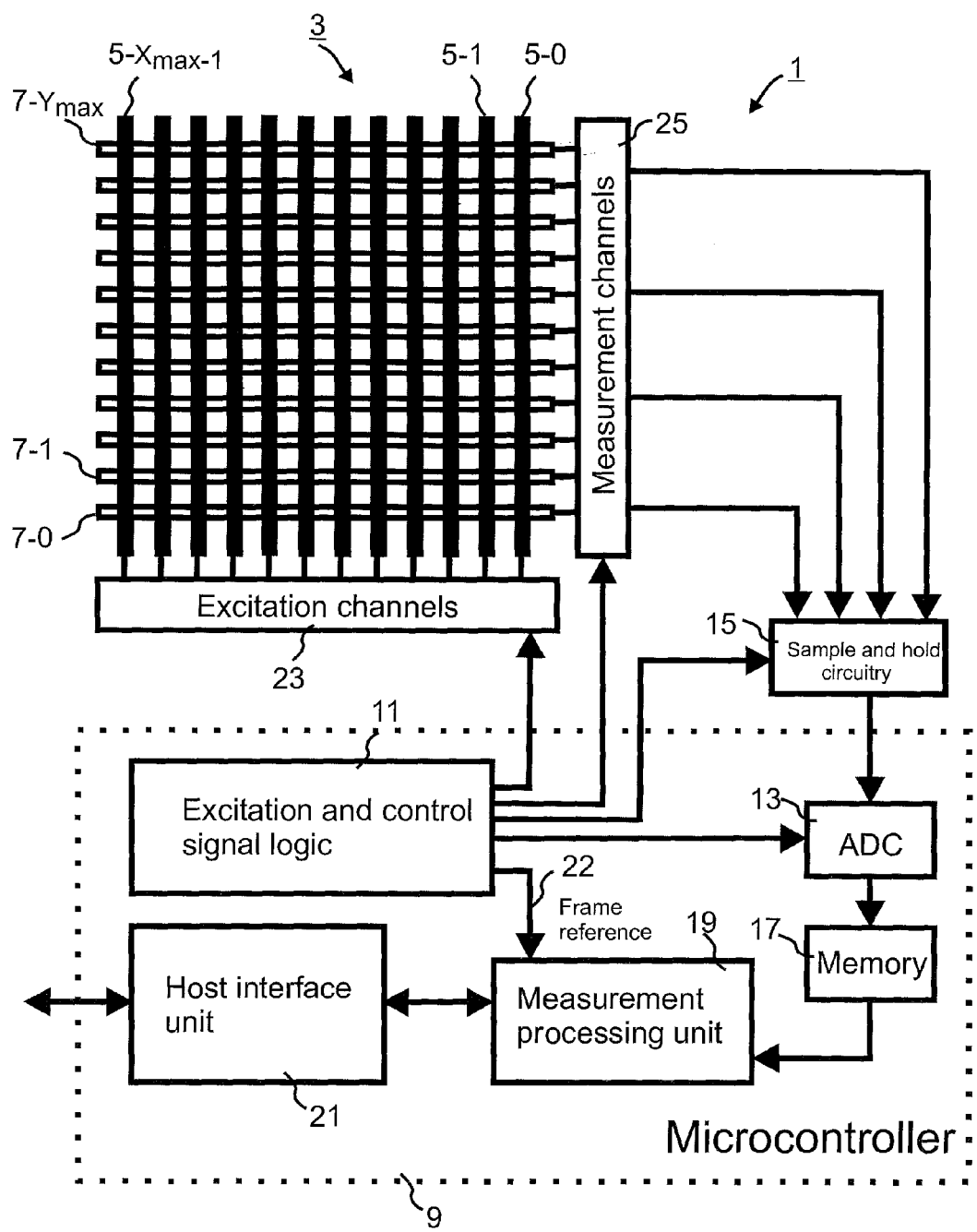
FIG. 3 is a schematic overview of an X-Y digitiser system illustrating the grid of X-Y conductors and the associated excitation and detection electronics.

FIG. 3 is a schematic block diagram illustrating the main components of the X-Y digitiser 1 used in this embodiment to sense user inputs from one or more fingers or from one or more conductive styli (not shown). The digitiser includes a grid 3 of excitation conductors 5-0, 5-1 . . . 5-Xmax–1 and a plurality of detection conductors 7-0, 7-1 . . . 7-Ymax. In this embodiment, as schematically illustrated in FIG. 3, the excitation conductors 5 and the detection conductors 7 are arranged in orthogonal directions. When the digitiser 1 is used to form a touch screen, the excitation conductors 5 and the detection conductors 7 are overlaid on top of the display screen (not shown).

The grid of conductors 3 is connected to a microcontroller 9 that controls the application of excitation signals to the excitation conductors 5 and that processes the signals obtained from the detection conductors 7. A shown in FIG. 3, the microcontroller 9 includes excitation and control signal logic 11 that generates the appropriate excitation and control signals used for controlling the operation of the digitiser 1 to obtain the measurements from the X-Y grid 3. The microcontroller 9 also includes an analogue to digital converter (ADC) 13 which converts the analogue measurements held by sample and hold circuitry 15 into digital values which are then stored in memory 17. The microcontroller 9 also includes a measurement processing unit 19 which processes the digital measurements stored in memory 17 to determine the location(s) of any user touches over the grid 3 and which then reports these locations to a host device via a host interface unit 21. As will be explained in more detail below, during normal operation, the excitation and control signal logic 11 operates independently of the measurement processing unit 19 and updates the measurements obtained from the grid 3 at a defined measurement cycle rate. At the end of each measurement cycle, the excitation and control signal logic 11 passes a frame reference signal 22 to the measurement processing unit 19 informing the measurement processing unit 19 that the next set of measurements have been stored in the shared memory 17 and are ready for processing. Whilst the excitation and control signal logic 11 is controlling the grid 3 to obtain the next set of measurements, the measurement processing unit 19 processes the previous set of measurements obtained during the last measurement cycle.

In this embodiment, the X-Y digitiser 1 is arranged to determine measurements of the mutual capacitance between each excitation conductor 5 and each detection conductor 7 at their intersection point (referred to below as the crossover points). To do this, the excitation and control signal logic 11 sequentially applies an excitation signal to selected excitation conductors until the excitation signal has been applied to each of the excitation conductors 5 along the grid 3. Excitation channels 23 are provided for controlling the selection of the excitation conductor(s) that are selected, during a given excitation interval, to receive the excitation signal. Similarly, during a given detection interval, the excitation and control signal logic 11 arranges for the signals from selected detection conductors 7 to be measured whilst the selected excitation conductor(s) are being energised. This selection of the detection conductors 7 is performed by the measurement channels 25 under control of the control signal logic 11. In this embodiment, the excitation and control signal logic 11 selects the detection conductors 7 from which measurements will be obtained and then controls the scanning of the excitation signal across all of the excitation conductors 5. The excitation and control signal logic 11 then selects the next set of detector conductors 7 from which measurements will be obtained and then again scans the excitation signal across all of the excitation conductors 5. Once this processes has been completed for all of the detection conductors 7, the measurement cycle ends and the excitation and control signal logic 11 sends the frame reference signal 22 to the measurement processing unit 19 telling it that the next set of measurements are ready in memory 17; and the excitation and control signal logic 11 starts the measurement process again. As will become clear from the following description, the excitation and control signal logic 11 operates continuously in a free running manner using a number of free-running synchronised clock signals and PWM signals.

Excitation Channels

Figure 4:
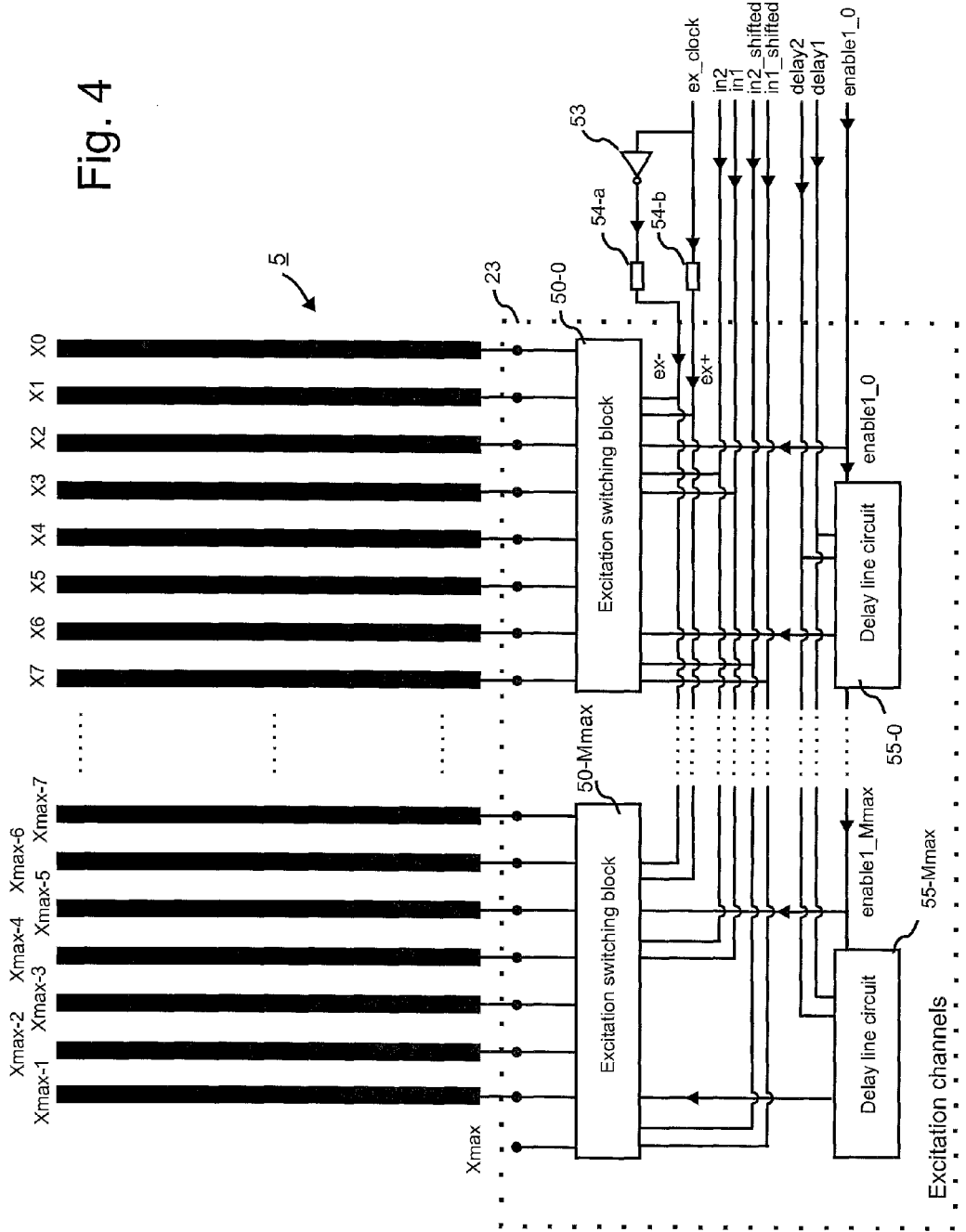
FIG. 4 schematically illustrates in more detail the excitation circuitry used to apply excitation signals to excitation conductors (the X conductors) forming part of the grid shown in FIG. 3.

FIG. 4 is a block diagram illustrating in more detail the multiplexing and control signal structure of the excitation channels 23 used in this embodiment. As shown in FIG. 4, each of the excitation conductors 5 is connected to a respective input of one of the excitation switching blocks 50-0 to 50-Mmax. In this embodiment, each of the excitation switching blocks 50 has eight outputs each for connection to a respective one of the excitation conductors 5, with the exception of the last output of the last excitation switching block 50-Mmax, which is not connected to an excitation conductor 5. The significance of this "missing" excitation conductor will become clear from the subsequent description.

The number of excitation conductors 5 and the number of multiplexors used in the excitation channels 23 depends on the size of the display screen (not shown) for which the grid 3 of conductors is designed. As an example, a screen having a diagonal dimension of about 203 cm (80 inches) and with a 16:9 aspect ratio, has a dimension in the X direction of approximately 177 cm and a dimension in the Y direction of approximately 100 cm. If forty excitation switching blocks 50 are provided each having eight outputs, then this allows for connection of three hundred and nineteen excitation conductors (whilst keeping the last output unconnected). Three hundred and nineteen excitation conductors 5 arrayed evenly along the 177 cm dimension, gives a spacing between adjacent excitation conductors 5 of approximately 5.6 mm, which is sufficient to sense a user's finger and/or conductive stylus with an accuracy of 1 mm over the whole surface of the display.

FIG. 4 also shows the excitation and control signals output by the excitation and control signal logic 11 to the excitation channels 23. These signals include the following:

ex_clock—this is the signal that is used to form the excitation signal that is applied to the selected excitation conductors 5. As shown in FIG. 4, the ex_clock signal is inverted by an inverter 53 to form two excitation signals: ex– and ex+, which are applied, via resistors 54-a and 54-b, to each excitation switching block 50. The resistors 54 act with capacitors 63 (shown in FIG. 5) that are attached to each excitation conductor 5 to filter out high frequency components of the excitation signal.

in1, in2, in1_shifted and in2_shifted—these are control signals used to select which of the multiplexor output terminals are connected to the multiplexor input terminals.

enable1_0—this is an enable signal that is used to enable excitation switching block 50-0. As shown in FIG. 4, the enable1_0 is delayed by respective delay line circuits 55-0 to 55-Mmax that are connected together in a serial manner. Each delay line circuit 55 outputs a shifted version of the input enable signal to the corresponding excitation switching block 50.

delay1 & delay2—these are control signals for controlling the delays introduced by the delay line circuits 55.

Excitation Switching Block

Figure 5:
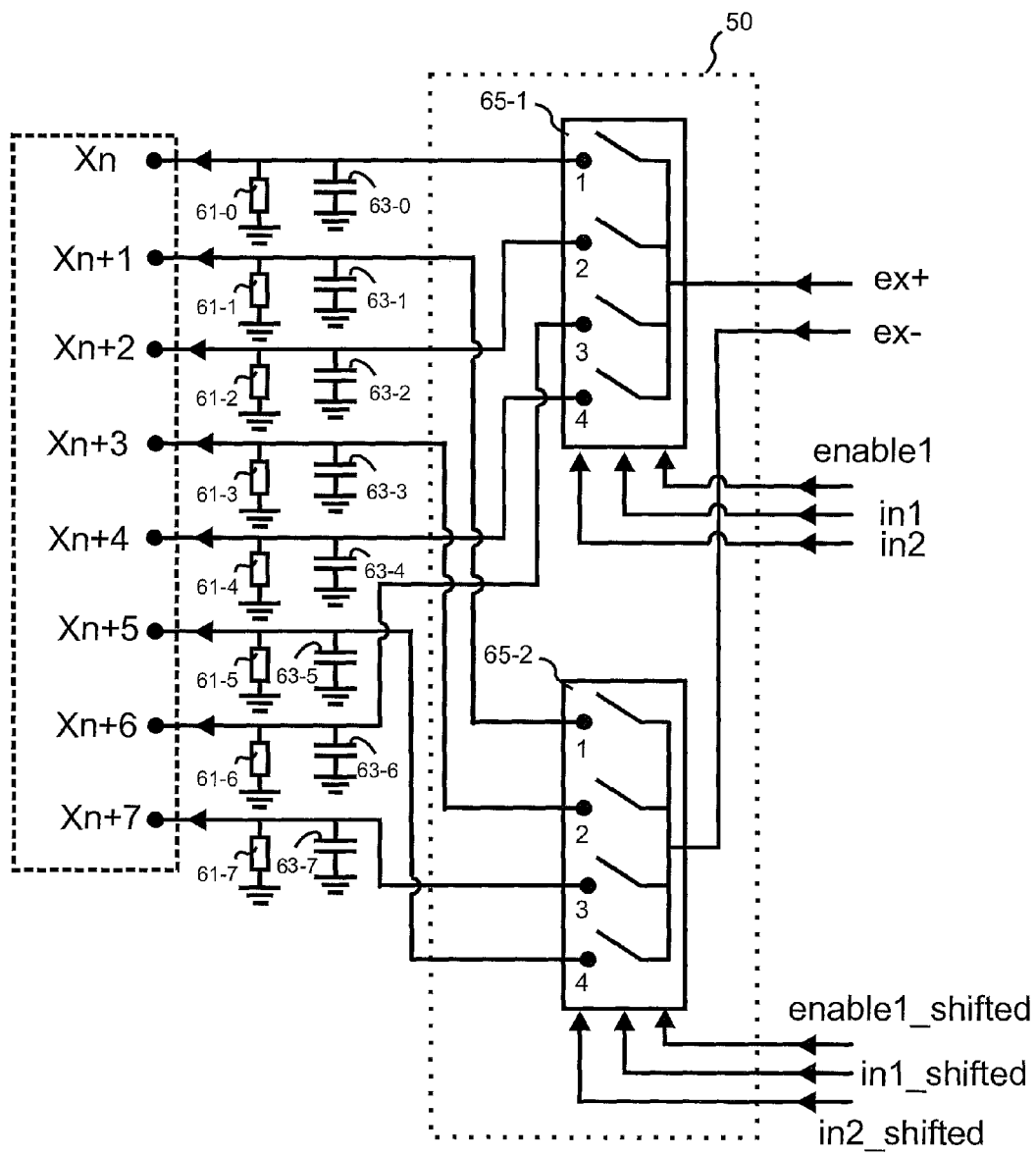
FIG. 5 illustrates in more detail switching multiplexors used to selectively apply excitation signals to the excitation conductors.

FIG. 5 is a block diagram illustrating in more detail the content of each of the excitation switching blocks 50. As shown in FIG. 5, each excitation switching block 50 includes two one-input and four-output multiplexors 65-1 and 65-2. Multiplexor 65-1 receives at its input the positive excitation signal (ex+) and multiplexor 65-2 receives at its input the negative input signal (ex−). The output, to which the input of the multiplexors 65 is connected, is selected based on the selection signals—in1 and in2 for multiplexor 65-1 and in1_shifted and in2_shifted for multiplexor 65-2. Additionally, the multiplexors 65 are arranged to be open circuit until they are enabled by a respective enable signal—enable1 for multiplexor 65-1 and enable1_shifted for multiplexor 65-2. As discussed above, enable1_shifted is generated by delaying the enable1_0 signal by the associated delay line circuit 55.

In this embodiment, the control of the connection through each multiplexor 65 is defined by the following truth table:

| in1/in1_shifted | in2/in2_shifted | Selected o/p |
|---|---|---|
| 0 | 0 | 1 |
| 0 | 1 | 2 |
| 1 | 0 | 3 |
| 1 | 1 | 4 |

FIG. 5 also shows the way in which the excitation switching blocks 50 are connected to the excitation conductors 5 via suitable grounding resistors 61-0 to 61-7 and grounding capacitors 63-0 to 63-7. Each capacitor 63 acts to filter out high frequency components of the excitation signals (ex+, ex−) switched through the multiplexors 65 and to filter out charge injection signal induced at the output of the multiplexors 65 at the fronts of the switching signals in1, in2, in1_shifted, and in2_shifted. These capacitors 63 also provide an efficient grounding of the excitation conductors 5 which are not selected by the multiplexor 65. This reduces any induced voltage in the non selected excitation conductors that would otherwise float when not connected to the excitation input. Such induced voltage can be caused, for example, by the above described cross-talk between adjacent excitation conductors 5. The resistors 61 are provided in order to avoid any uncontrolled accumulation of static charge on the excitation conductors 5 which might otherwise destroy the electronics once the excitation conductor 5 is selected by the multiplexor 65. In particular, any DC charge built up on the excitation conductors 5 will pass to ground through the resistor 61.

Delay Line Circuits

Figure 6:
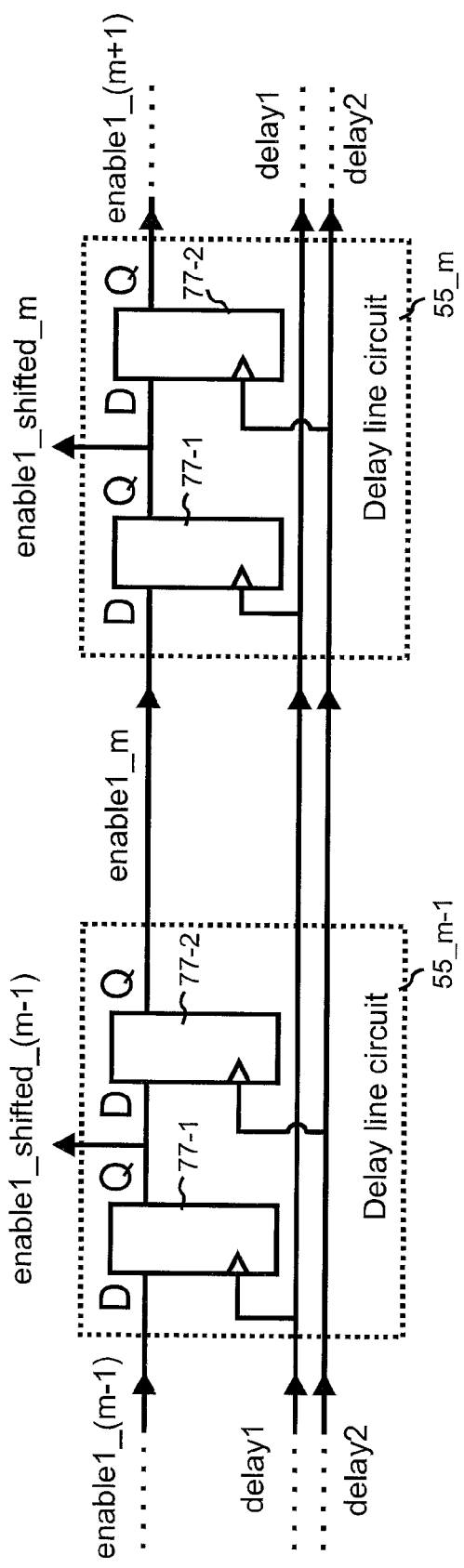
FIG. 6 schematically illustrates a delay line used to generate a sequence of delayed enable signals used to control the multiplexors shown in FIG. 5.

FIG. 6 is a block diagram illustrating the components of two adjacent delay line circuits 55-$m$−1 and 55-$m$; and illustrating the way in which they are connected together. As shown in FIG. 6, each delay line circuit 55 includes a first latch 71-1 and a second latch 71-2. The output of the first latch 71-1 is connected to the input of the second latch 71-2; and the output from the second latch 71-2 is connected to the input of the first latch 71-1 of the next delay line circuit 55. The output of the first latch 71-1 provides the shifted enable signal to the corresponding excitation switching block 50. As shown, the first latches 71-1 are clocked by the delay1 control signal and the second latches 71-2 are clocked by the delay2 signal. As will be explained in more detail below, the arrangement of the delay line circuits 55 and of the various control signals allow the excitation signals (ex+ and ex−) to be applied sequentially to adjacent excitation conductors of the grid 3 in an overlapping manner.

Timing Diagrams

Figure 7:
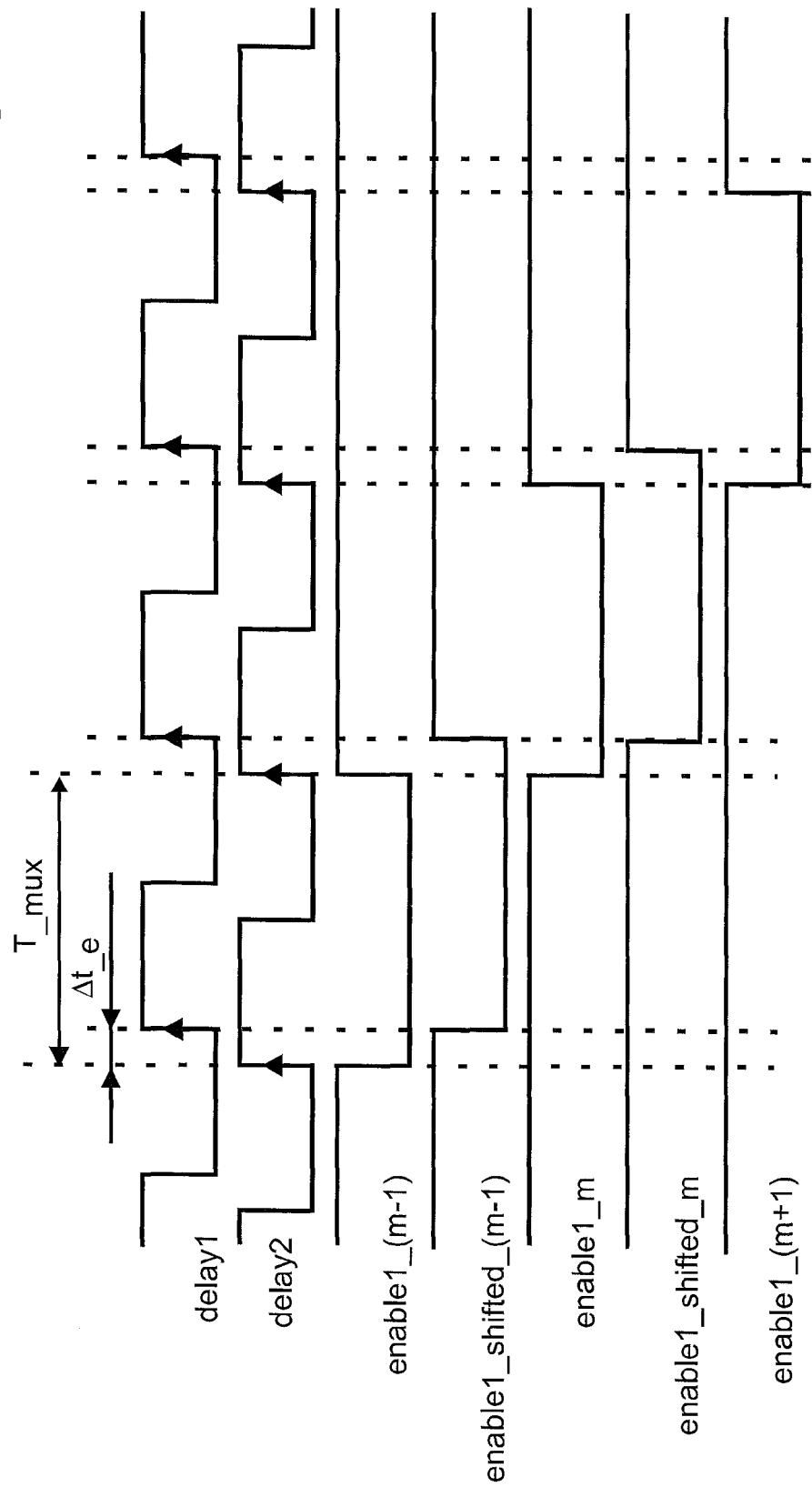
FIG. 7 illustrates the control signals that are generated by the circuitry shown in FIG. 6.

FIG. 7 is a timing diagram illustrating the timings of the control signals used in FIG. 6. In particular, FIG. 7 shows the delay1 control signal and the delay2 control signal that are used to clock the latches 71 within each delay line circuit 55. As shown, both delay1 and delay2 are square wave signals, with delay2 being shifted in time by an amount $\Delta t\_e$. FIG. 7 also shows the enable1_($m$−1) signal that is input to the first latch 71-1 of delay line circuit 55-$m$−1. This enable signal is latched through the first latch 71-1 on the rising edge of delay1 to generate the shifted enable signal enable1_shifted_($m$−1). As shown, the enable1_shifted_($m$−1) is then clocked through the second latch 71-2 by the rising edge of the delay2 signal to generate the input enable signal (enable1_$m$) for the next delay line circuit 55-$m$. Thus, as can be seen from FIG. 7, each delay line circuit 55 operates to generate two enable signals: enable1_shifted that is used to enable multiplexor 65-2 (shown in FIG. 5) and the enable signal (enable1) for the next multiplexor/delay circuit. When an enable signal is low, the corresponding multiplexor 65 is enabled and when the enable signal is high, the corresponding multiplexor 65 is disabled. Therefore, each excitation switching block 50 will be enabled during the period T_mux shown in FIG. 7.

It should be noted that there might be a reason to introduce a small phase shift between the edges of the control signals and the excitation clock signal. It is preferable to select and deselect the excitation conductor 5 at a moment in time when the excitation signal is at the zero value. This makes the overall system less sensitive to the time shift of the excitation signals along the length of the grid 3, which might exceed two meters. The overall phase shift can range from 20% to less than 1% of the excitation clock signal period.

Figure 8:
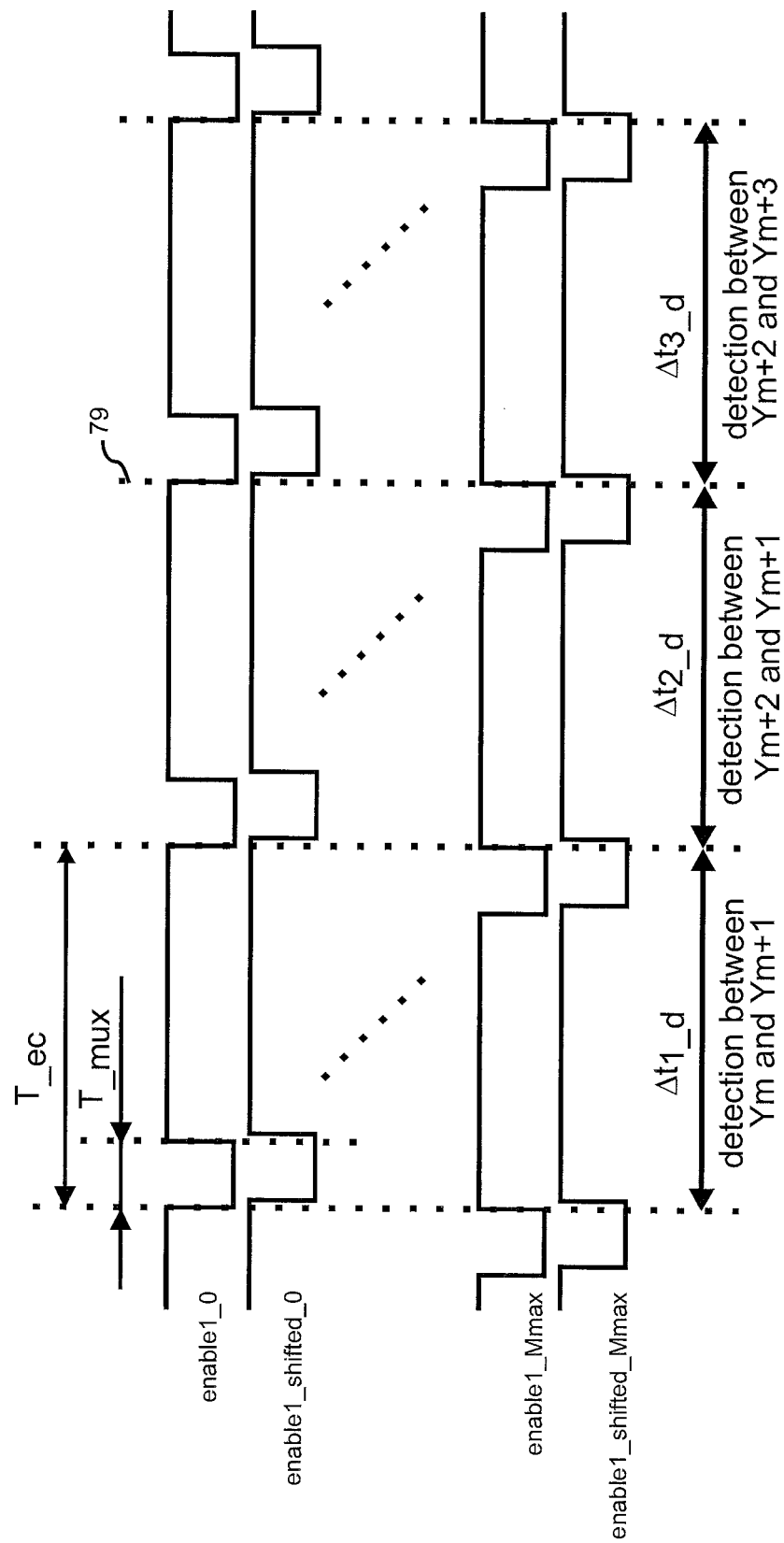
FIG. 8 schematically illustrates a number of consecutive detection intervals during which detections are made on adjacent detection conductors.

FIG. 8 shows the cyclic nature of each of the enable signals. In particular, as discussed above, for each set of detection conductors 7 that is selected, the excitation and control signal logic 11 sequentially applies the excitation signal across all of the excitation conductors 5. As shown in FIG. 8, the period of this excitation cycle is given as T_ec. For the example size of display discussed above, where there are forty excitation switching blocks 50, the excitation cycle T_ec will be forty times the period T_mux during which each excitation switching block 50 is enabled in turn. FIG. 8 shows a portion (corresponding to three consecutive excitation cycles) of the overall measurement cycle and shows the enable signals used to enable the first and last excitation switching blocks 50. In the first of the three excitation cycles, detections are made with respect to detection conductors $Y_m$ and $Y_{m+1}$; during the second of the three excitation cycles detections are made with respect to detection conductors $Y_{m+2}$ and $Y_{m+1}$; and during last of the three excitation cycles detections are made with respect to detection conductors $Y_{m+2}$ and $Y_{m+3}$. As shown, in each excitation cycle, the enable signals for the first excitation switching block 50-0 are brought low at the start of the excitation cycle, followed by the enable signals for the second excitation switching block 50-1 etc, until the end of the excitation cycle when the enable signals for the last excitation switching block 50-Mmax are brought low.

Figure 9:
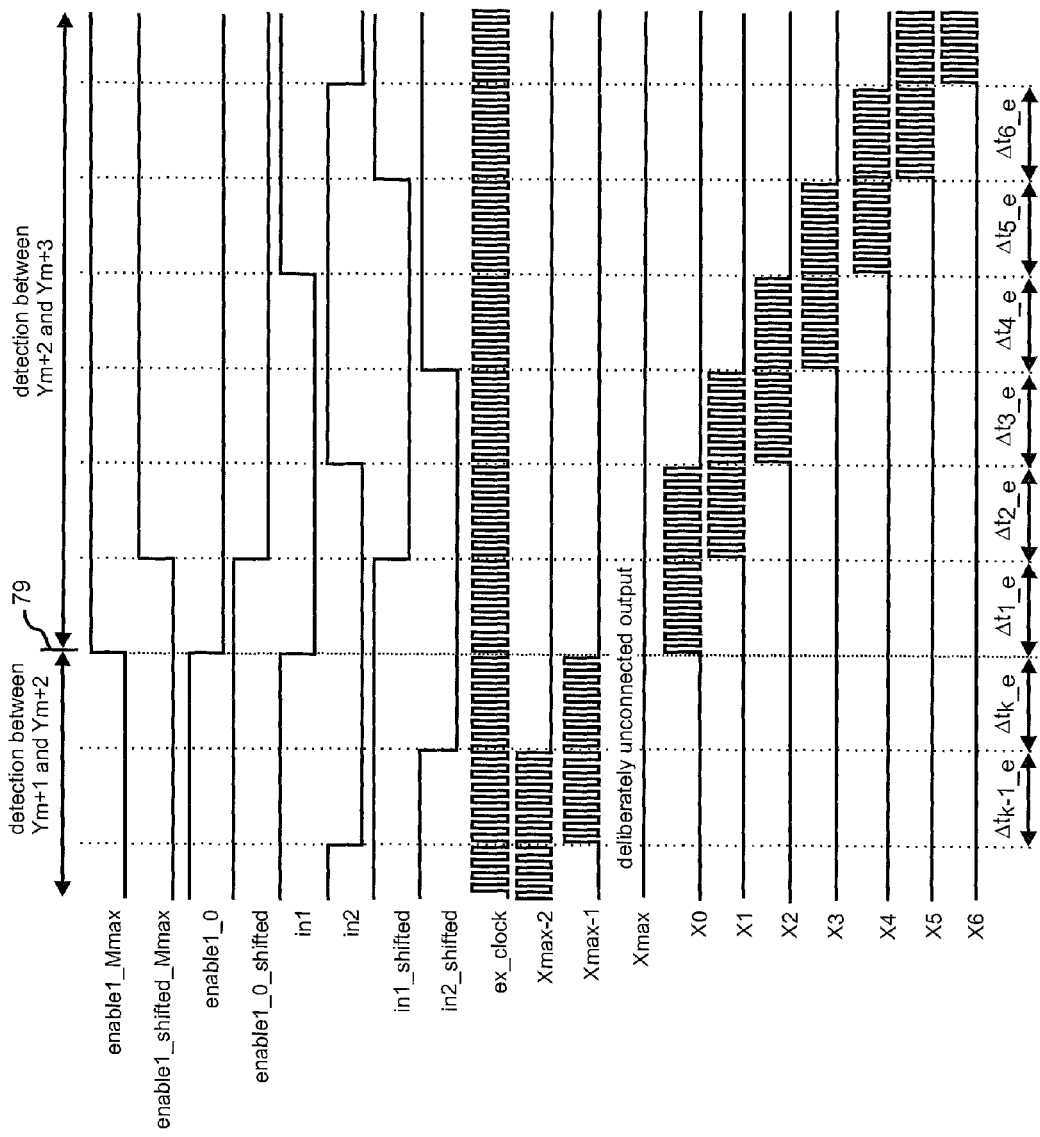
FIG. 9 is a timing diagram illustrating in more detail the excitation signals that are applied sequentially to neighbouring excitation conductors at the end of one detection interval and the start of the next detection interval.

FIG. 9 is a timing diagram illustrating the way in which the excitation signals are sequentially applied to the excitation conductors 5 at a timing around the end of the first excitation cycle shown in FIG. 8 and at the start of the second excitation cycle shown in FIG. 8 (and labelled 79 in FIGS. 8 and 9). The time between each of the vertical dashed lines corresponds to the shift in time between the delay1 and delay2 control signals (i.e. $\Delta t\_e$) shown in FIG. 7 and will be referred to in this embodiment as an excitation interval. As shown, during the excitation interval $\Delta tk-1\_e$, the enable signals for the last excitation switching block 50-Mmax are low and the multiplexor select signals in1 and in2 have values 1 and 0 respectively and in1_shifted and in2_shifted have values 1 and 1 respectively. As a result (c.f. the above truth table and the multiplexor connection shown in FIG. 5), excitation switching block 50-Mmax will output the positive excitation signal (ex+) to excitation conductor Xmax−1 and will output the negative excitation signal (ex−) to excitation conductor Xmax−2. In this way, two adjacent excitation conductors 5 on the grid 3 are driven with complimentary (180° phase shifted) excitation signals, which helps to reduce electromagnetic interference caused by applying the excitation signals to the selected excitation conductors 5.

In the next excitation interval $\Delta tk\_e$ (the last one in the present excitation cycle) the enable signals for the last excitation switching block 50-M are still low and the multiplexor select signals in1 and in2 remain unchanged. Therefore, the positive excitation signal (ex+) continues to be applied to the excitation conductor Xmax−1. However, in this excitation interval the multiplexor select signals in1_shifted and in2_shifted now have values 1 and 0 respectively, which cause multiplexor 65-2 within excitation switching block 50-Mmax to connect the negative excitation signal (ex−) to output 3, which (as can be seen from FIGS. 4 and 5) is not connected to an excitation conductor. This "missing" excitation conductor is notionally labelled Xmax in FIG. 4 and in FIG. 9 for ease of explanation. As shown at the top of FIG. 9, the end of excitation interval $\Delta tk\_e$ corresponds to the end of the excitation cycle during which detections are made with respect to detection conductors $Y_{m+1}$ and $Y_{m+2}$. The excitation sequence then immediately begins again in the next excitation interval $\Delta t1\_e$ where the enable signal (enable 1_0) used to enable the first excitation switching block 50-0 is again set to a low value. As shown, the multiplexor select signals in1 and in2 both have value 0, which means that the positive clock signal (ex+) is applied to excitation conductor X0. During this first excitation interval of the excitation cycle, the shifted enable signal (enable1_shifted) is still high and therefore the second multiplexor 65-2 (shown in FIG. 5) of excitation switching block 50-0 is not enabled and the negative excitation signal is not applied to any of the excitation conductors 5. In the next excitation interval $\Delta t2\_e$, the shifted enable signal (enable1_shifted) goes low which enables the second multiplexor 65-2 in the first excitation switching block 50-0. During this second excitation interval, the shifted multiplexor control signals (in1_shifted and in2_shifted) both have value 0, and therefore the negative excitation signal (ex−) is applied to excitation conductor X1; and the multiplexor select control signals in1 and in2 have not changed and therefore, the positive excitation signal (ex+) is still applied to excitation conductor X0. Thus, during the excitation interval $\Delta t2\_e$, the positive excitation signal is applied to excitation conductor X0 and the negative excitation signal is applied to the adjacent excitation conductor X1. Similarly, during the third excitation interval $\Delta t3\_e$, the positive excitation signal is applied to excitation conductor X2 and the negative excitation signal is applied to the adjacent excitation conductor X1; during the fourth excitation interval $\Delta t4\_e$, the positive excitation signal is applied to excitation conductor X2 and the negative excitation signal is applied to the adjacent excitation conductor X3; during the fifth excitation interval $\Delta t5\_e$, the positive excitation signal is applied to excitation conductor X4 and the negative excitation signal is applied to the adjacent excitation conductor X3 etc. Thus, in this embodiment, excitation signals are applied to the excitation conductors sequentially and in an overlapping manner so that during each excitation interval, except for the first and last intervals ($\Delta t\_1e$ and $\Delta tk\_e$) of an excitation cycle, positive and negative excitation signals are applied to adjacent conductors.

As those skilled in the art will appreciate from FIG. 9, the reason that there are no overlapping excitation signals during intervals $\Delta t1\_e$ and $\Delta tk\_e$ is because the last output from the excitation switching block 50-Mmax is not connected to an excitation conductor. As will be explained later, this is advantageous because it helps to reduce the bandwidth requirements of the measurement channels used to process the signals from the detection conductors 7.

Measurement Channels

Figure 10:
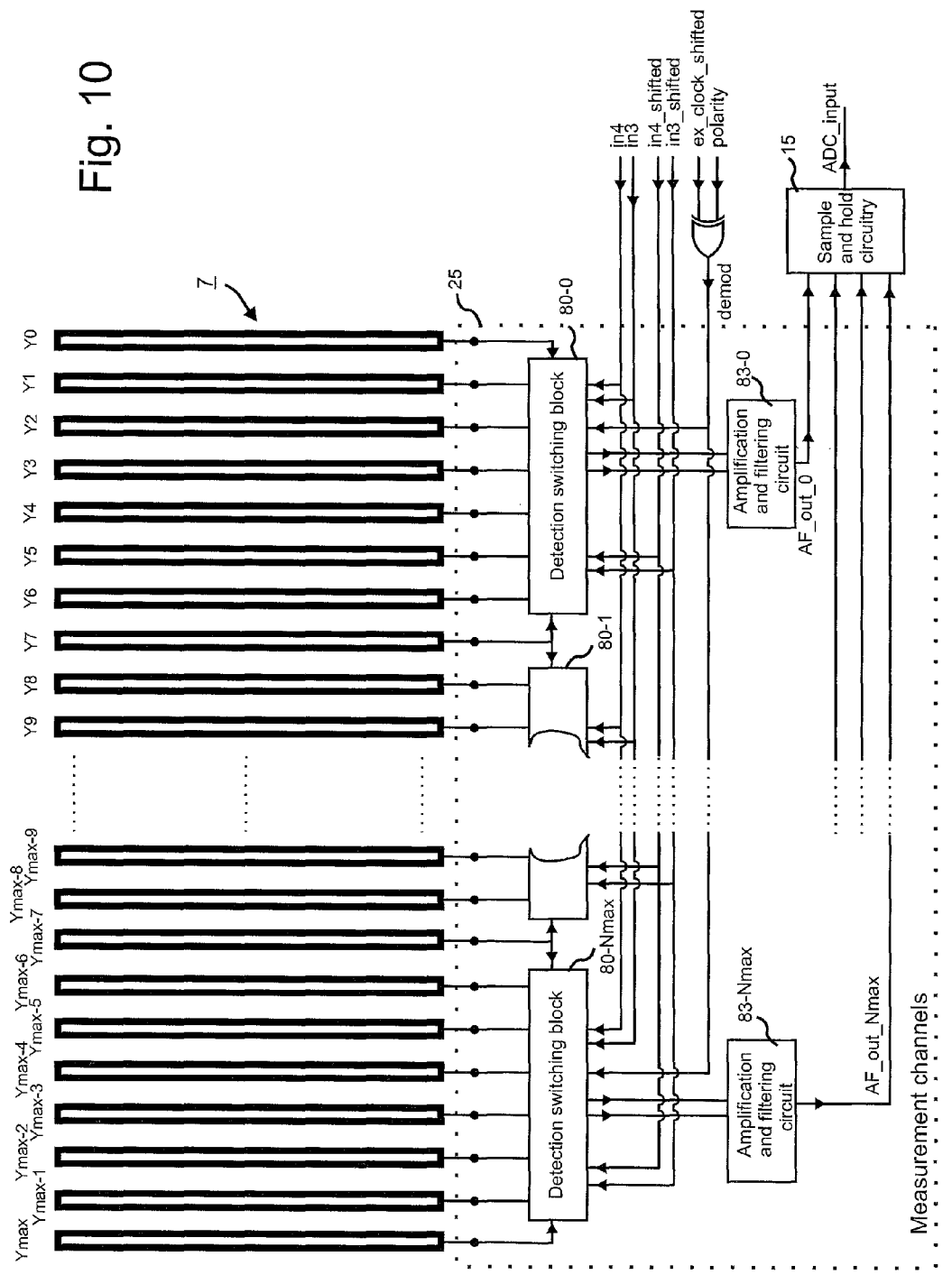
FIG. 10 schematically illustrates detection conductors (Y conductors) forming part of the grid shown in FIG. 3 and the way in which these detection conductors are coupled to measurement channels forming part of the detection circuitry.

FIG. 10 is a block diagram illustrating in more detail the switching and control signal structure of the measurement channels 25 used in this embodiment. As shown in FIG. 10, each of the detection conductors 7 (labelled Y0 to Ymax) is connected to a respective input of one of the detection switching blocks 80-0 to 80-Nmax. In this embodiment, each of the detection switching blocks 80 has eight inputs, each for connection to a detection conductor 7. As shown in FIG. 10, the last detection conductor that is connected to one switching block 80-L is also connected to the input of the next detection switching block 80-L+1. The significance of this shared detection conductor will become clear from the subsequent description.

The number of detection switching blocks 80 used in the measurement channels 25 depends on the number of detection conductors 7 (and hence on the size of the display screen) and the time available to switch the signals from the detection conductors 7 through each measurement channel. For the example screen discussed above having a dimension in the Y direction of approximately 100 cm and 169 detection conductors 7 arrayed evenly along the Y direction (gives a spacing between adjacent detection conductors 7 of approximately 5.9 mm) requires twenty four detection switching blocks 80 that have eight inputs each (because detection conductors are shared between adjacent detection switching blocks 80). Of course, fewer detection switching blocks 80 may be used if they each have more inputs or if there are fewer detection conductors 7. For example, it is possible to use twelve detection switching blocks 80 with sixteen inputs each serving 181 detection conductors 7 (which gives a spacing between adjacent detection conductors 7 of approximately 5.5 mm).

FIG. 10 also shows that each detection switching block 80 has two outputs that are input to a respective amplification and filtering circuit 83-0 to 83-Nmax. The outputs from the amplification and filtering circuits 83 are then input to the sample and hold circuitry 15 for sampling and subsequent conversion into digital values by the analogue to digital converter 13.

FIG. 10 also shows the control signals output by the excitation and control signal logic 11 to control the measurement channels 25. These signals include the following:

in4, in3, in3_shifted and in4_shifted—these are control signals used to select which of the detection switching block input terminals (and hence which detection conductors 7) are connected to the outputs of the detection switching block 80.

ex_clock_shifted—this is a clock signal having the same frequency as the excitation signal that is applied to the excitation conductors 5. The phase of this clock signal is shifted slightly compared to the phase of the excitation signal, to account for phase delays introduced in the digitiser. This clock signal is used to demodulate the signal received on the selected detection conductors 7.

polarity—this is a control signal used to polarity modulate the signal from each detection conductor 7.

Detection Switching Block

Figure 11:
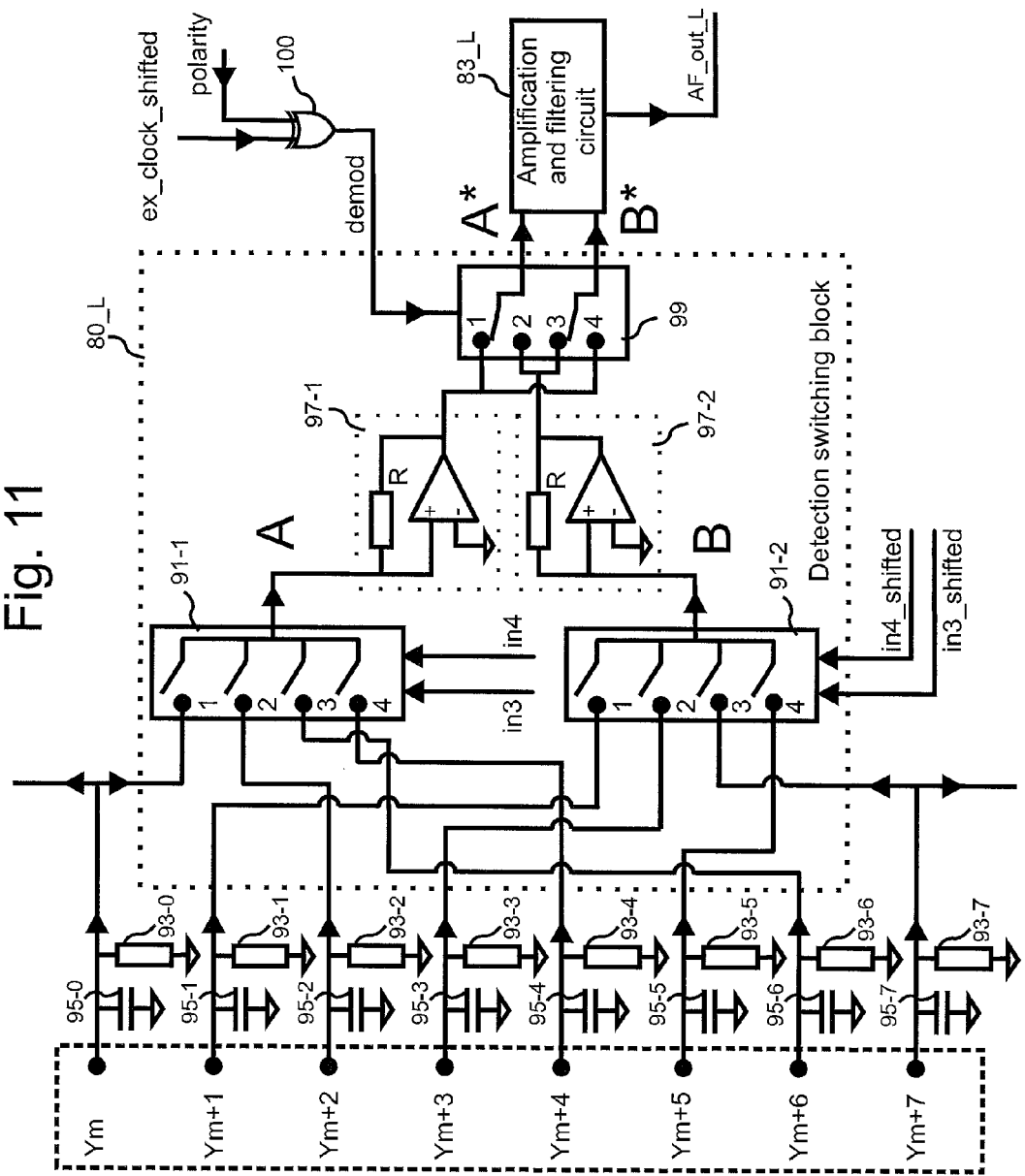
FIG. 11 schematically illustrates in more detail switching circuitry used to selectively connect pairs of detection conductors to amplification and filtering circuit.

FIG. 11 is a block diagram illustrating in more detail the content of one of the detection switching blocks 80-L. The other detection switching blocks 80 used in this embodiment have the same structure. As shown in FIG. 11, detection switching block 80-L includes two four-input and one-output multiplexors 91-1 and 91-2. As shown, input 1 of multiplexor 91-1 is connected to detection conductor $Y_m$; input 2 of multiplexor 91-1 is connected to detection conductor $Y_{m+2}$; input 3 of multiplexor 91-1 is connected to detection conductor $Y_{m+6}$ and input 4 of multiplexor 91-1 is connected to detection conductor $Y_{m+4}$. Similarly, input 1 of multiplexor 91-2 is connected to detection conductor $Y_{m+1}$; input 2 of multiplexor 91-2 is connected to detection conductor $Y_{m+3}$; input 3 of multiplexor 91-2 is connected to detection conductor $Y_{m+7}$ and input 4 of multiplexor 91-2 is connected to detection conductor $Y_{m+5}$. As shown in FIG. 11, detection conductor $Y_m$ and detection conductor $Y_{m+7}$ are also connected to corresponding inputs of the multiplexors 91 in the adjacent detection switching blocks 80. Thus, detection conductor $Y_m$ is connected to input 3 of multiplexor 91-2 of detection switching block 80-L−1 and detection conductor $Y_{m+7}$ is connected to input 1 of multiplexor 91-1 of detection switching block 80-L+1. Of course, the first and last detection switching blocks 80-0 and 80-Nmax, will only share a detection conductor 7 with one other detection switching block 80.

The detection conductor 7 that is coupled through each of the multiplexors 91 is selected based on the selection signals—in3 and in4 for multiplexor 91-1 and in3_shifted and in4_shifted for multiplexor 91-2. In this embodiment, the control of the connection through each multiplexor 91 is defined by the following truth table:

| in3/in3_shifted | in4/in4_shifted | Selected i/p |
|---|---|---|
| 0 | 0 | 1 |
| 0 | 1 | 2 |
| 1 | 0 | 3 |
| 1 | 1 | 4 |

FIG. 11 also shows that the detection switching blocks 80 are connected to the detection conductor 7 via suitable resistors 93-0 to 93-7 and capacitors 95-0 to 95-7. The capacitors 95 couple the detection conductor 7 directly to the mid-rail voltage level used in the measurement channels 25, which effectively grounds at high frequency the detection conductors 7 (as far as the measurement channels 25 are concerned) when they are not selected by the detection switching block 80. This helps to reduce measurement cross talk—when AC signals from an unselected detection conductor 7 capacitively couples into a selected detection conductor 7. The capacitors 95 also served to reduce the electromagnetic emission from detection conductors which is caused by the charge injection at the inputs of the multiplexors 91 at each front of the control signals in3, in4, in3_shifted, and in4_shifted. The resistors 93 also connect the detection conductors 7 to the mid-rail voltage level to avoid electrostatic charge build up on the grid 3.

The outputs from the two multiplexors 91, labelled A and B in FIG. 11, are input to a respective differential amplifier 97-1 and 97-2. Amplifier 97-1 acts to convert the AC measurement current from output A into a corresponding analogue AC voltage. Similarly, the amplifier 97-2 acts to convert the AC measurement current from output B into a corresponding analogue AC voltage. The voltage output by amplifier 97-1 is applied to terminals 1 and 4 of a demodulating switch 99 and the voltage output by amplifier 97-2 is applied to terminals 2 and 3 of the demodulating switch 99. The demodulating switch 99 acts to multiply a demod signal with each of the voltages from amplifiers 97-1 and 97-2. As shown in FIG. 11, the demod signal is obtained by combining (in this example using an exclusive OR (XOR) gate 100) the polarity control signal and the ex_clock_shifted control signal. Thus, the ex_clock_shifted signal acts to effectively demodulate the incoming signal to a "baseband" (quasi DC) signal whose amplitude depends on the mutual capacitances between the selected excitation conductors 5 and the selected detection conductors 7; and the polarity control signal modulates this "baseband" signal up to a frequency corresponding to that of the polarity control signal. When the demod signal has a value of one, the output voltage from amplifier 97-1 passes through switch terminal 1 to the A* input of the amplification and filtering circuit 83; and the voltage output from amplifier 97-2 passes through switch terminal 3 to the B* input of the amplification and filtering circuit 83. When the demod signal is zero the switch 99 changes position such that the output voltage from amplifier 97-1 passes through switch terminal 4 to the B* input of the amplification and filtering circuit 83; and the voltage output from amplifier 97-2 passes through switch terminal 2 to the A* input of the amplification and filtering circuit 83. As will be explained in more detail below, the amplification and filtering circuit 83 amplifies the difference between A* and B*. Thus, the demodulating switch 99 and the amplification and filtering circuit 83 act to demodulate and amplify A-B or B-A, depending on the value (1 or 0) of the polarity control signal. Hence positive and negative measurements can be obtained from each individual detection conductor.

Timing Diagrams

Figure 12:
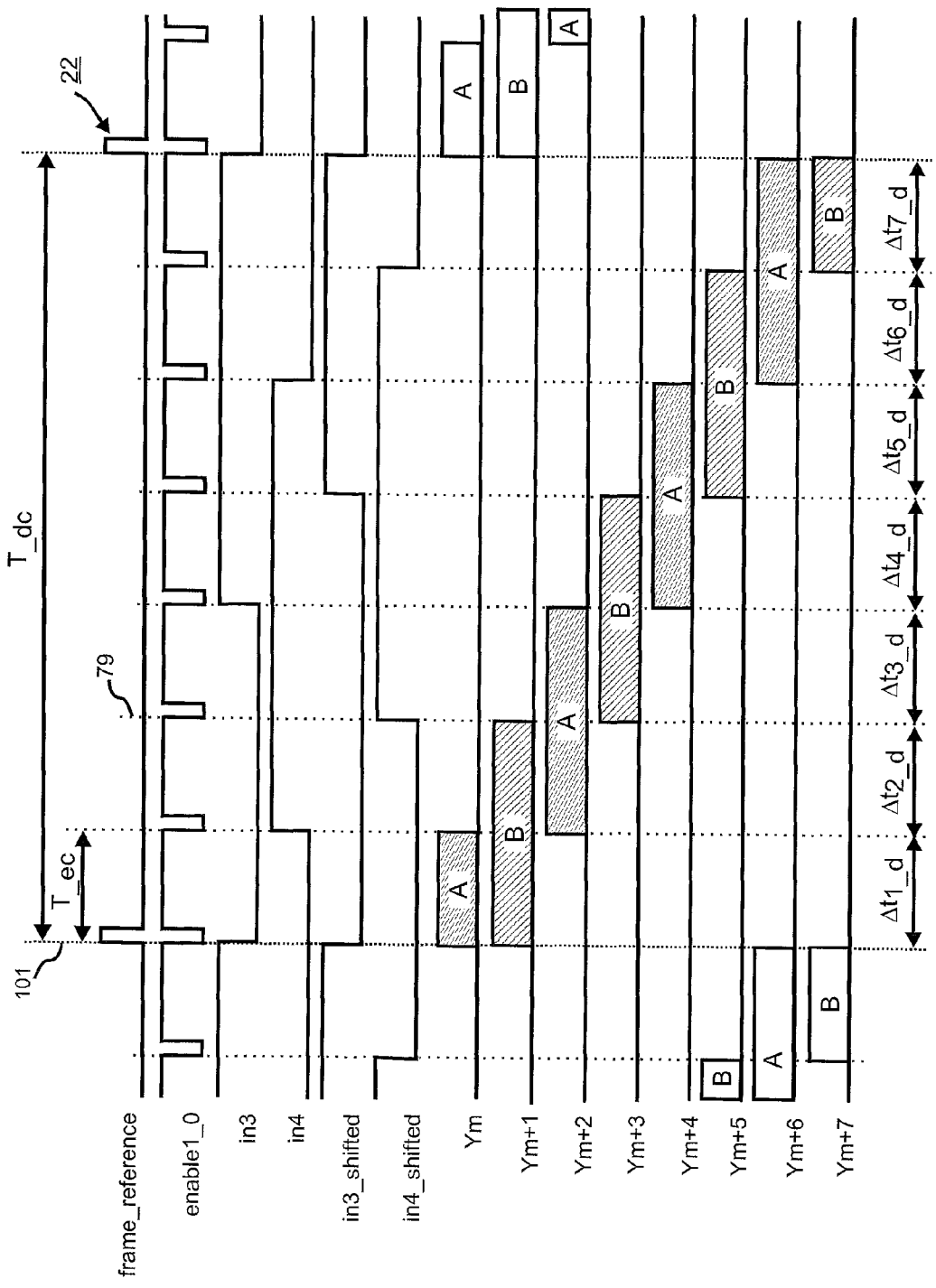
FIG. 12 is a timing diagram illustrating an overall measurement cycle in which a measurement is obtained for each conductor intersection point in the grid of conductors shown in FIG. 3.

FIG. 12 is a timing diagram illustrating the timings of the control signals used in FIG. 11 and showing which of the detection conductors 7 are selected through the switching block 80. FIG. 12 also shows the enable1_0 signal shown in FIG. 8. As shown, at the start of a measurement cycle (represented by the dashed line 101) the multiplexor selection signals in3, in4, in3_shifted and in4_shifted all have the value zero. Therefore, during a first detection interval labelled $\Delta t_1\_d$ (which, in this embodiment, corresponds in duration to the above described excitation cycle, T_ec) detection conductor $Y_m$ will be connected through multiplexor 91-1 to output A and detection conductor $Y_{m+1}$ will be connected through multiplexor 91-2 to output B. In the next detection interval (labelled $\Delta t_2\_d$) the value of the multiplexor switching signal in4 changes to the value 1 and accordingly, multiplexor 91-1 connects detection conductor $Y_{m+2}$ to the output A. In the next detection interval (labelled $\Delta t3\_d$) the value of the multiplexor select signal in4_shifted changes to 1 and as a result the multiplexor 91-2 connects detection conductor $Y_{m+3}$ to the output B. This process continues until the end of a detection cycle when each of the detection conductors 7 has been selected by the multiplexors 91.

As shown in FIG. 12, the connection of the adjacent detection conductors 7 through the detection switching blocks 80 is staggered and such that during each detection interval, the signals from two adjacent detection conductors 7 are passed through to the outputs A and B of the two multiplexors 91 of each detection switching block 80. This allows differential measurements to be obtained from the signals from adjacent detection conductors. As shown in FIG. 12, seven detection intervals are required in this embodiment to switch the signals from the eight detection conductors through the detection switching block 80. Only seven detection intervals are required because there is no need to obtain differential measurements of the signals from detection conductors Ym and $Y_{m+7}$ as detection conductors Ym and $Y_{m+7}$ are separated too far apart along the grid 3 to provide useful position information.

Once all the detection conductors 7 that are connected to a detection switching block 80 have been switched through to the corresponding amplification and filtering circuit 83, the cyclic processing begins again. The period of this detection cycle is shown in FIG. 12 and labelled T_dc and, in this embodiment, this period corresponds to the above described measurement cycle. As shown in FIG. 12, at the end of the detection cycle, the excitation and control signal logic 11 raises the frame reference signal 22 to signal to the measurement processing unit 19 that measurement data for the detection cycle that as just been completed will have been stored in memory 17 and is ready for processing.

Amplification and Filtering Circuit

Figure 13:
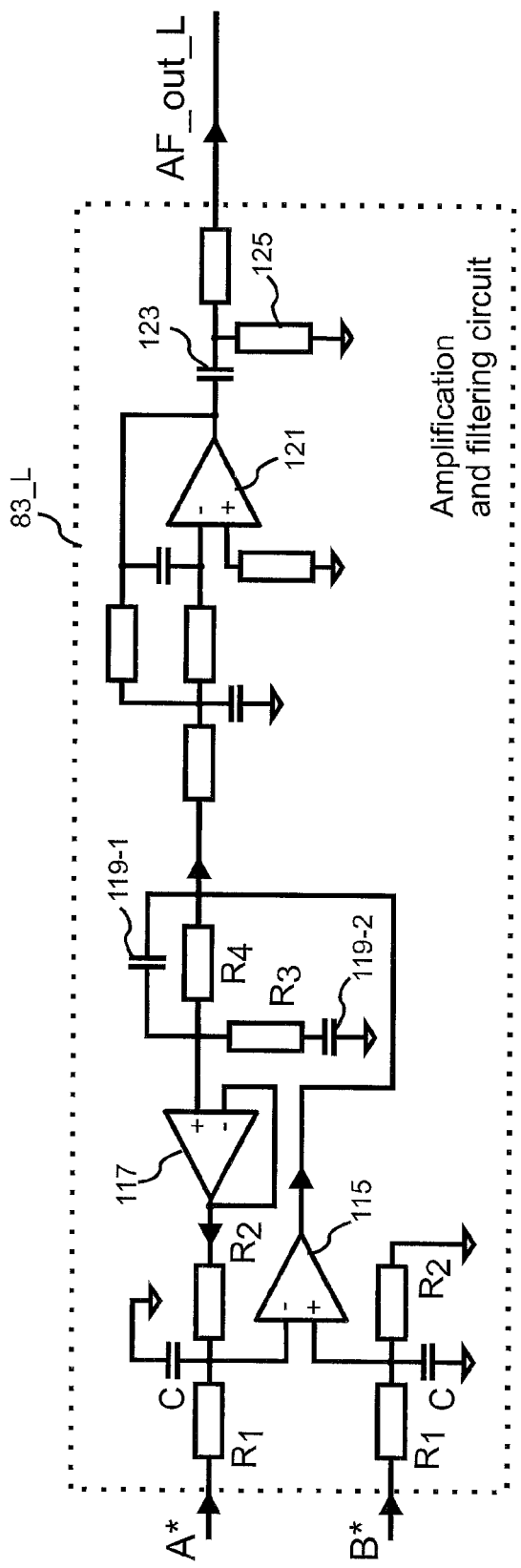
FIG. 13 is a circuit diagram illustrating preferred amplification and filtering circuit used to amplify and filter a differential measurement obtained from a selected pair of detection conductors.

FIG. 13 is a circuit diagram illustrating the main components of the amplification and filtering circuits 83 that are used in this embodiment to amplify and filter the signals output from the associated detection switching block 80. As shown, the two inputs A* and B* are input to the negative and positive inputs of a differential amplifier 115 having a generic gain of R2/R1. In a traditional differential amplifier the top R2 resistor is connected directly to the output of the amplifier. In this embodiment, however, the top resistor R2 is connected to the output of an amplifier 117 that buffers a voltage that is voltage divided by the resistors R3 and R4 from the output of the differential amplifier 115. This arrangement allows a higher than normal gain for the first stage of the differential amplifier 115 given by:

GAIN=$R2/R1*(R3+R4)/R3$

The two capacitors 119-1 and 119-2 introduced in the R3:R4 divider modify the gain of the differential amplifier 115 to its generic value of R2/R1 at high and low frequencies, thus allowing to achieve the higher gain only for the signals having frequencies falling within the pass band of interest.

The capacitors C connected at the node between resistors R1 and R2 at the input side of the differential amplifier 115 are used to achieve initial filtering of high frequency components in the signals obtained from the detection switching block 80. However, the corner frequency of this filter should be set to a higher value (than the overall corner frequency of the amplification and filtering circuit 83) in order to maintain high rejection of common mode signals in the main pass band. The main filtering of the high frequency signals is achieved with the third amplifier 121 which is configured as a second-order multiple feedback (MFB) low pass filter. The capacitor 123 and the resistor 125 provide a high pass filter in order to filter out low frequency noise and eliminate any DC offsets of the amplifiers at the output of the application and filtering circuit 83.

Frequency Spectrum and Filter Response

FIG. 14a illustrates the spectrum of the signals output by the detection switching blocks 80. Most of the desired signal components are around the frequency corresponding to the polarity control signal. The higher frequency components correspond to the high frequency demodulation harmonics generated by the demodulating switch 99.

FIG. 14b illustrates the desired frequency response of the amplification and filtering circuit 83 shown in FIG. 13 to filter the signals obtained from the detection switching block 80. As shown, the high corner frequency of the filtering circuit 83 can be kept quite close to the frequency of the polarity signal. In this embodiment, the high corner frequency has been set at 1.5 times the frequency of the polarity signal. This allows the amplification and filtering circuit 83 to filter out almost all the high frequency harmonics generated by the demodulator switch 99. The low corner frequency of the filtering circuit 83 cannot be set very close to the frequency of the polarity signal. This is evident from the spectrum of the input signal shown in FIG. 14a, which contains quite a long tail at the low frequency end; and filtering out this part of the spectrum will alter substantially the measured signal output by introducing low frequency transients in the response of the amplification and filtering circuit 83. In this embodiment, the low corner frequency of the amplification and filtering circuit 83 has been set at 100 times lower than the high corner frequency. This still allows the amplification and filtering circuit 83 to filter out the DC offsets of the amplifiers as well as most of the unwanted low frequency noise caused by the measurement circuitry 25 (and the display screen electronics) and allows for a well defined gain for the measured signals within the pass band of the filtering circuit 83.

Timing Diagrams

Figure 16:
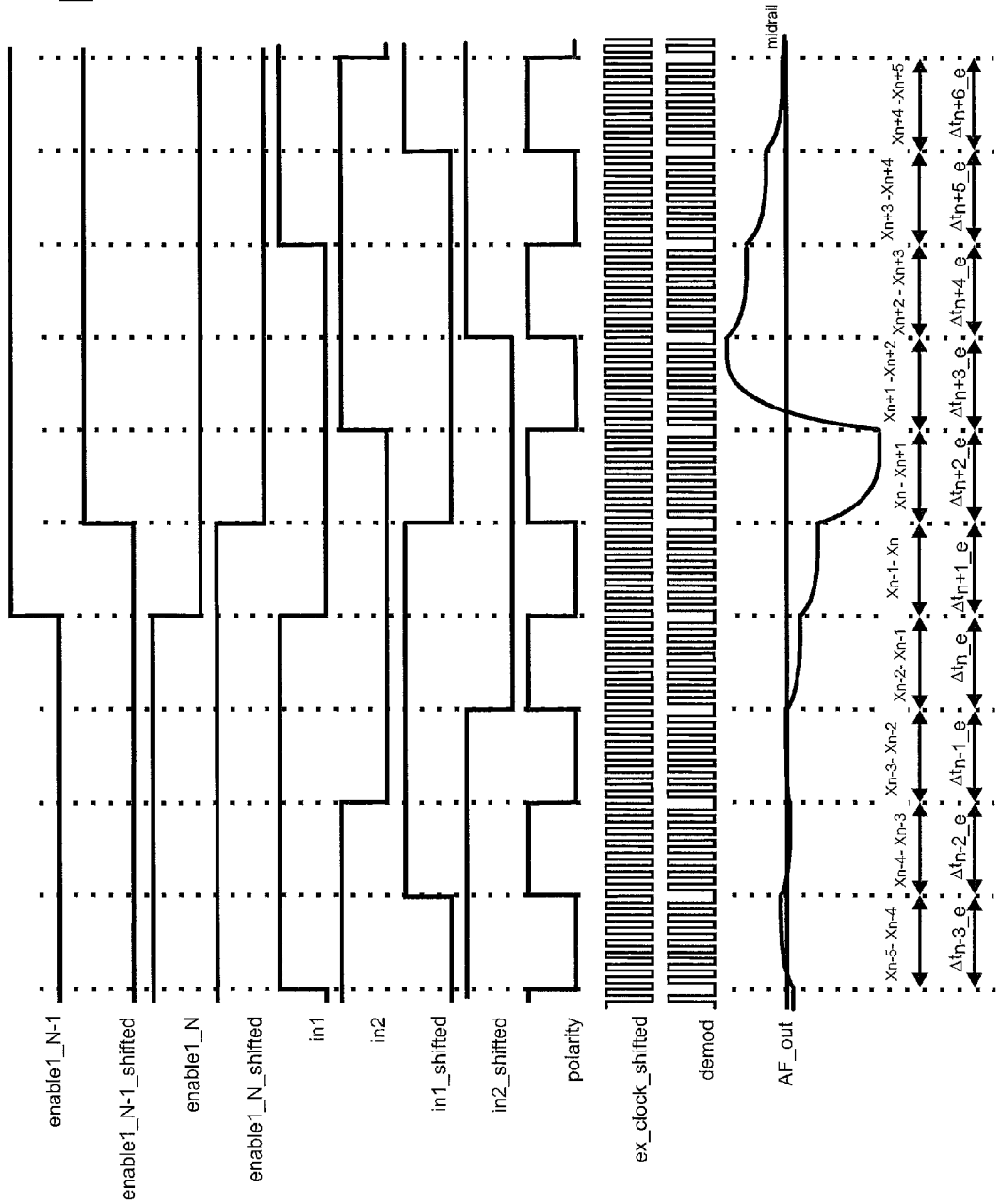
FIG. 16 illustrates the form of various control signals and the form of an output signal from the amplification and filtering circuit when a user's finger is located over the grid of conductors.

FIGS. 15 and 16 are timing diagrams which illustrate the timing of various control signals used in this embodiment and showing the way in which the output from one of the amplification and filtering circuits 83 (AF_out) varies during each excitation interval. FIG. 15 shows the situation when there is no finger (or stylus) in the vicinity of the crossover point between the selected detection conductors 7 and the selected excitation conductors 5. As shown, the output from the amplification and filtering circuit 83 varies slightly about the mid rail voltage level. FIG. 16 shows the situation when there is a finger (or stylus) in the vicinity of the crossover point between the selected detection conductors 7 and the selected excitation conductors. As shown in FIG. 16, the output from the amplification and filtering circuit 83 builds up in amplitude from excitation interval $\Delta t_n\_e$ until it reaches a peak negative value at the end of excitation interval $\Delta t_{n+2}\_e$. The output signal then inverts in polarity as the scanning of the excitation signal across the gird of excitation conductors 5 passes the user's fingers or the stylus, and the amplitude then decreases over subsequent excitation intervals as the scanning of the excitation signal to the excitation conductors 5 moves away from the user's finger (or stylus). Therefore, the measurement processing unit 19 can process the amplitudes of the signals output by the amplification filtering circuits 83 to identify the locations of users' fingers or other objects that affect the mutual capacitance between the excitation and detection conductors.

Sample and Hold Circuitry

FIG. 17a is a circuit diagram illustrating the main components of the sample and hold circuitry 15 used in this embodiment. In the exemplary size of screen mentioned above, having a diagonal of about 203 cm and having 169 detection conductors 7 that are multiplexed through twenty four detection switching blocks, there will of course, be twenty four amplification and filtering circuits 83 that will feed their outputs to the sample and hold circuitry 15. However, for ease of illustration and explanation, the sample and hold circuitry 15 illustrated in FIG. 17a receives inputs from four amplification and filtering circuits 83-0 to 83-3. As shown, the outputs from the amplification and filtering circuits 83 are input to a respective switch 151-0 to 151-3. Each switch 151 has two output terminals (labelled 1 and 2). The position of each switch 151 is controlled by a sample switch control signal that is generated by the excitation and control signal logic 11. The sample switch control signal is shown in the timing diagram of FIG. 17b. As shown, it has the same frequency as, although phase shifted from, the polarity modulation signal (polarity). When the sample switch signal is at a high value, each of the switches 151 connects its input to the output terminal labelled 1. This means that the signals output by the amplification and filtering circuits 83 are applied to the capacitors labelled C1. As a result, charge accumulates on the C1 capacitors until the sample switch signal goes low. At this point, the switches 151 switch the signals received from the amplification and filtering circuits 83 to their output terminal 2 so that the signals then start to charge up the capacitors labelled C2. As can be seen from FIG. 17b, the time that the sample switch signal is at a high level or a low level corresponds to one excitation interval ($\Delta t_n\_e$).

As shown in FIG. 17a, each of the C1 capacitors is connected to a respective input of a first multiplexor 155-1 and each of the C2 capacitors is connected to a respective input of a second multiplexor 155-2. As shown in FIG. 17a, the outputs from the two multiplexors 155 are input to the switch 157 which switches between the outputs from the two multiplexors. As shown in FIG. 17a, the switch 157 is also controlled by the sample switch signal and when the sample switch signal is high, the switch 157 connects the output from multiplexor 155-2 through to the input of the analogue to digital converter 13. When the sample switch signal is at a low value, the switch 157 connects the output from multiplexor 155-1 through to the input of the analogue to digital converter 13.

The output of multiplexor 155-1 is open circuit when not connected to the analogue to digital converter by the switch 157. Therefore, when the output from the amplification and filtering circuits 83 are being charged onto the C1 capacitors, the multiplexor 155-1 connected to the C1 capacitors is open circuit at the switch 157 and thus will not affect the charging of the C1 capacitors. Similarly, when the signals from the amplification and filtering circuits 83 are being charged onto the C2 capacitors, the multiplexor 155-2 connected to the C2 capacitors is open circuit at the switch 157.

FIGS. 17a and 17b also show the multiplexor control signals (in5 and in6) used to select which input of the multiplexors 155 is passed through to the output of the multiplexor 155. As shown, the following table shows the relationship between the values of these control signals to the selected multiplexor input.

| in5 | in6 | Selected i/p |
|-----|-----|--------------|
| 0   | 0   | 1            |
| 0   | 1   | 2            |
| 1   | 0   | 3            |
| 1   | 1   | 4            |

The operation of the sample and hold circuitry 15 shown in the FIG. 17a will now be explained with reference to FIG. 17b. During a first excitation interval ($\Delta t_{n+1}\_e$) the excitation signals are applied to excitation conductors Xn−1 and Xn. During this excitation interval, the outputs from the amplification and filtering circuits 83 are stored onto the C1 capacitors. At the end of this excitation interval (defined by the falling edge of the polarity signal) the sample switch signal also changes (after a short delay). This causes the switches 151 to switch the output from the amplification and filtering circuits 83 to start to charge up the C2 capacitors. Whilst the C2 capacitors are being charged during the next excitation interval ($\Delta t_{n+2}\_e$) the voltages stored on the C1 capacitors are sequentially passed through multiplexor 155-1 to the ADC 13 for conversion into corresponding digital values. Therefore, as shown in FIG. 17b, during the second excitation interval ($\Delta t_{n+2}\_e$) measurements are made for the signals obtained when excitation conductors $X_{n-1}$ and $X_n$ were energised during excitation interval $\Delta t_{n+1}\_e$. In the third excitation interval ($\Delta t_{n+3}\_e$), the switches 151 switch again so that the C1 capacitors are charged again and the voltages on the C2 capacitors are sequentially output through multiplexor 155-2 and switch 157 to the ADC 13. In this way, the signals obtained from the different measurement channels at the end of each excitation interval can be converted by the ADC 13 whilst in parallel the signals for the next excitation interval are collected. This also allows the nominal values for capacitors C1 and C2 to be increased and used as a part of the filtering circuitry.

FIG. 17b also shows the ADC trigger signal used to trigger the analogue to digital converter 13 to convert the output from the sample and hold circuitry 15 into a corresponding digital value. As shown, in this illustration as there are four amplification and filtering circuits 83 connected to the sample and hold circuitry 15, the ADC trigger signal has four pulses spaced during the relevant measurement interval so that the signal from each amplification and filtering circuit 83 will be sampled in turn.

Excitation and Control Signal Logic

Figure 18:
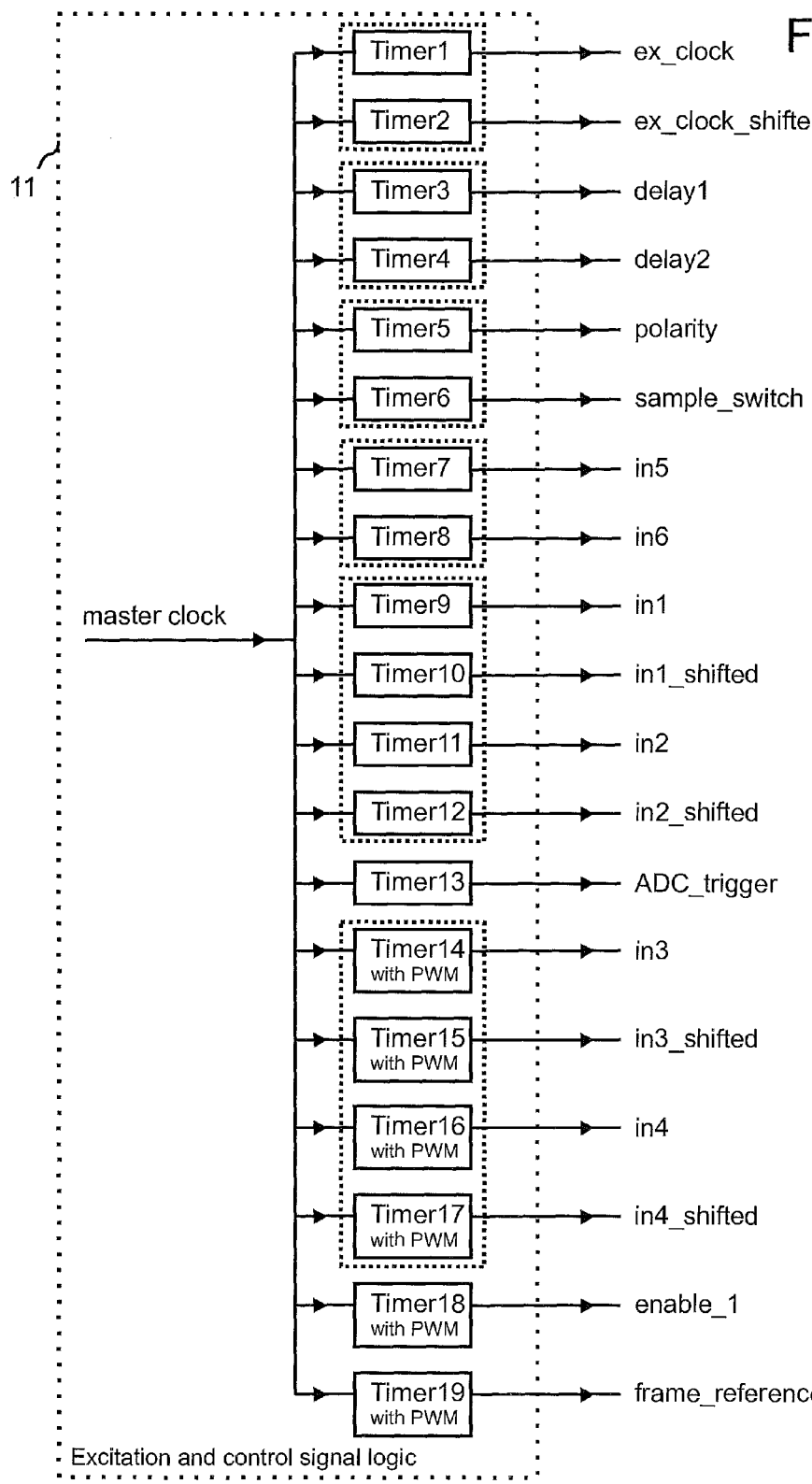
FIG. 18 is a block diagram illustrating the main components of the excitation and control signal logic shown in FIG. 3.

As mentioned above, the excitation and control signal logic 11 operates independently of the measurement processing unit 19 and operates cyclically in a free running manner to produce the same control signals—measurement cycle after measurement cycle. FIG. 18 is a block diagram that illustrates the main components of the excitation and control signal logic 11 used in this embodiment. As shown, the excitation and control signal logic 11 includes nineteen free running synchronised timers that are each clocked by a master clock signal and that each output one of the above described control signals. Some of the timers are just counters that output a suitably frequency reduced version of the master clock frequency, whereas other timers output a Pulse Width Modulated (PWM) signal (in particular the timers used to generate the enable signals and the multiplexor select signals used in the detection switching blocks).

Measurement Processing Unit

Figure 19:
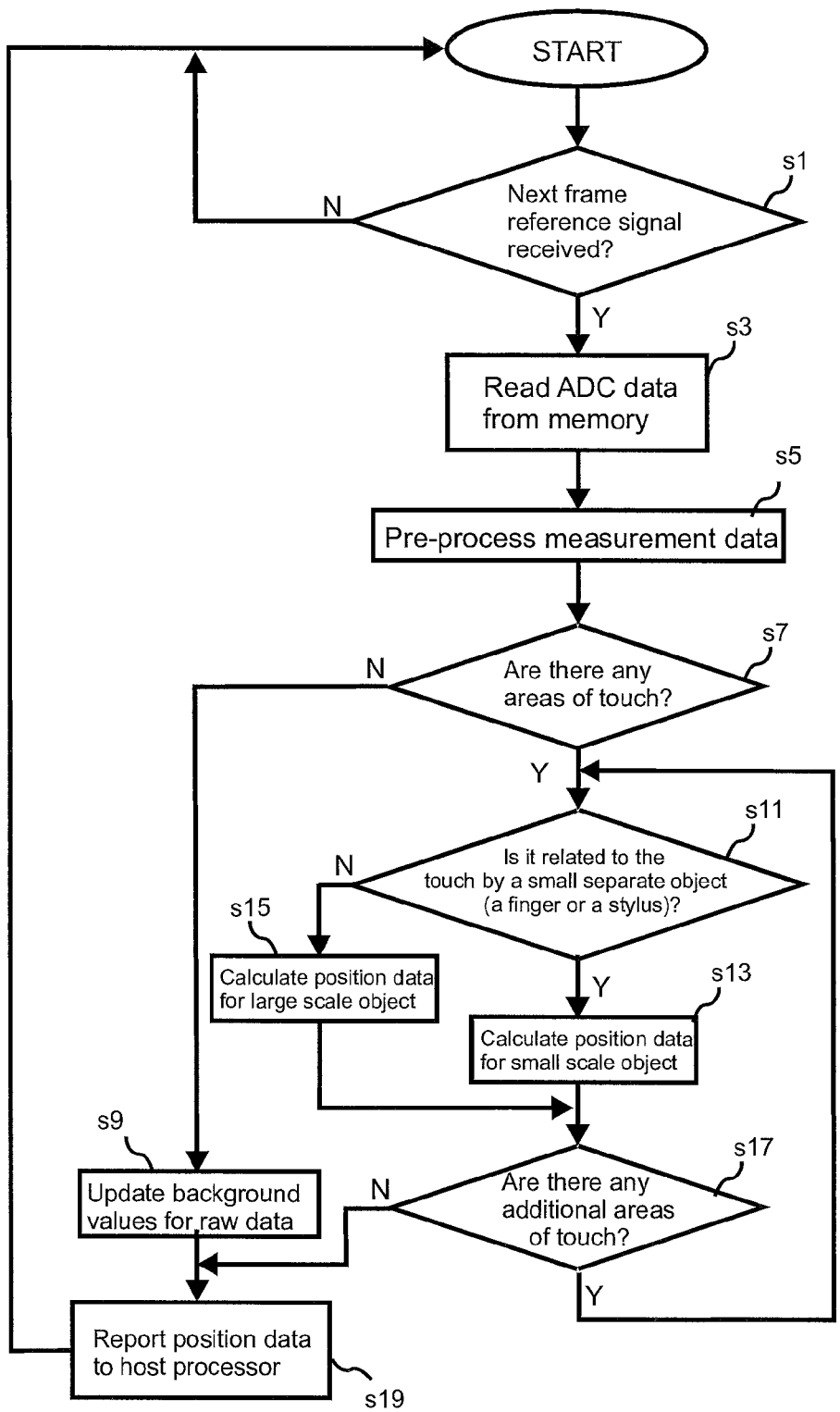
FIG. 19 is a flow chart illustrating a software routine used by a digital processing unit forming part of the digitiser electronics shown in FIG. 3 that controls the way in which the digital values obtained from the analogue to digital converter are processed during each measurement cycle.

FIG. 19 is a flow chart illustrating the way in which the measurement processing unit 19 operates to process the measurement data stored in memory 17. This process is typically software controlled. As shown, in step s1, the measurement processing unit 19 waits to receive the next frame reference signal 22 from the excitation and control signal logic 11. When the frame reference signal 22 is received, the processing proceeds to step s3, where the measurement processing unit 19 reads the new ADC data from memory 17. This data will include a set of differential measurements, each measurement involving different combinations of mutual capacitances formed at four cross-over points between the selected excitation conductors 5 and the selected detection conductors 7. In step s5, the measurements are pre-processed to put them in a form that makes them more suitable for position sensing measurement. In the simplest embodiment, this pre-processing may simply involve subtracting a background value (a value unperturbed by a user's finger or stylus etc) from each of these measurements. In this embodiment, the measurement processing unit 19 maintains a respective background value for each measurement point. In more complex embodiments (described later), this pre-processing of the measurement data may process the measurement data to determine separate measurements of the mutual capacitance between excitation conductor 5 and detection conductor 7 pairs. After the pre-processing of the raw measurement data, the measurement processing unit 19 processes at step s7 the adjusted measurements to determine if there are any areas of the digitiser 1 that have been touched, for example, by a user's fingers (or a stylus). If no areas have been touched then the processing proceeds to step s9, where the measurement processing unit 19 updates the background value for each raw measurement data point. In this way, changes in the measurements obtained because of slowly varying changes of the circuit components over time will be removed by the measurement processing unit 19. As those skilled in the art will appreciate an update of the background values will involve a digital filtering (smoothing) with a long time constant of the order of several minutes to avoid unwanted quick adjustment of the background values which can potentially trace and remove the effect of a slowly moving finger approaching the digitiser surface.

If at step s7, the measurement processing unit 19 determines that there are areas of the digitiser 1 that have been touched, then the processing proceeds to step s11 where the measurement processing unit 19 determines if a current touched area relates to a touch by a small separate object (such as a finger or a stylus) or a touch by a large object (such as the palm of a user's hand or closely located multiple fingers). The measurement processing unit 19 then calculates position data for a small separate object in step s13 or calculates position data for a large object in step s15, depending on the determination made at step s11. Areas of touch by small objects will be characterised by signals similar to those illustrated in FIG. 16. Large objects, like a palm or multiple closely spaced fingers, will produce large signal levels in a much larger area of adjacent measurement nodes. Typically, the signals from large objects can be processed using an algorithm that aims for more crude position information compared with the algorithms used for determining the position of smaller separate objects, which typically should be positioned with 1 mm accuracy. For instance, the position of a small object can be calculated as a centre of the gravity of all the measurement data in the area of touch; and the position of more closely spaced fingers can be calculated by using a multiple peak fit to the measurement data.

Distinguishing between small and large objects allows the digitiser 1 to report the different types of touches that have been detected which therefore allows a host processor (not shown) to take different control actions depending on whether or not the detected object is a small separate object or a large object. For example, if the host processor is running a drawing program, then detection of the large object can be used as an "eraser" function in the drawing program. In this way, the user experience of the electronic digitiser can be made similar to the normal use of a conventional "white board".

Once the position data for the current touched area has been calculated, the processing proceeds to step s17, where the measurement processing unit 19 determines if there are any additional areas of the digitiser 1 that have been touched. If there are, then the processing returns to step s11 as before. Once position data has been obtained for each of the touched areas, the processing then proceeds to step s19 where the measurement processing unit 19 reports the position data to the host processor (not shown) via the host interface unit 21. The processing then returns to step s1 where the measurement processing unit 19 awaits the next frame reference signal 22 indicating that the next set of measurements have been stored in the memory 17 and are ready to be processed.

Advantages of Embodiment

1) The excitation and control logic 11 operates autonomously with respect to the measurement processing unit 19; and in a "free running" manner. Thus the excitation and control logic can be configured with simple clock circuits that can generate the required control signals in the required cyclic manner, without software processor control.
2) Adjacent excitation conductors are energised in an overlapping manner so that during each excitation interval two adjacent excitation conductors are driven with complementary (180° phase shifted) excitation signals, allowing for a reduction in electromagnetic emissions by the digitiser grid 3 that might cause interference to other nearby electronic circuits.
3) Detection conductors are sequentially switched through the measurement channels such that during the detection intervals, the signals from two detection conductors are passed through each detection switching block, from which differential measurements can be obtained—allowing for a reduction in noise picked up from the LCD screen or another external noise source.
4) Each excitation conductor is energised during one period of the polarity signal, which cancels low frequency components in the signals measured with the amplification and filtering circuits. This also allows measurements to be obtained from each detection conductor for both polarities of the excitation signal and together with the overlapping selection of the excitation conductors allows for optimum measurement update rates.
5) The excitation electronics are arranged so that at the end of one detection interval (excitation cycle) and at the start of the next detection interval, there are no overlapping excitation signals—as this helps to reduce the bandwidth requirements of the amplification and filtering circuit(s) used to amplify and filter the signals obtained from the detection conductors, which in turn reduces the noise contained in the final measurements.

Excitation Frequency

Figure 21:
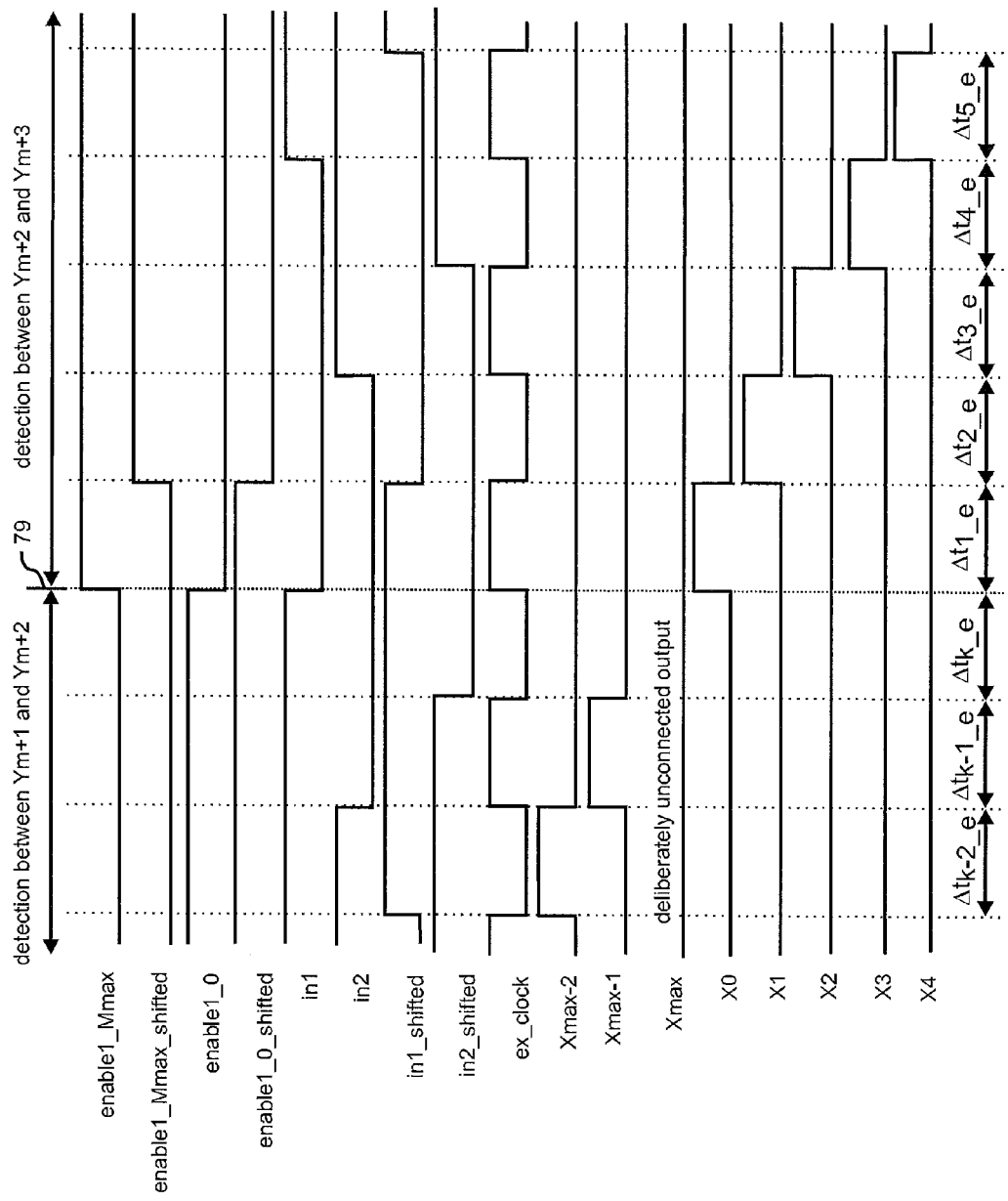
FIG. 21 is a timing diagram illustrating the timing of the excitation signals applied to adjacent excitation conductors when no demodulation is performed.
Figure 22:
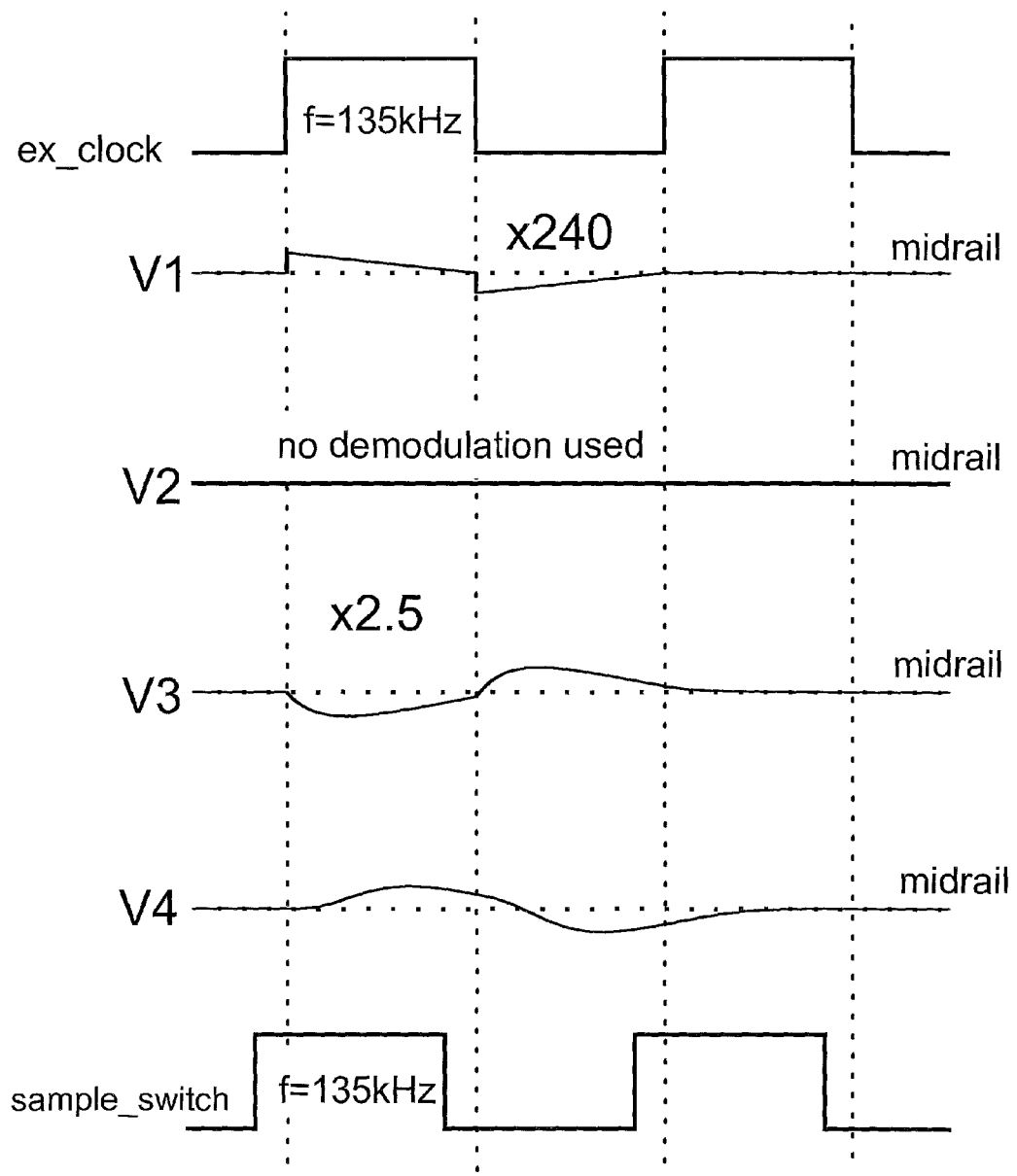
FIG. 22 illustrates voltages measured at different points of the circuitry shown in FIG. 20 in an embodiment where no demodulation is performed on the signals obtained from the detection circuitry.
Figure 23:
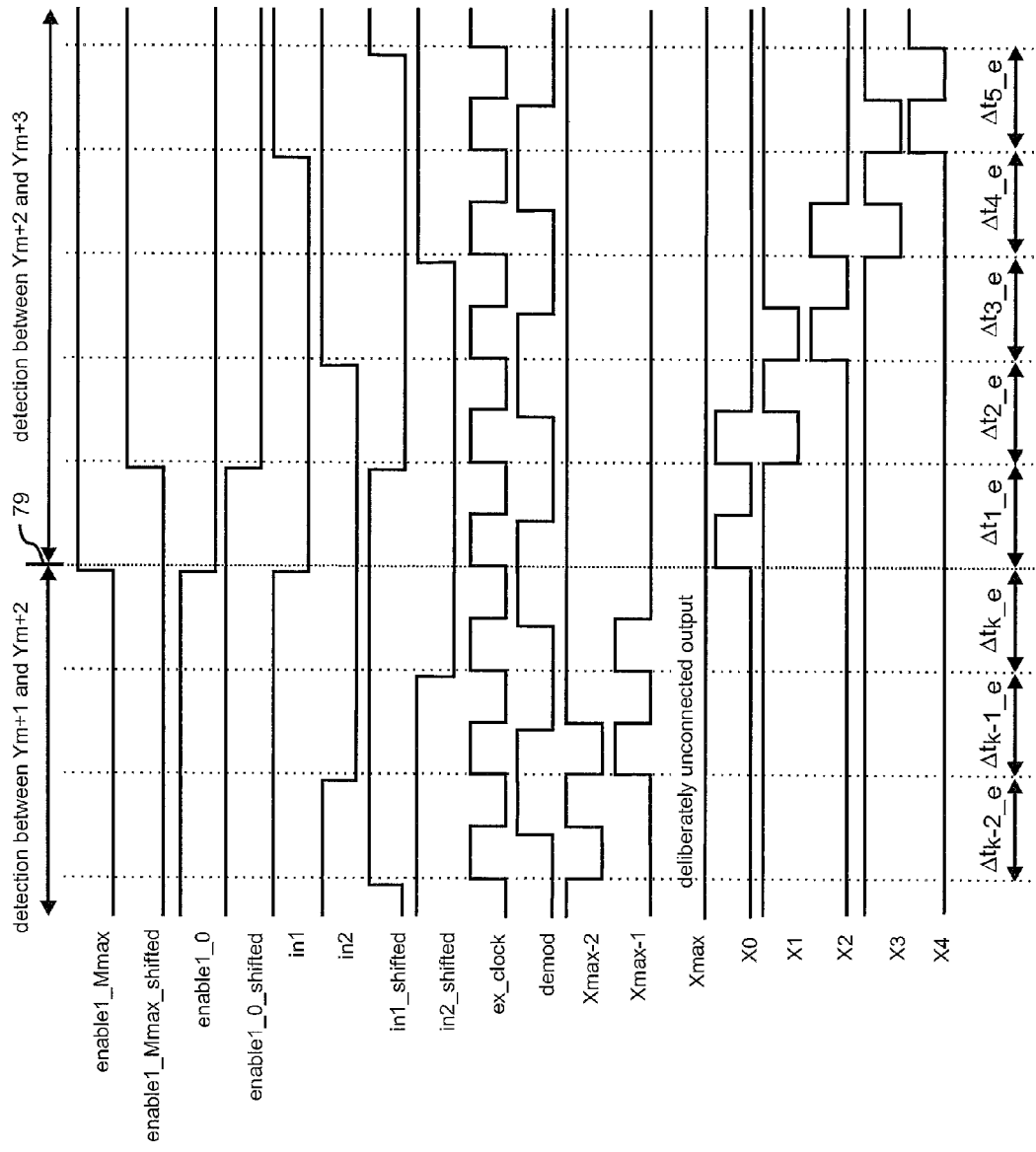
FIG. 23 is a timing diagram illustrating the timing of the excitation signals applied to adjacent excitation conductors when the excitation frequency is twice that of the polarity control signal.
Figure 24:
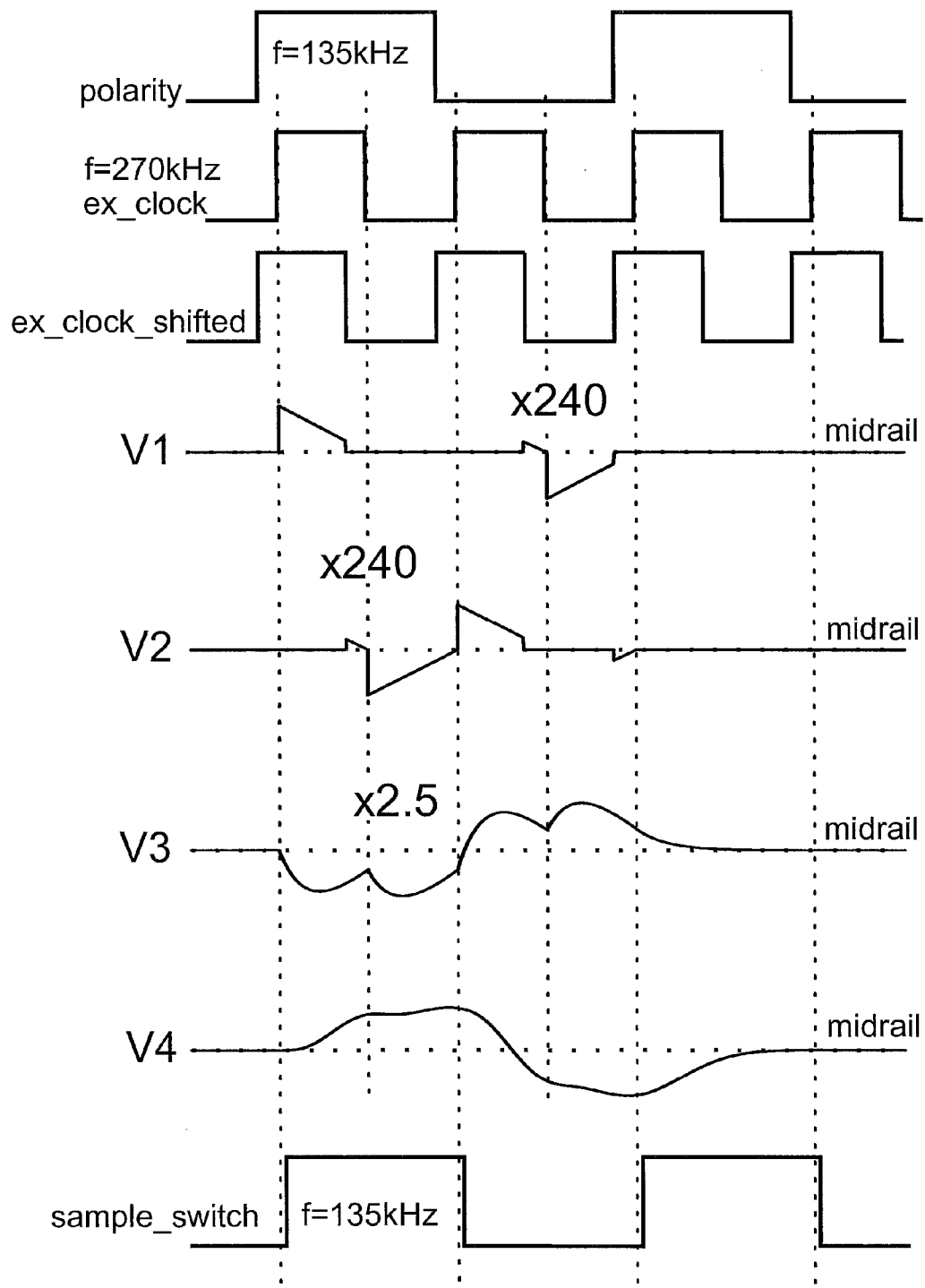
FIG. 24 illustrates voltages measured at different points of the circuitry shown in FIG. 20 when the frequency of the excitation signal is twice the frequency of the polarity control signal.
Figure 26:
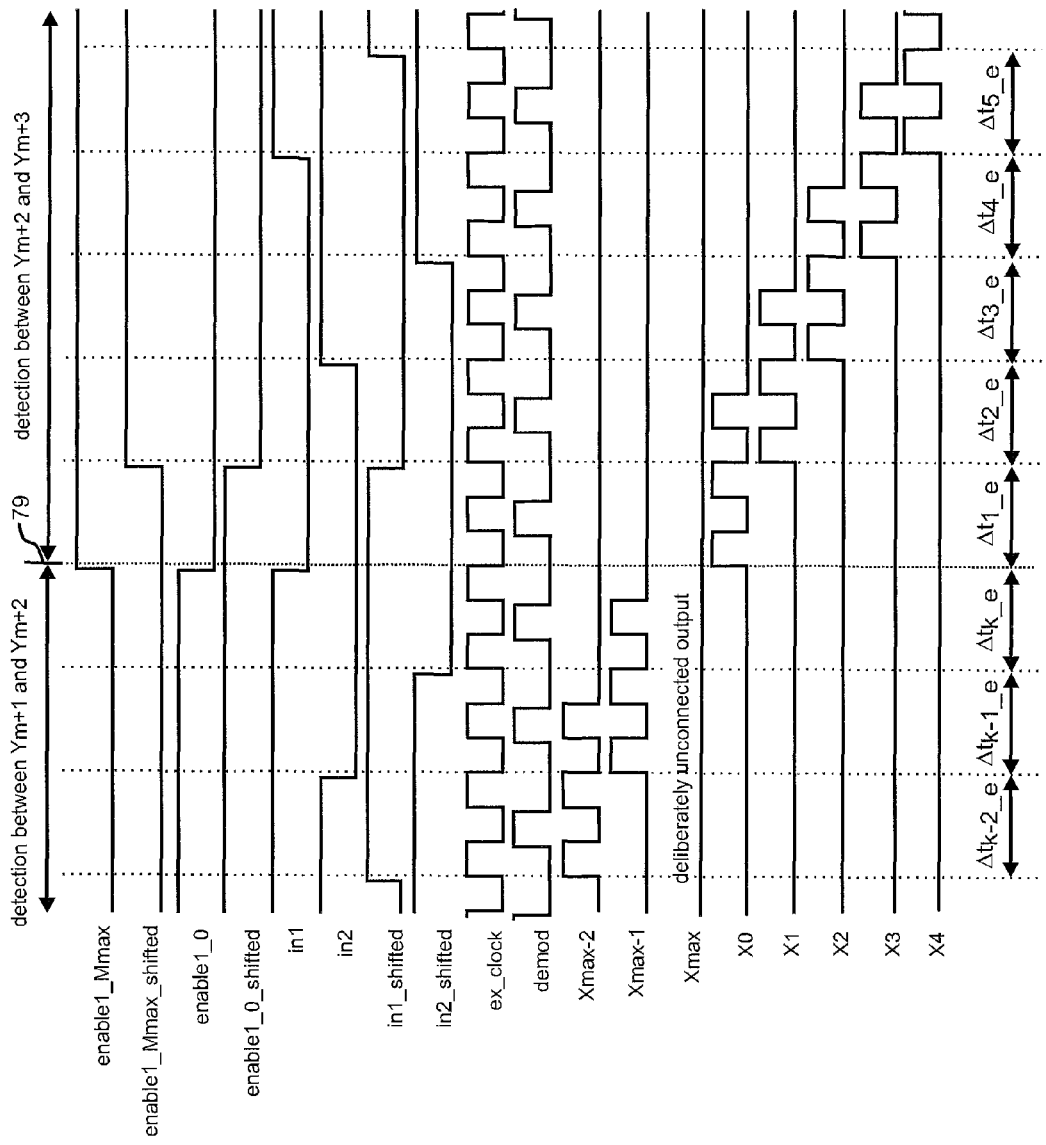
FIG. 26 is a timing diagram illustrating the timing of the excitation signals applied to adjacent excitation conductors when the excitation frequency is three times that of the polarity control signal.
Figure 27:
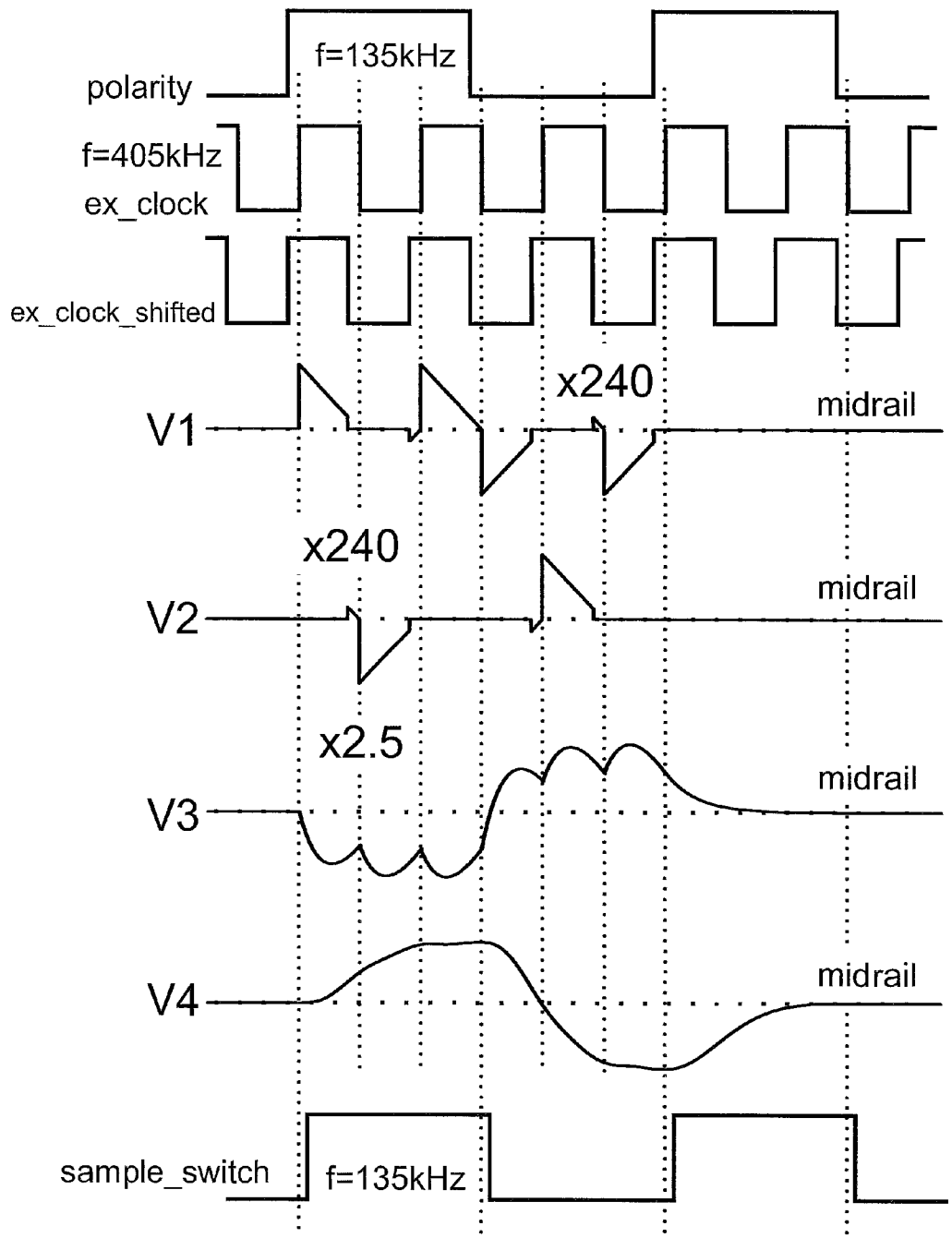
FIG. 27 illustrates voltages measured at different points of the circuitry shown in FIG. 20 when the frequency of the excitation signal is three times the frequency of the polarity control signal.
Figure 28:
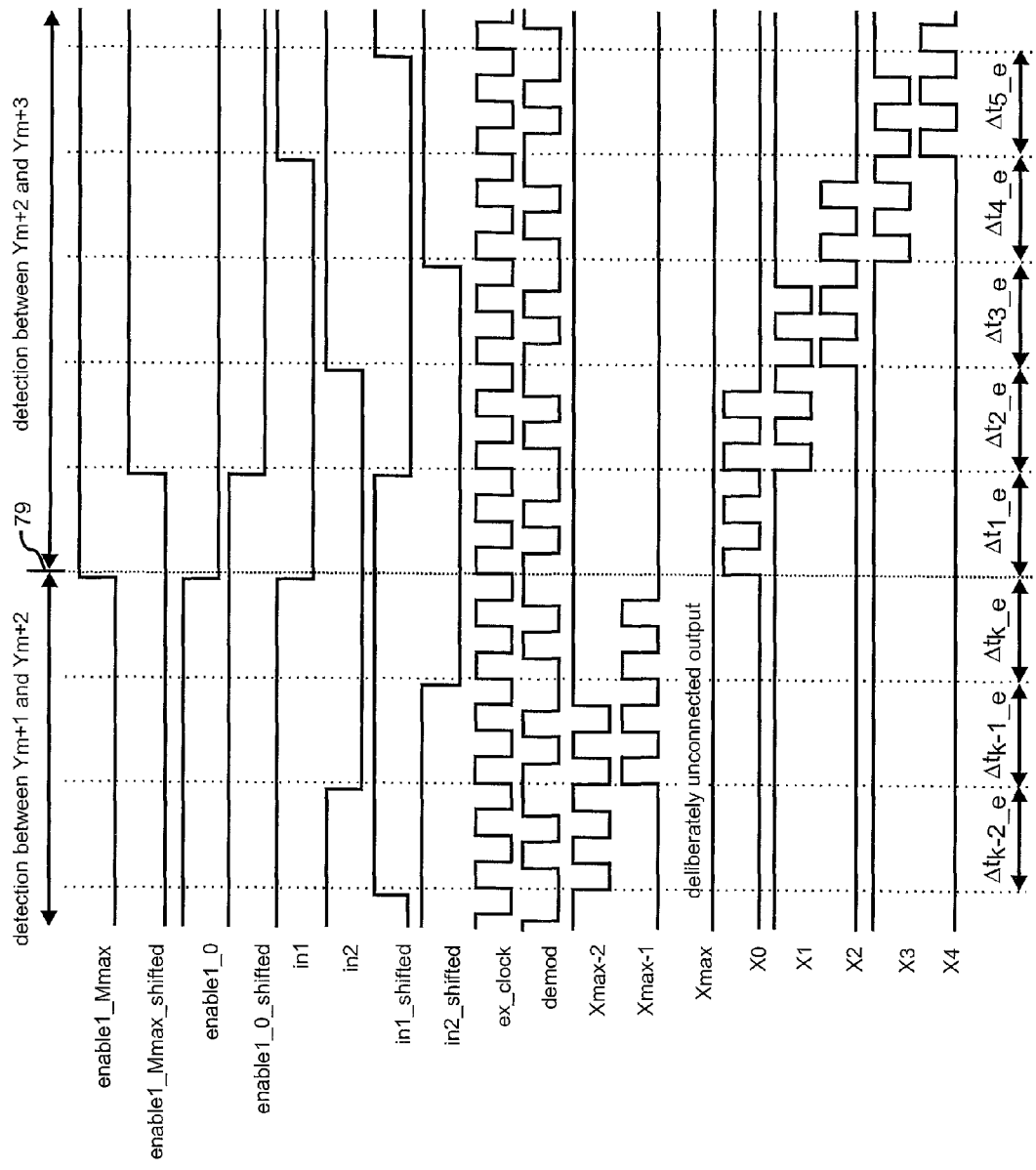
FIG. 28 is a timing diagram illustrating the timing of the excitation signals applied to adjacent excitation conductors when the excitation frequency is four times that of the polarity control signal.
Figure 29:
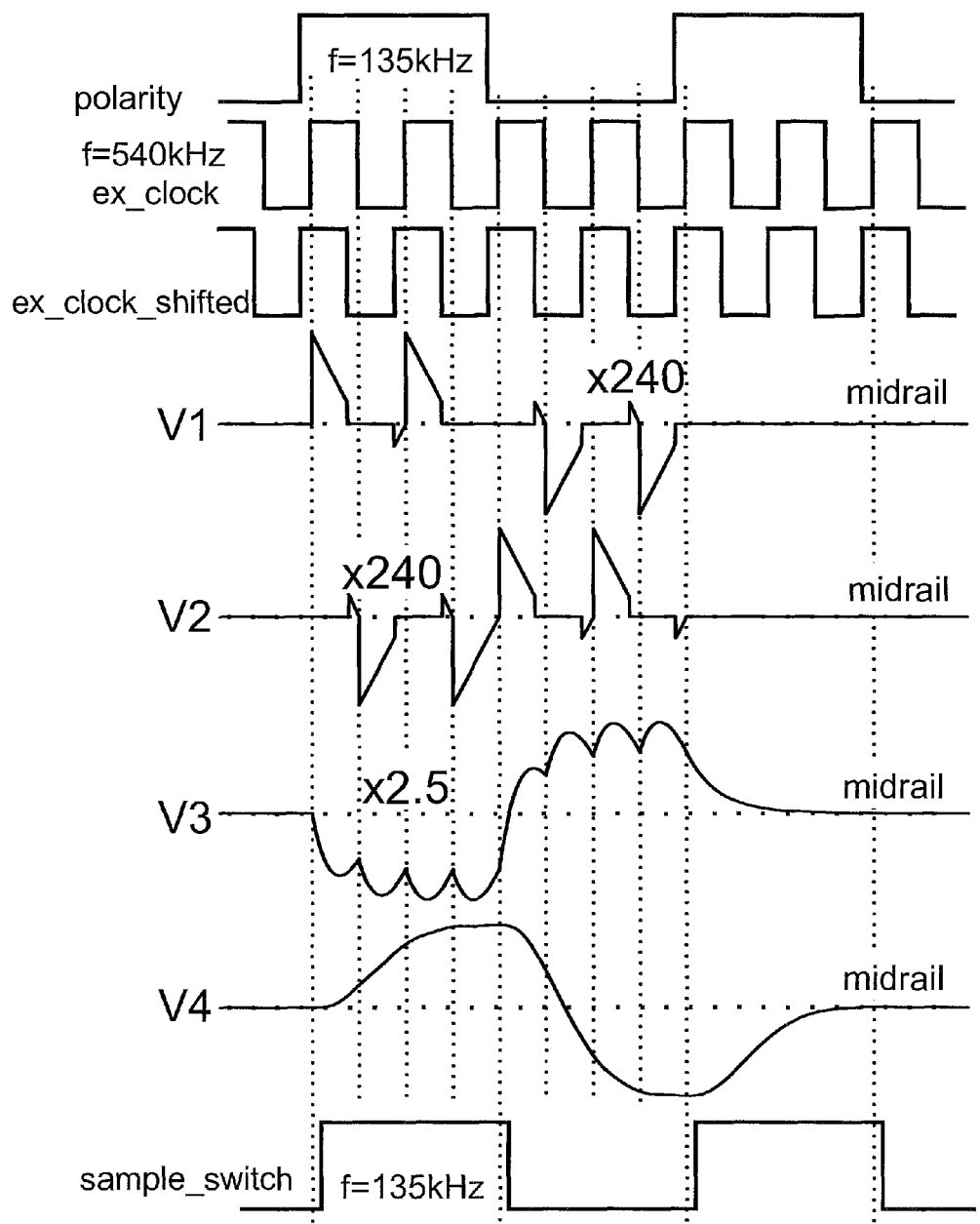
FIG. 29 illustrates voltages measured at different points of the circuitry shown in FIG. 20 when the frequency of the excitation signal is four times the frequency of the polarity control signal.

A description will now be given of the operation of the above embodiment for a specific implementation of the amplification and filtering circuit 83 (shown in FIG. 20) that has a pass band between 2 kHz and 200 kHz, for different excitation frequencies. FIGS. 21 and 22 illustrate the case where the frequency of the excitation signal is the same as the frequency of the polarity control signal (i.e. 135 kHz); FIGS. 23 and 24 illustrate the operation when the frequency of the excitation signal is twice the frequency of the polarity control signal (i.e. 270 kHz); FIGS. 26 and 27 illustrate the case where the excitation frequency is three times the frequency of the polarity control signal (i.e. 405 kHz); and FIGS. 28 and 29 illustrate the situation where the excitation frequency is four times the frequency of the polarity control signal (i.e. 540 kHz).

FIG. 21 illustrates the way in which the excitation signals are applied sequentially to the adjacent excitation conductors X0, X1, X2, etc. As shown, at the end of each excitation interval ($\Delta t_i\_e$) the excitation signal applied to one excitation conductor transitions from a one to a zero and the excitation signal applied to an adjacent excitation conductor transitions from a zero to a one. In this way, complimentary excitation signals are still being applied to adjacent excitation conductors. This is true for all excitation intervals except for the transitions at the start and end of the last excitation interval ($\Delta t_k\_e$) of a given excitation cycle. As discussed above, this is because there is no excitation conductor Xmax connected to the last excitation switching block 50-Mmax.

Figure 20:
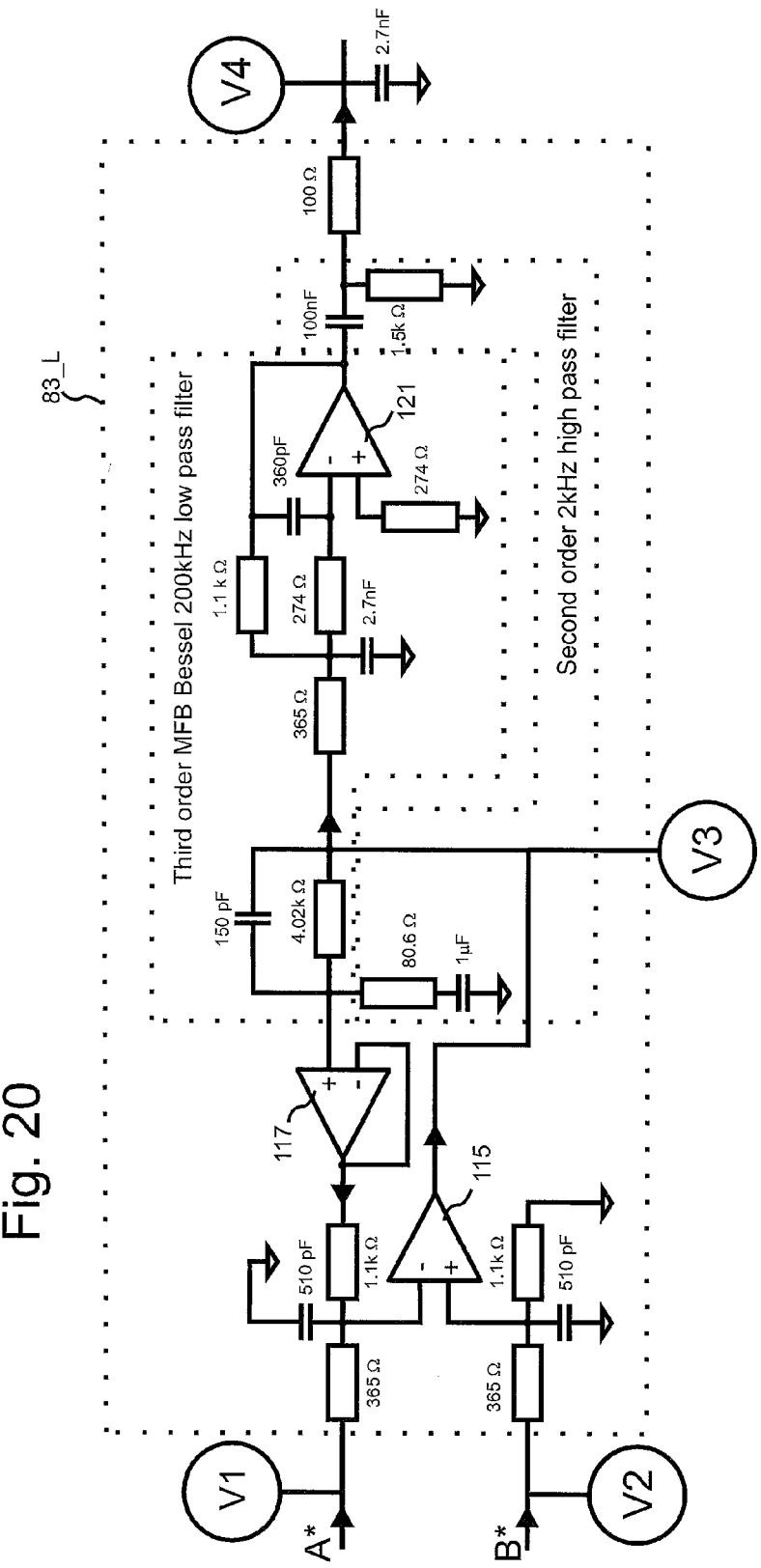
FIG. 20 illustrates exemplary circuit components used in the amplification and filtering circuit shown in FIG. 13 to provide a desired pass band filter response.

FIG. 22 illustrates the voltages V1 to V4 generated in the amplification and filtering circuit 83 shown in FIG. 20 (with voltages V1 and V2 multiplied by 240 and with voltage V3 multiplied by 2.5—for ease of visualising the signals). As shown in FIG. 20, the voltage V1 corresponds to the A* input to the amplification and filtering circuit 83 and the voltage V2 corresponds to the B* input to the amplification and filtering circuit 83. In this embodiment, because the excitation frequency is the same as the frequency of the polarity control signal, the output from the XOR gate 100 shown in FIG. 11 will be a constant and therefore switch 99 will not change position (i.e. there is no demodulation in this example). For the purposes of the following discussion, it will be assumed that the switch 99 is set in the position shown in FIG. 11 such that the output from amplifier 97-1 will be passed to the A* input of the amplification and filtering circuit 83 and so that the output from amplifier 97-2 is passed through to the B* input of the amplification filtering circuit 83. Further, to simplify the discussion of later examples, (where the excitation frequency is greater than the frequency of the polarity control signal) it will be assumed that there is no signal coming from amplifier 97-2.

As shown in FIG. 22, for the case where the excitation frequency is the same as the frequency of the polarity signal (=135 kHz), the input signal V1 appearing at the A* input of the amplification and filtering circuit 83 will rise to a peak positive value with the rising edge of the clock signal (excitation signal) and will then decay until the falling edge of the clock signal at which point it will go to a peak negative voltage and then decay over time. This V1 voltage is amplified and filtered by the first stage of the amplification circuitry to generate the voltage V3. This V3 voltage is then amplified and filtered again through the remaining amplification and filtering circuit to generate the output voltage V4 that is a smoother sinusoidal voltage at the frequency of the polarity control signal (135 kHz). FIG. 22 also shows the sample switch signal used to control the sampling of the signals by the sample and hold circuitry 15. As shown, the sample switch signal is phase shifted from the polarity and the excitation signals so that the voltage V4 is sampled closer to its peak values during the corresponding excitation intervals.

As those skilled in the art will appreciate, because there is no demodulation being performed in this example, the rejection of external noise is not optimum as all noise signals within the range 2 kHz to 200 kHz will pass through the amplification and filtering circuit 83. This can be disadvantageous especially when the digitiser 1 is for use with an LCD display where it is not uncommon to have LCD switching noise at approximately 30 kHz and power supply switching noise at approximately 100 kHz.

FIGS. 23 and 24 illustrate the signals obtained when the excitation frequency is twice the frequency of the polarity control signal. As can be seen from FIG. 23, in order to optimise the number of opposite polarity transitions of the excitation signals in adjacent excitation conductors, the odd numbered conductors have been held at Vcc when not selected for excitation. Therefore, when the excitation signal that is applied to excitation conductor X0 transitions from zero to one at the end of excitation interval $\Delta t_1\_e$ the excitation signal applied to the adjacent excitation conductor X1 transitions from a one to a zero. If excitation conductor X1 had not been held at Vcc, then the only opposing transition would occur in the middle of the excitation interval $\Delta t_2\_e$.

FIG. 24 illustrates the voltages V1, V2, V3 and V4 for this case where the excitation frequency is twice that of the polarity control signal. The dashed vertical lines shown in FIG. 24 correspond to the transitions of the excitation signal. As shown, when the excitation signal (ex_clock) transitions from a low level to a high level, the voltage V1 increases in amplitude and then decays during the first half of the clock period. However, on the falling edge of the ex_clock_shifted signal that is used to generate the demod control signal for the demodulating switch 99, the voltage output from amplifier 97-1 is switched onto the B* input to the amplification and filtering circuit 83 and therefore appears at V2. Subsequently, when the excitation signal transitions from a high level to a low level, a negative voltage will appear at V2 that will decay over time. When the ex_clock_shifted signal changes from a low level to a high level, the demod signal used to control the position of the demodulating switch 99 will remain the same because at this time instant the polarity signal also changes from a high level to a low level. Therefore, on the rising edge of the excitation signal, a positive peak appears at V2 which decays over time until the falling edge of the ex_clock_shifted signal. At this time, the position of the demodulating switch 99 changes again such that the voltage output from the amplifier 97-1 is passed through the A* input to the amplification and filtering circuit 83 and thus appears at V1.

FIG. 24 also shows the filtered signal V3 obtained by amplifying and filtering the difference between V1 and V2; and V4 shows the further amplified and filtered signal at the output of the amplification and filtering circuit 83. As shown in FIG. 24, the output signal V4 is still a substantially sinusoidal signal at a frequency corresponding to the polarity control signal. FIG. 24 also shows the sample switch control signal used to control the sampling of the signal output from the amplification and filtering circuit 83. As shown, the sample switch signal is shifted relative to the polarity signal so that the output V4 is sampled close to its peak value.

Figure 25:
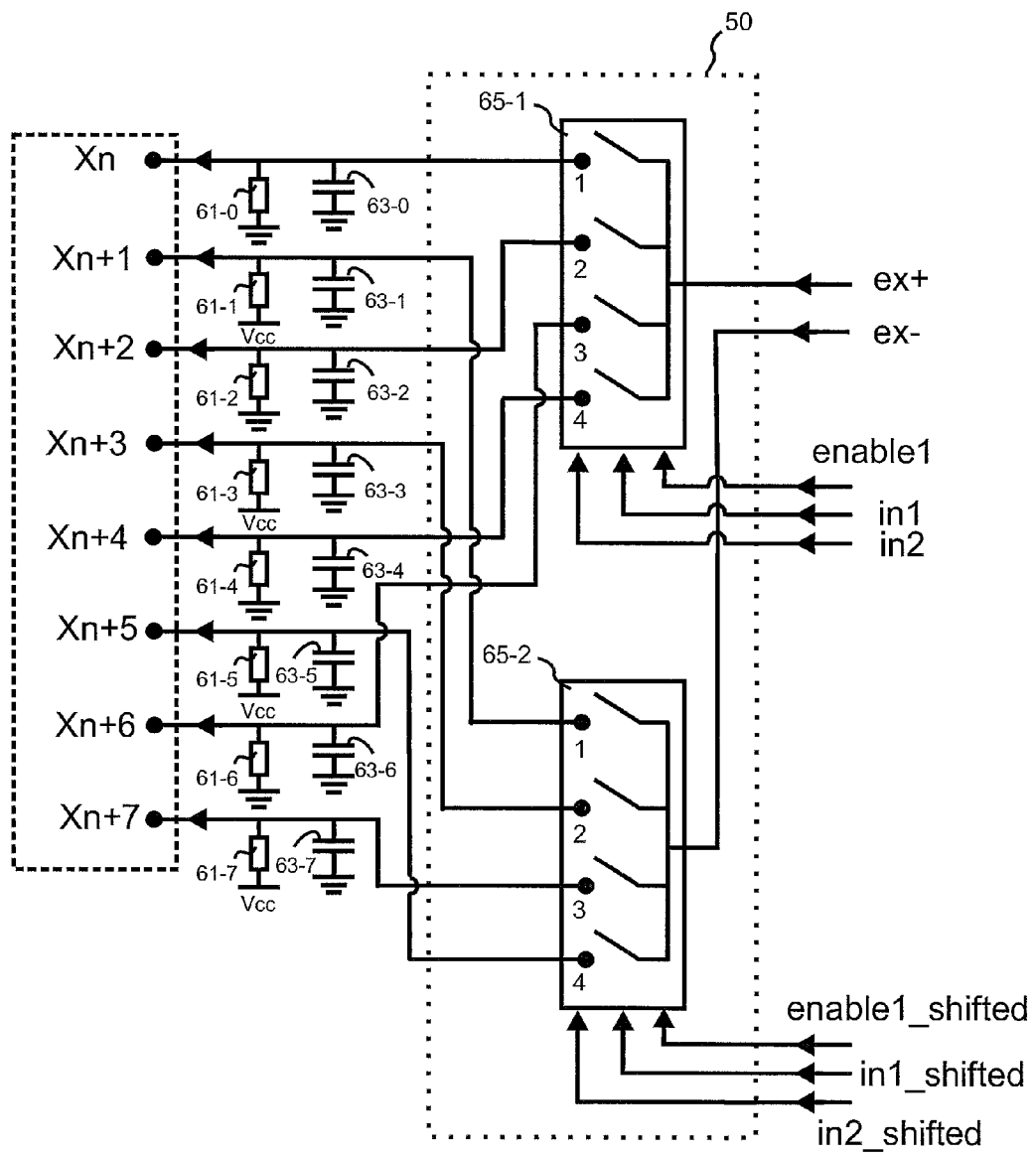
FIG. 25 illustrates the way in which alternate excitation conductors are connected to Vcc to facilitate generation of the excitation signals shown in FIG. 23.

As mentioned above, in this example, where the frequency of the excitation signal is twice that of the polarity control signal, the odd numbered excitation conductors are held at Vcc when the excitation signal is not being applied to them. FIG. 25 illustrates a modified version of FIG. 5 showing one way in which this can be achieved.

Because of the demodulation used in this embodiment, the frequencies that will pass through the amplification and filtering circuit 83 include those between 70 kHz and 470 kHz (+−200 kHz around 270 kHz). Therefore, noise at a frequency of 100 kHz will still pass through the amplification and filtering circuit 83.

FIGS. 26 and 27 illustrate the operation when the excitation frequency is three times the frequency of the polarity control signal. As shown in FIG. 26, in this case, there is no need to hold the odd numbered excitation conductors at Vcc. This is true in all cases where there is an even number of transitions in the excitation signal during each excitation interval ($\Delta t\_e$). Therefore, with this excitation frequency, there is no need to change the biasing scheme and the circuitry shown in FIG. 5 can be used.

With this excitation frequency, the frequencies that will pass through the amplification and filtering circuit 83 include those between 205 kHz and 605 kHz (+−200 kHz around 405 kHz). Therefore, with this excitation frequency the 100 kHz interfering signal will be filtered to a certain extent by the amplification and filtering circuit 83.

FIGS. 28 and 29 illustrate the operation when the excitation frequency is four times the frequency of the polarity control signal. In this case, as shown in FIG. 28, the odd numbered excitation conductors 5 should (preferably) be held at Vcc to optimise the number of opposing transitions of the excitation signal on adjacent excitation conductors.

In this case, the pass band of the amplification and filtering circuit 83 corresponds to 340 kHz to 740 kHz (+−200 kHz around 540 kHz). In this case, sources of external noise at about 100 kHz will be efficiently filtered out by the amplification and filtering circuit 83.

The frequency of the excitation signal may be any integer multiple of the frequency of the polarity control signal. The integer chosen depends on the particular application and the noise sources that may be present. The inventor has found that an optimum ratio for the multiplexing strategy used in this embodiment is where the excitation frequency is about seven times the frequency of the polarity control signal. This gives an excitation frequency of 945 kHz for the case where the polarity signal has a frequency of 135 kHz. When the excitation and detection conductors are formed from copper (or other low resistance material) operation of the digitiser at 945 kHz is practical even for digitisers designed for use with large diagonal screens (having for example a diagonal of 203 cm (80 inches) or more). However, with ITO based digitisers 1, such high excitation frequencies can only be used in digitisers designed for use with much smaller display screens. In particular, with an ITO based digitiser, the excitation frequency should be restricted to about 70 kHz for screens having a diagonal of about 75 cm (30 inches) to keep the amount of cross talk noise below 10%. As the size of the display screen is increased, the excitation frequency for such ITO based digitisers has to decrease further. However, reducing the excitation frequency also has the effect of reducing the amplitude of the signals that are being measured. This can be seen by comparing the amplitudes of the V4 signal shown in FIGS. 22, 24, 27 and 29. As shown, as the excitation frequency increases (relative to the frequency of the polarity control signal), the amplitude of the V4 signal increases. As those skilled in the art will appreciate, this is because the measured signal caused by the mutual capacitive coupling depends linearly on the excitation frequency. Of course, whilst it is possible to reduce the frequency of the polarity control signal (in order to reduce the bandwidth of the filtering circuit which will also reduce the noise), doing so reduces the rate at which the new measurements can be obtained. As discussed above, the measurement update rate must be sufficient to allow the tracking of objects over the digitiser 1 and therefore, the frequency of the polarity control should be kept as high as possible—especially for large sized digitisers 1.

Pre-Processing of Raw Measurement Data

In the above description, the pre-processing performed on the raw measurement data in step s5 of FIG. 19 simply involved the subtraction of a background value. A description will now be given of a more complex pre-processing that can be performed in step s5, which aims to derive measurements of the perturbation (change) of the mutual capacitive coupling between individual excitation and detection conductor pairs caused by a touch event, which provides a greater flexibility for dealing with complex touch objects. In order to improve the speed of the measurements required for a large diagonal digitiser system, this more complex pre-processing does not determine these mutual capacitive coupling values for all cross-over points of the grid, only for the cross-over points where it is determined that the digitiser has been touched. This saves significantly on the amount of raw data measurements that need to be processed and improves signal to noise ratio for the calculated data. Indeed, for large scale diagonal digitiser sensors more than 99% of the differential measurements obtained using the differential sensing algorithm described above will demonstrate only a negligibly small deviation from their unperturbed values. This allows the novel algorithm described below with reference to FIG. 30, to be implemented with minimal processing and hence delay.

As those skilled in the art will appreciate from the above discussion, each measurement value obtained from the above sensing algorithm provides a "double differential" measurement representing the difference in mutual couplings between two adjacent excitation conductors 5 and two adjacent detection conductors 7. In particular, a single measurement value ($v_{i,j}$) obtained from the ADC 13 will represent the following double differential measurement:

$$v_{i,j} = (M_{i,j+1} - M_{i-1,j+1}) - (M_{i,j} - M_{i,j})$$

Where $M_{i,j}$ represents the mutual capacitive coupling between excitation conductor i and detection conductor j. The term in the first brackets represents the signal generated in detection conductor (j+1) as a result of driving adjacent excitation conductors (i and i−1) with opposite polarity excitation signals (ex+ and ex−); and the term in the second bracket represents the signal generated in detection conductor (j) as a result of driving the same adjacent excitation conductors (i and i−1) with the same opposite polarity excitation signals (ex+ and ex−). The terms in the two brackets are subtracted from each other as a result of applying the signals from the two adjacent detection conductors to the different inputs of the differential amplifier 115 in the amplification and filtering circuit 83.

Figure 30A:
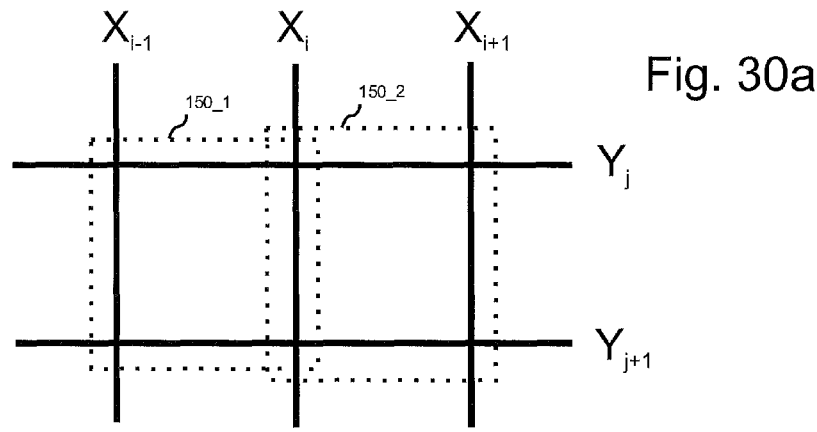
FIG. 30a schematically illustrates measurements made in part of the grid illustrated in FIG. 3 and the cross-over points involved in a measurement obtained from the grid.

Thus each data value represents a combined effect from four adjacent cross-over points in the digitizer grid 3. FIG. 30*a* shows part of the digitizer grid 3 around excitation conductors labeled i−1, i and i+1 and detection conductors labeled j and j+1. The dashed box 150-1 encloses the four cross-over points represented by the above double differential measurement. In the next excitation interval, the scanning process selects excitation conductor i+1 instead of excitation conductor i−1 and the polarity control signal changes, so that the double differential measurement obtained at this time represents:

$$v_{i+1,j} = (M_{i+1,j+1} - M_{i,j+1}) - (M_{i,j} - M_{i,j})$$

The dashed box 150-2 shown in FIG. 30*a* encloses the four cross-over points represented by this new double differential measurement. As each new excitation conductor 5 is selected, a new double differential measurement is obtained. Once all excitation conductors 5 have been selected and energized in this way, the next detection conductor (in this example j+2) is selected instead of detection conductor (j) and the driving of the excitation conductors 5 is repeated. The measurement values obtained in this way may conveniently be considered as a matrix of values, with the values in each row representing the measurement values obtained for a given pair of detection conductors and the values in successive positions in the row correspond to the different measurement values obtained as a result of the successive switching of the excitation conductors from one excitation interval to the next.

When i=0 we have:

$$v_{0,j} = (M_{0,j+1} - M_{-1,j+1}) - (M_{0,j} - M_{-1,j}) = M_{0,j+1} - M_{0,j}$$

where $M_{-1}$ is the effect of the missing wire ($X_{max}$) which is equal to zero and $M_0$ is the effect of excitation conductor $X_0$.

When j=0 we have $v_{0,0} = M_{0,1} - M_{0,0}$ which corresponds to the detection between detection conductors Y0 and Y1. When j is set to its maximum value (maxj) we have $v_{0,maxj} = M_{0,maxj+1} - M_{0,maxj}$ which corresponds to the detection between detection conductors Ymax and Ymax−1. As those skilled in the art will appreciate, the value of maxj depends on how many differential measurements are obtained from the grid of detection conductors. In the embodiment described above where a differential measurement is obtained between each adjacent pair of detection conductors, maxj will be equal to the number of detection conductors minus two.

When i is set to its maximum value (maxi) we have:

$$v_{maxi,j} = (M_{maxi,j+1} - M_{maxi-1,j+1}) - (M_{maxi,j} - M_{maxi-1,j}) = M_{maxi-1,j} - M_{maxi-1,j+1}$$

where $M_{maxi}$ is the effect from the missing excitation conductor ($X_{max}$) and is therefore equal to zero; and $M_{maxi-1}$ is the effect from excitation conductor Xmax−1. In this embodiment, because of the missing excitation conductor and because a single excitation conductor is energized in the first and last excitation intervals in each detection interval (see FIG. 9), maxi is equal to the number of excitation conductors.

As described above, in this exemplary embodiment, there are twenty four different amplification and filtering circuits 83, and these each produce signals that are measured in the same excitation interval. It is convenient (at least initially) to treat the measurements obtained from each amplification and filtering circuit 83 separately, thus, twenty four such matrices will be generated in this embodiment. As discussed above, each detection switching block 80 obtains signals to be amplified and filtered (before measuring) from seven pairs of detection conductors (this is illustrated in FIG. 12—by the seven different detection intervals) and so each matrix will have seven rows of values. Each row will have values obtained when adjacent pairs of excitation conductors are energized and also when the last excitation conductor (5-$X_{max-1}$) 1 is energized on its own—so the matrix will have one more column than the number of excitation conductors 5. Thus in one measurement cycle, the following matrices will be produced:

$$V^m = \begin{bmatrix} v^m_{0,0} & v^m_{1,0} & v^m_{2,0} & \cdots & v^m_{X\,max-1,0} & v^m_{X\,max,0} \\ v^m_{0,1} & v^m_{1,1} & v^m_{2,1} & & v^m_{X\,max-1,1} & v^m_{X\,max,1} \\ \vdots & & & \ddots & & \\ v^m_{0,j\,max} & v^m_{1,j\,max} & v^m_{2,j\,max} & \cdots & v^m_{X\,max-1,j\,max} & v^m_{X\,max,j\,max} \end{bmatrix}$$

For m=0 to 23 and where jmax is equal to 6 in this embodiment.

Figure 30B:
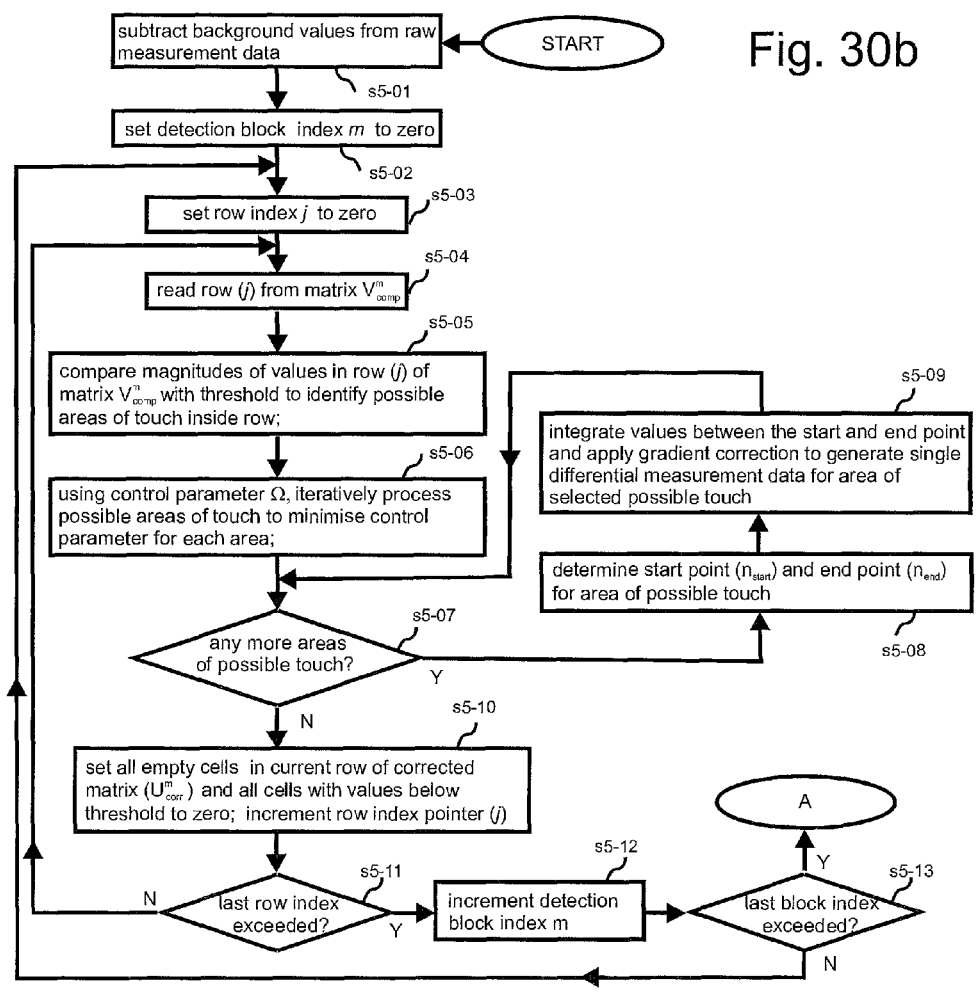
FIG. 30b is a flow chart illustrating first pre-processing steps that may be carried out on the raw measurement data obtained from the measurement channels.

FIG. 30*b* is a flowchart illustrating the processing steps performed by the measurement and processing unit 19 when this more complex pre-processing is performed in step s5 of FIG. 19 in this embodiment. As shown, in step s5-01 a respective background value is subtracted from each raw measurement value. In this embodiment, the measurement and processing unit 19 stores a set of twenty four matrices ($B^m$) of background values that correspond to the above matrices of measurement values ($V^m$), such that the measurement values can have the corresponding background values subtracted from them by performing a matrix subtraction operation as follows:

$$V^m_{comp} = V^m - B^m$$

Thus the values stored in the background compensated matrices $V^m_{comp}$ identify how each measured value deviates from the corresponding background value (or unperturbed value). When there are no fingers, styli or other objects touching or near the digitizer that will affect the mutual coupling between the excitation and detection conductors, then the values in all of these background compensated matrices should be very close to zero. However, when a finger, styli or other object touches or comes close to the digitizer, then this affects the capacitive coupling between the excitation conductors and the detection conductors in the vicinity of the finger, styli or other object and the corresponding values in the background compensated matrices will be much larger in magnitude. When a small object is provided adjacent the digitizer, the signal measurements include a positive and negative spike in values next to each other (as illustrated in FIG. 16) due to the differential nature of the measurements. When a larger object is located adjacent the digitiser, a peak of one polarity will be observed at one edge of the object and a peak of opposite polarity will be observed at the other edge. Again, this is because the measurements represent differential changes in the capacitive coupling. So in the middle of the object, adjacent conductors are subject to similar conditions, and therefore the difference between the signals produced by them will be small.

The processing described below aims to identify the characteristic positive and negative peaks associated with the presence of objects. The algorithm considers each row in each background compensated matrix ($V^m_{comp}$) in turn; and a detection block index (m) and a row index pointer (j) that are used to control this processing are initialised to zero in steps s5-02 and s5-03 respectively. In step s5-04, the measurement and processing unit 19 reads the values in the row pointed to by the row index (j) in the matrix pointed to by detection block index (m).

In step s5-05, the measurement and processing unit 19 compares the magnitude of each value in the selected row against a threshold value, in order to identify areas of possible touch inside the row where the magnitudes are greater than the threshold value. Such a simple selection, however, requires further adjustment as this process might select, as separate touched areas, the opposite edges of the same large object. For instance, the differential measurements at the first boundary of a large object can provide high positive values; the middle of the object can result in nearly zero values and the opposite edge can provide large negative values. Thus in step s5-06 the measurement and processing unit 19 iteratively analyses the selected areas of possible touch (identified in step s5-05) in order to combine, if necessary, nearby possible touch areas together to capture touches from such large objects. To achieve this, in this embodiment, step s5-06 calculates a control parameter $\Omega$ which is equal to the sum of the differential measurement values in the initially selected area (or currently selected area if this is a subsequent iteration) of touch divided by the sum of the modulus of those differential measurement values. For a correctly selected possible touch area, the calculated control parameter $\Omega$ should be close to zero. Large values of the control parameter $\Omega$, especially values close to +1 or −1, indicate that the initially selected possible touch area is incorrectly selected. In this case, the measurement and processing unit 19 finds the nearest touch area having a large control parameter value $\Omega$ with opposite polarity and merges the corresponding touch areas together (including all points between them) in order to minimise the value of the control parameter $\Omega$ for the new merged possible touch area. Of course, the processing of step s5-06 may join together touched areas which should be treated as separate ones. However, this is not a problem as all measurement values below the threshold value are later replaced with zero values to facilitate a more precise selection of individual touched areas in step s11 of FIG. 19. The purpose of identifying the possible touched areas at this stage is to identify the parts of the background compensated matrices ($V^m_{comp}$) that are to be processed to determine values representative of the change in mutual coupling between individual excitation conductor/detection conductor pairs (rather than the raw double differential measurements that are available in the background compensated matrices ($V^m_{comp}$)).

The algorithm then processes, in steps s5-07 to s5-09, the double differential measurement values within each area of possible touch to integrate the values along the row within each area of possible touch. In particular, in step s5-07 the measurement and processing unit 19 determines if there are any more areas of possible touch (in the current row being processed) that have not been processed through steps s5-08 and s5-09. If there are, then in step s5-08 the measurement and processing unit 19 determines the start point ($n_{start}$) in the row and the end point ($n_{end}$) in the row of the area of possible touch to be processed. These start and end points are the first and last values in the area of possible touch whose values exceed the threshold value. Then, in step s5-09, the measurement and processing unit integrates the values between the start and end points and stores the integrated values in corresponding positions of a new row of a new matrix ($U^m$) having one less measurement, such that the number of columns in the new matrix equals the number of excitation conductors 5.

As discussed above, each raw double differential measurement represents the effect from the following combination of mutual capacitances:

$$v^m_{i,j} = (M^m_{i,j+1} - M^m_{i-i,j+1}) - (M^m_{i,j} - M^m_{i-1,j})$$

If it is assumed that the raw measurement value immediately before $n_{start}$ is zero, then it can be assumed that the effect of the conductor (i−1) that is shared between the preceding value and $n_{start}$ is also zero. Thus the value at $n_{start}$ can be considered to equal:

$$u^m_{nstart,j} = v^m_{nstart,j} = (M^m_{nstart,j+1} - 0) - (M^m_{nstart,j} - 0) = M^m_{nstart,j+1} - M^m_{nstart,j}$$

This represents the mutual coupling between a single excitation conductor (with index nstart) and two adjacent detection conductors (with index j and index j+1). If this value is then added to the next value in the area of possible touch ($v_{nstart+1}$), we get:

$$u^m_{nstart+1,j} = v^m_{nstart+1,j} + u^m_{nstart,j}$$

$$= (M^m_{nstart+1,j+1} - M^m_{nstart,j+1}) - (M^m_{nstart+1,j} - M^m_{nstart,j}) +$$

$$(M^m_{nstart,j+1} - M^m_{nstart,j})$$

$$= M^m_{nstart+1,j+1} - M^m_{nstart+1,j}$$

This value represents the mutual coupling between the next excitation conductor (with index nstart+1) and the same two detection conductors. Step s5-09 calculates such integrated values between $n_{start}$ and $n_{end}$. More specifically, in this embodiment the following integrated values are calculated:

$$u^m_{p,j} = v^m_{p,j} + K_0 * u^m_{p-1,j}$$

Where $K_0$ is a constant close to one, $n_{start} \leq p \leq n_{end}$ and $u_{nstart-1,j} = 0$.

The exact value of the constant $K_0$ depends on the transient response of the amplification and filtering circuit 83 (which is shown in FIG. 40c and will be described in more detail later). In particular, when an excitation signal is applied to an excitation conductor, the signals received by the detection conductors will charge up dc blocking capacitors forming part of the amplification and filtering circuit 83. As a result, the amplification and filtering circuit 83 will not relax to the mid-rail voltage but to a midpoint level that deviates from the mid-rail by an amount that depends on the time constant of the amplification and filtering circuit 83 (which depends on the frequency of the polarity modulation signal and on the value of the low frequency corner of the amplification and filtering circuit 83). As an example, in the case when the second order high pass filter of the amplification and filtering circuit 83 has a low frequency corner corresponding to one hundredth of the polarity modulation frequency, the constant $K_0$ can be set close to 1.04.

In the next excitation interval, the signal related to the same excitation conductor will be inversed at the input of the amplification and filtering circuit 83 and it will cause the amplification and filtering circuitry to relax to an opposite midpoint value. Thus the two perturbations to the midpoint level from the positive and negative parts of the polarity period related to the signal from the same excitation conductor will cancel each other almost completely—only about 0.06% from the signal amplitude from the excitation conductor will be left as a composite net perturbation to the midpoint level (and that net perturbation will relax to the mid-rail with a time constant determined by the low-frequency corner of the amplification and filter circuit 83). Thus, while the net effect of the signal from a given excitation conductor taken with both positive and negative polarity is quite close to zero (and is below the actual measurement noise level), the measured value of the second amplitude of this AC signal will be about 4% higher compared to the first amplitude (and will have the opposite sign). Thus multiplying the previous value by 1.04 will compensate for this transient effect in the measurements.

The calculation of new values continues in this way until the end of the selected touch area is reached. At this point the calculated value of $u_{nend,j}$ should equal zero—because excitation conductor with index $n_{end}$ is shared with the next double differential measurement which is zero. However, in practice, $u_{nend,j}$ will not equal zero due to the cumulative effect of noise in the measurements, error in the value of the coefficient $K_0$, and due to the slow shift of the mid-rail level from its previous value. In order to compensate for the non-zero final value of $u_{nend}$ a gradient correction $\Delta = u_{nend,j}/(1+n_{end}-n_{start})$ is calculated and all data related to the possible touch area in question are corrected as follows:

$$u^{corr,m}{}_{p,j} = u^m{}_{p,j} - \Delta * (1+p-n_{start}) \text{ for } n_{start} \leq p \leq n_{end}$$

This completes the processing of the current area of possible touch and a similar process is performed for the next area of possible touch until it is determined in step s5-07 that there are no more areas of possible touch in the current row of raw double differential measurements being processed. At this point, the processing proceeds to step s5-10, where all empty cells (elements in the row for which the above integration process was not performed) in the current row of the corrected matrix are set to zero. Similarly, all cells having values ($u^{corr,m}{}_{i,j}$) that are less then the above (or similar) threshold value are also set to zero. This helps to separate out the touched areas which were not properly split out by the algorithm in step s5-06.

Steps s5-11, s5-12 and s5-13 ensure that the measurement and processing unit 19 repeats the above integration process for each row of each background compensated matrix $V^m{}_{comp}$. The result of such integration of the raw data is a set of new data matrices $U^m{}_{corr}$. In each new matrix $U^m{}_{corr}$ the data in different columns correspond to the effect of individual different excitation conductors $X_i$ instead of the data in the initial set of matrices $V^m$ in which the data in most columns related to the differential effect of adjacent excitation conductors $X_i$ and $X_{i+1}$.

Figure 30C:
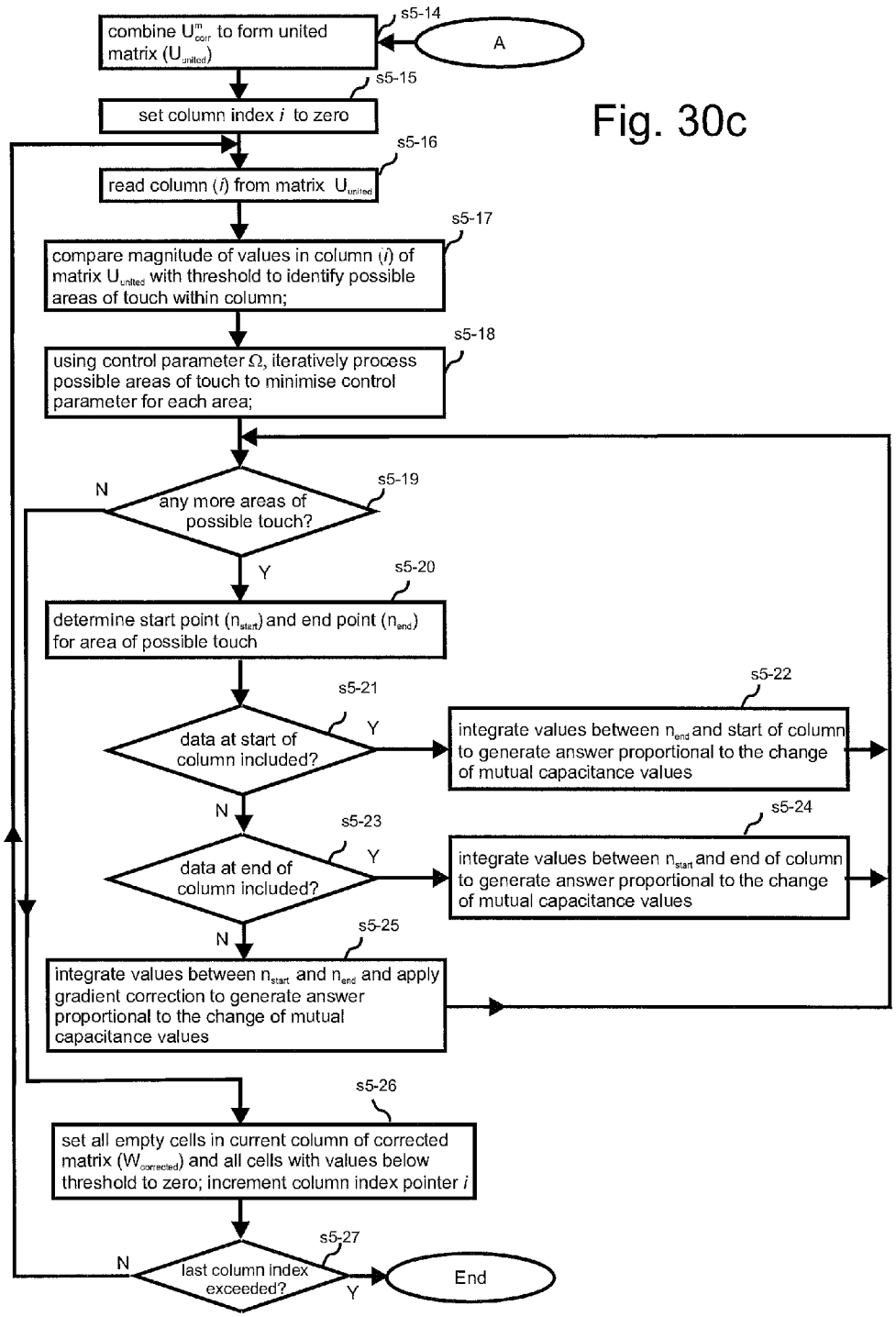
FIG. 30c is a flow chart illustrating second pre-processing steps that may be carried out on the raw measurement data obtained from the measurement channels.

The processing then proceeds to step s5-14, shown in FIG. 30c in which the m matrices ($U^m{}_{corr}$) are concatenated together to form a new data matrix $U_{united}$ such that each column in the new matrix $U_{united}$ corresponds to the effect of a particular excitation conductor $X_i$ and combines together consecutive differential measurements with pairs of the adjacent detection conductors $Y_k$ and $Y_{k+1}$. The algorithm also reverses the sign of the data $u^{corr,m}{}_{i,j}$ for each even detection interval j in each separate detection block m taking into account that the polarity of the differential detection of each detection conductor shown in FIG. 12 remains constant during the time when such detection conductor is selected by the detection switching circuitry 80.

The subsequent steps of the more complex pre-processing aim to integrate the values along each column of the united matrix ($U_{united}$) in a manner similar to the way in which the values in the rows of $V^m{}_{comp}$ were integrated in step s5-09. Integrating along the columns is slightly more complex than the integration along the rows because the values at the start and end of each column correspond to differential measurements. This was not the case for the rows—as the first and last values of a row correspond to a situation when only one excitation conductor is being energised (see excitation intervals $\Delta t_1$_e and $\Delta t_k$_e in FIG. 9). The effect of this is that if an object is placed over the top or bottom edge of the digitizer grid, only one of the characteristic positive and negative peaks will be found in the data values for that area of touch. For instance a palm located at the edge of the grid 3 and overlapping detection conductor $Y_0$ can produce very little effect in differential measurements between detection conductors $Y_0$ and $Y_1$, and $Y_1$ and $Y_2$. It will, however, produce large negative differential signals at the edge of the palm, and this region of negative differential signals will not be compensated by a region with positive differential signals, as the other edge of the palm is located outside of the sensing grid 3.

Turning now to FIG. 30c, at step s5-15 a column index pointer (i) is initialised to zero. In step s5-16, the measurement and processing unit 19 reads the values in the column pointed to by the column index pointer (i). In step s5-17, the measurement and processing unit 19 compares the magnitude of each value in the selected column against a threshold value, in order to identify areas of possible touch within the column where the magnitudes are greater than the threshold value. Each area is identified by a start point ($n_{start}$) and an end point ($n_{end}$). As in step s5-06, in step s5-18, the measurement and processing unit 19 iteratively analyses the selected areas of possible touch (identified in step s5-17) in order to combine, if necessary, nearby possible touch areas together to capture touches from large objects. As before, a control parameter $\Omega$ is calculated which is equal to the sum of the differential measurement values in the initially selected area (or currently selected area if this is a subsequent iteration) of touch divided by the sum of the modulus of those differential measurement values. For a correctly selected possible touch area, the calculated control parameter $\Omega$ should be close to zero. Large values of the control parameter $\Omega$, especially values close to +1 or −1, indicate that the initially selected possible touch area is incorrectly selected. In this case, the measurement and processing unit 19 finds the nearest touch area having a large control parameter value $\Omega$ with opposite polarity and merges the corresponding touch areas together (including all points between them) in order to minimise the value of the control parameter $\Omega$ for the new merged possible touch area. However, as explained above, there may be no other area of touch having a large control parameter value $\Omega$ with opposite polarity when the area of touch is at the edge of the digitiser corresponding to the start or end of the column of values being processed. Therefore, if no appropriate adjacent area of touch can be found, then it is assumed that there is a large object overlapping with the edge of the digitizer and so the data points between the currently selected possible area of touch and the start or end of the column (whichever is closest) are added to the area of possible touch in question (by adjusting the value of $n_{start}$ or $n_{end}$ accordingly).

After the areas of possible touch have been identified in step s5-18, the values within each area of touch are integrated from the start point to the end point and the integrated values are stored in corresponding positions of a new column of a new matrix (W) having one more row than matrix $U_{united}$.

As discussed above, the values in the matrix $U_{united}$ represent the difference in mutual coupling between an excitation conductor (i) and two adjacent detection conductors. Thus the value at the start of the area of possible touch can be represented by:

$$U_{i,nstart} = M_{i,nstart+1} - M_{i,nstart}$$

As $u_{i,nstart}$ is the first value in the area of possible touch that is greater than the threshold value, it follows that $i_{i,nstart-1}$ is zero. Therefore, it can be assumed that $M_{i,nstart}$ which forms part of $u_{i,nstart-1}$ must also be equal to zero and so the value of $u_{i,nstart}$ equals $M_{i,nstart+1}$, which is the mutual capacitive coupling between excitation conductor i and detection conductor nstart+1. Further, adding this value to the next value in the column gives:

$$w_{i,nstart+2} = u_{i,nstart+1} + u_{i,nstart}$$

$$\equiv (M_{i,nstart+2} - M_{i,nstart+1}) + M_{i,nstart+1}$$

Consequently, the values to be written in to the new matrix (W) can be found as follows:

$$w_{i,p+1} = u_{i,p} + w_{i,p} \text{ for } n_{start} \leq p \leq n_{end}; \text{ and where}$$
$$w_{i,nstart} = 0$$

The coefficient $K_0$ is not applicable for this calculation as adjacent data in the column represent measurements obtained in adjacent detection intervals and during the time between these intervals any transients will have settled to zero. The calculation of new values continues in this way until the end of the selected touch area is reached. At this point the calculated value of $w_{i,nend+1}$ should equal zero—because it should equal $M_{i,nend+1}$ and this value should be zero as it forms part of $u_{nend+1}$ which is zero. However, in practice, $w_{i,nend+1}$ calculated in this way will not equal zero due to the cumulative effect of noise in the measurements and due to the slow shift of the mid-rail level from its previous value. In order to compensate for the non-zero final value of $w_{i,nend+1}$ a gradient correction $\Delta = w_{nend+1}/(1+n_{end}-n_{start})$ is calculated and all data related to the possible touch area in question are corrected as follows:

$$w^{corr}_{i,p+1} = w_{i,p+1} - \Delta*(1+p-n_{start}) \text{ for } n_{start} \leq p \leq n_{end}$$

However, if the area of touch includes the start of the column, then a different integration is performed because only one zero boundary condition can be assumed—at $n_{end}$; and the integration must be performed from the end point $u_{i,nend}$ back to the start of the column as follows:

$$w_{i,p} = -u_{i,p} + w_{i,p+1} \text{ for } 0 \leq p \leq n_{end}; \text{ and where } w_{i,nend+1} = 0$$

Additionally, as there is only one zero boundary when the area of possible touch overlaps with the start or end of the column, it is not possible to perform the gradient correction using the information from the additional zero boundary. Therefore, the values of $w_{i,p}$ thus calculated are directly used as the corrected values $w^{corr}_{i,p}$.

Returning to FIG. 30c, after the possible areas of touch have been identified for the current column in step s5-18, a check is made in step s5-19 if there are any more areas of possible touch that have to be processed in the current column. If there are, then the processing proceeds to step s5-20 where the start point ($n_{start}$) and the end point ($n_{end}$) for the next area of possible touch are determined/retrieved. In step s5-21, the measurement and processing unit 19 determines if the data points at the start of the column are included in the current area of possible touch. If they are, then the integration is performed in step s 5-22 starting from the end point ($n_{erd}$) and working back to the start of the column; and the integrated values that are determined are stored in corresponding positions of a corresponding column of the new matrix ($W^{corr}$).

If the measurement and processing unit 19 determines, at step 5-21, that the area of possible touch does not include data points from the start of the column, then the processing proceeds to step s5-23 where the measurement and processing unit 19 determines if the data points at the end of the column are included in the current area of possible touch. If they are, then the integration is performed in step s 5-24 starting from the start point ($n_{start}$) and working to the end of the column. No gradient correction is performed in this case as there is no zero boundary condition at the end of the column; and therefore the integrated values that are determined are stored in corresponding positions of the corresponding column of the new matrix ($W^{corr}$).

If the measurement and processing unit 19 determines, at step 5-23, that the area of possible touch does not include data points from the end of the column, then the processing proceeds to step s5-25 where the measurement and processing unit 19 performs the integration starting from the start point ($n_{start}$) and working to the end point ($n_{end}$). The integrated values thus determined are then corrected using the above gradient correction and the corrected values are stored in corresponding positions of the corresponding column of the new matrix ($W^{corr}$).

The processing then returns to step s5-19 and the process is repeated for all other areas of possible touch in the current column, until there are no more areas of possible touch in the current column still to be processed. At this stage, the processing proceeds from step s5-19 to step s5-26, where all cells in the current column of $W^{corr}$ that do not contain a value and any cells of $W^{corr}$ for which the calculated value is less than the threshold value, are set to the value zero. The processing then proceeds to step s5-27 where the measurement and processing unit 19 increments the column index pointer (i) and then checks to see if the column index pointer has exceeded the limit—maxi (indicating that all columns of $U_{united}$ have been processed). If the limit has not been exceeded, then the processing returns to step s5-16 and the process is repeated for the next column of values read from $U_{united}$. Once all columns have been processed in this way the pre-processing ends and the result is a new matrix $W^{corr}$ in which data in different rows now corresponds to the effect of each individual detection conductor 7 and the data in different columns now corresponds to the effect of each individual excitation conductor 5. The processing then resumes from step s6 in FIG. 19 using the newly generated matrix $W^{corr}$.

As those skilled in the art will appreciate, the advantage of this pre-processing illustrated in FIG. 30 is that a more accurate determination of the position of the touched area can be determined from the change in mutual capacitance values contained in $W^{corr}$ than can be obtained from the raw double differential measurements. Additionally, by identifying the start and end points where there are possible areas of touch, changes in mutual capacitance values are only calculated for a very small proportion of measurement points (1 to 5% of all measurement points, depending on the number of touches) thus improving both the processing speed and the signal to noise ratio for the calculated answers.

Alternative Embodiments and Modifications

A detailed description has been given above of a digitiser 1 that can be implemented over a wide range of sizes and that can be used with or without an associated display screen. A number of modifications to the above described digitiser will now be described.

In the above embodiment of the integration algorithm, a dynamic selection of the zero boundary conditions was implemented at steps s5-05 and s5-06 prior to the integration process being implemented at steps s5-08 and s5-09 (see FIG. 30b). In an alternative embodiment the integration process can be started straight away and is seeded with a point relating to a non-differential excitation such as $u^m_{0,j} = v^m_{0,j}$. In the next step the calculated value $u^m_{0,j}$ is compared with the first threshold value. If the magnitude of $u^m_{0,j}$ is below the first threshold level, a zero value is assigned to this data point instead: $i^m_{0,j} = 0$. All subsequent points are calculated as follows: $u^m_{p,j} = v^m_{p,j} + K_0 * u^m_{p-1,j}$. For any result with a magnitude below the first threshold level the calculated value $u^m_{p,j}$ is again set to zero. Such an approach helps to avoid accumulation of measurement noise from areas outside of the touch area. The integration algorithm of this embodiment will keep all calculated values $u^m_{p,j}$ at zero until the actual touch area is met. This helps to maintain similar signal to noise ratio levels for calculated values $u^m_{p,j}$ in the touch area regardless of whether the first excitation conductor $X_0$ related to the value $u^m_{0,j}$ corresponds to the actual area of touch (no noise from the previous integration steps is accumulated anyway) or whether the first excitation conductor related to the area of touch is located at the end of the excitation grid 3. Once the integration process has passed the touch area the calculated values $u^m_{p,j}$ might not return to the values having a magnitude below the first threshold. This might happen due to the combined effect of noise, error in the used value of $K_0$, the drift of the midpoint level etc. To avoid such ambiguity the magnitude of the calculated values $u^m_{p,j}$ may also be compared with a second (larger) threshold. After $u^m_{p,j}$ first exceeds this second threshold, the integration process decides that the integration has crossed the first boundary of the touch area and is progressing inside the actual area of touch. Thus, the integration process starts monitoring the condition corresponding to reaching the second boundary of the touch area. To do this the integration process further compares the magnitude of each calculated value $u^m_{p,j}$ with the second (larger) threshold and the value of $v^m_{p,j}$ with the first (smaller) threshold. If the magnitudes of both $u^m_{p,j}$ and $v^m_{p,j}$ fall below the corresponding thresholds, the measurement and processing unit 19 makes a determination that the second zero boundary of the touch area has been crossed and assigns $n_{end}$ to equal the current value of p. In the next step the algorithm determines the start position of the area of touch $n_{start}$ in order to apply the gradient correction to the already calculated data inside the just determined touch area in the manner similar to that used in step s5-09 in the first embodiment:

$$\Delta = u^m_{p,ij}/(1+p-n_{start})$$

$$u^{corr,m}_{k,j} = u^m_{k,j} - \Delta*(1+k-n_{start}) \text{ for } n_{start} \leq k \leq p$$

The corrected value $u^{corr,m}_{p,j}$ is equal to zero and is used to continue the integration process until the end of the row is reached. The algorithm further takes into account that the last data point $u^m_{maxi,j} = v^m_{maxi,j} + K_0*u^m_{maxi-1,j}$ must be equal to zero as it is related to the effect of the missing conductor $X_{max}$. Thus this last point with index p=maxi is treated as the end of the touch area and the gradient correction is applied to the data even if the calculated value $u^m_{maxi,j}$ is above the second threshold.

As those skilled in the art will appreciate, such an alternative approach for the integration process is very similar to the first embodiment of the integration algorithm but is relying on the existence of the seed data point corresponding to the non-differential excitation.

In the first embodiment, it was assumed that it will be always possible to define zero boundary conditions for the integration of the data. This is true for large diagonal size systems; however this might be not true for smaller size diagonal systems like those designed for 4" to 10" diagonal sized grids. In particular, under certain circumstances in such small size diagonal systems all cross-over nodes between the excitation and detection conductors might become perturbed simultaneously by multiple fingers and the palm of the user's hand. As a result there might be difficulty in defining a zero boundary condition for the integration of the raw double differential data. Whilst the integration performed in step s5-09 will be stable as it has two well-defined zero boundary points at the start and the end of the row regardless of the nature of the touch (since only one excitation conductor is excited in these excitation intervals). In a contrast, the integration along the columns performed in steps s5-22, s5-24 or s5-25 might fail as all the inputs of the detection switching blocks 80 are connected to detection conductors 7. To overcome this problem, it will be beneficial for small digitisers to connect the input(s) of the detection switching block(s) 80 that would have been connected to detection conductor $Y_0$ or/and detection conductor $Y_{max}$ to the mid-rail instead of to the actual detection conductor 7. Such a change in the wiring of the detection circuitry will allow to provide well defined zero boundary conditions for the integration of the data similar to the one used in the step s5-09 or to the alternative embodiment with seed integration point described in the previous paragraph.

In an alternative embodiment, a "missing" excitation conductor can be introduced in each excitation switching block 50. Additionally, one (or more) conductor in each detection switching block 80 can be connected to the mid-rail instead of to the grid 3 (further, in such an embodiment there is no need to share detection conductors between adjacent switching blocks). Such "missing" conductors not connected to the sensor grid 3 will split the measurement matrix of the grid 3 into multiple blocks with well defined zero boundary conditions for integration. Effectively in such an embodiment a significant number of excitations will be carried out non-differentially and a substantial number of measurements will be taken non-differentially. As will be apparent from the previous discussion, the data corresponding to such non-differential measurements will make the integration task more straightforward. The number of conductors inside the integration area of each multiple block is reduced and therefore a better signal to noise ratio can be achieved. However a significant number of non-differential excitations used during the excitation cycle can cause a significant increase in the amount of electromagnetic radiation from the grid 3 of the digitiser. Similarly, a large number of non-differential measurements carried out by each detection switching block 80 will increase the efficiency of coupling of external noise into the measurement circuitry thus reducing the achievable signal to noise ratio. While such increase in the EMI is insignificant for small diagonal size systems with 30 cm diagonal or less, it becomes a major issue for larger digitisers having, for example, a 2 meter diagonal size.

In the above embodiment, a polarity control signal was applied to (multiplied with) the signal obtained from each selected detection conductor. This polarity control signal was applied by the demodulating switch 99. In an alternative embodiment, the polarity control signal may be applied to the excitation signal before it is applied to each excitation conductor 5. FIG. 31a illustrates one way in which this may be achieved. As shown in FIG. 31a, the positive excitation signal (ex+) is formed by taking the exclusive-or (XOR) of the polarity control signal and the ex_clock signal. Similarly, the negative excitation signal (ex−) is obtained by taking the exclusive-or of the inverted polarity signal and ex_clock.

Figure 31B:
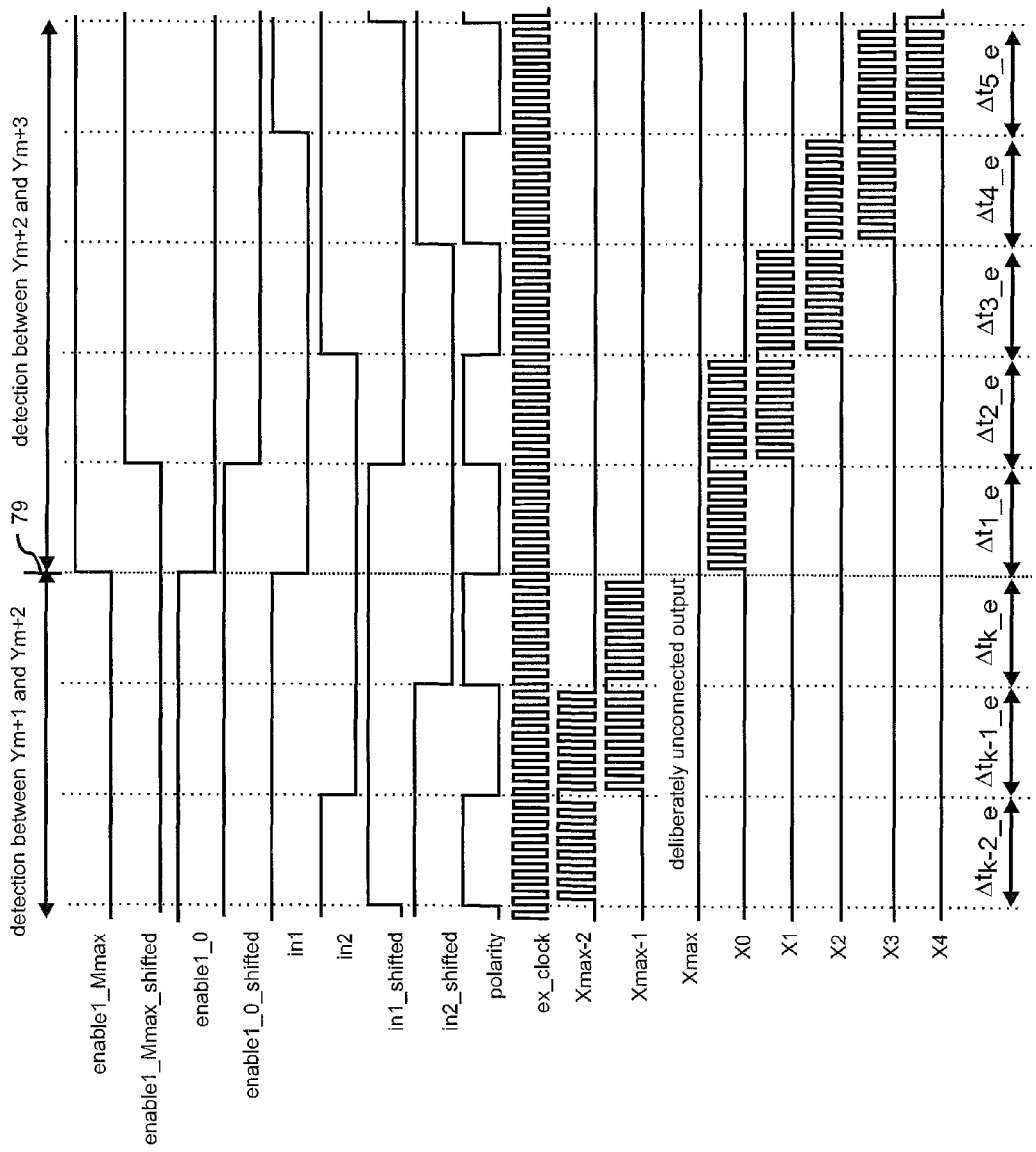
FIG. 31b is a timing diagram illustrating the control signals used to control the application of the polarity modulated excitation signals to the adjacent excitation conductors.

FIG. 31b illustrates the form of the excitation signals applied to the selected excitation conductors. Like in the first embodiment described above, the excitation signal is applied to each excitation conductor in turn and in an overlapping manner. Also, like in the first embodiment described above, the excitation signal applied to each excitation conductor is applied for two consecutive excitation intervals ($\Delta t_{i\_e}$ and $\Delta t_{i+1\_e}$). Further, the polarity of the excitation signal applied to each excitation conductor is inverted between the two excitation intervals. This inversion of the excitation signal is caused by the use of the polarity control signal in the excitation circuitry.

Figure 32:
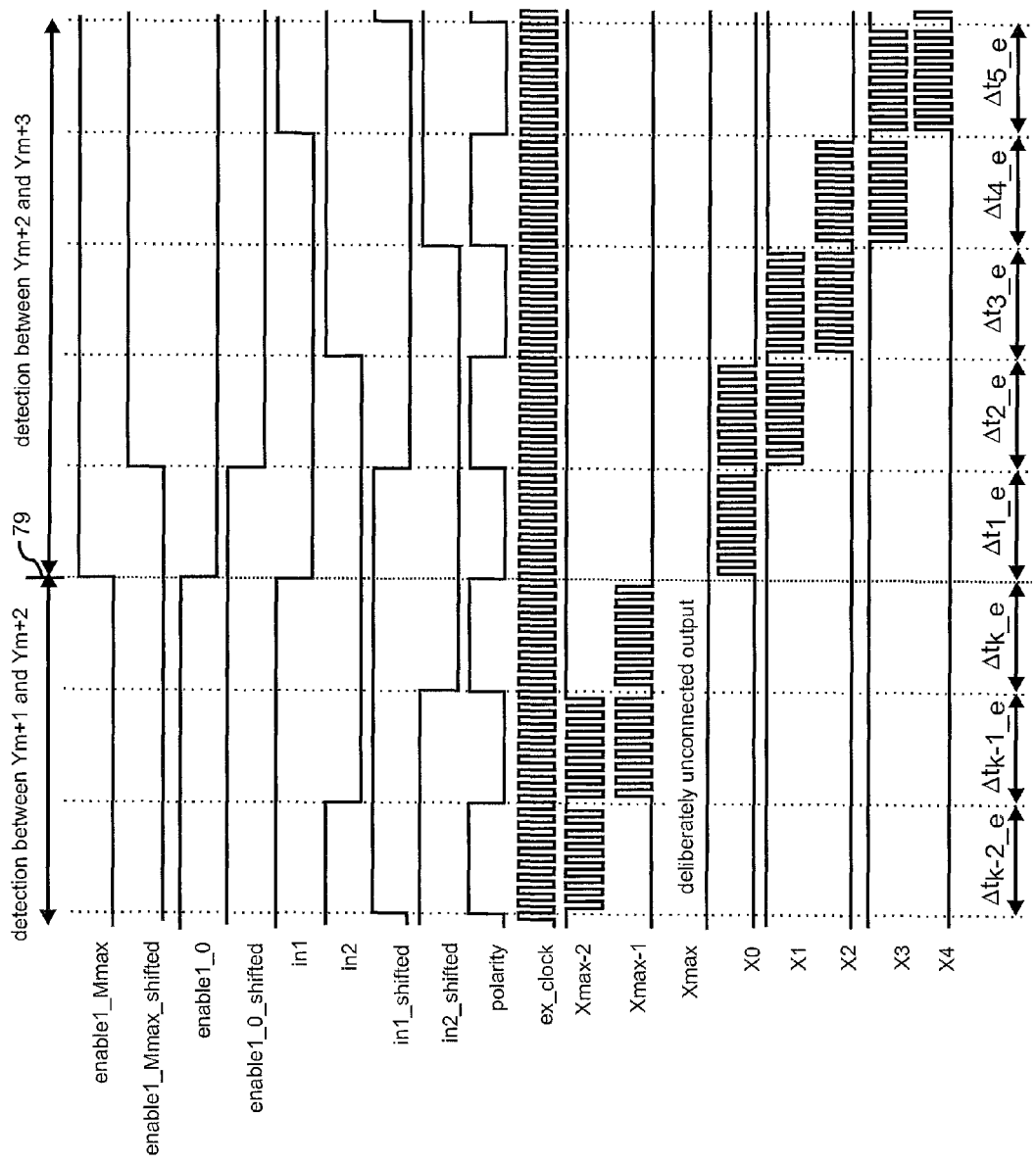
FIG. 32 is a timing diagram illustrating alternative control signals used to control the application of the polarity modulated excitation signals to the adjacent excitation conductors when alternate excitation conductors are held at Vcc using the circuitry of FIG. 25.

FIG. 31b illustrates the case where there are 16 excitation periods per period of the polarity control signal. However, due to the polarity control signal being applied on the excitation side, one excitation pulse is lost and so only 15 pulses are applied to each excitation conductor. Therefore, in this sense, applying the polarity control signal on the excitation side is less efficient than applying it on the detection side. FIG. 32 illustrates the case where there are 17 periods per polarity period, but due to the polarity signal, one excitation pulse is lost and so only 16 pulses are actually applied. As shown in FIG. 31b, as there is an odd number of transitions in the excitation signal applied during each excitation interval, there is no need in holding any of the excitation conductors to Vcc when they are not being energised. On the other hand, in FIG. 32 there is an even number of transitions in the excitation signal applied during each excitation interval and therefore, in order to optimise opposing pulses applied to adjacent excitation conductors, each of the odd numbered excitation conductors is held at Vcc when not being energised.

Figure 33:
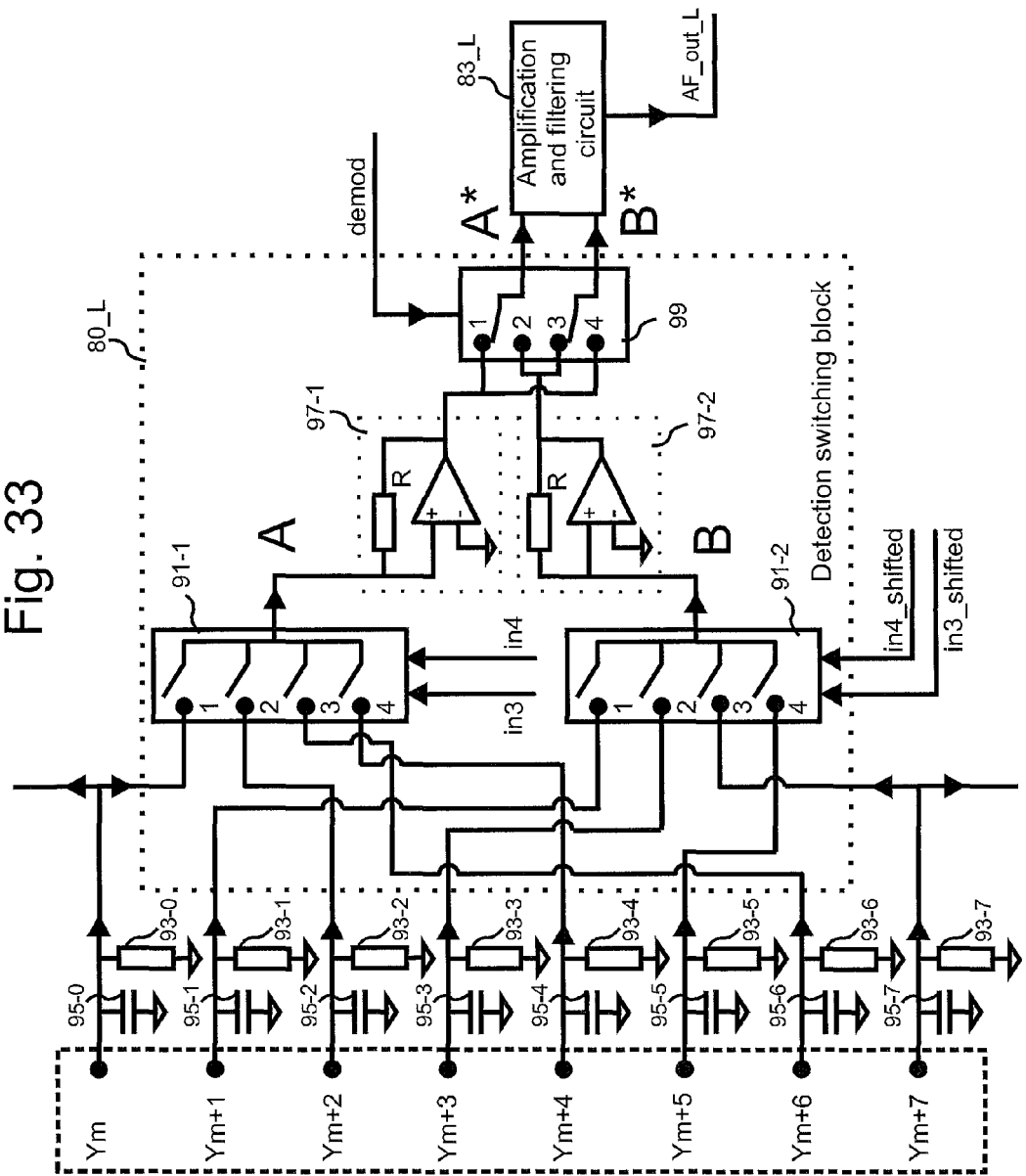
FIG. 33 illustrates the form of alternate switching circuitry used to switch and demodulate the signals from pairs of detection conductors for the embodiment where the excitation signals are polarity modulated.
Figure 34:
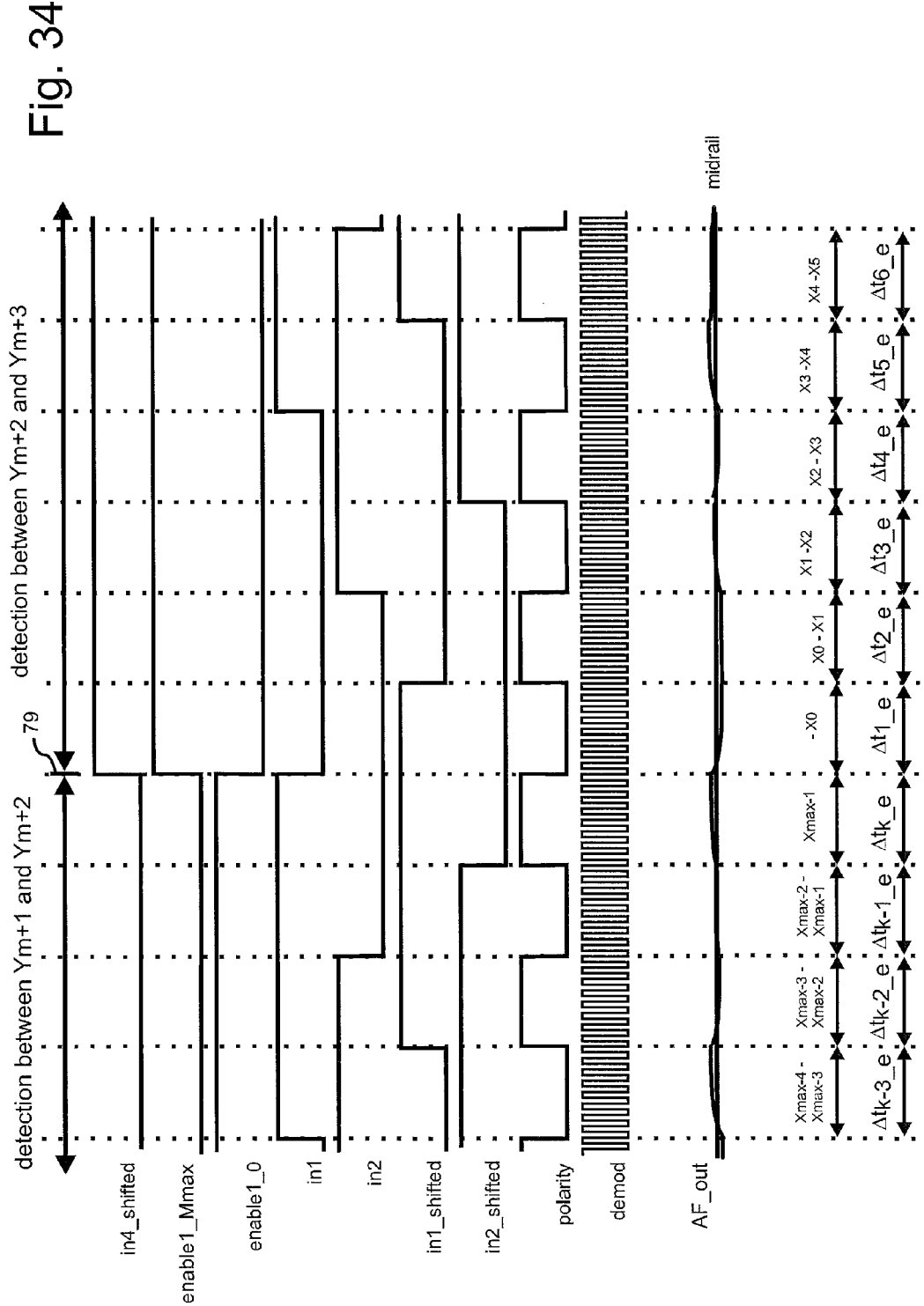
FIG. 34 illustrates the form of various control signals and the form of an output signal from the amplification and filtering circuit at the end of one detection interval and at the start of the next detection interval.
Figure 35:
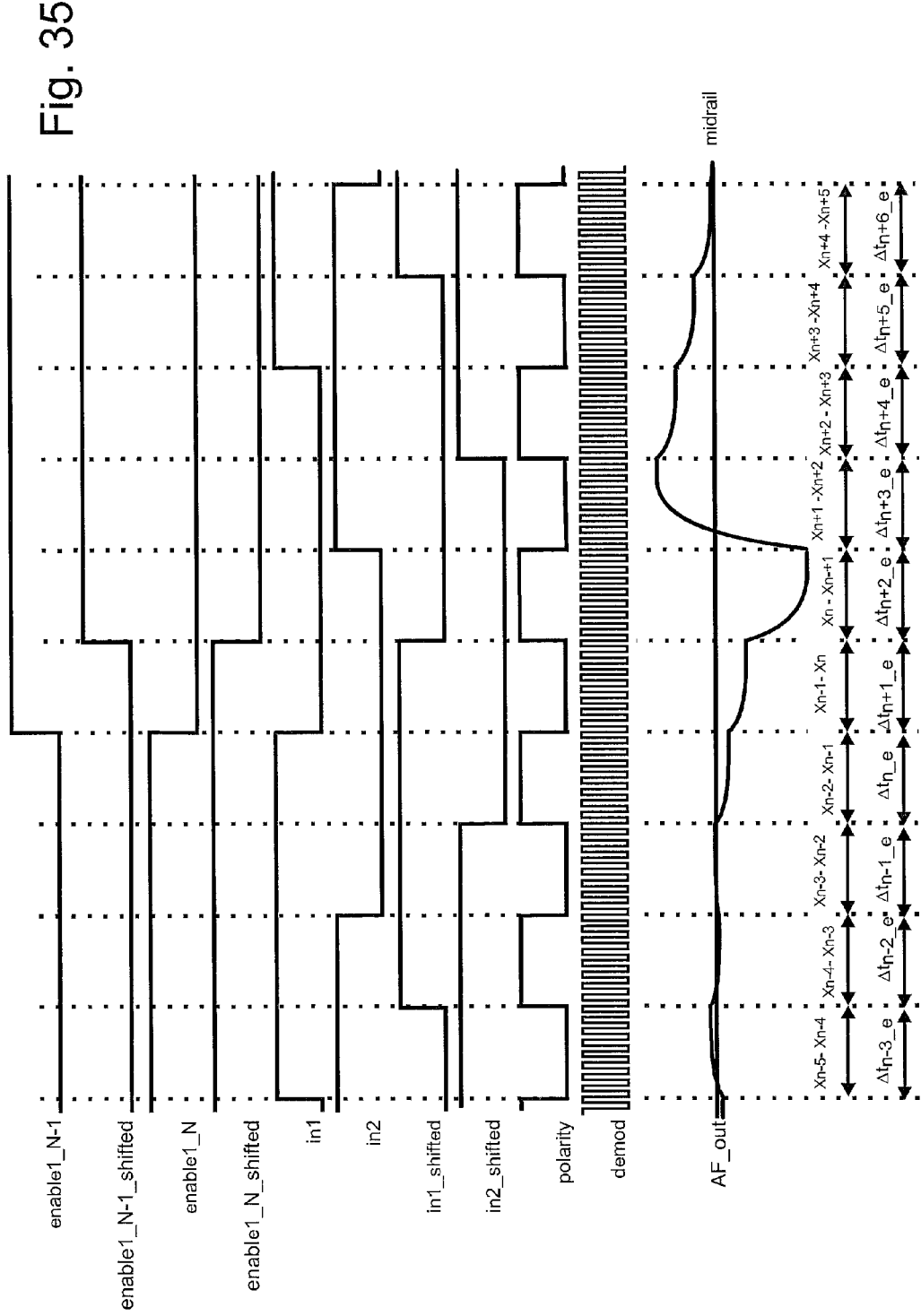
FIG. 35 illustrates the form of various control signals and the form of an output signal from the amplification and filtering circuit when a user's finger is provided over the grid of conductors.

FIG. 33 illustrates the detection switching block 80 used in this alternative embodiment. As shown in FIG. 33, there is no polarity control signal that is combined with the ex_clock_shifted signal. Instead, as shown in FIG. 34, the demod signal corresponds to the ex_clock_shifted signal of the first embodiment. As can be seen from FIGS. 34 and 35, the output from the amplification and filtering circuit 83 is the same as in the first embodiment for a case where there is a user's finger and where there is no finger present adjacent the conductors being interrogated. Therefore, the polarity control signal can be applied either on the detection side or on the excitation side of the circuitry, without materially affecting the operation of the embodiment.

Figure 36:
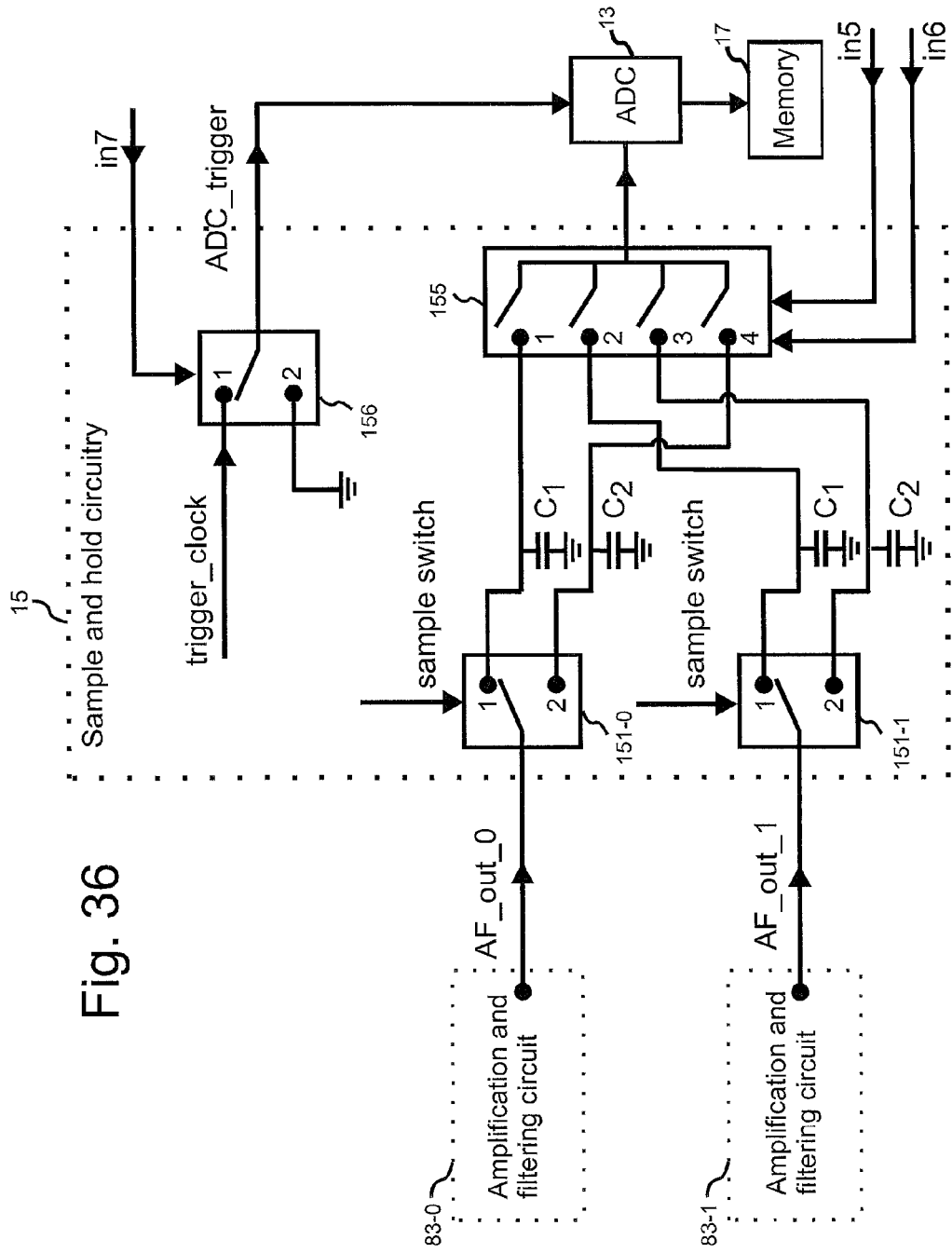
FIG. 36 is a block diagram illustrating alternative sample and hold circuitry for processing signals obtained from two amplification and filtering circuits.

In the above embodiment, the outputs from four amplification and filtering circuits were passed through a sample and hold circuit 15. As shown in FIG. 18, the ADC_trigger signal causes the ADC to sample the output from the sample and hold circuitry 15 at regularly spaced intervals during the excitation intervals. FIGS. 36 and 37 illustrate an alternative embodiment where there are fewer amplification and filtering circuits and where the ADC_trigger signal causes the ADC 13 to convert the output from the sample hold circuitry 15 at the beginning of each excitation interval. As shown in FIG. 36, in this alternative embodiment, the C1 and C2 capacitors are connected to different inputs of a 4-input 1-output multiplexor 155. As shown in FIG. 36, the ADC_trigger signal is generated by the trigger_clock signal that is selectively switched via the switch 156; and the position of the switch 156 is controlled by the in7 control signal.

In the first embodiment the last excitation switching block 50-$M_{max}$ had one output that was not connected to an excitation conductor. As explained above, this reduces the width of the pass band required for the amplification and filtering circuit 83. The reason for this will now be explained with reference to FIGS. 38 to 40. In particular, FIG. 38 illustrates an alternative embodiment where the missing excitation conductor $X_{max}$ is included and connected to the last excitation switching block 50-Mmax. As shown in FIG. 38, in this embodiment, the polarity control signal is applied on the excitation side of the digitiser electronics rather than on the detection side as per the first embodiment. However, as explained above, where the polarity control signal is applied does not affect the operation of the embodiment.

Figure 40A:
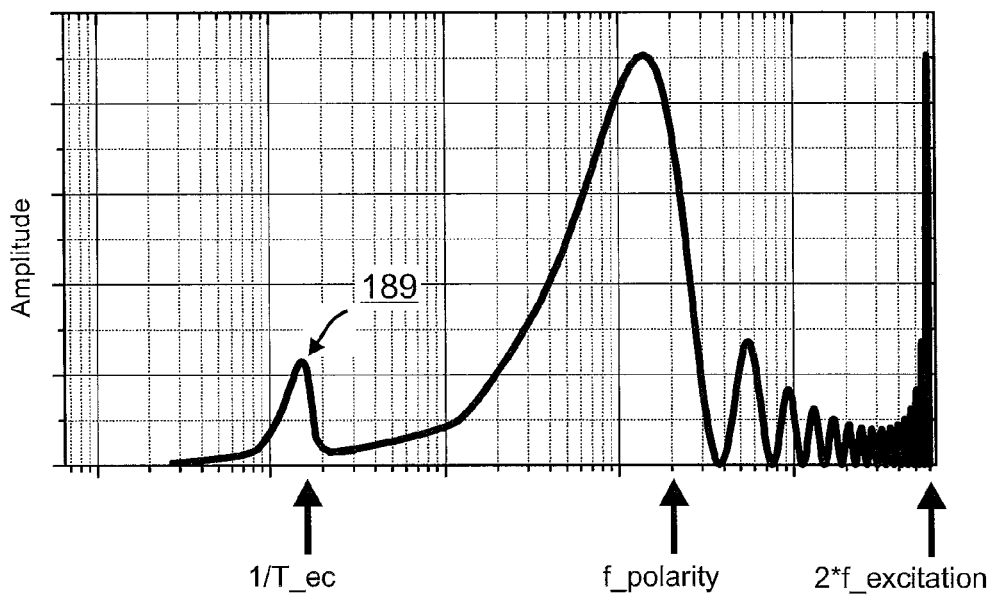
FIG. 40a is a spectrum plot illustrating a spectrum of a signal obtained from the demodulator in this embodiment, showing an extra frequency component at the frequency corresponding to the excitation cycle.
Figure 40B:
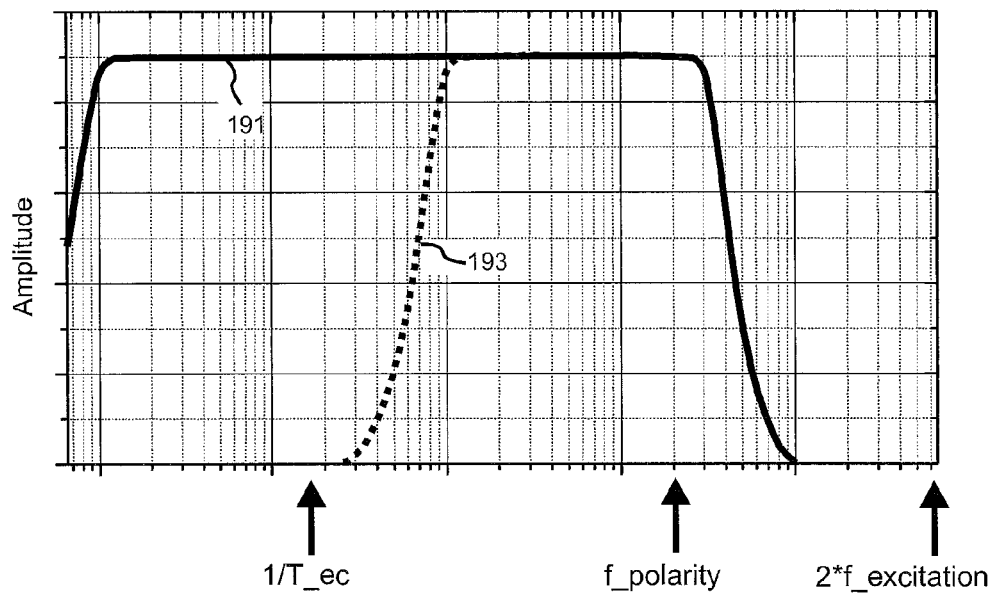
FIG. 40b illustrates a bandwidth of the amplification and filtering circuit required to filter the signal shown in FIG. 40a in order to recover the desired signal whilst filtering out high frequency components of the demodulation signal and illustrating the increased bandwidth of the circuitry over the corresponding bandwidth of the circuitry used in the first embodiment.

As can be seen from FIG. 39, during the last and first excitation intervals ($\Delta t_k\_e$ and $\Delta t_1\_e$) of an excitation cycle, the excitation signal is applied to the conductor $X_{max}$ (whereas in the first embodiment there was no $X_{max}$ conductor to be energised). Therefore, whilst this embodiment offers the advantage that during each excitation interval ($\Delta t_i\_e$) there are two conductors that are energised with excitation signals of opposite polarity, during the first excitation interval ($\Delta t_1\_e$) of each excitation cycle conductors at opposite ends of the digitiser (conductors $X_0$ and $X_{max}$) are energised. As these conductors are not adjacent each other, the signals will not combine to reduce the electromagnetic emissions of the digitiser during this interval. Further, since the positive and negative polarity of the excitation signal applied to excitation conductor $X_{max}$ (for the same configuration of detection conductors) are applied at the start and at the end of the excitation cycle, an additional frequency component is introduced to the signal output from the detection switching blocks 80 that corresponds to the frequency of the excitation cycle. This additional component 189 is illustrated in FIG. 40a at a frequency corresponding to the frequency of the excitation cycle (1/T_ec). As a result of this additional frequency component 189, the amplification and filtering circuits 83 have to be designed with a wider pass band. FIG. 40b illustrates, with the solid line 191, the pass band that will allow this additional frequency component 189 to pass through the amplification and filtering circuits 83. FIG. 40b also illustrates, by the dashed line 193, the bandwidth of the amplification and filtering circuits 83 used in the first embodiment. As can be seen from FIG. 40b, the additional excitation conductor connected in the manner shown in FIG. 38 results in a significant increase in the bandwidth of the amplification and filtering circuits 83, which in turn increases the amount of noise that will pass through the amplification and filtering circuits and into the measurements that are obtained.

Considering this from a different perspective, the signal caused by the excitation conductor $X_{max}$ at the beginning of the excitation cycle will perturb the instantaneous value of the midpoint for subsequent signals which will be output from the amplification and filtering circuits 83. For example, when the low corner frequency of the filter 83 is at about 1:100 of the frequency of the polarity modulation signal, the perturbation of the midpoint level will be about 4% of the amplitude of the signal related to the excitation conductor $X_{max}$. In large scale digitiser systems having a polarity modulation frequency of the order of several hundred kHz, the transient perturbation can be reduced down to 0.2% if the low corner frequency of the filter is reduced to about 1:2,000 of the frequency of the polarity modulation signal bringing it close to several hundred Hz. The small level of transient perturbation in such case is close to the noise level and can be neglected in the data processing steps of the measurement processing unit 19.

The transient perturbation of the midpoint level caused by the signal from conductor $X_{max}$ will relax over time with a time constant determined by the low corner frequency of the filter circuit 83 and will decay almost to zero by the time it can be compensated by the opposite polarity signal related to the excitation conductor $X_{max}$ at the end of the given excitation cycle. Whilst there will be a similar perturbation as a result of energising the other excitation conductors, those conductors will be energised with opposite polarity signals in the next excitation interval and so the perturbations will substantially cancel each other out. This is not necessarily the case in respect of energising conductor $X_{max}$, as (in respect of the same detection conductors) it is energised at the start of the excitation cycle and at the end of the excitation cycle. When $X_{max}$ is energised at the end of one excitation cycle a transient is generated in respect of detection conductors $Y_{j-1}$ and $Y_j$. At the start of the next excitation cycle, $X_{max}$ is energised again and a new transient is generated in respect of detection conductors $Y_j$ and $Y_{j+1}$. Normally these perturbations will have opposite sign and so they will cancel each other to some degree, although not to the same degree as with the perturbations caused by other excitation conductors as the two perturbations are in respect of different detection conductors. Additionally, if the user's finger is located at conductor $Y_j$, then the two transients will actually add together rather than subtract from each other.

A further explanation of these perturbations will now be given with reference to FIGS. 40c and 40d. In particular, FIG. 40c is a plot that illustrates the way in which a voltage generated in the amplification and filtering circuit 83 rises to a peak value of $u_{i,j}$ (corresponding to the differential mutual capacitive coupling $M_{i,j+1}-M_{i,j}$) and then, once the next excitation conductor is selected, the voltage drops (not to the mid-rail level) but to a level of $-(K_0-1)u_{i,j}$. This forms the basis of the above described transient perturbation that will decay almost to zero during the time interval corresponding to the single excitation cycle.

There is a transient perturbation caused by the excitation of conductor $X_{max}$ at the end of the previous excitation cycle that carries forward into the current excitation cycle and this may partially (but not fully) cancel the perturbation caused by energising conductor $X_{max}$ at the start of the current excitation cycle. FIG. 40d illustrates the perturbation $-(K_0-1)u_{maxi,j-1}$ from the preceding excitation cycle that is present at the beginning of the current excitation cycle—when excitation conductor $X_{max}$ is energised again. In this illustration, energising $X_{max}$ results in a new transient perturbation $(K_0-1)u_{mai,j}$ that is opposite in sign to the perturbation from the preceding excitation cycle. Therefore, in the next excitation interval (when i=1), the net perturbation is $[(K_0-1)u_{maxi,j}-(K_0-1)u_{maxi,j-1}]$ multiplied by an exponential term (as the perturbations decay over time). By the time that excitation conductor $X_{max}$ is energised again at the end of the current detection cycle, these perturbations will have decayed to substantially zero and a new perturbation $-(K_0-1)u_{maxi,j}$ will be generated that will feed into the next excitation cycle.

Figure 40E:
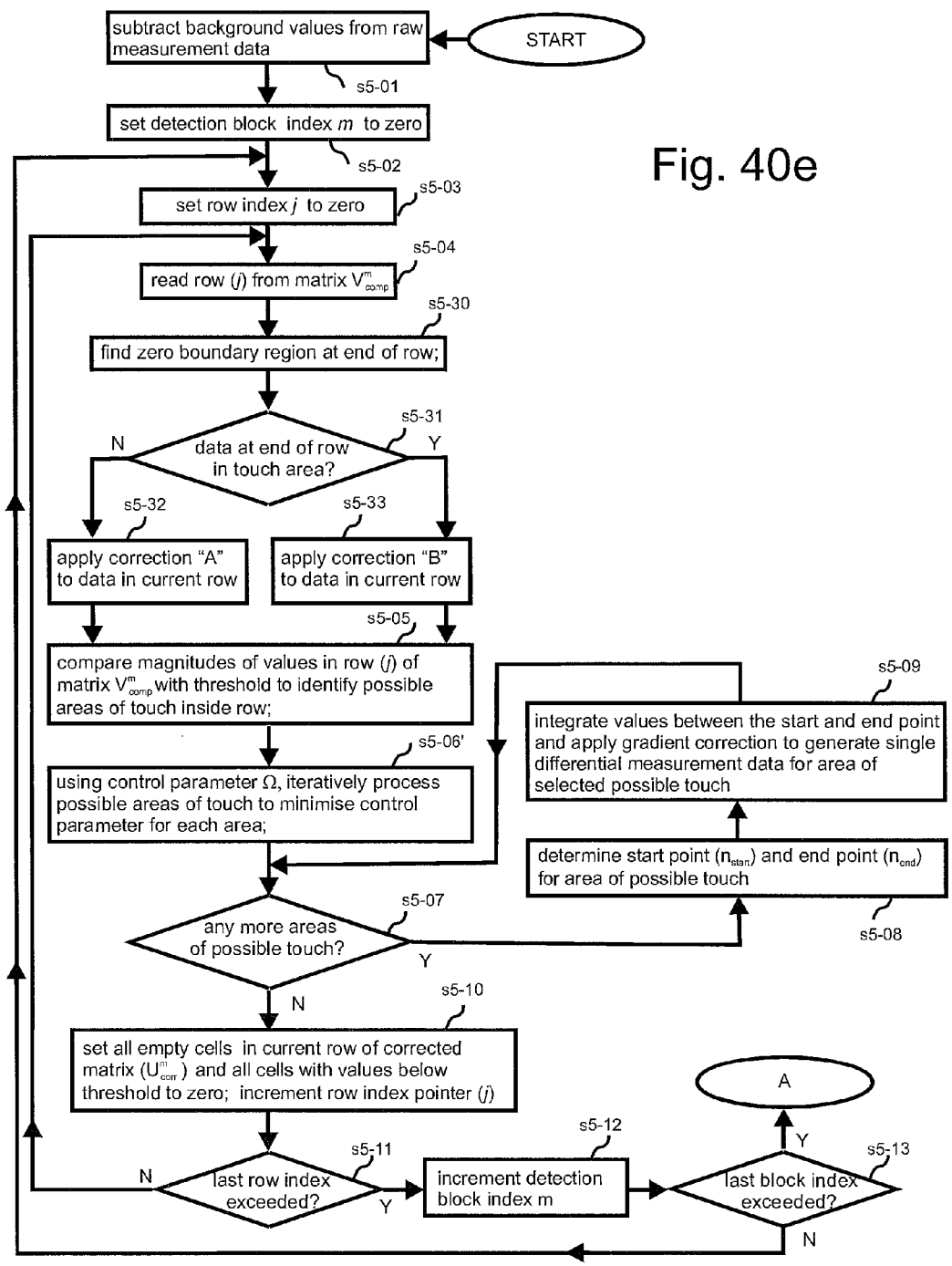
FIG. 40e is a flow chart of new step s5 illustrating additional steps of a software routine used by the measurement and processing unit for removing the effect of perturbation to the midpoint level caused by the extra excitation conductor.

As will be explained below, this perturbation to the midpoint level caused by the excitation signal being applied to the conductor $X_{max}$ can be taken into account and partially removed by the measurement and processing unit 19 by modifying the more complex pre-processing performed in step s5 described above with reference to FIG. 30b—and this modified process is illustrated in FIG. 40e. The same reference numerals as those used in FIG. 30b are used in FIG. 40e to refer to steps that have not changed. As those skilled in the art will appreciate, it is impractical to isolate the full effect of the unperturbed signal related to the conductor $X_{max}$ from the raw signal measurements because all excitations are carried out in a different manner. However it is possible to isolate the effect of the perturbation to the midpoint level when this perturbation is caused by the touch of a finger or a stylus at a position close to the conductor $X_{max}$.

The effect caused by the unperturbed mutual capacitance (i.e. when there is no object near conductor $X_{max}$) between the conductor $X_{max}$ and corresponding detection conductors is a stable (reproducible from measurement cycle to measurement cycle) unwanted signal. It will cause a static shift of the midpoint level in the consecutive measurement points which will have the same value each measurement cycle. Such a static effect is fully removed by subtracting the background values in step s5-01. On the other hand, the dynamic effect of the variation to the signal from the conductor $X_{max}$ caused by the presence of a target like a finger(s) or a stylus can be calculated approximately using an integration algorithm with zero boundary conditions. In the present embodiment each row of the background compensated matrices ($V^m_{comp}$) will start from the differential excitation between the conductors $X_{max}$ and $X_0$ and will finish with the differential excitation between the conductors $X_{max-1}$ and $X_{max}$. As excitation conductor $X_{max}$ is energised at both the beginning and the end of the excitation cycle, the value of the signal related to the excitation of conductor $X_{max}$ can be calculated by identifying areas with small perturbation adjacent to the end of the current row being processed.

Therefore, in this embodiment, after the current row (j) of data has been read from the background compensated matrix ($V^m_{comp}$) in step s5-04, the measurement and processing unit 19 processes the data in step s5-30 to find the zero boundary region (area of possible touch) at the end of the row. It does this in a similar manner to the way in which the measurement and processing unit 19 identifies the areas of possible touch in steps s5-05 and s5-06, except in this step the processing focusses on the data at the end of the row and possible touch areas at the start and end of the row can be combined into one possible area of touch. In step s5-31 the measurement and processing unit 19 checks to see if the data at the end of the row is in an area of possible touch. If it is not, then it can be assumed that $(K_0-1)u_{maxi,j}$ equals zero. However, the perturbation caused by exciting $X_{max}$ at the end of the previous excitation cycle $(-(K_0-1)u_{maxi,j-1})$ may not be zero (as it relates to different detection conductors) and this value is used to perform a correction (correction A) on the data in the current row in step s5-32. However, if in step s5-31 the measurement and processing unit 19 determines that the data at the end of the row is in an area of possible touch, then a different correction (correction B) is performed at step s5-33 using the perturbation caused by exciting $X_{max}$ at the end of the previous excitation cycle $(-(K_0-1)u_{maxi,j-1})$ and the perturbation caused by exciting $X_{max}$ at the start of the current excitation cycle $((K_0-1)u_{maxi,j})$. Details of the corrections applied in steps s5-32 and s5-33 will now be given.

Correction A

In the case of the correction performed in step s5-32, as discussed above, it is assumed that $u_{maxi,j}$ is equal to zero and so each data value in the current row is only modified based on the perturbation caused by exciting $X_{max}$ at the end of the previous excitation cycle, as follows:

$$v^{corr,m}_{i,j}=v^m_{i,j}+(K_0-1)[u^m_{maxi,j-1}]\exp(i/\lambda) \text{ for } j>0 \text{ and for } 0 \leq i \leq \text{maxi}$$

Where $\lambda$ is the time constant of decay (which depends on the frequency of the polarity modulation signal and the low-corner frequency of the amplification and filtering circuitry 83); and $u^m_{maxi,j-1}$ is the last value in the previous row of the new matrix $U^m_{corr}$ that was calculated in step s5-08 or s5-09 during the processing of the previous row. In the case of j=0, the previous excitation interval is the last excitation interval in the previous measurement cycle and corresponds to the time when j was at its maximum value, jmax (which is determined by the number of different detection conductor pairs that are connected through each detection switching block 80). Therefore, when j=0, the following correction is performed:

$$v^{corr,m}_{i,0}=v^m_{i,0}+(K_0-1)[u^m_{maxi,jmax}]\exp(i/\lambda) \text{ for } j=0 \text{ and for } 0 \leq i \leq \text{maxi}$$

Correction B

If it is determined at step s5-31 that the data at the end of the current row is in an area of possible touch, then the perturbation caused by energising $X_{max}$ at the beginning of the current row must also be taken into account. Therefore, in this case in step s5-33, the measurement and processing unit 19 integrates the values from the start point of the area of possible touch ($n_{start}$) to the end of the row as follows:

$$u^m_{p,j}=v^m_{p,j}+K_0 * u^m_{p-1,j} \text{ for } n_{start} \leq p \leq \text{maxi}$$
$$\text{where } u^m_{nstart-1}=0.$$

This will provide a value for $u^m_{maxi,j}$ that will allow the following correction to be applied to the data values in the current row:

For j>0:

$$v^{corr,m}_{i,j} = v^m_{i,j} - (K_0-1)[u^m_{maxi,j} - u^m_{maxi,j-1}]\exp(i/\lambda) \text{ for } 0<i\le maxi$$

$$v^{corr,m}_{0,j} = v^m_{0,j} + (K_0-1)[u^m_{maxi,j-1}] \text{ for } i=0$$

For j=0:

$$v^{corr,m}_{i,0} = v^m_{i,0} - (K_0-1)[u^m_{maxi,0} - u^m_{maxi,jmax}]\exp(i/\lambda) \text{ for } 0<i\le maxi$$

$$v^{corr,m}_{0,0} = v^m_{0,0} + (K_0-1)[u^m_{maxi,jmax}] \text{ for } i=0$$

After these corrections have been made to the data in the current row, the processing continues to step s5-05 as before, where the measurement and processing unit 19 processes the now corrected data to identify areas of possible touch, as before these areas are potentially combined in step s5-06' in order to minimise the control parameter Ω for each area of possible touch. The processing performed in step s5-06' is arranged to consider joining together possible touched areas located at the beginning and the end of the row. In all other aspects step s5-06' is identical to step s5-06 of FIG. 30b. The subsequent processing is then the same as that described above in FIG. 30b except that a slightly different integration is performed for the area of possible touch that extends from the end of the row to the beginning of the row (if such an area is identified). In particular in this case, the values at the end of the row are integrated as follows:

$$u^m_{p,j} = v^{corr,m}_{p,j} + K_0 * u^m_{p-1,j} \text{ for } n_{start} \le p \le maxi;$$
$$\text{and } u^m_{nstart-1,j} = 0$$

This gives an updated value of $u^m_{maxi,j}$ that is used to seed the integration at the start of the row:

$$u^m_{0,j} = v^{corr,m}_{0,j} + u^m_{maxi,j}$$

And the integration then proceeds to the end point $n_{end}$ as follows:

$$u^m_{p,j} = v^{corr,m}_{p,j} + K_0 * u^m_{p-1,j} \text{ for } 0 < p \le n_{end};$$

The values thus determined can also be corrected using a gradient correction similar to that discussed above. In particular, the following gradient correction can be applied:

$$\Delta = u^m_{nend,j} / (2 + maxi - n_{start} + n_{end})$$

$$u^{corr,m}_{p,j} = u^m_{p,j} - \Delta * (1 + p - n_{start}) \text{ for } p \ge n_{start}$$

$$u^{corr,m}_{p,j} = u^m_{p,j} - \Delta * (2 + p + maxi - n_{start}) \text{ for } 0 \le p \le n_{end}$$

The processing then continues as before and a further description will not be given again. In this way the dynamic effect related to the touch detection at conductor $X_{max}$ can be accounted for and removed from the signals measured for all other excitation conductors during the same excitation cycle.

Figure 42:
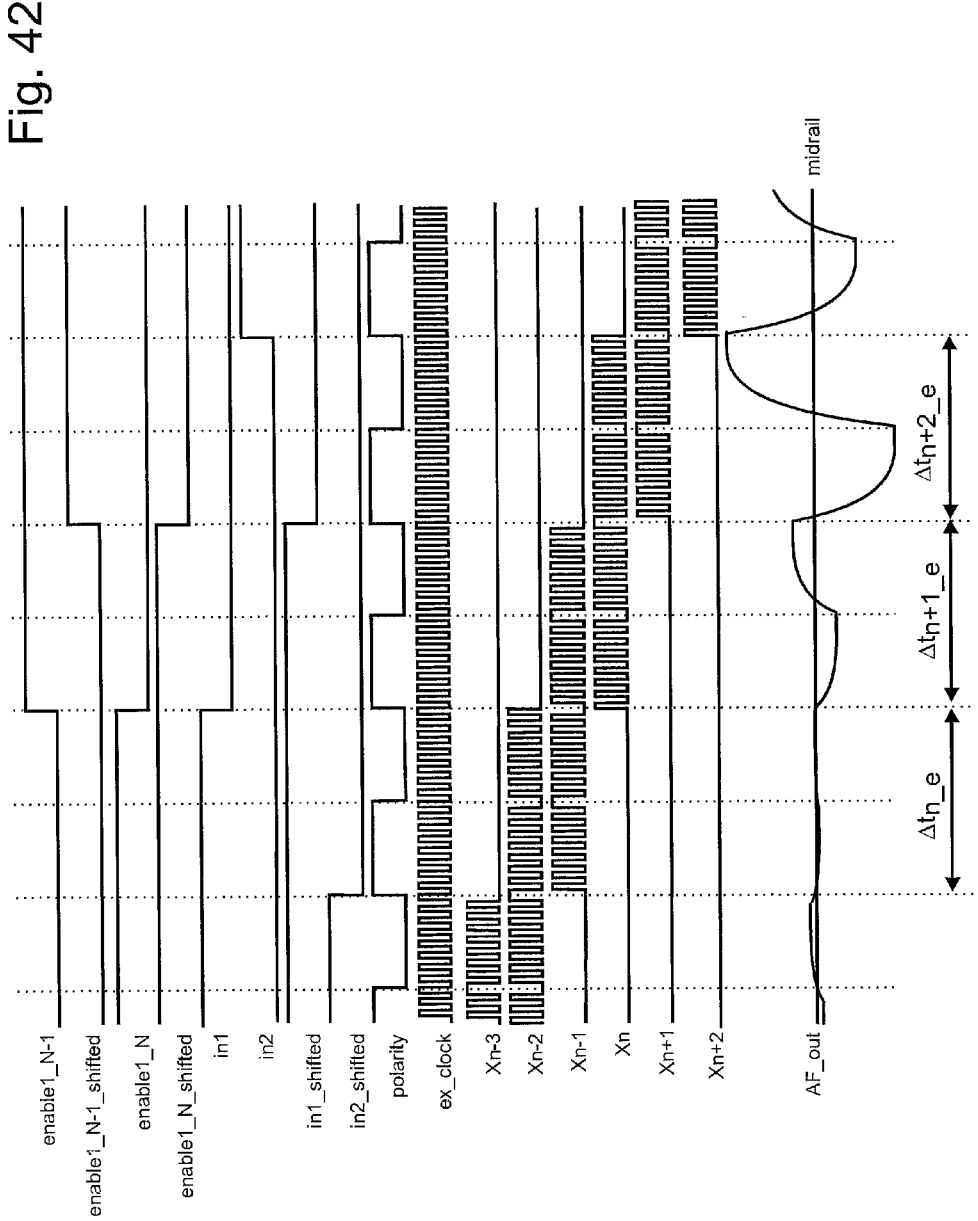
FIG. 42 illustrates the same control and excitation signal shown in FIG. 41, but showing the output from the amplification and filtering circuit in the presence of a finger over the grid.

Another way that can be used to avoid the perturbation to the midpoint level caused by energising $X_{max}$ is to keep the excitation and polarity control signals at the same frequency but to half the frequency of the other control signals used for the excitation circuitry (such as the enable control signals and the multiplexor select control signals). As a result, each excitation conductor will receive twice the number of excitation pulses and during each excitation interval ($\Delta t_i\_e$) each excitation conductor that is energised will be energised with both positive and negative versions of the excitation signal. FIG. 41 is a timing diagram illustrating the operation of such an embodiment. As shown in FIG. 41, the enable control signals and the multiplexor select signals (in1, in2, in1_shifted and in2_shifted) have half the frequency than those used in the first embodiment. Therefore, during the first excitation interval ($\Delta t_1\_e$) and during the last excitation interval ($\Delta t_k\_e$) for the same configuration of detection conductors, the signal applied to conductor $X_{max}$ has both positive and negative versions of the excitation clock signal. As a result, the frequency spectrum of the signals obtained in this embodiment correspond with those shown in FIG. 14a and therefore, amplification and filtering circuits 83 having narrower pass bands can be used. However, as those skilled in the art will appreciate, with this modification, the update rate of the system is reduced by two without any sizeable improvement in the signal to noise ratio. FIGS. 41 and 42 show that during each excitation interval ($\Delta t_i\_e$) the system is now measuring an AC type of signal, with both a positive and negative voltage level per configuration of excitation and detection conductors. This is more clearly seen in FIG. 42—which shows the output from the amplification and filtering circuit 83 in the presence of a user's finger.

Figure 43:
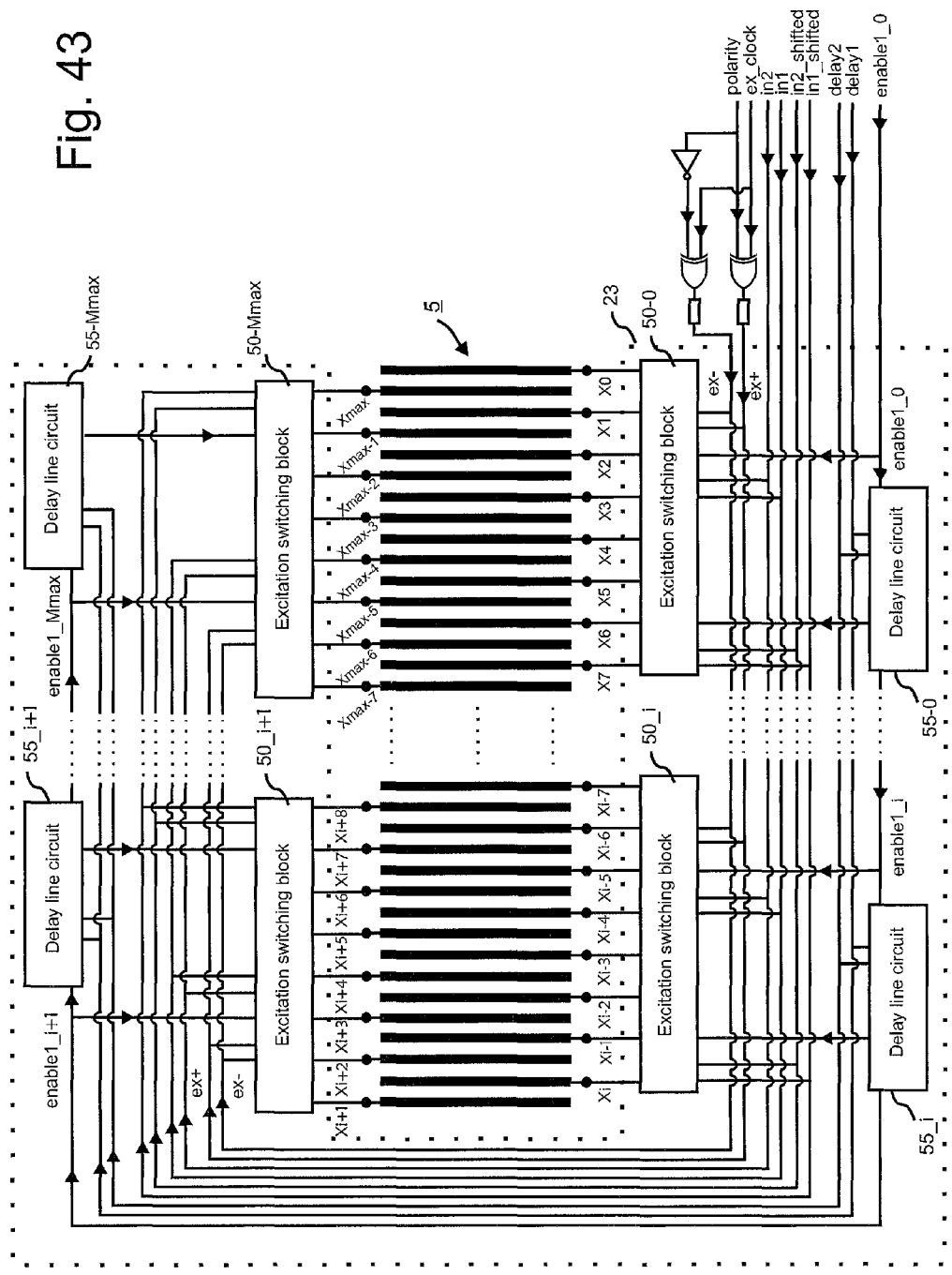
FIG. 43 illustrates a further alternative way of applying the excitation signals to the excitation conductors that sweeps the excitation signal back and forth across the conductor grid during each excitation cycle.

In the above embodiments, during each excitation cycle, the excitation signal is scanned along the excitation conductors 5 from one side of the grid 3 to the other side. This is because the $X_0$ conductor is located at one side of the grid 3 and the $X_{max}$ (or $X_{max}-1$) conductor is located at the opposite side of the grid 3. In an alternative embodiment, during each excitation cycle, the excitation signal may be scanned across the gird two or more times. FIG. 43 illustrates an embodiment where the excitation signal is scanned from right to left across the grid from conductor $X_0$ to conductor $X_i$ and is then scanned from left to right from conductor $X_{i+1}$ to conductor $X_{max}$. As shown in FIG. 43, when scanning the excitation signal from excitation conductor $X_0$ to excitation $X_i$, the excitation signals are applied to every alternate excitation conductor and when scanning from left to right, the excitation signal is applied to the excitation conductors that were not scanned in the first stage. With this arrangement, because the first and last excitation conductors that are energised during each excitation cycle are physically adjacent each other, the problem of extra electromagnetic interference emitted by the digitiser 1 can be reduced because the excitation signal applied to conductor $X_{max}$ will cancel, to a certain extent, the excitation signal applied to conductor $X_0$ during the first excitation interval ($\Delta t_1\_e$) of each excitation cycle. As those skilled in the art will appreciate, the same is true if the excitation signal is swept from one side of the digitiser to the other side any integer number of times per excitation cycle.

As those skilled in the art will appreciate, in view of the modified sequence with which the excitation conductors 5 are energised through the excitation switching blocks 50, the complex pre-processing of the measurement data performed by the measurement and processing unit 19 in step s5 (described above with reference to FIG. 30b (when excitation conductor $X_{max}$ is absent); or FIG. 40e (when excitation conductor $X_{max}$ is present)) will result in adjacent columns of matrix $U_{united}$ generated in step s5-14 not relating to immediately adjacent excitation conductors. Indeed, where the excitation scanning process scans across the grid 3 from one side to the other and then back again only once, the data in the matrix $U_{united}$ will be in two halves, with the data from the first half corresponding to the scan in one direction and the data in the second half corresponding to the scan in the opposite direction. In order to assist in the subsequent processing of the measurement data in step s13 or step s15 (of FIG. 19), the data in the matrix $U_{united}$ is preferably rearranged so that adjacent columns in $U_{united}$ do correspond to the effect of immediately adjacent excitation conductors 5. This will involve reversing the order of the columns in the second half of $U_{united}$ and interleaving them between the columns in the first half of $U_{united}$. The processing can then proceed as before. Alternatively, this rearranging of the columns can be performed on the columns of $W^{corr}$ after the data values in each column have been integrated.

Although FIG. 43 shows the excitation switching blocks 50 on each side of the excitation conductors 5, this is shown for ease of illustration. In a preferred embodiment, the excitation circuitry that is used to apply the excitation signals to the excitation conductors 5 is preferably provided on one side of the excitation conductors 5, like the arrangement shown in FIG. 3.

In a similar manner, the processing of the signals from the detection conductors may also be scanned from one end of the array of detection conductors to the other and then back to the starting end (any integer number of times). This is illustrated in FIG. 44*a*, where the detection conductors $Y_0$ to $Y_k$ are scanned first followed by conductors $Y_{k+1}$ to $Y_{max}$. As shown in FIG. 44*a*, detection conductor $Y_{max}$ is also input to detection switching block 80_0 and detection conductor Yk is also connected to detection switching block 80_*k*+1 and thus the scanning is circular in nature. This arrangement may be particularly useful when combined with the alternative illustrated in FIG. 43 in order to provide similar differential scanning processes for both the excitation and detection conductors. The inventor has found that taking differential measurements between detection conductors that are not immediately adjacent each other (but still close by) helps to increase the signal levels and hence the signal to noise ratio obtained. Further, the integration process described above allows these differential measurements to be combined to obtain measurements in respect of each individual detection conductor 7. This is similarly true for the excitation conductors 5.

Figure 44B:
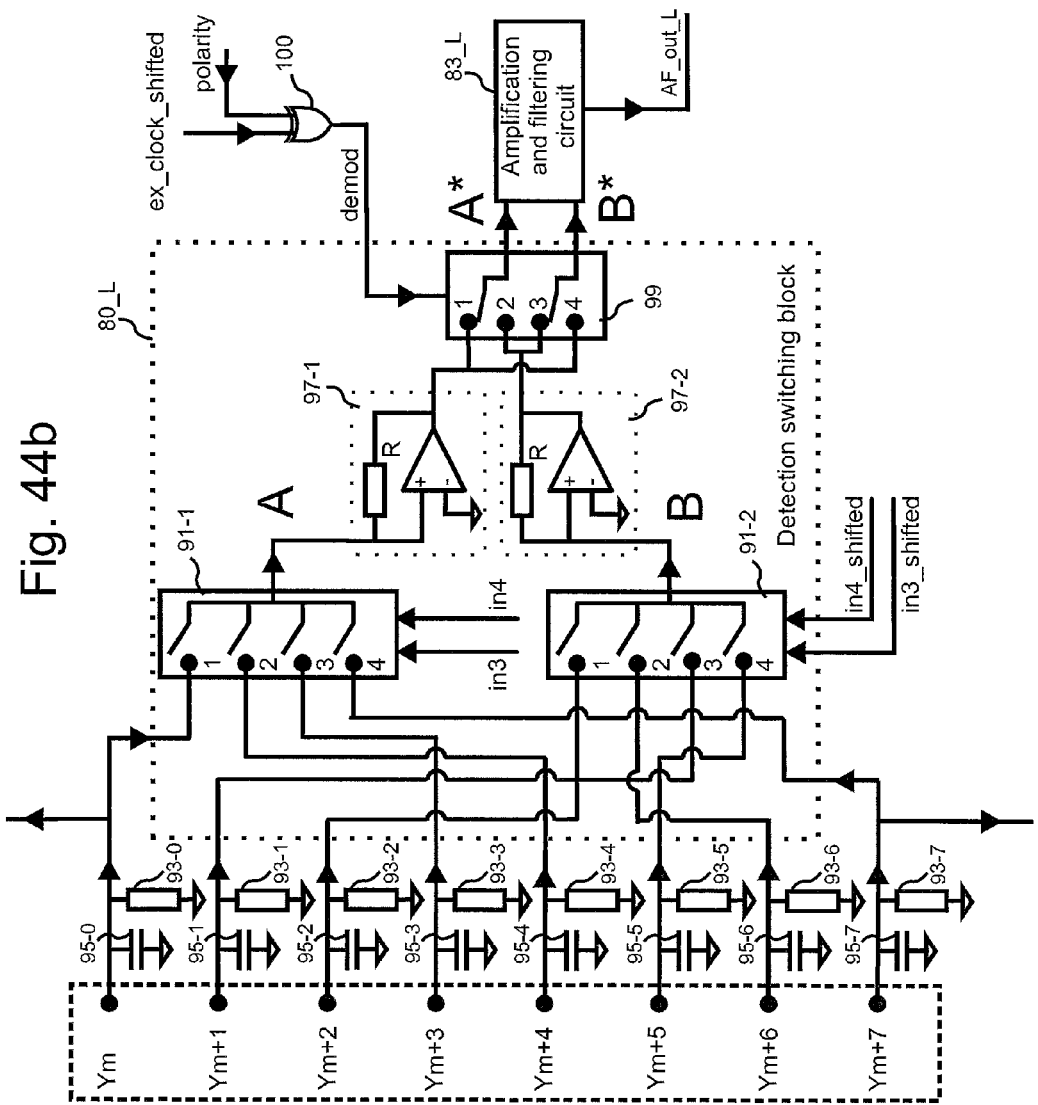
FIG. 44b illustrates a further alternative way of connecting the detection conductors inside individual detection switching blocks.

However, with the layout shown in FIG. 44*a*, each detection switching block 80 is connected to detection conductors that are more widely separated along the grid 3 than in the first embodiment (see FIG. 10). For example, detection switching block 80_1 is connected at one end to the thirteenth detection conductor in the grid 3 (labelled $Y_6$) and at the other end to the twenty seventh detection conductor in the grid 3 (labelled $Y_{13}$). If the spacing between adjacent conductors is 5 mm, then the detection switching block 80_1 will span 70 mm. In the first embodiment, each detection switching block 80 only spanned 35 mm. This embodiment therefore requires longer signal lines to connect the detection conductors 7 to the corresponding detection switching blocks 80, which introduces more noise into the signal measurements (compared with the noise introduced in the first embodiment) and will require the use of wider PCBs for the detection switching blocks 80. The inventor has realised that it is possible to perform the above type of circular scanning process to obtain differential measurements between detection conductors that are not immediately adjacent each other whilst keeping the more compact layout of FIG. 10. This is achieved by modifying the wiring of the individual detection conductors 7 to the multiplexors 91 inside the individual detection switching blocks 80, such as in the manner shown in FIG. 44*b*. FIG. 44*c* illustrates a timing diagram for an overall detection cycle in which differential measurements are obtained between pairs of detection conductors when connected to the multiplexors 91 in the manner shown in FIG. 44*b*. As can be seen, as a result of the modified wiring of the multiplexors 91, all detection pairs are now related to adjacent detection conductors, which would not be the case if the detection conductors 7 were connected to the multiplexers 91 in the manner shown in FIG. 11. For instance, FIG. 44*c* shows that during the first and the last detection intervals $\Delta t_1\_d$ and $\Delta t_8\_d$ the amplifiers 97 are connected to adjacent conductors. Also, when the detection conductors 7 are connected to the multiplexers 91 in the manner shown in FIG. 44*b*, eight sets of differential measurements are obtained in the detection cycle (T_dc) compared with seven in the first embodiment. This is because in the first embodiment, when the detection conductors 7 are connected to the multiplexors 91 in the manner shown in FIG. 11, there was no point in obtaining differential measurements between conductors $Y_m$ and $Y_{m+7}$ because these detection conductors are too widely spaced apart on the physical grid 3. Further, as can be seen from FIG. 44*c*, most of the pairs of detection conductors are not immediately adjacent each other—there is at least one other detection conductor between them. As discussed above, this helps to increase the signal levels that are obtained and hence the signal to noise ratio.

During the process of generating united matrix $U_{united}$ the data in the matrices $U^m$ is first re-arranged in order to take into account the modified connection of the detection conductors to the multiplexors 91 of the detection switching blocks 80 (in the manner shown in FIG. 44*b*), so that the resulting data $U_{united}$ is similar to the data that is obtained using the arrangement shown in FIG. 44*a*. The way in which this re-arranging is performed is illustrated graphically in FIG. 44*d*. In particular, the left hand of FIG. 44*d* illustrates the columns of data that are obtained by reading out the same column (i) from the matrices $U_{corr}^{q-1}$, $U_{corr}^{q}$, $U_{corr}^{q+1}$ and $U_{corr}^{q+2}$. These columns of data are labelled $u_{corr,i}^{q-1}$, $u_{corr,i}^{q}$, $u_{corr,i}^{q+1}$ and $u_{corr,i}^{q+2}$ and referenced 200-1, 200-2, 200-3 and 200-4 in FIG. 44*d*. As shown in FIG. 44*d*, the values in some of these columns are directly written in to a new column (labelled $u_{united,i}$) and referenced 202. Others are inverted in their sign and written into the new column 202 and others are combined with values from an adjacent column 200 before being added to the new column 202, to produce the sequence of differential values contained in $u_{united,i}$ that would be expected to be obtained by scanning the detection conductors from one end of the grid 3 to the other end and then back again in the manner shown in FIG. 44*a*.

Once the data in $U_{united}$ has been integrated to produce the matrix $W^{corr}$, the rows of the matrix $W^{corr}$ should be re-arranged to take into account the circular nature of the scanning detection process before the data in $W^{corr}$ is processed to identify locations of touch in step s13 or step s15 of FIG. 19. In the case where the scanning process scans from one end of the grid 3 to the other and back again only once in each detection cycle, this will involve reversing the order of the rows in the second half of the matrix $W^{corr}$ and then interleaving those rows between the rows of the first half of the matrix $W^{corr}$. Similarly, if the excitation switching is also arranged to perform a circular type of switching of the excitation conductors to the excitation switching blocks 50 (like in the arrangement of FIG. 43), then the columns of $W^{corr}$ should also be re-arranged in the manner discussed above with reference to FIG. 43. The result of this processing will be a matrix of values where the rows represent the effect of a single detection conductor and the columns represent the effect of a single excitation conductor, such that each value in the matrix represents the change in mutual capacitance (over the unperturbed state) between the corresponding excitation/detection conductor pair, which facilitates the subsequent determination of the location of any objects touching the digitiser.

Figure 45:
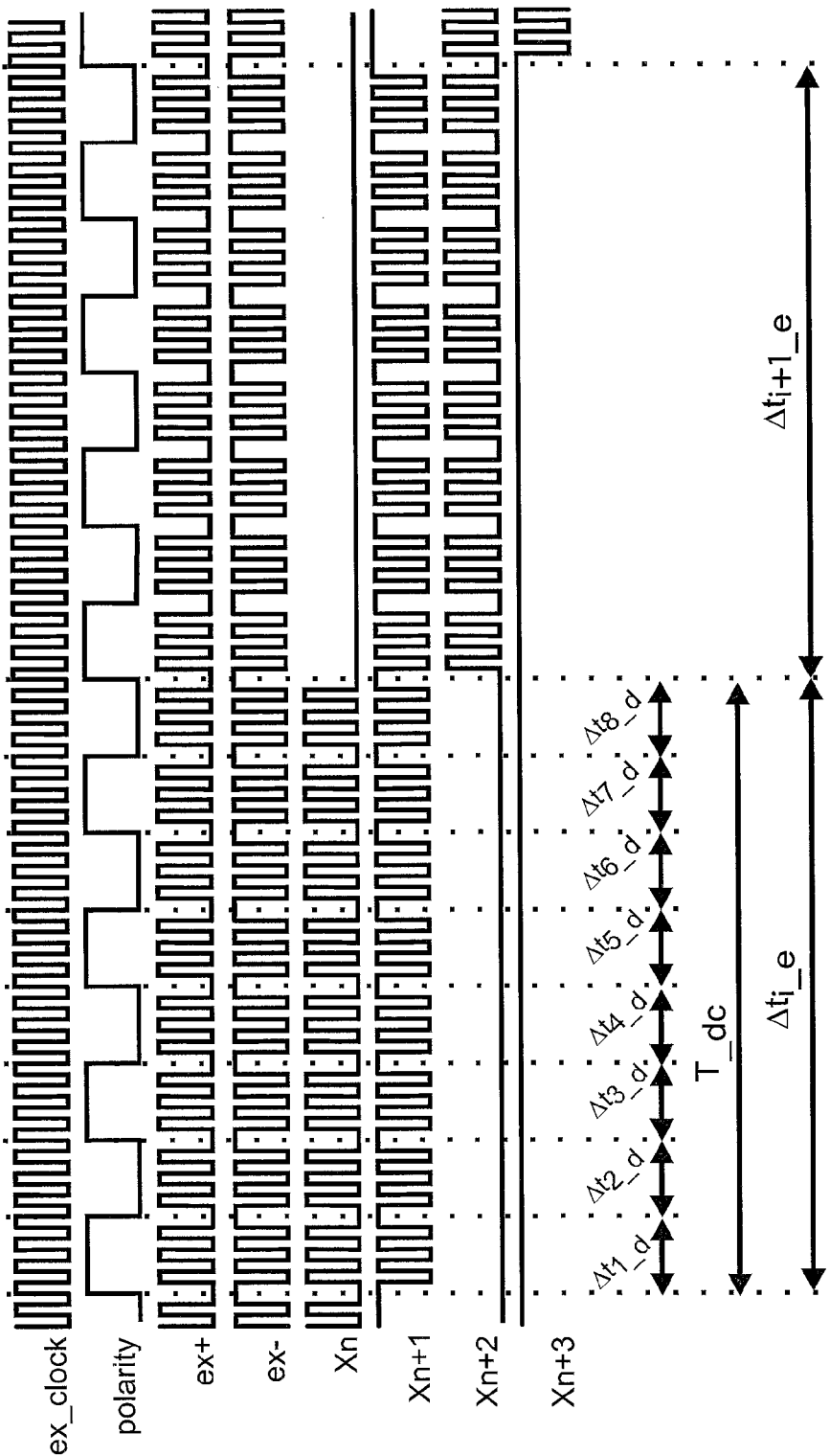
FIG. 45 illustrates the timing of control and excitation signals used in a further alternative embodiment in which the cyclic switching of the excitation conductors and the cyclic switching of the detection conductors are reversed.

In the above embodiments, a pair of detection conductors 7 was selected by each detection switching block 80 and then the excitation signals were sequentially applied in the above described overlapping manner to the excitation conductors 5. Once all of the excitation conductors have been energised, the excitation cycle ends and the next pair of detection conductors for each detection switching block were then selected. In an alternative embodiment, the excitation signals may be applied to a selected pair of excitation conductors and the pairs of detection conductors 7 may be sequentially switched through the detection switching blocks 80 before changing to the next pair of excitation conductors and cycling through the detection conductors 7 again. Timing diagrams illustrating the operation of such embodiment are shown in FIGS. 45 and 46. As before, the excitation interval is given by $\Delta t_i\_e$. During each excitation interval, the excitation signals (ex+ and ex−) are applied to the same selected pair of excitation conductors (in this example conductors $X_n$ and $X_{n+1}$). Each excitation interval is divided into a number of detection intervals ($\Delta t_i\_d$) —in this case eight detection intervals, during each of which a different pair of detection conductors is selected by each detection switching block 80. Once all of the pairs of detection conductors have been selected through the detection switching blocks 80, at the end of a detection cycle (T_dc), the configuration of the excitation conductors is changed (in this case so that the excitation signals are applied to excitation conductor $X_{n+1}$ and excitation conductor $X_{n+2}$) and the cyclic selection of the detection conductors 7 begins again. FIG. 45 shows excitation performed with an excitation switching block shown in the FIG. 25, which allows to pull excitation conductors sequentially either to the ground or to the power supply voltage in order to achieve the timing diagram of excitation signals illustrated in FIG. 45. FIG. 46 shows that once all the pairs of excitation conductors 5 have been selected for excitation, at the end of the excitation cycle (T_ec), the frame reference signal 22 is generated and then the processing begins again.

Figure 47A:
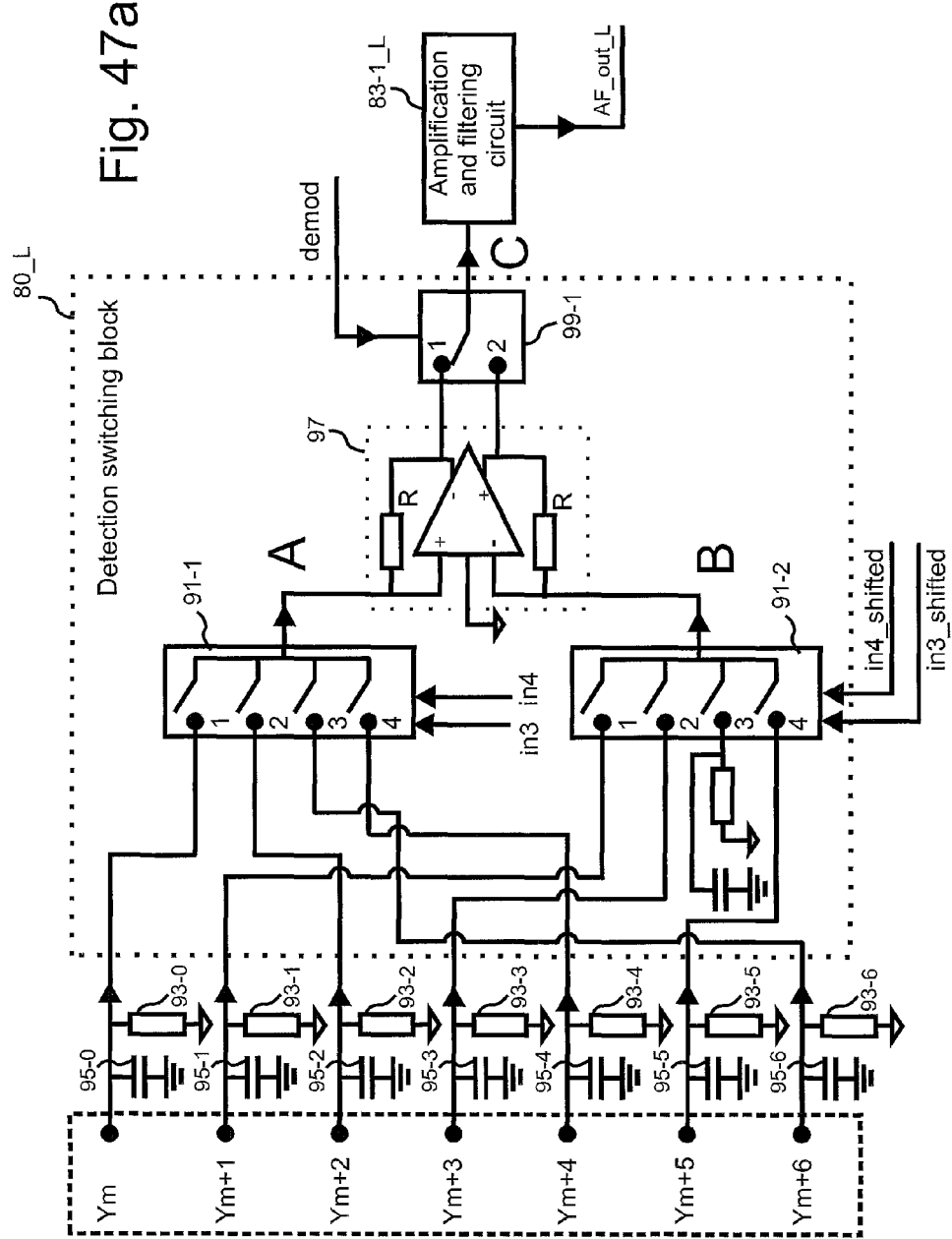
FIG. 47a is a block diagram illustrating switching circuitry used in this alternative embodiment to control the switching of signals obtained from pairs of detection conductors through the amplification and filtering circuit.

FIG. 47a illustrates a preferred form of the detection switching block 80 used in this embodiment. As can be seen from a comparison of FIG. 47a with FIG. 11, the structure of the detection switching block 80 is similar to the detection switching block structure used in the first embodiment except that input 3 of the multiplexor 91-2 (which was connected to conductor $Y_{m+7}$ in FIG. 11) is now held at the mid-rail voltage level. Further, each detection switching block 80 only has seven input conductors $Y_m$ to $Y_{m+6}$, and in this case conductor $Y_m$ and conductor $Y_{m+6}$ are not shared with the adjacent detection switching blocks 80 (as it can be considered that the conductor connected to the mid-rail is shared with the adjacent detection switching blocks instead). Therefore, in this embodiment, the same twenty four detection switching blocks 80 would be required to process the signals from one hundred and sixty eight detection conductors 7.

Figure 47B:
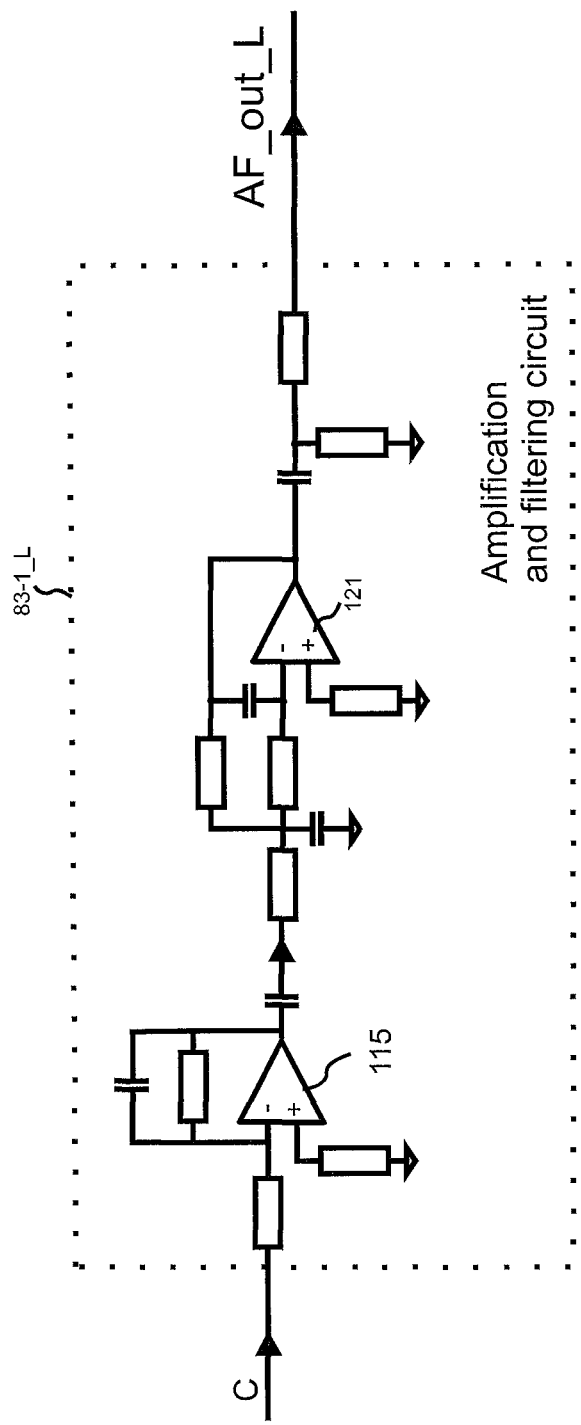

FIG. 47a also illustrates a possible modification to the analogue circuitry of the switching block 80. This modification can provide a better rejection of external common mode noise and reduces the overall power consumption of the analogue circuitry due to the simplification of the amplification and filtering block 83 as discussed below. In particular, in this modification a new fully differential amplifier 97 is used to amplify the differential current between the terminals A and B. The common mode current in terminals A and B is grounded via the set of capacitors 95 as the virtual resistance of the fully differential amplifier 97 for the common mode current is infinitely high. In contrast, the virtual input resistance to the differential current is quite low (the differential input voltage must be almost zero for an amplifier with a high open loop gain) and therefore the differential current is mainly flowing via the feedback resistors R with only a small amount of current diverted to ground via the set of capacitors 95. As a result of the differential current via the feedback resistors R, a highly symmetrical differential voltage is created at the output of the amplifier 97. By using a fully differential amplifier with a relatively high gain bandwidth product it is possible to maintain very low virtual impedance at the input of the fully differential amplifier 97 for the differential current in spite of using relatively large nominal values for the feedback resistor R. The highly symmetrical voltage at the output of the fully differential amplifier 97 can be multiplexed via the multiplexor 99-1 using the same digital demod signal as before into the single ended analogue signal C which is provided as an input to the modified amplification and filtering circuitry 83-1. The new amplification and filtering circuitry 83-1 is shown in FIG. 47b. The circuitry provides a band pass filter with amplification based on a simplified version of a third-order MFB (multiple feedback) low-pass filter coupled with a second-order high pass filter. The modified amplification and filtering circuitry 83-1 requires only two amplifiers 115 and 121 compared with the previous version (shown in FIG. 1020) which was based on three amplifiers.

Figure 48:
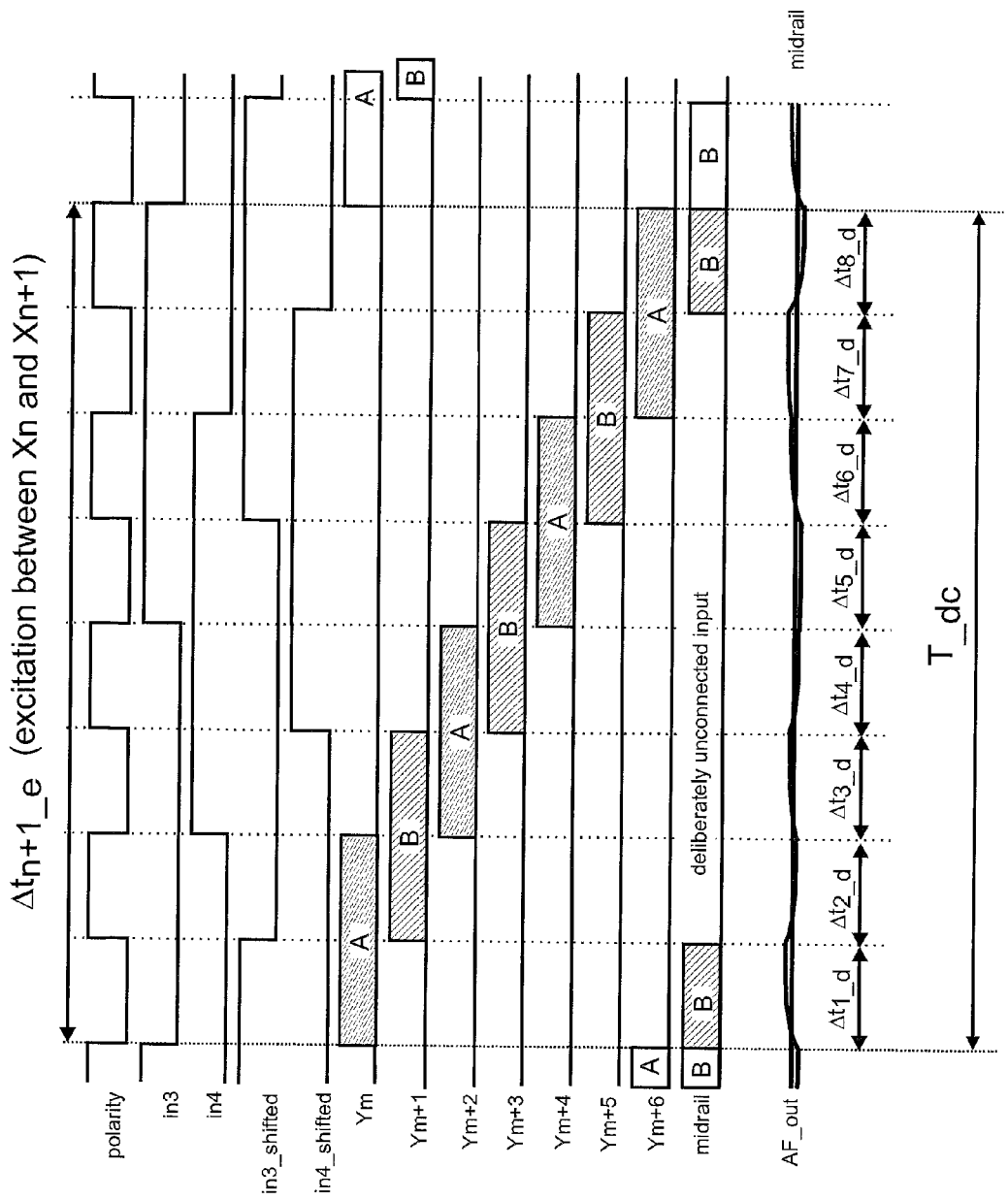
FIG. 48 is a timing diagram illustrating the way in which the signals from the detection conductors shown in FIG. 47a are switched through the switching circuitry and showing an output from the amplification and filtering circuit.

FIG. 48 illustrates the way in which the signals are switched through the switching blocks 80. As shown and as mentioned above, in this embodiment, each detection cycle (T_dc) is split into eight detection intervals ($\Delta t_1\_d$ to $\Delta t_8\_d$). As shown in FIG. 48, each of the detection conductors $Y_m$ to $Y_{m+6}$ is connected through the detection switching block 80 for two consecutive detection intervals and in an overlapping manner. As can be seen from the top of FIG. 48, one detection interval corresponds to half the period of the polarity control signal. As discussed above, the polarity control signal is either used on the excitation side or on the detection side to invert the polarity of the received signal. Therefore, since each detection conductor 7 is switched through the detection switching block 80 for two consecutive detection intervals, a measurement can be obtained from each detection conductor for both polarities. It is desirable that the signals obtained from each detection conductor 7 include both polarities so that no low frequency components are introduced into the measured signals from each detection conductor 7.

In the first embodiment described above, it was possible to switch the signals from the detection conductors in just seven detection intervals (as shown in FIG. 12); because during each detection interval the excitation signals were being cycled through all of the excitation conductors with both polarities. Therefore, there is no low frequency component caused by only switching conductor $Y_m$ and conductor $Y_{m+7}$ through the detection switching block 80 during one detection interval ($\Delta t_1\_d$ in the case of conductor $Y_m$ and $\Delta t_7\_d$ in the case of conductor $Y_{m+7}$). This is not the case in this embodiment, and each detection conductor 7 should be connected through the detection switching block 80 for two detection intervals with opposite polarities to avoid introducing low frequency components into the measurement signals.

Figure 49:
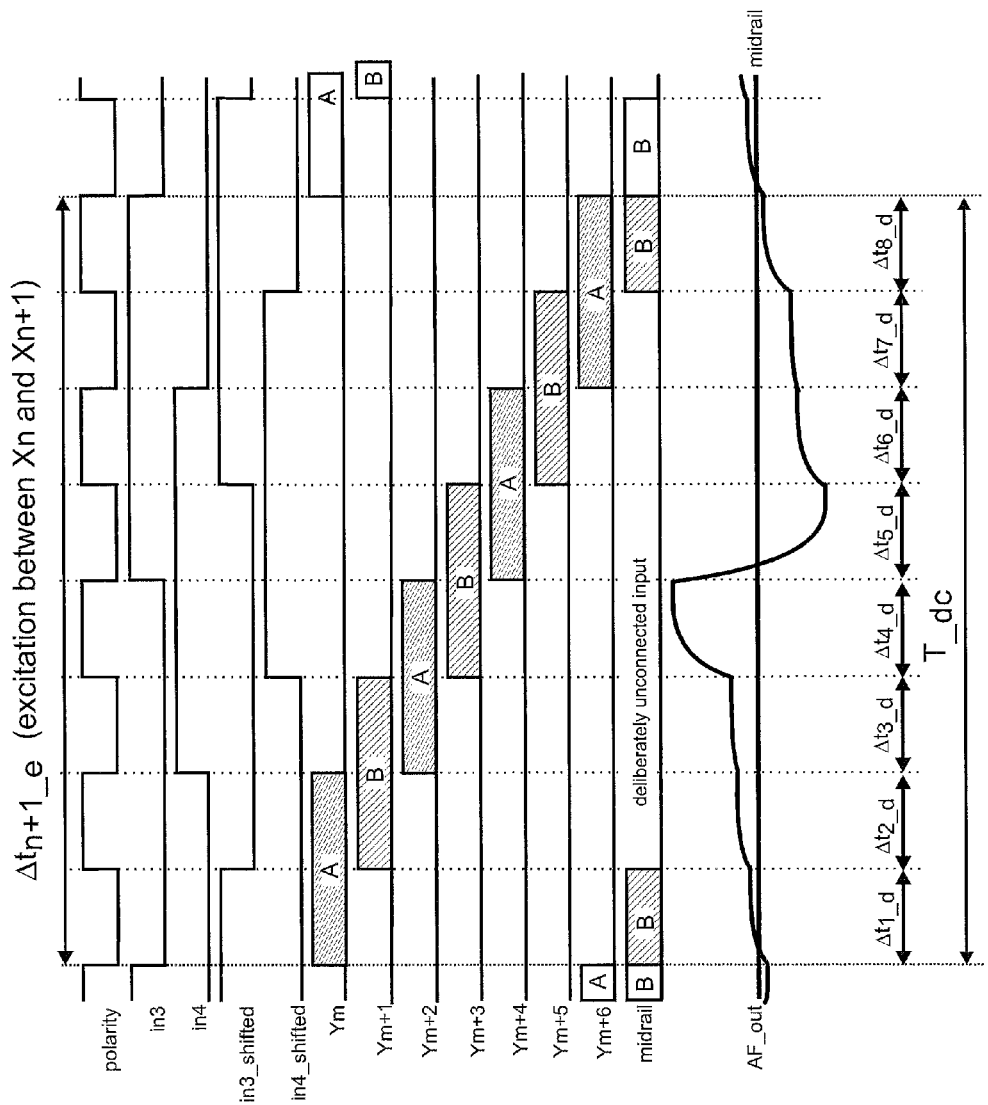
FIG. 49 is a diagram illustrating the way in which the signals from the detection conductors shown in FIG. 47a are switched through the switching circuitry and showing an output from an amplification and filtering circuit when a finger is provided adjacent the conductor grid.

FIG. 48 also shows the output from the associated amplification and filtering circuit 83 when there is no finger or object adjacent the selected excitation and detection conductors; and FIG. 49 shows a similar plot to that shown in FIG. 48, except showing a typical response that will be obtained from the output of the amplification and filtering circuits 83 when there is a finger or other object adjacent currently selected excitation and detection conductors. As explained above, each detection switching block 80 will switch seven detection conductors through the same amplification and filtering circuit. As these conductors are relatively closely spaced, it is likely that the presence of a finger will affect the signals obtained from the conductors connected to the same detection switching block 80. In the example illustrated in FIG. 48b, the finger is likely to be centered over detection conductor $Y_{m+3}$, corresponding to the peak signal that is generated and also corresponding to the conductor where the polarity of the output signal changes.

When performing the complex pre-processing of step s5 in this embodiment, the integration is performed first with respect to the columns of the background compensated matrices ($V^m_{comp}$) and then with respect to the rows. Also, as each background compensated matrix ($V^m_{comp}$) has known non-differential measurements at the start and end thereof, the integration can be performed along the entire column (so there is no need to look for areas of potential touch first). In particular, because in the first and last detection intervals ($\Delta t_1\_d$ and $\Delta t_8\_d$) one of the inputs to the amplifier and filtering circuit 83 is connected to the mid-rail voltage, the measurement value generated during these detection intervals is not a differential measurement and can be used to seed or initiate the integration process as follows:

$$w^m_{i,0} = v^m_{i,0}$$

$$w^m_{i,p+1} = v^m_{i,p+1} + K_0 * w^m_{i,p} \text{ for } 0 < p \leq j\text{max}-1$$

The value of $w^m_{i,jmax}$ should equal to zero (as it corresponds to an input that is permanently connected to the mid-rail voltage), but in practice due to noise etc the calculated value of $w^m_{i,jmax}$ is unlikely to be equal to zero and it can be used to perform a similar gradient correction to that performed in the first embodiment to produce a corrected column of values $w^{corr,m}_{i,j}$.

As those skilled in the art will appreciate, an alternative approach for integrating such differential measurement data can be implemented using an integration algorithm similar to steps s5-05 to s5-10 described for the first embodiment with reference to FIG. 30b (which identifies possible areas of touch and then integrates the data within those areas). As measurement noise for data outside of a touch area in this case does not propagate into the subsequent integration steps, this approach might be especially useful for analysing data from detection switching blocks having a large number of individual conductors. For instance, it can be successfully used for the case when fifteen detection conductors are multiplexed through the same detection switching block with the sixteenth input to the multiplexor 91 being connected to the reference voltage.

As explained above, eight detection intervals $\Delta t_i\_d$ shown in FIG. 48 are required for the measurements of different pairs of seven detection conductors in order to synthesise a signal with zero low frequency component in its Fourier spectrum at the output of the detection switching block 80. If high pass filtering at the amplification and filtering circuitry 83 is not required, the number of detection intervals $\Delta t_i\_d$ can be reduced by one. In this case the last value of the integration process $w^m_{i,jmax}$ will correspond to the last detection conductor in the detection switching block ($Y_{m+6}$ for the embodiment shown in FIG. 47a) and thus no gradient correction will be applied to the data $w^m_{i,p}$ calculated in this particular case. In this case the integration algorithm can be further modified in order to compare at each integration step the result ($w^m_{i,p+1}$) with a threshold value. For any result with a magnitude below the threshold value the result ($w^m_{i,p+1}$) is nulled out (set to zero). This helps to avoid accumulation of measurement noise from areas outside of the touch area and is especially useful if the detection conductor related to the result $w^m_{i,0}$ is outside of the actual area of touch. The integration algorithm of this embodiment will keep all calculated results ($w^m_{i,p+1}$) at zero until the actual touch area is met. This helps to maintain a similar signal to noise ratio level for the calculated results ($w^m_{i,p+1}$) in the touch area regardless of whether the first conductor related to the result $w^m_{i,0}$ corresponds to the actual area of touch (no noise from the previous integration steps is accumulated anyway) or whether the first conductor related to the area of touch is located at the end of the integration cycle.

Columns corresponding to the same excitation interval can then be concatenated to form a united matrix $W^{united}$. However, in this embodiment the redundant cells that relate to the zero value for unconnected inputs are removed. With regard to the integration along each row of the thus calculated matrix $W^{united}$, this is performed in a similar manner to that shown in FIG. 40e, except that there is no need to perform the transient correction processing of steps s5-31 to s5-33.

Since the excitation scanning process used in this embodiment is a circular scanning process (like in embodiment described with reference to FIG. 43), after the data in the rows of $W^{united}$ have been integrated to generate $U^{corr}$, the order of the rows is re-arranged with a view to match it with the actual order of the excitation conductors 5 in the grid 3. For instance, with the wiring arrangement of FIG. 43, this requires the following rearrangement of the rows: $u_0$, $u_{maxj}$, $u_1$, $u_2$ ... $u_{(maxj+3)/2}$, $u_{(maxj-1)/2}$, $u_{(maxj+1)/2}$. The final matrix $U^{corr}$ will hold data values $u_{i,j}$ that corresponds to the perturbation of the mutual capacitance of the cross-over point between an excitation conductor i and detection conductor j.

Figure 51A:
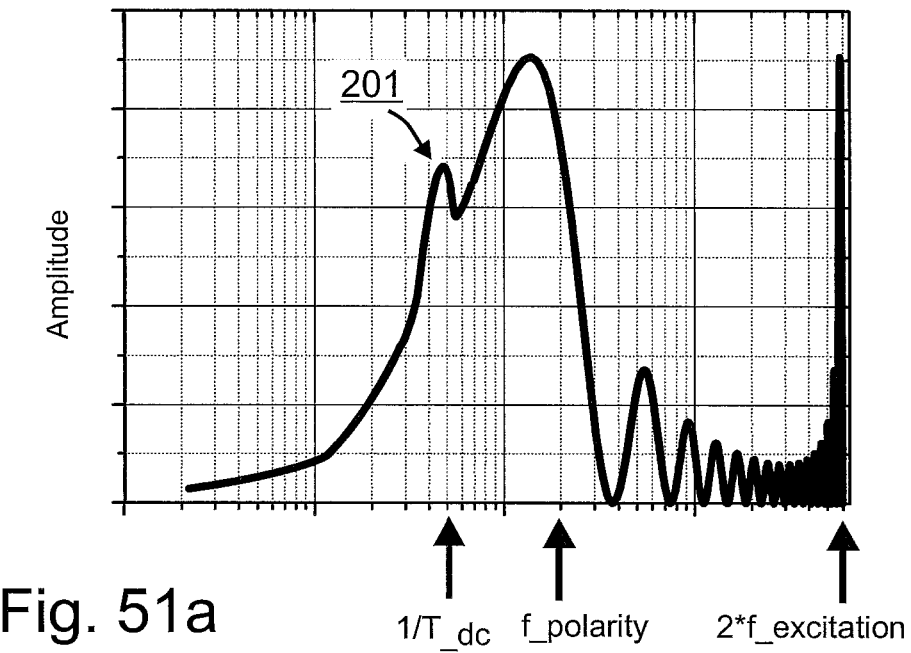
FIG. 51a is a plot illustrating a spectrum of a signal output from a demodulator in the alternative embodiment of FIG. 50 which illustrates an additional peak in the spectrum of the measurement signal.
Figure 51B:
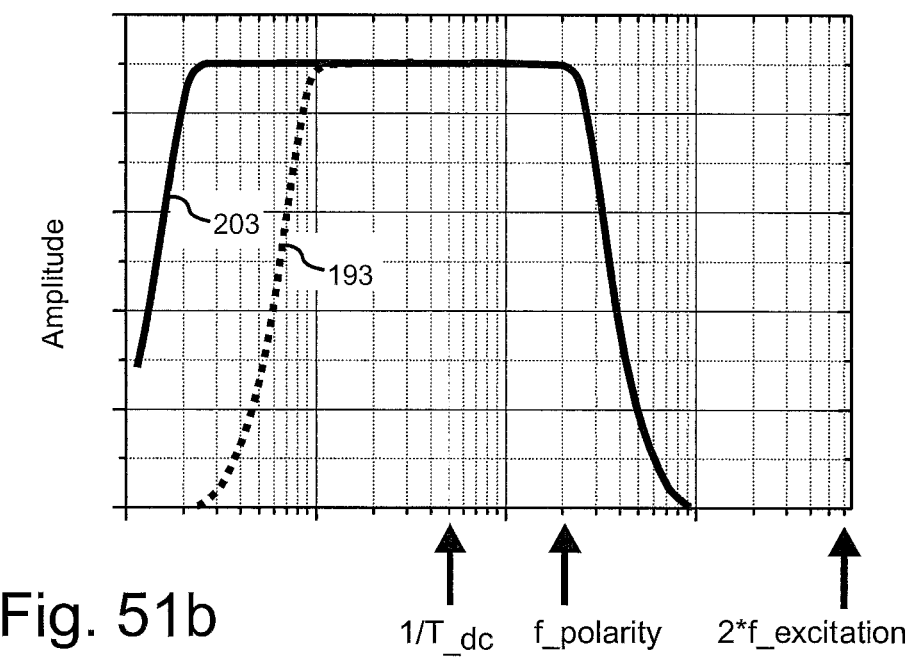
FIG. 51b illustrates a plot of the bandwidth of the amplification and filtering circuits for filtering out the high frequency signals shown in FIG. 51a in order to recover the desired signal whilst filtering out high frequency components of the demodulation signal and illustrating the increased bandwidth of the circuitry over the corresponding bandwidth of the circuitry used in the first embodiment.

The reason for holding the third input of multiplexor 91-2 at the mid-rail voltage level will now be explained. In particular, if this third input had been connected to the detection conductor $Y_{m+7}$ (as per the first embodiment), then as indicated in FIG. 50 it would be connected through the demodulation switching block 80 during detection intervals $\Delta t_1\_d$ and $\Delta t_8\_d$. As a result, an additional frequency component will be added into the measurements at a frequency corresponding to one over the period of the detection cycle (i.e. 1/T_dc). This additional frequency component 201 is illustrated in FIG. 51a. Such additional frequency component 201 is much closer in frequency to the frequency of the polarity control signal (compared to the additional frequency component 189 shown in FIG. 40a) because there are only four periods of the polarity control signal within each detection cycle. This in turn is because there are fewer detection conductors 7 and these are being multiplexed through parallel detection switching blocks 80. Therefore, as shown in FIG. 51b, if all of the multiplexor inputs of the detection switching blocks 80 are connected to detection conductors, then the amplification and filtering circuits 83 will require a frequency response 203 that has a wider pass band than the filter response 193 required when one of the multiplexor inputs of the detection switching blocks 80 is held at the mid-rail voltage level. Therefore, as those skilled in the art will appreciate, holding one of the inputs into the detection switching block to the mid-rail voltage level is analogous to the "missing" conductor of the last excitation switching block 50-Mmax of the first embodiment. The main difference is that in the first embodiment, only one output from the last excitation switching block 50-Mmax was not connected to an excitation conductor. Whereas in this embodiment, one of the inputs to each of the detection switching blocks 80 should be connected to the mid-rail voltage if the additional frequency component 201 is to be avoided.

Of course, as the frequency of the additional frequency component 201 is relatively close to the main peak of the desired signal at the frequency of the polarity signal, it may be preferable to connect the detection conductors through the detection switching blocks 80 in the manner shown in FIG. 33 (if the polarity signal is being applied on the excitation side) or FIG. 11 (if the polarity signal is being applied on the detection side); by performing all measurements as differential detection such an arrangement provides better rejection of common mode noise that may be picked-up by the detection conductors 7 from the switching events in the electronics of an LCD screen that is provided under the grid 3.

In embodiments that do have the extra detection conductor $Y_{m+7}$, the best way of wiring the detection conductors to the multiplexors 91 is shown in FIG. 44b. As can be seen from FIG. 44c the extra conductor $Y_{m+7}$ is connected to the amplifier 97-2 in the middle of the detection cycle, namely during the detection intervals $\Delta t_5\_d$ and $\Delta t_6\_d$. Thus there is no problem to share this particular conductor with an adjacent detection switching block 80, where this particular conductor will be connected to the amplifier 97-1 at the very beginning of the detection cycle, namely during the detection intervals $\Delta t_1\_d$ and $\Delta t_2\_d$.

Figure 52B:
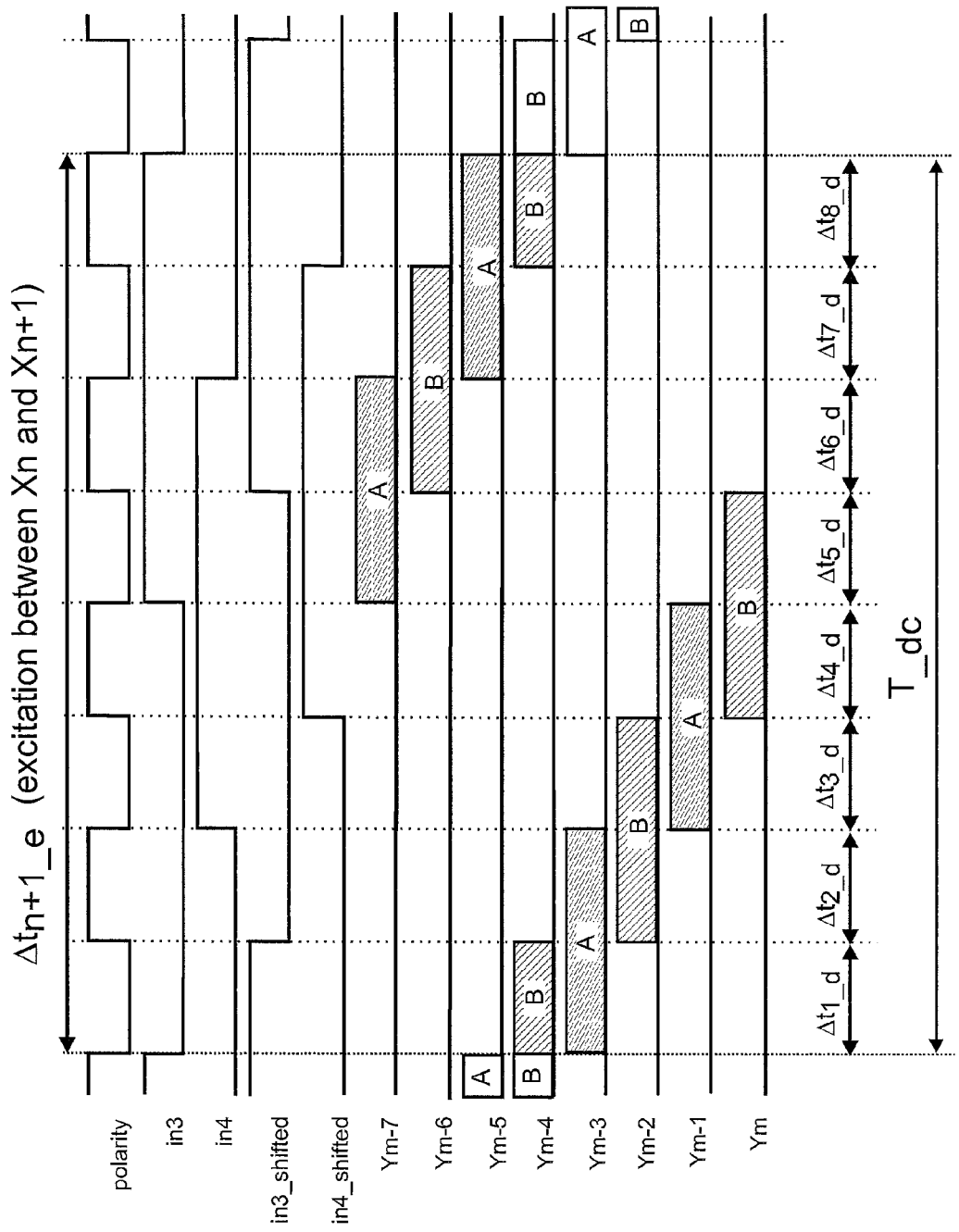

However, in embodiments that use the extra detection wire $Y_{m+7}$ using the wiring scheme to the multiplexor 91 as shown in FIG. 33, care has to be taken in the design of adjacent detection switching blocks 80 so that detection switching blocks 80 that are connected to the same detection conductor 7 do not switch the signal from that detection conductor 7 through both detection switching blocks 80 during the same detection interval. For example, detection conductor $Y_m$ shown in FIG. 33 is shared with the previous detection switching block 80-L-1 and if both detection switching blocks 80 are connected in the same way, then during the first detection interval ($\Delta t_1\_d$) conductor $Y_m$ will be connected to the A output of multiplexor 91-1 in switching block 80-L and will be connected to the B output of multiplexor 91-2 in detection switching block 80-L-1. As those skilled in the art will appreciate, such a dual connection through two detection switching blocks 80 will cause erroneous measurements to be obtained from conductor $Y_m$. Consequentially, in such an embodiment, adjacent detection switching blocks 80 should be configured differently so that the same detection conductor is not switched through two switching blocks at the same time. FIG. 52a is a block diagram illustrating the way in which this can be achieved for a preceding detection switching block 80-L-1 which connects to detection conductors $Y_m$ to $Y_{m-7}$; and FIG. 52b is a timing diagram illustrating the timing of when the signals from the detection conductors $Y_m$ to $Y_{m-7}$ are connected through the detection switching block 80-L-1 during one detection cycle. As shown in FIG. 52b, detection conductor $Y_m$ is now connected through detection switching block 80-L-1 during detection intervals $\Delta t_4\_d$ and $\Delta t_5\_d$ and this does not conflict with the connection of conductor $Y_m$ through detection switching block 80-L (shown in FIG. 33 or 11).

Further, software correction (by the measurement and processing unit 19) to the possible perturbation of the midpoint level from the mid-rail level caused by the extra conductor connected to the detection switching block 80 can be implemented in a manner similar to that discussed above with reference to the flowchart of FIG. 40e.

Figure 53:
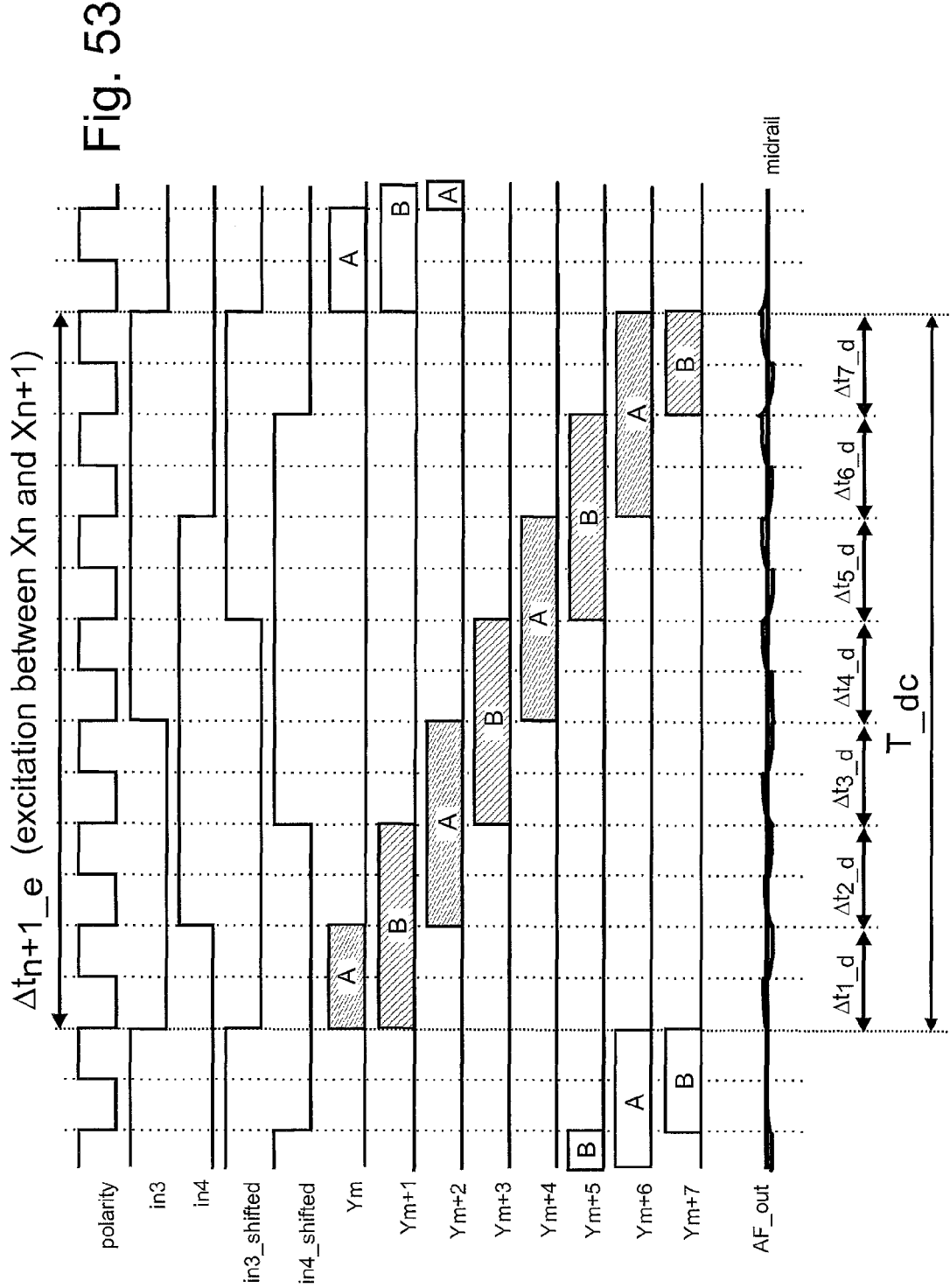
FIG. 53 is a timing diagram illustrating the timings when the signals from the different detection conductors are multiplexed through the switching block shown in FIG. 33 in which the overlap of signals detected from adjacent detection conductors overlap for one period of the polarity modulation signal and showing an output from the amplification and filtering circuit when no finger is present.
Figure 54:
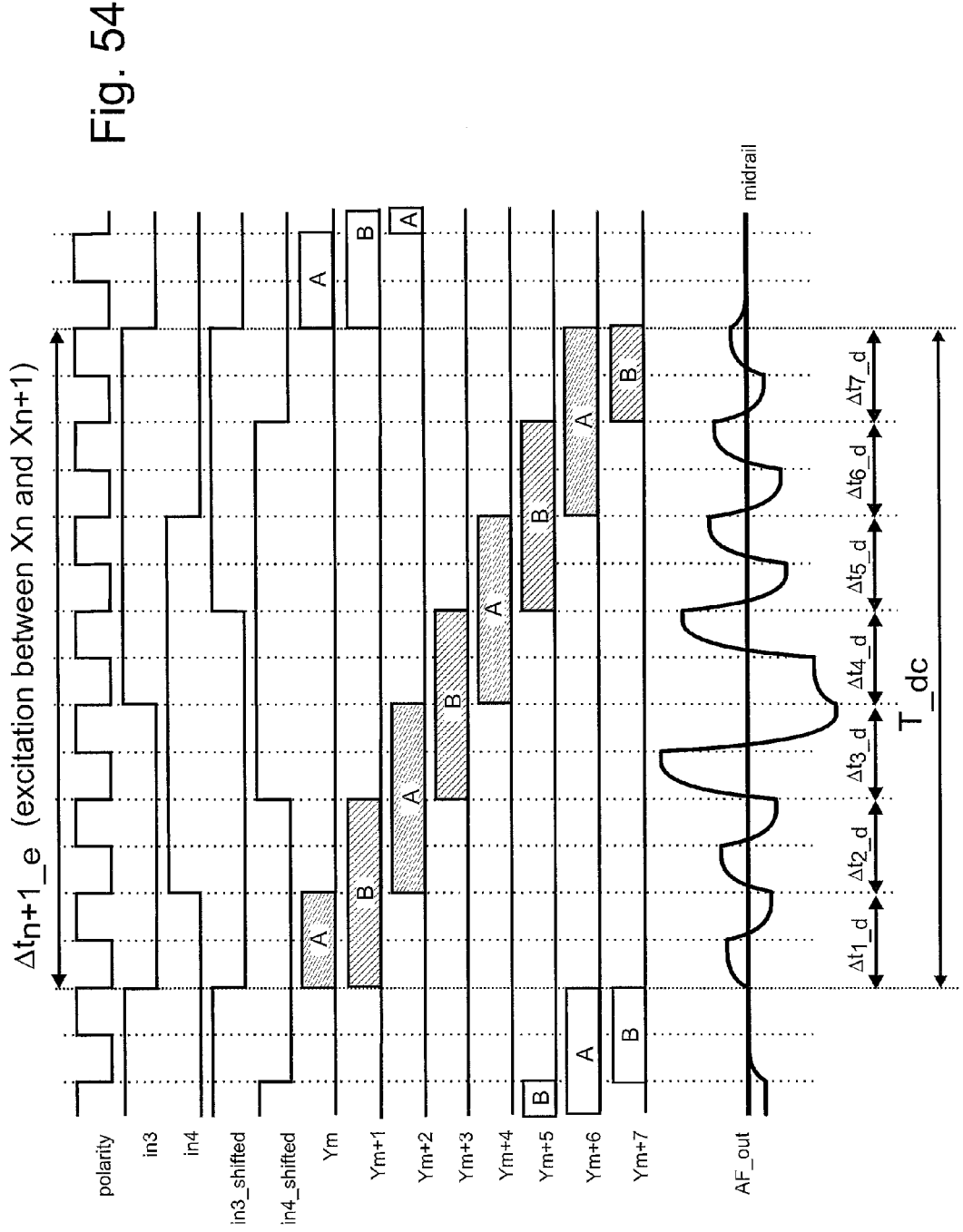
FIG. 54 is a timing diagram showing the same timing signals as shown in FIG. 53 and the output from the amplification and filtering circuit when a user's finger is over the grid.

FIG. 53 illustrates an alternative way to solve the problem of additional frequency components in the measurement signals and that allows all of the detection switching blocks 80 to have the same configuration similar to one shown in FIG. 11 or FIG. 33. In this alternative, the frequency of the multiplexor select signals (in3, in4, in3_shifted and in4_shifted) has been reduced compared to those shown in FIG. 48b. The frequency of these multiplexor select switches is such that during each detection interval ($\Delta t_i\_d$) the polarity control signal cycles through one period and therefore, the detection signals received during each detection interval will include both polarities and will not, therefore, include the above described low frequency component that would be present if there is only one polarity. Therefore, in this embodiment, like in the first embodiment shown in FIG. 12, it is possible to use the signal from conductors $Y_m$ and $Y_{m+7}$ during a single detection interval without adding a low frequency offset; and consequently it is possible to cycle through the eight detection conductors $Y_m$ to $Y_{m+7}$ in only seven detection intervals ($\Delta t_1\_d$ to $\Delta t_7\_d$) as opposed to the eight detection intervals required in the embodiments illustrated with reference to FIGS. 48a and 50. With this arrangement, it is also possible to have the same configuration in adjacent detection switching blocks 80 as the adjacent switching blocks do not pass the signal from the shared detection conductor through the switching blocks during the same detection interval. The downside with this embodiment is the same as the downside with the embodiment illustrated in FIGS. 41 and 42—namely the update rate of the system is reduced without any notable improvement in the signal to noise ratio. In particular, as more clearly shown in FIG. 54 (showing the outputs obtained in the presence of a user's finger), the output obtained from each detection conductor now forms a quasi AC signal and the detection circuitry will sample both a positive voltage level and a negative voltage level for each configuration of the excitation and detection conductors, when only one measurement is needed. This therefore halves the measurement update rate that can be achieved in this embodiment.

In the above embodiments, a number of complex pre-processing algorithms have been described to process the raw data obtained from the digitizer grid 3. As those skilled in the art will appreciate, various changes can be made to this processing. For example, in the above embodiments, a background value was subtracted from each raw measurement value. This is not essential. The algorithms can work with absolute values rather than relative values. Additionally, whilst the raw measurement values were written into matrix data structures in the memory, other arrangements are possible, as long as the measurement processing unit 19 knows where each measurement value is stored. Where the raw data measurements are written into matrix structures, the data written into the rows could have been written into columns and vice versa. Thus, references to columns and rows in the above description can be reversed depending on how the raw data measurements are stored in memory.

In the above embodiments, the multiplexors 91-1 and 91-2 were switched at different moments in time. Namely, multiplexor 91-1 was switched on the negative edges of the polarity signal and multiplexor 91-2 was switched on the positive edges of the polarity signal. During the switching of any analogue multiplexor a small amount of charge is always injected into the switching channel via capacitive coupling between the channel and the gates in the transistors. Typical values of the charge injection are about 5 pC and in most analogue measurement circuits such charge injection does not cause any issues. However in projective capacitive digitisers (like those described above), which measure extremely small AC currents associated with a small mutual capacitance at each cross-over measurement node, this non-symmetrical charge injection can create a problem. Because the charge is injected in the multiplexor channel during a short period of time of about 20 ns, the amplitude of the injected current can be an order of magnitude higher than the measurement current itself. This shouldn't be an issue for a measurement system having a polarity modulation frequency below 50 kHz as the amplification and filtering circuitry 83 will be able to remove the effect of this charge injection prior to the measurement of the amplitude being made in the sample and hold circuitry 15. However for very large diagonal size digitisers the frequency of the polarity modulation control signal can be as high as 250 kHz in order to achieve a measurement rate of 100 Hz in spite of the large number of cross-over sensing nodes. In this case, the filtering of the charge injection current becomes much less efficient due to the increase in the high frequency corner of the filter 83 and care should be taken to reduce such unwanted charge injection into the detected signal before it is applied to the amplification and filtering circuitry 83.

Figure 55A:
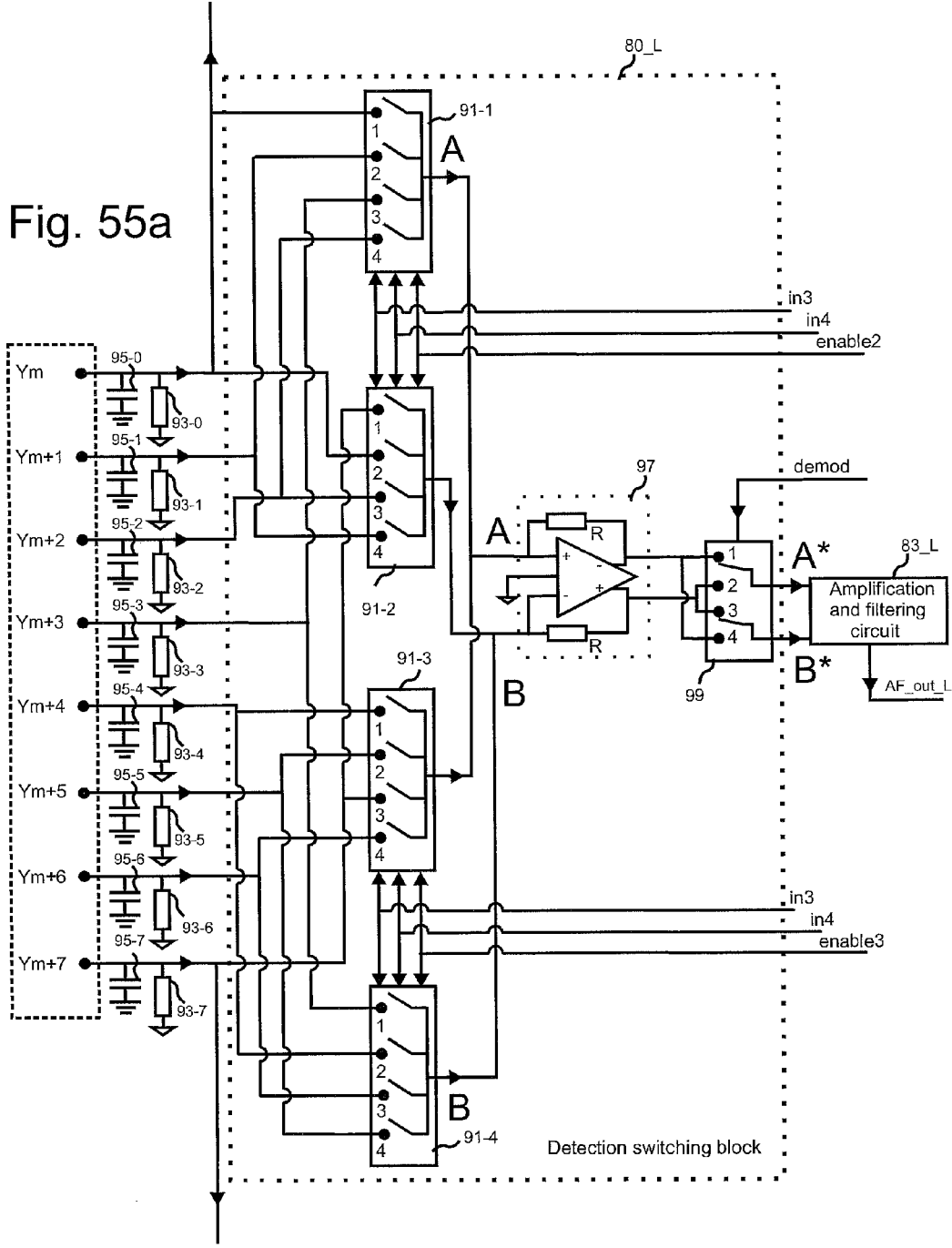
FIG. 55a is a block diagram illustrating switching circuitry used in this alternative embodiment to control the switching of signals obtained from pairs of detection conductors through the detection switching block without using a dedicated polarity control signal.

One way to reduce the effect of the switching current injected by the multiplexors is to use the switching circuitry shown in the FIG. 55a which is arranged to switch the signals through the multiplexors 91-1 to 91-4 in the manner shown in FIG. 55b. As can be seen from FIG. 55b, the switching events are now arranged symmetrically—the detection conductors connected to channels A and B are switched simultaneously at each positive and negative edge of the polarity signal (shown in previous embodiments). In addition there is no need for the explicit polarity signal in the embodiment of FIG. 55a. The reversal of the polarity of the signals detected by a particular detection conductor $Y_m$ is achieved by connecting this conductor to two multiplexors—with the first multiplexor connected to the output A and the second multiplexor connected to the output B. Therefore, this conductor can be connected to the output A or to the output B in adjacent moments in time by controlling the multiplexors 91. However, this arrangement of the detection switching blocks 80 comes at a cost, as now each detection conductor is connected to two dedicated analogues switches in contrast to the above embodiments, where each detection conductor is connected to a single analogue switch. Effectively, this embodiment of FIG. 55a allows the polarity modulation to be applied to the detected signals before they are converted into a voltage at the fully differential amplifier 97. In this way the charge injected into the measurement circuit at the multiplexors 91 becomes a common mode signal for the fully differential amplifier 97 and so its effect will be greatly reduced at the output of the amplifier 97.

As those skilled in the art will appreciate, a similar arrangement for multiplexing the excitation conductors 5 to the excitation circuitry 23 using two dedicated analogue switches (one connected to the ex+ signal and another one connected to the ex− signal) per excitation conductor is also possible. Such an arrangement can provide polarity modulation of the excitation signals without using a dedicated polarity control signal.

Figure 56B:
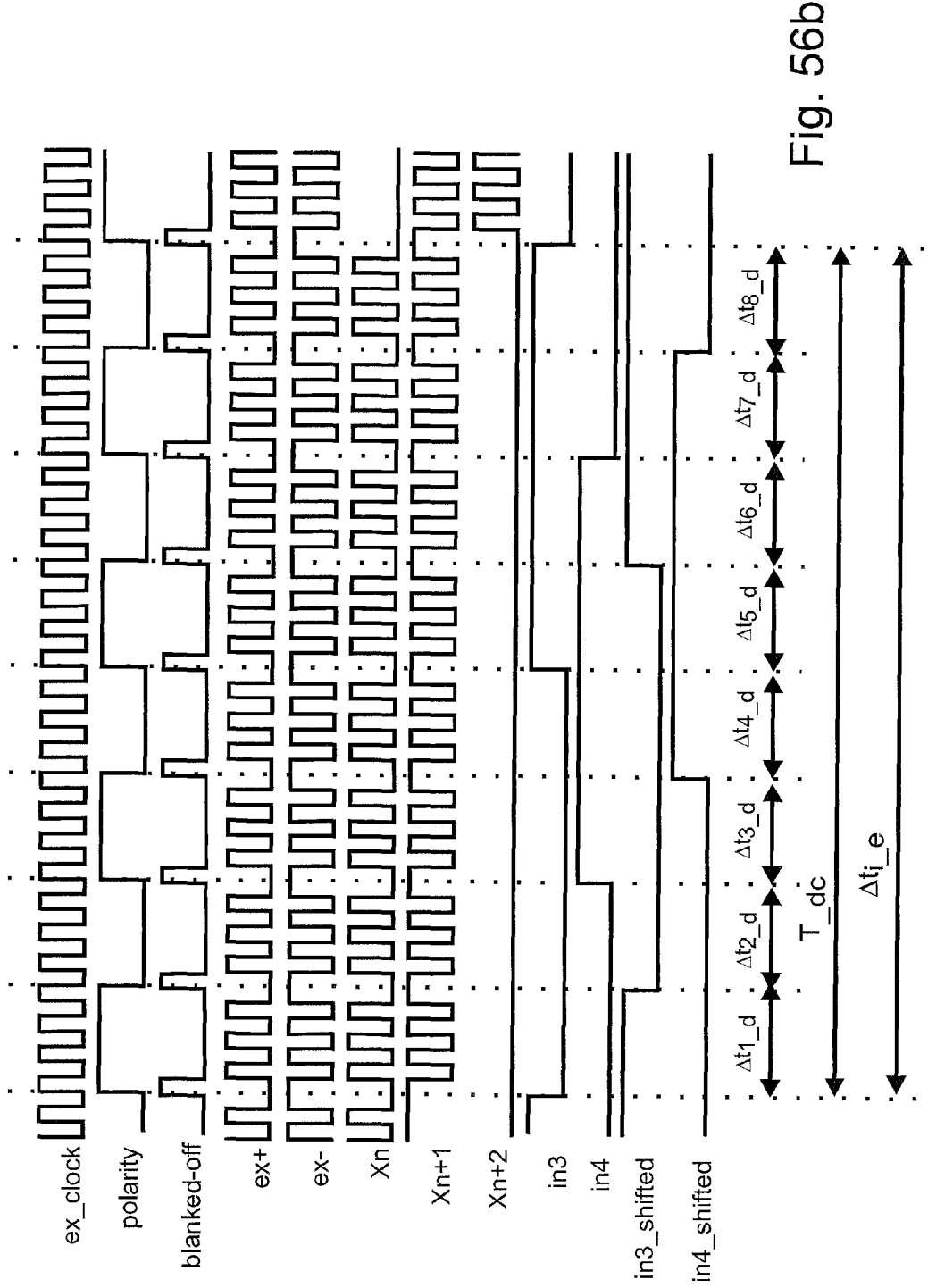
FIG. 56b is a timing diagram illustrating the way in which the signals from the detection conductors shown in FIG. 56a are switched through the switching circuitry.

Another way of reducing the effect caused by the charge injection from the multiplexor 91 is shown in the FIG. 56a. In this embodiment the demodulation multiplexor 99 has an additional enable input signal "blanked-off". This new control signal "blanked-off" is used to disconnect the amplification and filtering circuitry 83 from the detection switching block 80 for a short period of time when the unwanted injected current from the multiplexor 91 would otherwise be passed through from the fully differential amplifier 97. This embodiment is cheaper to implement compared to the solution of FIG. 55a as it does not require any extra electronic components (analogue switches). The blanked-off signal should disable multiplexor 99 at each edge and immediately after each edge of the polarity modulation signal. As more clearly shown in FIG. 56b the duration of the blanked-off signal pulse can be equal to or slightly smaller than half the period of the excitation clock (ex). For instance, the duration of the blanked-off pulse can be equal to 250 ns, which is enough to let the output of the fully differential amplifier 97 to relax to its unperturbed value. As is evident from FIG. 56b, the blanked-off signal disconnects the amplification and filtering circuitry 83 from the detection switching block 80 during the time when no excitation edges are applied to the system—excitation signals ex+ and ex− themselves have the missing transition edge at each positive and negative edge of the polarity signal. Thus the usage of the blanked-off signal does not change any signals measured by the amplification and filtering circuitry, and it can eliminate almost completely the effect of the unwanted charge injection from the multiplexor 91. The charge injection in the demodulation multiplexor 99 is not relevant to the actual performance of the measurement circuitry; the effect of the unwanted charge injection at this point in the circuitry does not typically exceed $10^{-5}$ of the value of the maximum measured signals.

The usage of the blanked-off signal helps to solve another problem which can appear at the excitation side. As was described in the above embodiments, excitation signals ex+ and ex− are created from a digital (square wave) signal. They are applied symmetrically in the opposite phase to each other and thus do not provide significant levels of electromagnetic radiation. Nevertheless it might be advantageous to filter-out high frequency harmonics in the excitation signals ex+ and ex− in order to suppress even more efficiently the frequency components above 30 MHz which potentially can be radiated via very long excitation conductors. Such filtering can modify slightly the exact level of low and high signals in the ex+ and ex− channels such that the deviation can be of the order of 1% or more. This is not an issue for a ratiometric algorithm used to determine the exact location of the touch target but can be a problem for creating an excitation signal with zero DC component. Indeed, all excitation conductors 5 are held at either the power supply voltage or ground voltage using pulled resistors 61. The switching of an excitation conductor to an excitation channel ex+ or ex− can cause a small unwanted jump of the voltage level at an excitation conductor. This unwanted jump of the order of 1% or more of the typical jump at the edges of the excitation signals ex+ and ex− is not going to be compensated at the end of the excitation cycle as each excitation conductor will return to its pulled value (rail or ground) with a relatively long time constant determined by the RC product of the resistor 61 and capacitor 63. Such an uncompensated jump for the voltage level can represent an additional perturbation of the midpoint level of the signal in the amplification and filtering circuitry 83 from the mid-rail level. The blanked-off signal disconnects the amplification and filtering circuitry 83 from the detection switching block 80 at and immediately after each edge of the polarity signal. By coincidence, it will also blank-off the signal related to this extra jump in the voltage of the excitation conductor as the edges of the excitation window are fully aligned with the edges of the polarity modulation control signal.

In the above embodiments detection conductors 7 and excitation conductors 5 were grounded using low impedance capacitors 63 (see FIG. 5) and 95 (see FIG. 11). The low impedance to ground for excitation or detection conductors which are not selected in the excitation and measurement interval reduces unwanted effects of mutual capacitive coupling between adjacent excitation conductors or between adjacent detection conductors. If non-selected conductors are left floating they can introduce significant crosstalk between signals measured at adjacent crossover points. The capacitance of the capacitors 63 or 95 provided by the electronics located on a PCB board is connected in parallel to the capacitance from the conductor in question to all other non-floating conductors in the grid as well as to the capacitance between the conductor in question and the ground plane of the LCD screen (or the metallic walls of the whiteboard display). The net capacitance of the conductor in question to ground might become several times larger compared to the capacitance of the capacitors 63 or 95. Thus it is sufficient to use capacitors 63 and 95 with a capacitance of the order of five times larger compared to the unwanted capacitive coupling between adjacent parallel conductors in order to reduce such crosstalk; or in terms of impedance requires the impedance presented by the capacitors 63 and 95 to be of the order of five times smaller than the impedance between adjacent conductors. In the case of using a sensor grid build with an ITO film, the overall resistance of the conductors can become very large and thus will be the main limiting factor for increasing the excitation frequency. In this case the combined impedance of the capacitors 63 and resistors 61 (or capacitors 95 and resistors 93) should not exceed twice the impedance of the conductors in order to avoid introducing even further limitation to the value of the excitation frequency which can be used with the grid. Additionally, the termination capacitors 63 and 95 filter high frequency signals induced on the conductors during charge injection by the multiplexors and thus help with EMC compliance for the electronics of the digitiser.

Figure 56C:
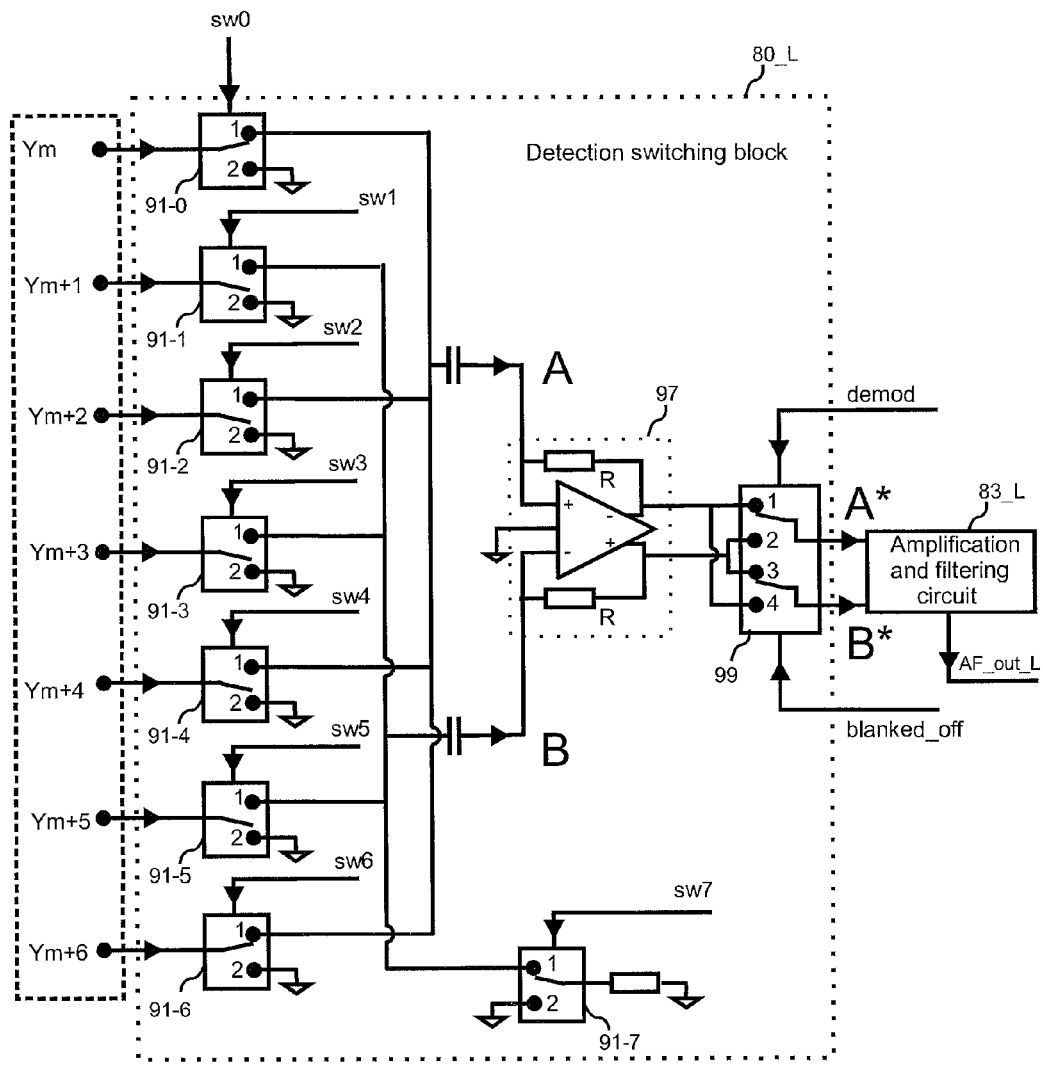
FIG. 56c is a block diagram illustrating switching circuitry used in an alternative embodiment to control the switching of signals obtained from pairs of detection conductors using a pair of dedicated analogue switches per detection conductor.
Figure 56D:
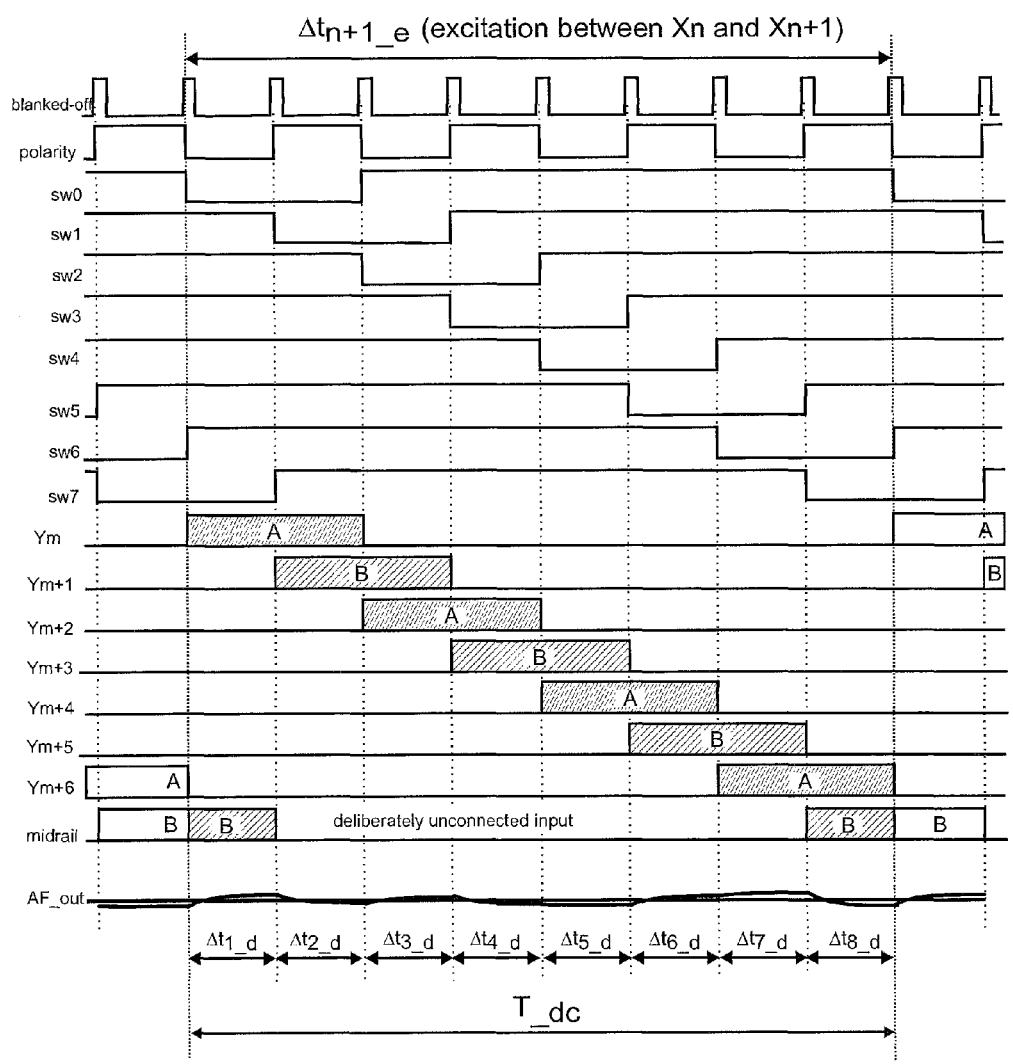
FIG. 56d is a timing diagram illustrating the way in which the signals from the detection conductors shown in FIG. 56c are switched through the switching circuitry.

An alternative embodiment for grounding the detection conductors is shown in FIG. 56c (a similar arrangement can be used to ground the excitation conductors). In this embodiment a dedicated pair of switches per detection conductor is used to connect the detection conductor either to the mid-rail voltage level or to the detection switching block amplifier 97 under the control of digital signals (sw0 to sw7). As shown in the timing diagram of FIG. 56d, the switching can be arranged to keep the same timing sequence as shown in previous Figures. However in this embodiment it is achieved using more digital control signals and twice the number of analogue multiplexors compared to the embodiments described above.

Figure 57A:
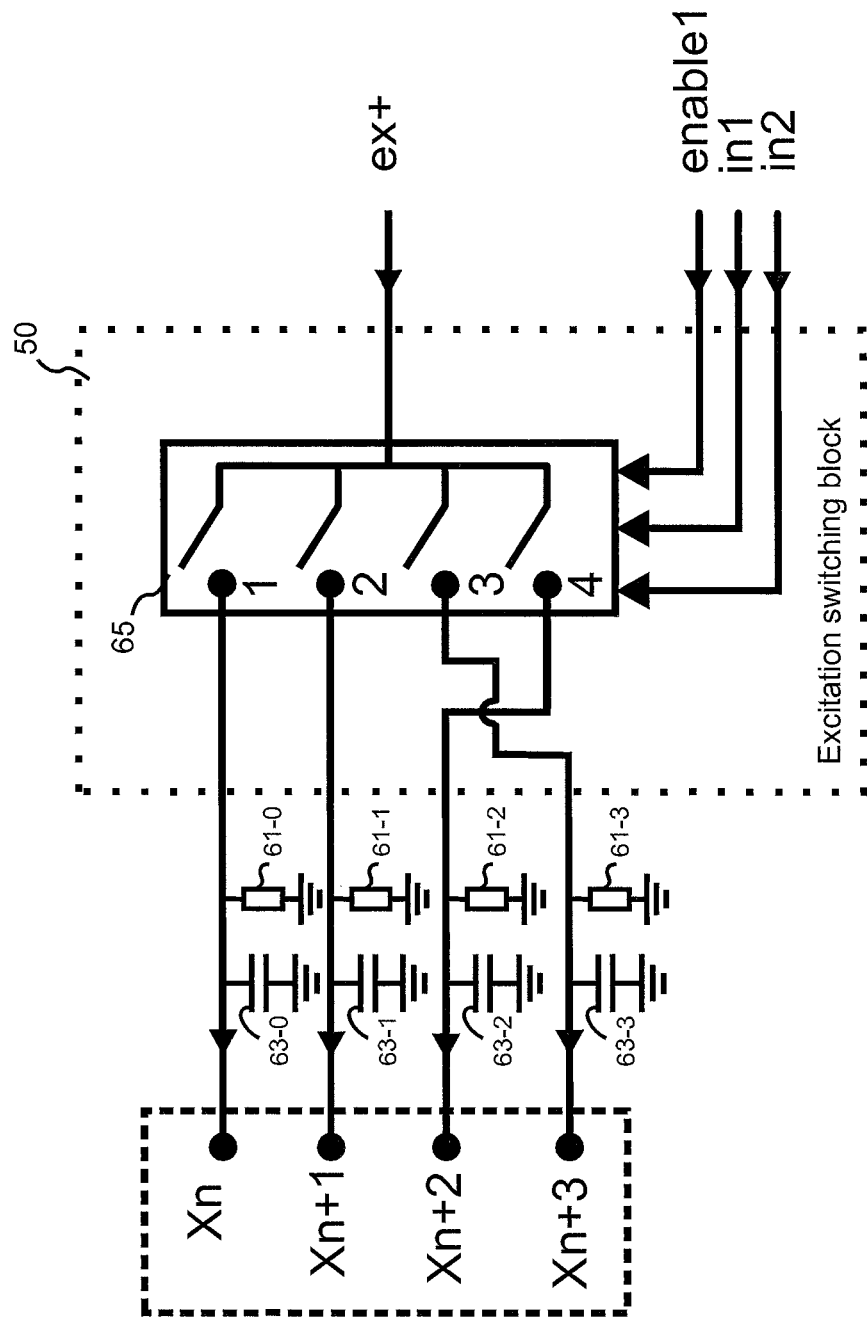
FIG. 57a is a diagram illustrating switching circuitry used in an embodiment where a single polarity of excitation signal is applied to a selected excitation conductor.

In the above embodiments, positive and negative excitation signals were applied to adjacent (or neighbouring) excitation conductors on the digitiser grid 3. As those skilled in the art will appreciate, this is not essential and a single polarity of excitation signal may be applied instead. The excitation circuitry used in such an embodiment is illustrated in FIG. 57a. In particular, FIG. 57a shows a single excitation signal (ex+) that is selectively applied to the detection conductors via the multiplexor 65.

Figure 57B:
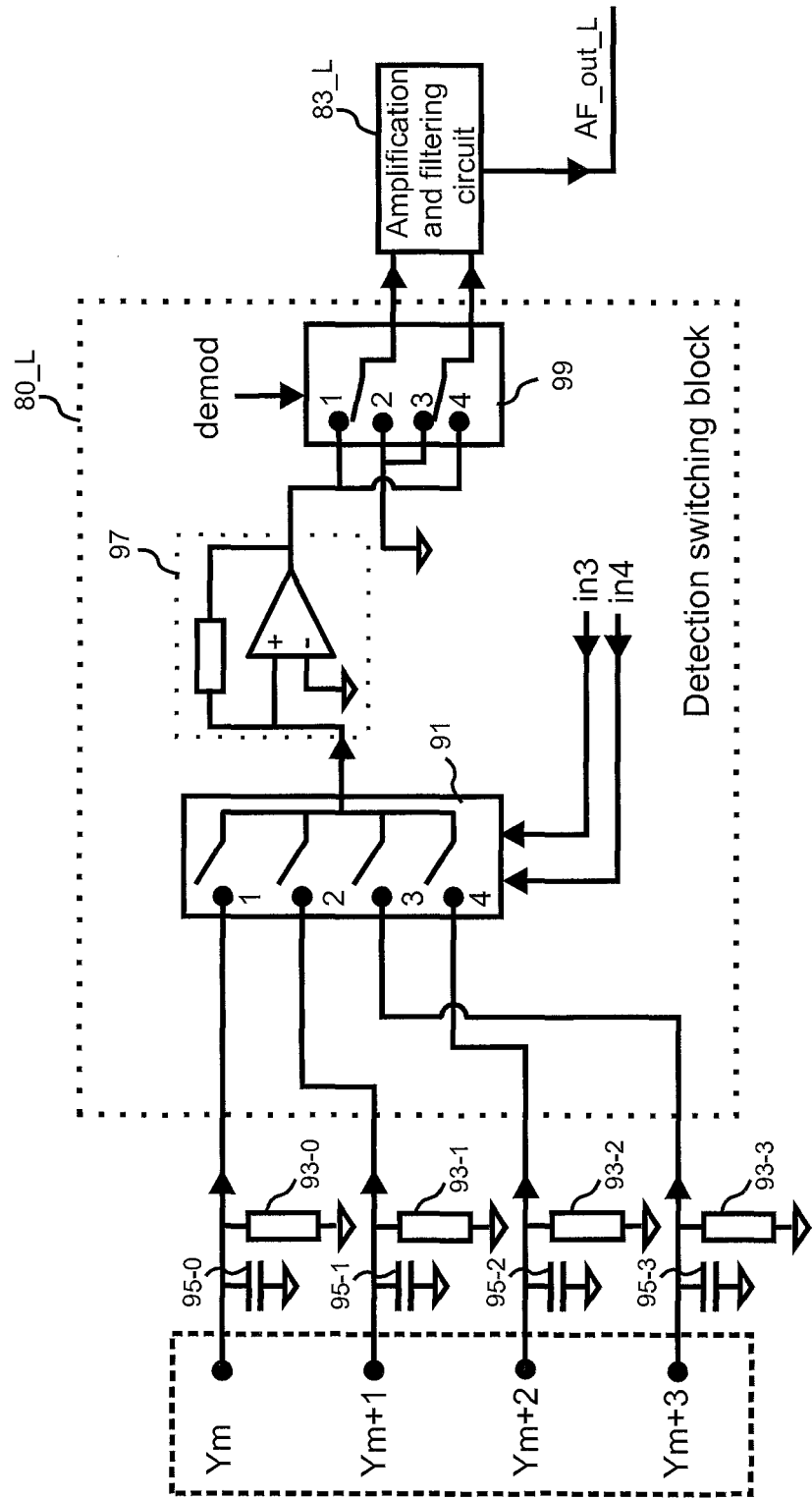
FIG. 57b is a block diagram illustrating an alternative form of switching circuitry used to switch the signals obtained from the detection conductors through to the amplification and filtering circuit.

In the above embodiments, the measurement channels were arranged to obtain measurements of the difference in signals obtained from adjacent (or neighbouring) detection conductors. As those skilled in the art will appreciate, this is not essential as the measurement electronics may measure the signal obtained from each detection conductor separately. FIG. 57b is a block diagram of a detection switching block 80 that may be used in such an embodiment. As shown, in this alternative, the detection switching block 80 includes one multiplexor 91 that selectively couples one of the four input detection conductors through to the differential amplifier 97 and the demodulating switch 99.

Figure 58A:
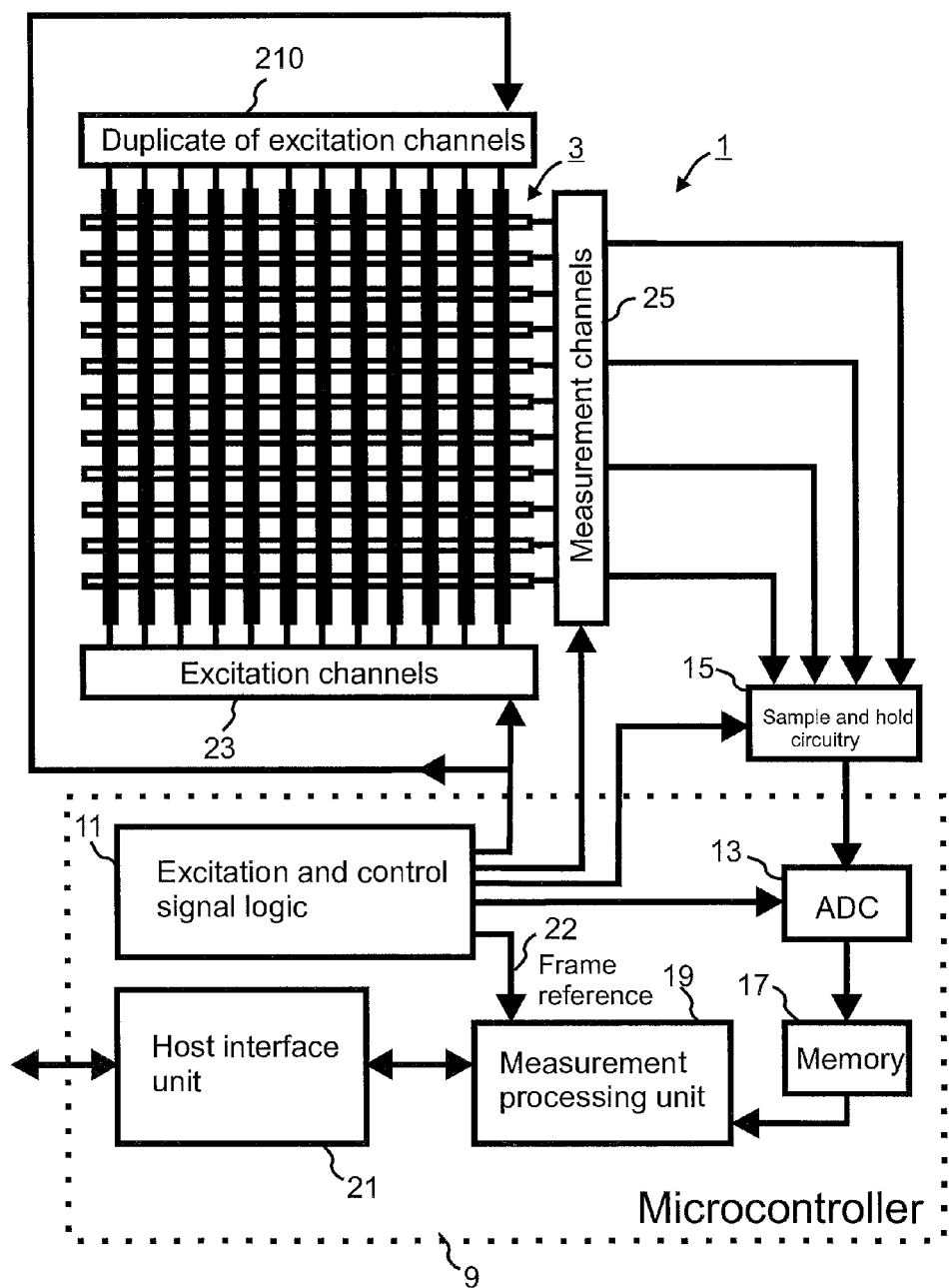
FIG. 58a is a block diagram illustrating an alternative form of excitation circuitry for the digitiser with excitation signal applied simultaneously at both ends of the selected excitation wire in order to reduce the capacitive crosstalk between adjacent excitation wires.

In the above embodiments, the digitiser 1 was arranged with excitation channels 23 connected only at one end of the grid 5. However, in other embodiments the same excitation channel circuitry may be connected to both ends of the excitation conductors 5 by using an additional set of electronics 210 to duplicate the excitation channels as shown in FIG. 58a. This way each excitation conductor 5 will be selected by the corresponding excitation blocks 50 belonging to excitation channels 210 and 23 simultaneously at both ends and additionally each excitation conductor 5 will be grounded at both ends via capacitors 63 as shown for each excitation block 50 in FIG. 5. In such an embodiment capacitive crosstalk between excitation conductors can be reduced by a factor ranging from two to four depending on the overall resistance of the excitation conductors. In the case of an ITO based system or very large diagonal size digitisers made with thin metallic wires, the resistance of the excitation conductors is high, the crosstalk between excitation conductors is usually quite large, and this embodiment will achieve a fourfold reduction in the crosstalk. The reduction in the crosstalk allows the use of a higher excitation frequency and thus allows an increase in the measurement speed of each detection switching block 80. This way, instead of using more electronic components for arranging extra detection switching blocks 80 and amplification and filtering blocks 83, more detection conductors can be multiplexed via the existing detection switching blocks 80. This can reduce the cost of the overall system as the cost of the analogue parts used in the detection circuitry (measurement channels 25) is substantially higher than the cost of the digital parts used in the excitation channel circuitry 210.

Figure 58B:
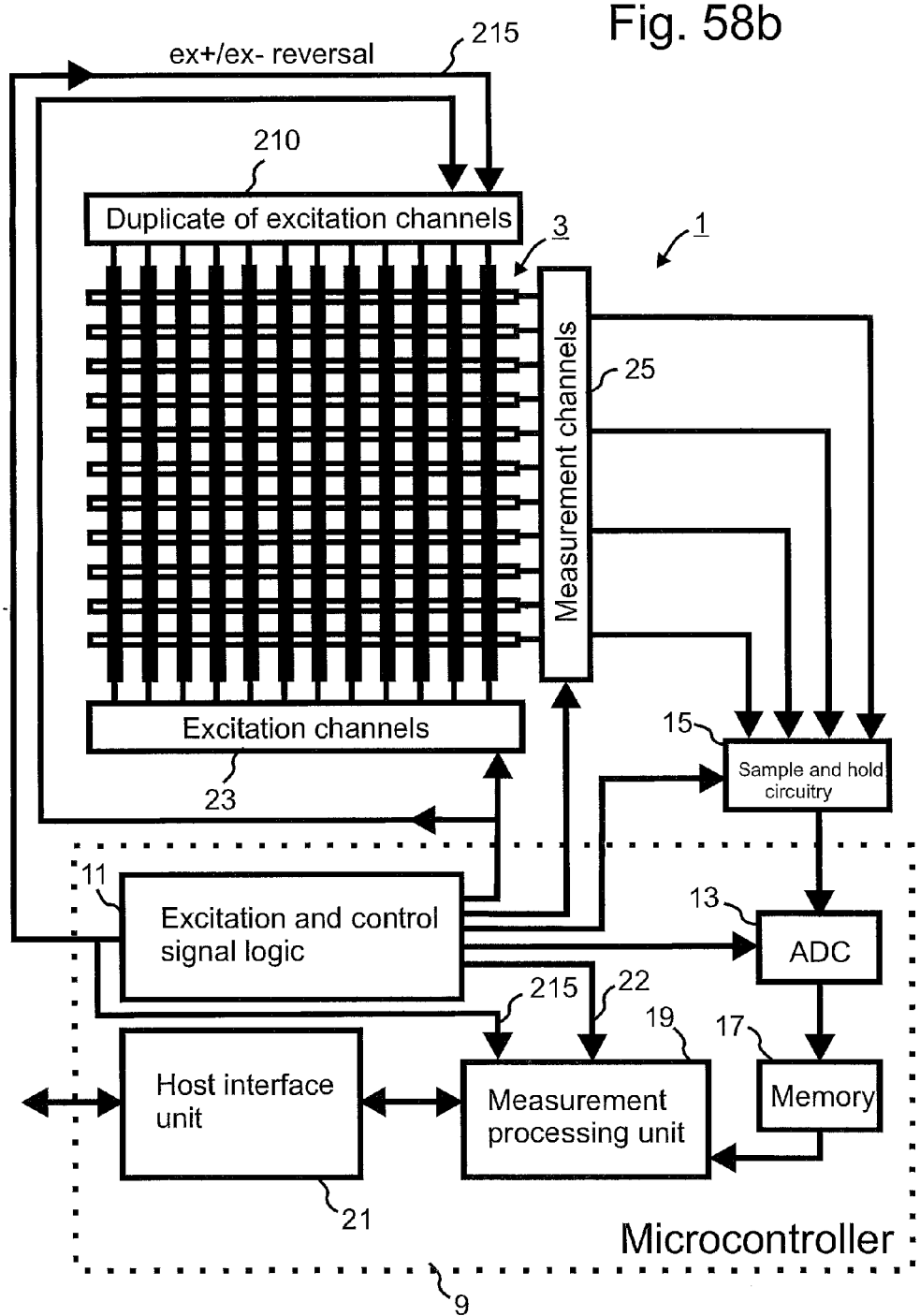
FIG. 58b is a block diagram illustrating an alternative form of digitiser that can detect the position of one or more user fingers using capacitive sensing techniques and that can detect one or more styli using inductive coupling techniques.

In the above embodiments, the digitiser 1 was arranged to detect objects that affect the mutual capacitance between the selected excitation and detection conductors. In an alternative embodiment, the digitiser 1 may also be arranged to detect resonant target objects that inductively couple with the conductors in the digitiser. Such a dual capacitive and inductive digitiser embodiment preferably operates where the detection intervals are shorter than the excitation intervals—i.e. where the excitation signals are fixed and the detection conductors are multiplexed through the detection switching blocks before the excitation conductors are changed and the multiplexing of the detection conductors starts again. In addition, the polarity modulation signal in this embodiment is preferably applied on the detection side (in the detection switching blocks 80) in the manner shown in FIG. 11, in order to avoid continuous perturbation to the phase of the excitation signals. This is because inductive resonant target based digitisers tend to require a relatively stable excitation signal to be applied to the excitation conductors in order to achieve a steady state level of energising an inductive resonant target with relatively high Q-factor located in the vicinity of the digitiser. Additionally, in order to function in this dual capacitive and inductive mode of operation, the excitation conductors need to be able to carry AC excitation current with which the inductive resonant target can couple via mutual inductance. FIG. 58*b* illustrates that this can be achieved by adding ex+/ex− reversal signal 215 to the electronics of the duplicate excitation channel 210. The ex+/ex− reversal signal 215 can be applied instead of the polarity modulation signal for the embodiment of the excitation channel circuitry 210 shown in the FIG. 31*a*.

In operation, after (or before) the measurement channels have selectively scanned the detection conductors through the measurement channels for capacitive sensing, the excitation and control signal logic 11 can configure the excitation and measurement channels 210, 23, and 25 to make the desired scanning of excitation/detection conductors for inductive sensing. Namely, during the first mode of operation the AC voltages at both ends of an excitation conductor selected simultaneously by the excitation circuitry 210 and 23 will have the same phase during the measurements of capacitive coupling at all cross-over points as described in the embodiment of FIG. 58*a*. No net current is carried by the excitation conductors selected by the excitation circuitry 210 and 23 during this first mode of operation. In the second mode of operation the polarity of ex+ and ex− signals is reversed in the excitation channels 210 using control signal 215. Such polarity reversal caused by the signal 215 is constant during the second mode of operation; the signal 215 is provided to the measurement processing unit 19 to inform the processing algorithm that the second mode of operation is selected during the present set of measurements. In this second mode of operation a positive AC voltage will be applied at one end of the first excitation conductor selected by the excitation circuitry 23 and a negative AC voltage is simultaneously applied at the opposite end of the same excitation conductor by the excitation circuitry 210. As a result, a significant AC current of the order of few mA will flow through the excitation conductor selected by the excitation channels 210 and 23. The amplitude of the AC current is determined mainly by the value of the resistance of the conductors 5 and only partially to its self inductance. In the case of using a thin metallic wire grid 3 the resistance of the excitation conductors varies from 100 Ohms to 400 Ohms depending on the size of the digitiser. Thus an AC current of the order of 10 mA can be applied to the excitation conductors without the need to use a large excitation AC voltage. The AC current in the second (adjacent) excitation conductor that is simultaneously selected by the circuitry 210 and 23 will be excited in the opposite polarity to the AC current excited in the first excitation conductor described above. This is the case because AC voltages applied at both ends of the second excitation conductor have opposite polarities to the ones applied to the first excitation conductor. Thus in the second mode of operation excitation conductors selected simultaneously by the circuitry 210 and 23 are used to generate an AC magnetic field in the vicinity of the excitation conductors. This AC magnetic field can couple to a resonant inductive target located near the selected conductors. As is well known, a resonant target energised in this way can be arranged to generate its own AC electric field which can then be sensed by measuring the AC electric current generated by the resonant target in the detection conductors. The resonant target may generate its AC electric field by applying an AC voltage between the outer surface of the stylus (capacitively coupled to the ground via the user palm) and an electrode at the tip of the resonant target; the AC voltage source may be powered directly by an inductor coil that inductively couples with the magnetic field generated by the selected excitation conductors or can be further amplified using power from an internal battery. The amplification circuitry inside the stylus can provide further active filtering of the external noise coupled to the resonant circuit outside of the excitation frequency pass band and can provide additional adjustment to the phase shift for the amplified AC voltage signal applied to the electrode at the tip of the stylus.

In order to save power, the internal battery can be disconnected from the amplification circuitry most of the time until the minimum level of AC voltage is developed in the resonant circuit due to the inductive coupling to the excitation channel of the digitiser or/and until the tip of the stylus is pushed against the surface of the digitiser to activate a pressure sensitive electronic switch. As those skilled in the art will appreciate, such an active stylus can have additional circuitry that transmits with a slow update rate of several Hz via an additional wireless channel (e.g. using short-wavelength radio or ultrasonic transmissions) additional information such as pressure applied to the tip of the stylus and even the orientation of the stylus if the stylus includes a built in accelerometer. Such additional information, combined with the location of the tip of the stylus provided by the measurement processing unit 19, can be used to correct the apparent position of the stylus (using angular data) and to emulate in software a true natural drawing experience achieved with the active stylus. The battery of the stylus can be recharged wirelessly in a cradle mounted at the edge of the digitiser using an inductive power link between the AC power source operating at the excitation frequency of the digitiser and the resonant inductive circuitry of the stylus.

An AC electric field energised in such a manner by the internal coil of the resonant target can be measured by the detection circuitry via an AC current generated in the detection conductors caused by the mutual capacitive coupling between the tip of the resonant target and the detection conductors.

As those skilled in the art will appreciate, the excitation signals ex+ and ex− can be applied to the excitation circuitry 210 and 23 during this second mode of operation in a PWM (Pulse Width Modulation) manner with short excitation intervals followed by short silent intervals during which no excitation signals are applied to the grid 3. Such PWM modulation can be implemented inside the excitation and control signal logic 11 or outside of the microcontroller by using periodic analogue or digital switching of the ex+ and ex− signal lines to the ground or Vcc level respectively during the silent intervals. The measurement of induced signals in such an embodiment is performed during time intervals when no excitation signal is applied to the excitation conductors 5. Such a new measurement mode during the silent intervals of the excitation signal can be facilitated by using the blanked off signal at the demodulation multiplexor as shown in the FIG. 56*a*. As known in the prior art, before starting the detection cycle in the second mode, it might be necessary to run the excitation signal sequence for some time to stabilise the level of the AC current induced in the resonant target. This allows all detection signals to be measured under similar conditions when the amount of energy received by the resonant target during the excitation interval is equal to the AC energy loss from the resonant target during the silence interval. Once detected, the way in which such signals relating to the inductive coupling should be processed by the measurement processing unit 19 will be familiar to those skilled in the art and a further description will not be given here.

In another embodiment of the inductive measurement cycle, the raw measurements can be taken during the time when excitation current is applied to the excitation conductors—thus removing the need to have silent intervals and allowing for increased measurement speed. The unwanted contribution due to the capacitive coupling of objects other than the inductively coupled stylus (such as the user's arm or fingers) can be removed by the measurement processing unit 19. For example, the matrix $W_{capacitive}$ may be calculated during step s-05 for the capacitive measurement mode and the matrix $W_{inductive}$ may be calculated during step s-05 for the inductive measurement mode. The values in matrix $W_{inductive}$ can then be further corrected to reduce the effect of objects other than the inductive object of interest using the matrix $W_{capacitive}$. However, it is not a simple matter of subtracting the values in $W_{capacitive}$ capacitive from the values in $W_{inductive}$ as the cross-over points across the grid 3 are subject to different voltages in the inductive mode. For example, a maximum positive voltage is applied to the cross-over points at one end of the grid; and a maximum negative voltage is applied to the cross-over points at the opposite end of the grid and with approximately zero voltage being applied to the cross-over points in the middle of the grid. Therefore, the values in $W_{capacitive}$ capacitive should be weighted based on a prediction of the AC voltage level applied at the corresponding crossover point during the inductive measurement cycle. If it is assumed that the voltage along an excitation conductor changes linearly from one end to the other, then the corrected matrix for the inductive measurements ($W_{inductive}^{corr}$) can be calculated as follows:

$$w_{inductive}^{corr}{}_{i,j} = w_{inductive\_i,j} - \xi \ast (i - \text{maxi}/2) \ast w_{capacitive\_i,j}$$

Where coefficient $\xi$ is a constant that is close to one; and is used to take into account a ratio between the maximum voltage applied to the end of the excitation conductor during the inductive measurement mode and the voltage applied to the excitation conductor during the capacitive measurement mode. By combining the capacitive measurements and the inductive measurements in this way, the touch event caused by the inductive stylus (or other inductive object) can be isolated from other touch events (such as are caused by the user's hand or fingers etc).

In the above embodiments, missing excitation conductors or non-connected inputs to the measurement channels were used to reduce the bandwidth requirements of the amplification and filtering circuitry. A similar effect can be achieved without these "missing connections" by controlling the multiplexors using modified control signals—that achieves the same switching timings approach with reduced low frequency harmonics in the received signals as illustrated in the Figures. As one example, this can be achieved by simply increasing the length of the excitation cycle T_ec shown in FIG. 8 by one excitation interval Δt_e (see FIG. 9) in order to align the falling edge of the signal enable1_0 with the rising edge of the signal enable1_shifted_Mmax. As will be apparent from the timing diagram of FIG. 9, this modification to the control signals will shift the timing diagram for the conductors X0, X1, X2, etc. selected during the consecutive excitation cycle by one excitation interval and thus will allow activation of the conductor Xmax with the excitation signal. However, such an embodiment is not preferred as it also requires a change of the phases of the control signals in1, in2, in1_shifted, and in2_shifted at the start of each excitation cycle T_ec, which requires more complex control signal logic that uses more PWM signals, digital switches and logic gates to form the desired control signals. As a compromise, the excitation cycle can be extended by a multiple of eight excitation intervals thus keeping signals in1, in2, in1_shifted, and in2_shifted as free running clock signals without the need to adjust their phases. In such an embodiment the excitation cycle T_ec might even become much longer than the corresponding detection interval Δt_d (see FIG. 8). Such an embodiment can be useful when the grid of conductors 3 is integrated within the structure of the LCD screen itself. In particular, when the grid 3 is integrated with an LCD display, this usually results in an increased level of switching noise picked up by the detection conductors of the digitiser due to the LCD drive signals used to drive the LCD display. Adding in such additional excitation intervals allows for a time division multiplexing between the digitiser electronics and the electronics of the LCD screen. For instance, by doubling the length of the excitation cycle T_ec and keeping the same length for the detection interval Δt_d it is possible to keep the first half of the excitation cycle for the measurements of the signals from the digitiser, and the second half of the excitation cycle T_ec can be used to switch signals that control the operation of the LCD screen. In such embodiment, a control signal i7 shown in the embodiment of the sample and hold circuitry 15 of FIGS. 36 and 37 can be used to disable the ADC controller during the second half of the excitation cycle T_ec.

In the above embodiments, signals delay1 and delay2 were used in the delay line circuit 55 to control the timing of the enable signals provided to various switching blocks 50. The frequency and the phase of such delay1 and delay2 signals are similar to those of the in1 and in1_shifted signals. Thus it is possible to implement the desired switching algorithm without generating a dedicated pair of signals delay1 and delay2. Instead it is possible to use signals in1 and in1_shifted both for controlling the excitation switching blocks 50 and the delay line circuits 55.

In the above embodiments, all steps s1 to s19 of the measurement processing algorithm of FIG. 19a were implemented inside the microcontroller 9. However all or some of the calculation steps from s5 to s23 can be moved into the host controller instead. The exact results of the processing of the raw data do not influence the measurement process and so can be implemented elsewhere in the computer control system.

In the above embodiments, sample and hold circuitry 15 was used to facilitate the measurement of the signal level in different measurement channels at the same moment in time. An alternative approach will now be described with reference to FIG. 59a. In this embodiment, new dedicated delay circuitry 14 is introduced in order to control the timing of the different measurement channels with a view to generate signal forms AF_out with exact phases shifted between consecutive amplification and filtering circuits 83. The shifted phase approach explained below allows to multiplex analogue signals AF_out_L consecutively using a simple analogue switch 16 instead of the more complex sample and hold circuitry 15 of the main embodiment described above. In order to introduce the possibility for the phase shift in the synthesised signals AF_out, an extra enable signal enb2 is introduce to control the multiplexors 91 as shown in FIG. 59b. In this embodiment enb2 signal is pushed to a high level at the end of each active detection cycle in order to create an extra detection interval (Δt$_9$_d shown in FIG. 59c). The input multiplexors 91 are disconnected from the grid 7 during this new detection interval and thus a zero differential value is measured during this interval regardless of the excitation signals applied at the excitation channels. This extra detection interval $\Delta t_9\_d$ allows the introduction of a de-phasing between the edges of the detection cycle T_*dc* shown in FIG. 59*c* and the excitation window $\Delta t_{n+1}\_e$ shown in the same Figure. In this example the switching of one of the excitation conductors in the excitation pair occurs during the detection interval $\Delta t_9\_d$ of the current detection cycle and detection interval $\Delta t_9\_d$ of the previous detection cycle. The exact phase of the synthesised signal $\Delta F\_out$ depends on the phase of seven control signals like polarity, in3, in4, in3_shifted, in4_shifted, enb2, and blanked-off (not shown). These signals can be shifted from one detection switching block 80_*k* to the next detection switching block 80_*k*+1 using latches in a manner similar to that used for phase shifting the enable signals applied to the excitation switching blocks using the circuitry shown in FIGS. 6 and 7. For example, FIG. 59*d* shows an arrangement for using latches 77 to delay the polarity control signal between adjacent detection switching blocks 80. In this example two already generated signals—ex_clock_shifted and ex_clock (used in the excitation channels) with dissimilar phases are used to shift the polarity control signal by one period of the excitation cycle at each delay block 14_*m*. All other control signals should be taken through similar delay blocks to achieve synchronous delay for all control signals for the same detection switching block 80 except the signal ex_clock_shifted. A typical ADC can perform the analogue to digital conversion of the input signal during one period of the excitation signal. Thus the approach described above will allow measurement of consecutively different analogue outputs AF_out via the same ADC channel without the need for the sample and hold circuitry 15. For digitisers working at low excitation frequencies a new pair of signals delay3 and delay4 can be used to take the role of signals exc_clock_shifted and ex_clock used in the latches shown in FIG. 59*d*.

Figure 59A:
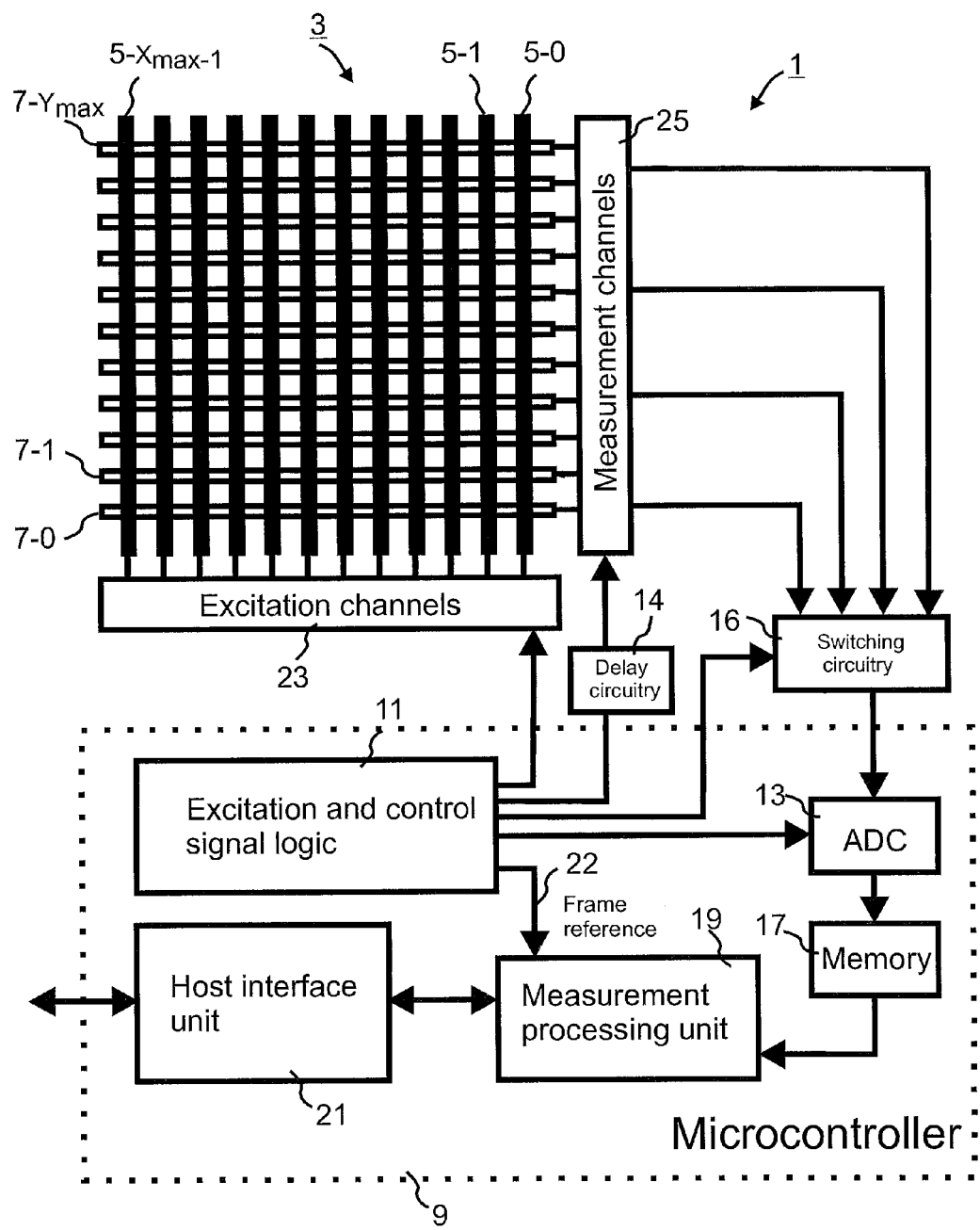
FIG. 59a is a block diagram illustrating an alternative form of digitiser that can detect multiple analogue signals AF_out without using dedicated sample and hold circuitry 15.
Figure 59B:
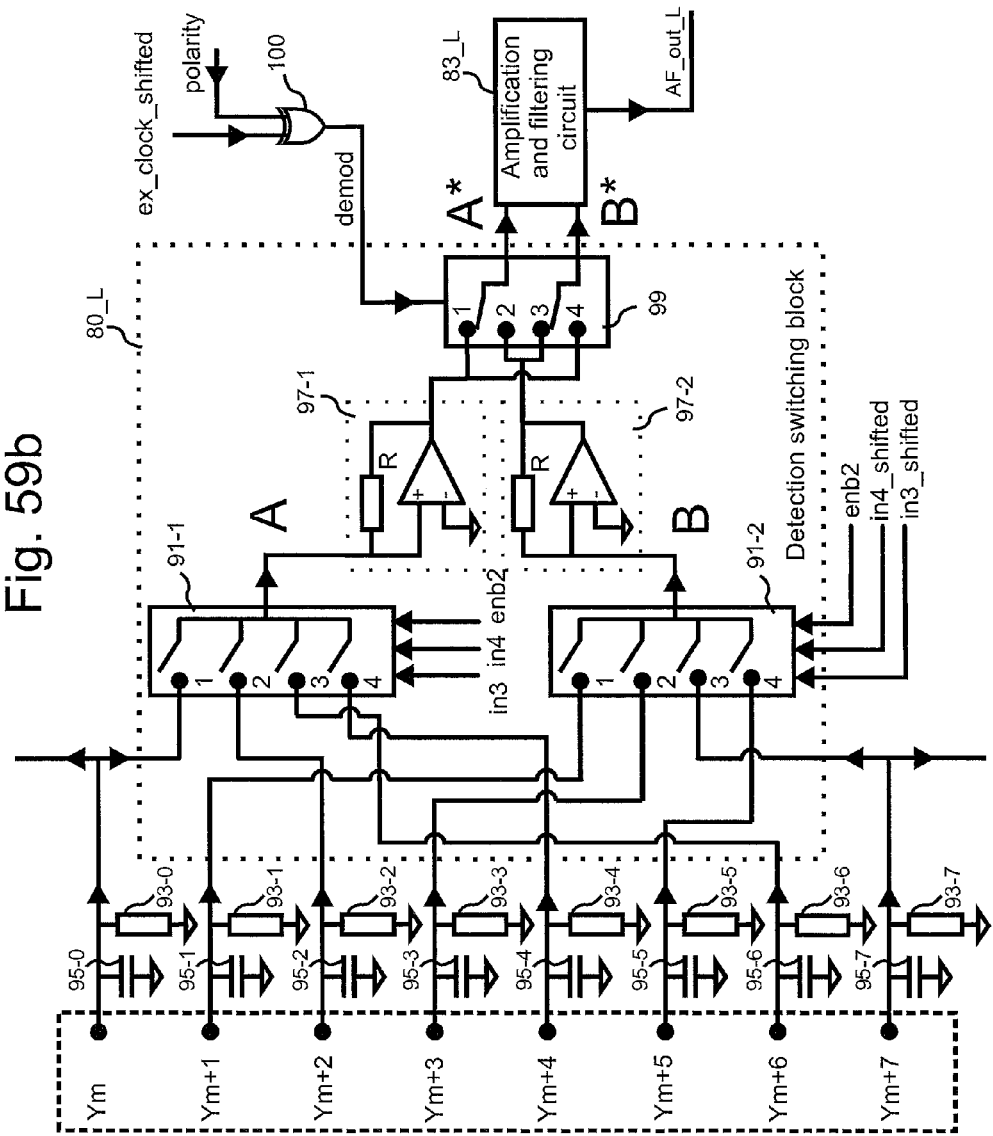
FIG. 59b is a block diagram illustrating the usage of the new enable signal controlling multiplexors 91 of the detection switching block 80.
Figure 59D:
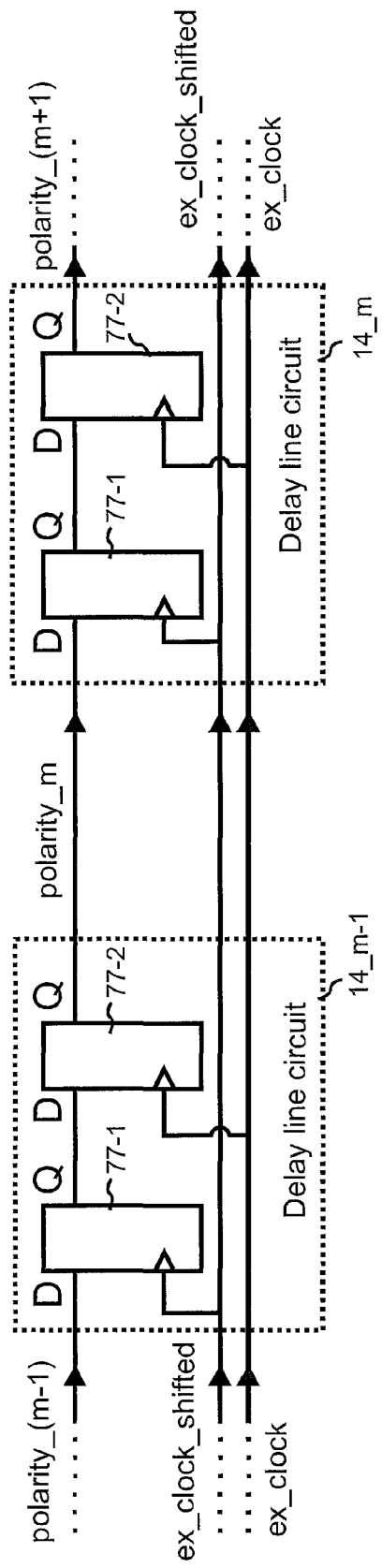
FIG. 59d schematically illustrates a delay line used to generate a sequence of delayed polarity signals used to control the multiplexors 99 shown in FIG. 59b.

However, one disadvantage of the embodiment of FIG. 59*a* is that the update rate is slightly reduced due to the introduction of the extra detection interval $\Delta t_9\_d$. In addition the exact order of switching of the detection conductors at the boundary of the detection cycle is modified between adjacent detection cycles. For instance, the detection cycle shown in FIG. 59*c* begins with the detection pair $Y_m$ and $Y_{m+7}$. The next detection cycle will start from detection conductor pair $Y_m$ and $Y_{m+1}$ which have been selected during the detection window $\Delta t_2\_d$ in the current detection cycle. Consequently the next detection cycle will be finished by measuring at interval $\Delta t_8\_d$ the detection conductor pair $Y_m$ and $Y_{m+7}$ which have been selected during the detection window $\Delta t_1\_d$ in the current detection cycle. Such shift will be repeated cyclically at each consecutive detection cycle. However, these changes to the detection sequences can be taken into account in the software.

In the above embodiments, the signal to noise ratio can be improved via increasing the excitation power—for instance by increasing the amplitude of the excitation voltage from 3V to 12V and/or by increasing the excitation frequency. Alternatively it is possible to increase the amount of filtering in the amplification and filtering circuitry 83 by reducing the high frequency corner of the band pass filter; although this approach also requires a reduction in the frequency of the polarity control signal in order to allow the measurement signals to rise to the quasi-stationary level before they are sampled by the sample and hold circuitry 15. In order to compensate for a reduced measurement rate caused by a reduced polarity control signal frequency, it might be necessary to decrease the number of detection conductors multiplexed via the same detection switching block 80 and thus to increase the number of the detection switching blocks 80 and amplification and filtering circuitries 83. In order to save the cost of electronics required for such extra detection switching blocks 80, it is possible to run measurements using several excitation sources having different frequencies to achieve parallel scanning of the excitation conductors 3. In the above embodiments the excitation frequency was always a multiple of the frequency of the polarity control signal. The same relationship between excitation frequency and polarity control signal frequency should be maintained if using multiple excitation frequencies.

A practical example discussed below relates to a measurement system using two separate excitation sources with different frequencies. With reference to FIG. 4, the first half of the excitation switching blocks 50 are connected to the first excitation source having a first excitation frequency and the second half of the excitation switching blocks 50 are connected to the second excitation source having a second excitation frequency. Each of the two halves of the excitation channels created this way are treated as fully separate excitation grids and are run in parallel using the same control signal enable1_0 (shown in FIG. 8) which is separately delayed in the delay circuitries 55 of each of two halves of the excitation channels. This way two parallel scanning sequences are launched via each of two halves of the array of excitation conductors 3; with one scanning sequence in the first half of the array connected to the first excitation source and another scanning sequence (localised in the second half of the excitation grid) connected to the second excitation source. Each excitation scanning sequence will make a full cycle during the excitation period T_ec, but with each scan covering only half of the grid the update rate of the system is increased two times.

At the detection switching blocks 80 shown in FIG. 11 the measurements acquired by the differential amplifiers 97-1 and 97-2 will contain signals related to the two pairs of excitation conductors. One pair of excitation conductors (from the first half of the excitation grid) is excited at the first frequency and the other pair of excitation conductors (from the second half of the excitation grid) is excited at the second excitation frequency. In such an embodiment the signals from the amplifiers 97-1 and 97-2 should be taken into two separate demodulators 99. The first demodulator 99-1 is designed to demodulate (and polarity modulate) at the first excitation frequency and the second demodulator 99-2 is designed to demodulate (and polarity modulate) at the second excitation frequency. The two signals demodulated at either demodulator are then passed through separate amplification and filtering circuits 83 and are measured as two separate signals by the ADC 13. In such an embodiment, an unwanted signal, with a frequency equal to the difference between the first excitation frequency and the second excitation frequency (hereafter referred to as the differential frequency), will be created by the demodulators 99; but it can be efficiently filtered if this differential frequency is at least several times larger (preferably at least three times larger) compared to the high frequency corner of the amplification and filtering circuitry 83. In practical terms this means that the differential frequency should be at least eight times larger than the frequency of the sample switch control signal (shown in FIG. 17*a*) (or the polarity control signal if one is used) and can be for instance achieved by making the first excitation frequency equal to 32 times the frequency of the sample switch control signal and by making the second excitation frequency equal to 40 times the frequency of the sample switch control signal. For example, when the differential frequency is equal to eight times the frequency of the sample switch control signal, the reduction might be about 1:600 and thus there will be no or substantially no detectable crosstalk between simultaneous measurements undertaken with the two dissimilar excitation frequencies applied to the different parts of the grid. However, when the differential frequency is equal to four times the frequency of the sample switch control signal (which can be achieved, for example, by setting the first excitation frequency to be twenty times the frequency of the sample switch control signal and the second excitation frequency to be 16 times (or 24 times) the frequency of the sample switch control signal), the reduction of the unwanted signal at the differential frequency by the filtering circuitry 83 might be about 1:16 and this is not enough to prevent significant crosstalk between simultaneous measurements with two dissimilar excitation frequencies being introduced into the measured signals. In this case, additional measures (described below) can be taken to reduce the crosstalk interference caused by this unwanted signal.

In the case where the differential frequency is equal to an odd multiple of the frequency of the sample switch control signal and the polarity control signal is present, a non-zero DC contribution caused by the unwanted signal will be passed through the sample and hold circuitry 15. This is because during each half period of the sample switch control signal, an odd number of half periods of the unwanted signal will be applied to the DC blocking capacitors of the amplification and filtering circuitry 83 thus introducing a certain net charge in the DC blocking capacitors. When no polarity control signal is being used, this net charge will be fully compensated during the next half period of the sample switch signal because the charge will have opposite polarity. However, when the polarity control signal is used to reverse the polarity of all signals passed through the amplification and filtering circuitry 83 during each half period of the sample switch control signal, the charge applied to the DC blocking capacitors during one half period of the sample switch control signal will have the same polarity as the charge applied during the previous (and next) half period of the sample switch signal. Thus instead of exact compensation of the charge injection in the DC blocking capacitors a substantial accumulation of overall charge can happen which will result in unwanted DC transients passing through the amplification and filtering circuitry 83 to the sampling circuitry 15. However, if the differential frequency is an even multiple of the frequency of the sample switch control signal, then, the polarity of the charge injected in the DC blocking capacitors in the amplification and filtering circuitry 83 will be the same in all sample switch half periods. Consequently, if the polarity control signal is being used then the same charge injection will have opposite polarity in adjacent half periods of the sample switch control signal. Thus the total charge injected into the DC blocking capacitors will be fully compensated during each period of the sample switch signal if the differential frequency is equal to an even multiple of the frequency of the sample switch control signal and if the polarity control signal is used (on the excitation side or on the detection side).

If the sample switch control signal is phase aligned with the unwanted signal at the differential frequency so that the switching points of the sample switch control signal correspond to when the unwanted signal passes through zero, then the effect of the unwanted signal in the measurements obtained by the sample and hold circuitry 15 can be significantly reduced—and this is possible when the phase of the unwanted signal is approximately 90° shifted from the phase of the desired signal output from the amplification and filtering circuitry 83. The exact phase of the unwanted signal at the differential frequency that is output by the amplification and filtering circuitry 83 (and thus the phase difference between it and the phase of the desired signal) will depend on the design of the amplification and filtering circuitry 83 and the frequency difference between the two signals. Therefore, for some differential frequencies it is possible to achieve the desired phase alignment, whilst for others it will not be.

Where this phase alignment can be achieved, the outputs obtained by digitizing the analogue signals from the output of the amplification and filtering circuits 83 with the ADC controller 13, will contain very little crosstalk between the two different excitation sources. For example, the inventor has found that by making the first excitation frequency equal to ten times the frequency of the sample switch control signal and by making the second excitation frequency equal to eight times (or alternatively twelve times) the frequency of the sample switch control signal, it is possible using this phase alignment approach to isolate the signals from the first half of the excitation channels (excited at the first excitation frequency) from the signals from the second half of the excitation channels (excited at the second excitation frequency). The degree of such isolation depends only on the reproducibility of the phase shift for the signals passed via different amplification and filtering circuits 83 and is limited to about 1:80 in a practical design. This acceptable isolation of two measurement channels is achieved in spite of the fact that the differential frequency is located near the high frequency corner of the pass band of the amplification and filtering circuitry 83 and thus the amplitude of the unwanted signal output from the filtering circuitry 83 might still be comparable to the amplitude of the desired signal.

Alternatively, instead of trying to design the filters to align the phase of the unwanted signal in the above manner, the amplification and filtering circuitry 83 can be modified to use an integrator stage at the front end with the integration time set to be equal to half the period of the sample switch control signal. The integrators would integrate out the unwanted signal as long as the differential frequency is an even multiple of the frequency of the sample switch control signal.

If it is not possible to design the amplification and filtering circuitry 83 to achieve the desired phase alignment, then removal of the unwanted signal can still be achieved by suitable processing of the measurements in the measurement and processing unit 19, to remove the unwanted crosstalk interference caused by the unwanted signal. This can be done due to the stable phase relationship between the unwanted signal and the sample switch signal. For example, this crosstalk can be reduced by subtracting from the measurement matrix ($V_{ij}^I$) obtained for the measurement channels demodulated at the first excitation frequency a weighted measurement matrix ($V_{ij}^{II}$) obtained for the measurement channels demodulated at the second excitation frequency, and vice versa:

$$v_{ij\ corrected}^{I} = v_{ij}^{I} - \sigma \ast v_{ij}^{II}$$

$$v_{ij\ corrected}^{II} = (v_{ij}^{II} - \sigma \ast v_{ij}^{I}) \ast f^I/f^{II}$$

where components $v_{ij}^I$ and $v_{ij}^{II}$ are related to signals from the same pair of detection conductors originated from the same detection switching block 80 but demodulated with demodulator 99-1 and demodulator 99-2 respectively, and where coefficient σ is related to the parameters of the amplification and filtering circuitry 83 and may be found through calculation or experimentation to find the optimum value. The matrix $V_{ij}^{II}$ related to the measurement channels demodulated at the second excitation frequency is further normalized via the coefficient $f^I/f^{II}$ in order to take into account the change of the amplitude response of the capacitive coupling between excitation and detection conductors with the value of the excitation frequency.

If desired, the same value of the coefficient σ can be applied to all corrections, but in practice since each measurement channel will have slightly different frequency characteristics due to the tolerance of passive and active components, the optimum value for the coefficient σ might vary between amplification and filtering circuits 83. The inventor has found that this numerical compensation can provide reliable isolation of the different measurement channels of the order of 1:200 for a differential frequency equal to four times the frequency of the sample switch control signal.

By using two separate excitation frequencies for each of the two halves of the excitation channels, the above embodiment allows the frequency of the sample switch control signal to be halved and the high frequency corner of the band-pass filter reduced two times while maintaining the same update rate as before. The number of amplification and filtering blocks 83 and the number of signal channels measured by the ADC 13 is doubled however without increasing the number of the required detection switching blocks 80. This saves the cost of extra amplifiers 97-1 and 97-2 and reduces the complexity of the layout of the PCB.

In the above alternatives two different excitation sources were used simultaneously. However it is also possible to increase the number of such separate excitation sources. For instance it is possible to use the first excitation frequency equal to 44 times the frequency of the sample switch control signal, the second excitation frequency equal to 40 times the frequency of the sample switch control signal, the third excitation frequency equal to 36 times the frequency of the sample switch control signal, and the fourth excitation frequency equal to 32 times the frequency of the sample switch control signal. In this case, four different demodulators 99-1, 99-2, 99-3, and 99-4 would be connected to the output of the same differential amplifiers 97-1 and 97-2 inside the same detection switching block 80 in order to provide demodulation (and if required polarity modulation) at four dissimilar excitation frequencies. The output from these four demodulators would then be connected to four dissimilar amplification and filtering circuits 83. Any crosstalk between the signals measured from the four different channels derived simultaneously from the same pair of detection conductors 7 can then be reduced via the following correction procedure:

$$v_{ij}^{I}{}_{corrected} = v_{ij}^{I} - \sigma * v_{ij}^{II}$$

$$v_{ij}^{II}{}_{corrected} = (v_{ij}^{II} - \sigma * v_{ij}^{I} - \sigma * v_{ij}^{III}) * f^I/f^{II}$$

$$v_{ij}^{III}{}_{corrected} = (v_{ij}^{III} - \sigma * v_{ij}^{II} - \sigma * v_{ij}^{IV}) * f^I/f^{III}$$

$$v_{ij}^{IV}{}_{corrected} = (v_{ij}^{IV} - \sigma * v_{ij}^{III}) * f^I/f^{IV}$$

Also, in this example, the excitation grid can be divided into four consecutive separate blocks of equal length with each block served by its own and dissimilar excitation frequency source. In order to reduce capacitive crosstalk between adjacent detection conductors it might be advantageous to arrange the lowest excitation frequency source to serve the furthest block of the excitation grid 5 with regard to the position of the detection switching blocks 80; and the highest excitation frequency source to serve the closest block of the excitation grid 5. Alternatively each excitation conductor can be wired to one of the four different excitation sources and different excitation conductors connected to different excitation sources interposed between adjacent excitation conductors connected to the same excitation source, so that each fixed frequency excitation channel covers the whole length of the excitation grid 5 but with only one quarter of the excitation conductors included in it.

In a different embodiment two (or more) excitation sources can be connected using extra multiplexors located at each input of the excitation switching blocks in a way so that each excitation source is utilised for scanning the whole length of the excitation grid during one excitation cycle. In such an embodiment a first set of excitation conductors that will be energised by the first excitation source should be shifted by half of the period of the excitation cycle from the second set of excitation conductors that will be energised by the second excitation source so that two scanning sequences from both excitation sources can co-exist on the grid during the same excitation cycle. Such an embodiment is specifically useful for the case when the first excitation frequency corresponds to the resonant frequency of the inductive stylus described above with a reference to FIG. 58*b*. As will be apparent from the previous discussion, the polarity of the excitation signal applied by the first excitation source to the first end of the selected excitation conductor should be opposite to the polarity of the excitation signal applied to the second end of the same excitation conductor. The second excitation frequency of the second excitation source will have its frequency outside of the resonance response of the inductive stylus and is used to measure conductive objects like fingers or conductive stylus using capacitive coupling of such objects to the grid of the digitiser. Such dual mode of operation is very similar to the embodiment described in FIG. 58*b* with the only difference that the measurements related to the first (inductive) and second (capacitive) mode of operations are taken now simultaneously via the same detection switching blocks but via a different pair of amplification and filtering circuits connected to two dissimilar demodulators 99.

Method of Manufacture of Thin Wire Digitiser

It is well known in the prior art to manufacture digitisers using transparent ITO conductors. The typical resistivity of the ITO conductors is of the order of several hundred ohms per centimetre. This restricts the utility of ITO technology to small diagonal sizes only. For large diagonal size digitisers the resistance of ITO traces becomes comparable to the mutual impedance caused by capacitive coupling between the adjacent lines even at very low measurement frequencies of a few tens of kHz.

Figure 60A:
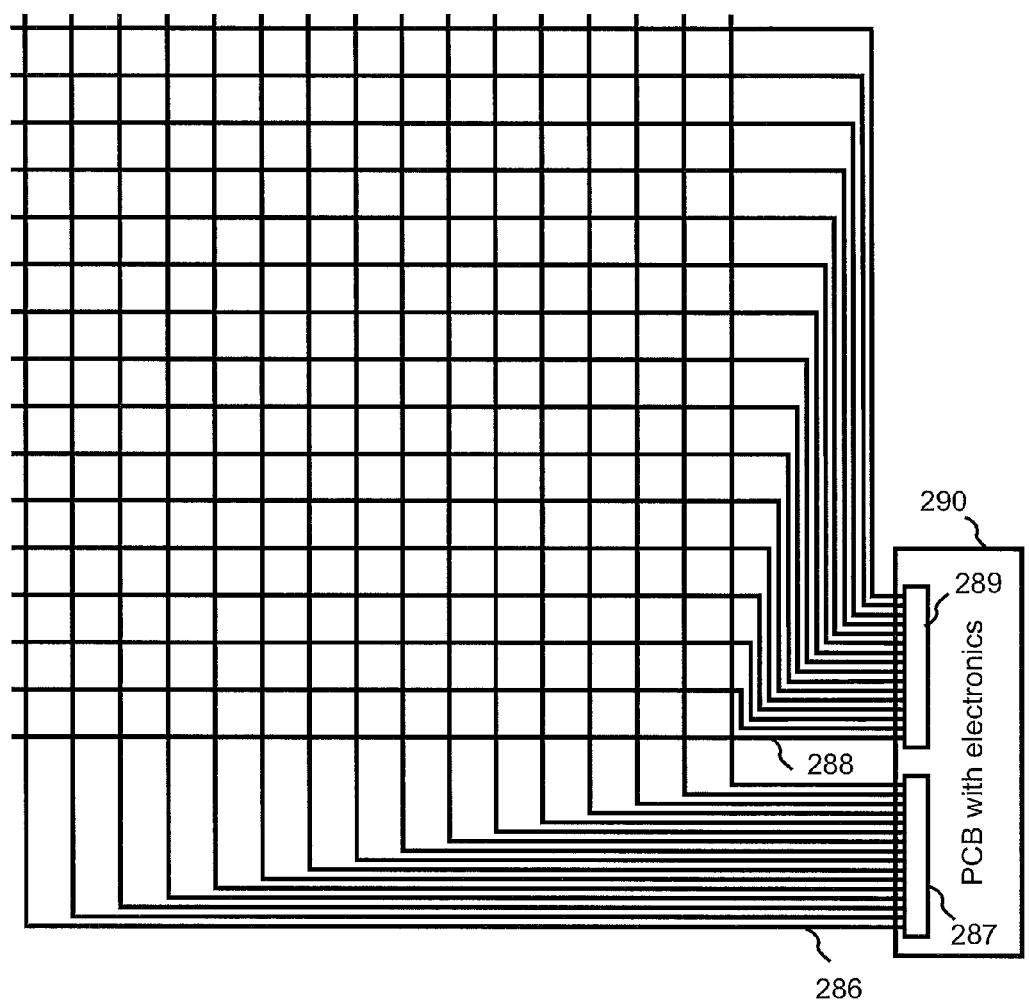
FIG. 60a is a physical arrangement known from the prior-art for integrating sensing X-Y wire grid with an electronics unit.

It is known in the prior art to make the conductors of X-Y digitisers using thin copper wires with a diameter of about 10 microns for designing digitisers with diagonal size above 30" and up to 100", although existing technical solutions are not yet appropriate for cheap mass production. FIG. 60*a* shows a typical physical arrangement for the sensing wires used in the currently available commercial digitisers based on using thin copper wires. The plurality of thin copper wires forming the X-Y grid are typically laminated between two thin sheets of plastic and can be further laminated to the glass screen or between two sheets of glass. The virtual flat cables 288 and 286 are arranged by routing thin wires to the same region of the plastic sheet where the sensing wires are terminated on a flexible PCB (Printed Circuit Board). The flexible PCB flat cables 288 and 286 are in turn connected to a rigid PCB 290 with the measurement electronics via a standard ZIF connector 289 and 287. The cost of routing all thin copper wires in order to form the virtual flat cable 286 and 288 and the extra cost of terminating each individual wire on the rigid PCB 290 forms a major part of the cost of the total build. As a compromise, all available commercial providers are forced to use about 20 mm separation between adjacent wires for large diagonal digitisers—which reduces the number of required individual electrical terminations. Such a large separation between adjacent conductors in the X-Y grid restricts the achievable accuracy of the commercially available copper wire based digitisers to about 5 mm for measuring the exact location of a finger or a conductive stylus. It is highly desirable to reduce the separation between adjacent wires in the X-Y grid to about five to six millimetres in order to provide an improved accuracy and thus an improved user experience, especially when using a conductive stylus for drawing applications. However a fourfold increase in the required wiring density cannot be achieved economically without the development of radically new and cheaper methods for interconnecting the wire grid and the sensing electronics.

Another disadvantage of the common geometry of the sensing grid shown in FIG. 60a is related to the increased length of wires, especially for wires which are close to the corners of the screen. As discussed above, the mutual capacitance between adjacent conductors imposes a major limitation for the excitation frequency which can be used to measure signals from the X-Y digitiser. With thin copper wires this limitation becomes important with diagonal sizes above 40" (100 cm) and is indeed a major limiting factor with diagonal sizes of about 80" (200 cm). The inventor has realised, therefore, that it is highly desirable to use a concept of distributed electronics arranged around the periphery of the digitiser in order to shorten the active length of the individual wires in the X-Y array.

Additionally, the inventor has realised that one technology that can be used to make the large format digitisers described above is taken from the automotive windscreen industry. In particular, an existing technology using thin metallic wires laminated in glass is known in the automotive industry for providing heated windscreens. It has been developed during the last decade for heated automotive windscreens. In this technique specialised automated machinery lay thin (nearly invisible to the naked eye) tungsten wires 294 (see FIG. 60b) and heat them to attach onto the surface of an insulating PVB (Poly Vinyl Butyral) interlayer 292. PVB is a random copolymer of vinyl alcohol and vinyl butyral (VB) moieties synthesised by reacting poly vinyl alcohol (PVA) with butyraldehyde in an acid medium. The typical thickness of the PVB foil interlayer used in the windscreen glass lamination is 0.030 in. (0.76 mm); a larger thickness of 0.060 in. (1.52 mm) is used for burglar resistance architectural glass. The PVB foil with a thickness of 0.015 in. (0.38 mm) is used predominantly for less demanding safety glass applications. The minimum thickness of the tungsten wires used for the heated glass is about 17 microns; the standard thickness is about 22 microns. The tungsten wires are typically coated in black to reduce their visibility in reflected light against a dark background. Straight sections of wire 294 might become highly visible due to the moiré effect caused by the intersection of the straight wire with the nearly parallel features present in the field of view of the driver (e.g fencing bars). This moiré effect is substantially reduced by laying out the wire 294 in a wiggle pattern as shown in the FIG. 60b with sinusoidal modulation with amplitude ranging from ±0.5 mm up to ±1.5 mm and a period of about 5 mm. The set of wires 294 is closely wound with a distance of about 4 mm between adjacent arms of the wire. The wires are wound between two copper busbars 296 and 298 which are served as electrical terminals (see FIG. 60b). The standard copper busbar is made out of 50 or 75 µm thick copper foil, with the most common width of 3, 5, 6 and 9 mm. The copper busbar has a conductive adhesive layer on the top surface which allows a good ohmic contact between the busbar and the tungsten wires 294 to be obtained during the process of laying out the wires between the two busbars 296 and 298. Additional busbars 296-1 and 298-1 (not shown in FIG. 60b) with an adhesive conductive layer are attached on top of each of the two initial copper busbar 296 and 298 in order to seal the electrical connection between the busbar and the tungsten wires. The PVB foil 292 is finally laminated between two glass sheets. The glass lamination is carried out at an elevated temperature of about 130° C., which is just above the PVB melting point, for a period of about 60 minutes. When laminated under these conditions, the PVB interlayer 292 becomes optically clear and binds the two panes of glass together. In the finished product two separate copper busbars 296 and 298 stick out of the laminated glass windscreen and are connected to the source of electrical energy. By applying a voltage between the busbars 296 and 298 electric current flows through the integrated wires 294 and the glass is heated in order to control condensation, de-mist and de-icing of the automotive windscreen to improve visibility and safety.

Figure 1A:
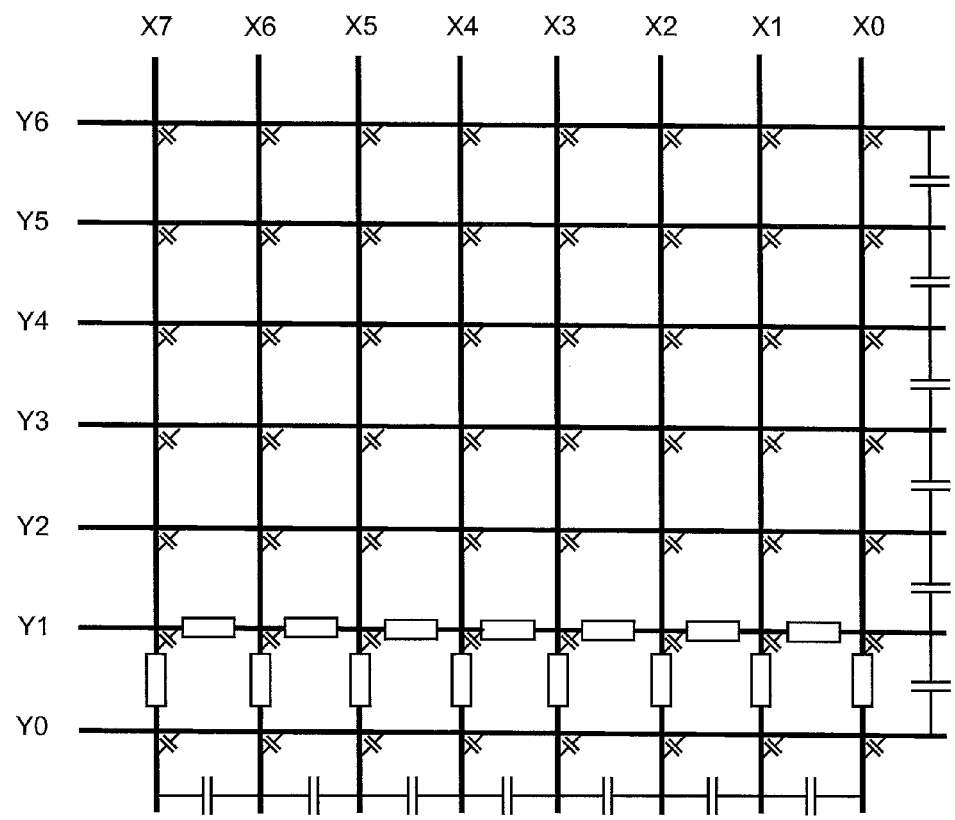
FIG. 1a schematically illustrates X and Y conductors forming part of a touch screen digitiser.
Figures 1B, 1C:
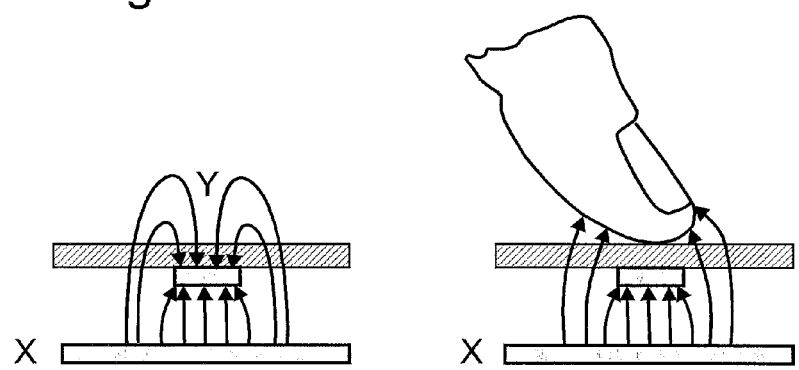
FIG. 1b illustrates electric field lines that couple from an X conductor of FIG. 1a with a Y conductor at a point of intersection between the conductors.
FIG. 1c illustrates the field lines shown in FIG. 1b in the presence of a user's finger and illustrating the change in coupling between the X conductor and the Y conductor.
Figure 60B:
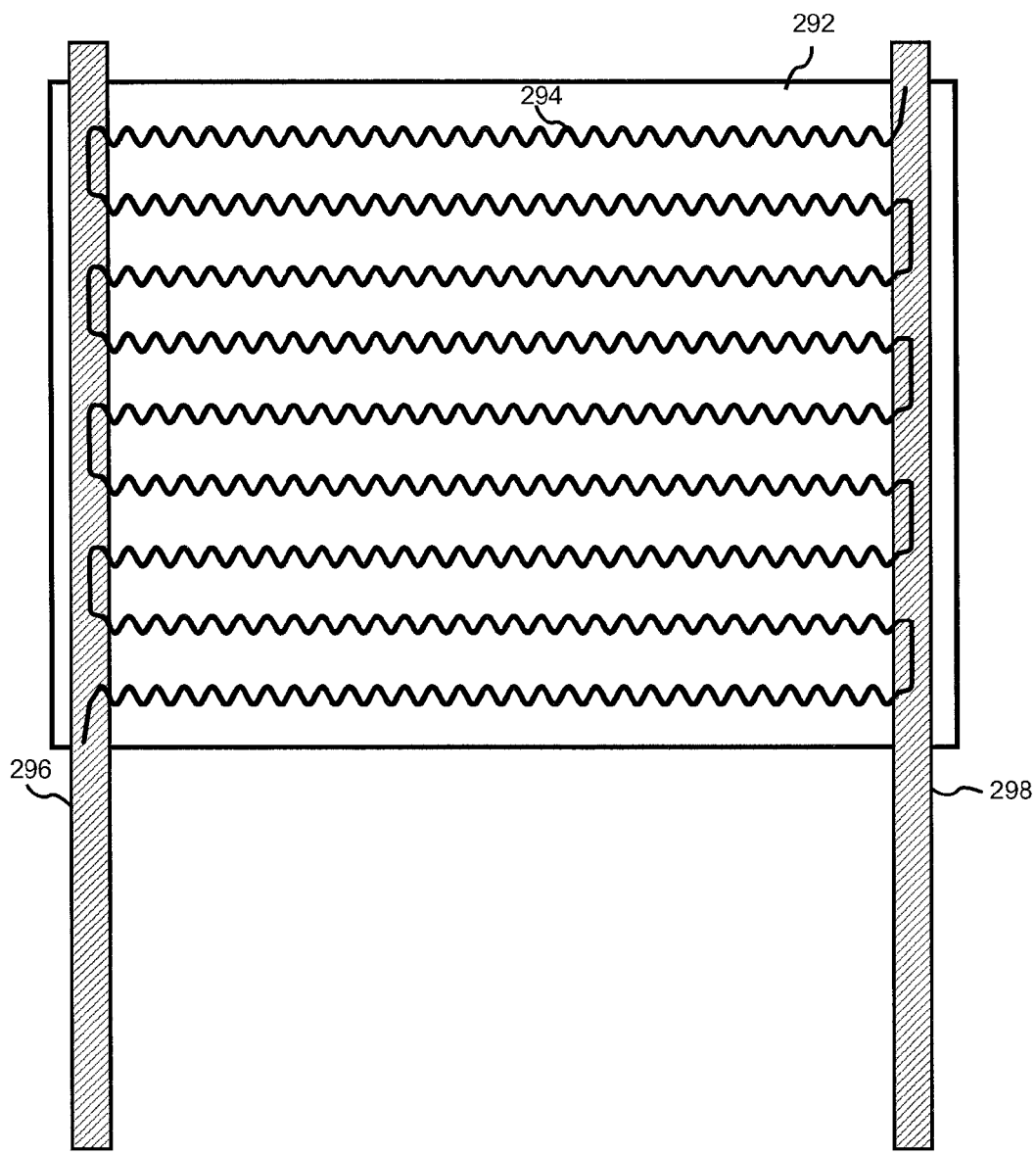
FIG. 60b is a physical arrangement of wires used for heated glass in the automotive windscreen manufacturing field.
Figure 61:
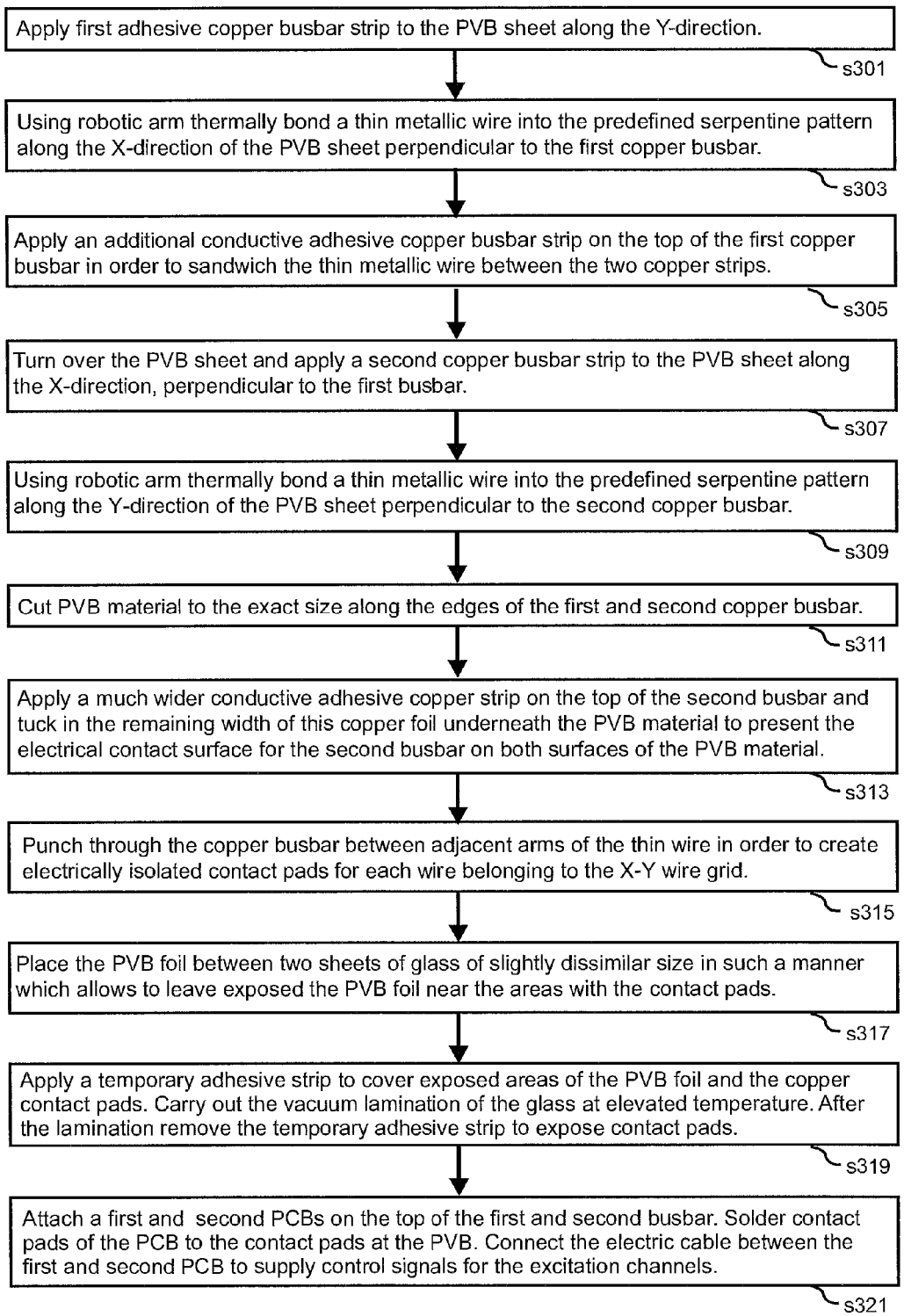
FIG. 61 is a flow chart illustrating manufacturing steps that can be used to manufacture the X-Y conductor grid structure for a glass screen overlay and for integrating it with digitiser electronics.
Figure 62A:
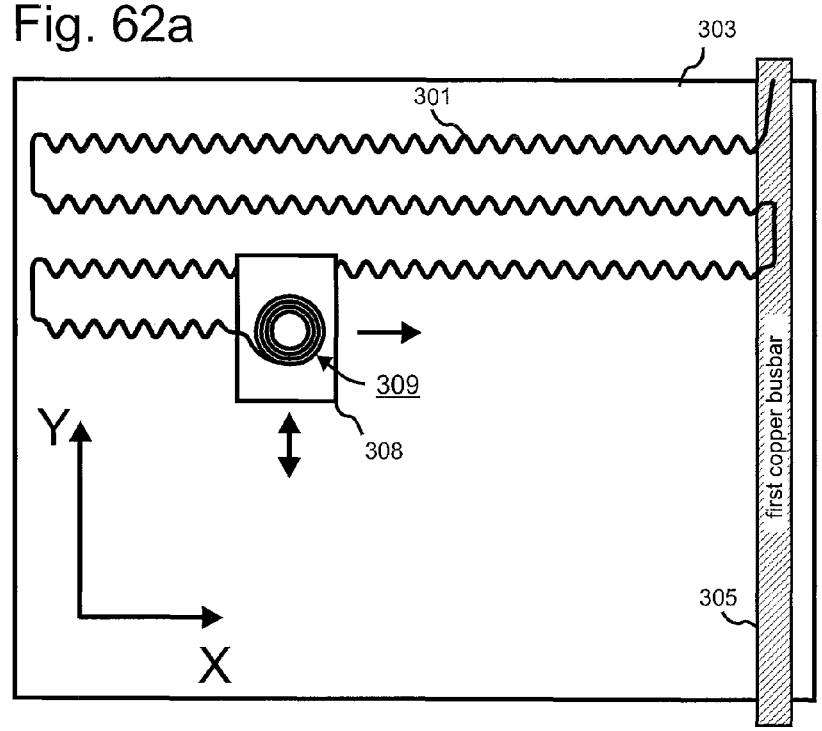
FIG. 62a schematically illustrates the laying of a first set of conductors over a PVB foil substrate.
Figure 62B:
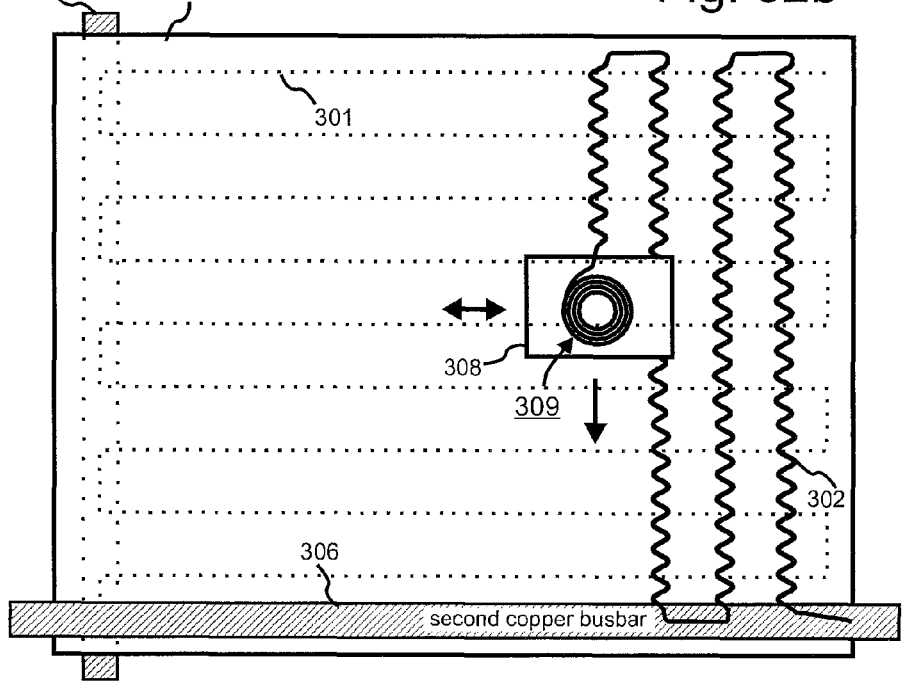
FIG. 62b illustrates the laying of a second set of conductors over the first set of conductors on the opposite side of the same PVB substrate.

The inventor has found that the above automotive manufacturing process for heated laminated glass is useful for the production of cheap digitizer systems. However several changes are required due to the dissimilarity between the physical arrangement for the automotive heated windscreen and the digitiser conductors. Usually a digitiser for an interactive display will have a flat glass layer while the windscreen will typically use curved glass. The heated windscreen illustrated in FIG. 60b is based on a nearly parallel set of wires but a digitiser functions using an X-Y array of intersecting wires (see FIG. 1) to establish crossing nodes distributed over the whole surface. In contrast to a digitiser, the heated windscreen application requires only two electrical connections to send the electrical current through the set of the wires connected in parallel to each other in order to heat the glass. Thus the main difference comes from the necessity to establish individual connections to each wire in the X-Y array for the digitiser and the desire to connect distributed sensing electronics to each individual wire of the X-Y sensing wire grid. The novel methods described below for connecting distributed electronics individually to each section of wire in the X-Y grid help to develop a large volume manufacturing technology for the digitiser.

Method of Manufacture for Glass Overlay Digitiser

A preferred method for manufacturing the digitiser grid using thin metallic wires having a diameter between 10 micron and 30 micron integrated in a glass LCD display screen with a diagonal size ranging from 12" (30 cm) to 120" (305 cm) will now be described with reference to FIGS. 61 to 66.

As shown, in step S301 (see FIG. 61) a first adhesive copper busbar strip 305 is applied to the PVB sheet 303 along the Y-direction. In step S303 a thin 20 micron tungsten wire 309 is bonded onto the surface of the PVB sheet (see FIG. 62a) using a heat source with a temperature of about 130° C. which is sufficient to locally melt the surface of the PVB foil. Using robotic arm 308 the wire 301 is laid along the predefined serpentine pattern along the X-direction of the PVB sheet 303 substantially perpendicular to the first copper busbar 305. Straight sections of wire 301 might become highly visible due to the moiré effect caused by the intersection of the straight wire with nearly parallel vertical or horizontal edges of the pixels of the LCD display. This moiré effect can be substantially reduced by laying out the wire 301 in a undulating pattern with sinusoidal modulation of the order of about ±0.5 mm or larger and a period of about 5 mm (preferably between 3 mm and 7 mm). Preferably the spacing between adjacent conductors of the X-Y grid should be equal to the period of the sinusoidal undulations or should be an integer multiple of it to reproduce the geometry of the intersecting set of wires 301 and 302 at each node of the X-Y grid. The most appropriate conductor spacing for the X-Y grid ranges from five to six millimetres in order to provide better than one millimetre accuracy for the location of various targets ranging from a large diameter adult finger to a narrow tip of a conductive stylus.

In step S305 an additional conductive adhesive copper busbar strip 305-1 is applied on the top of the first copper busbar 305 in order to sandwich the thin tungsten wire between the two copper strips.

In step S307 the PVB sheet 303 is turned over in order to expose the opposite surface of the PVB foil. A second copper busbar strip 306 is attached to the PVB sheet along the X-direction, substantially perpendicular to the first busbar 305 (see FIG. 62b). In step S309 using robotic arm 308 a tungsten wire 302 is thermally bonded onto the PVB sheet 303 into the predefined serpentine pattern along the Y direction substantially perpendicular to the second copper busbar 306. In order to keep FIG. 62b more readable the first set of wires 301 are represented in the Figure as straight dotted lines ignoring the original undulating pattern.

Figure 63A:
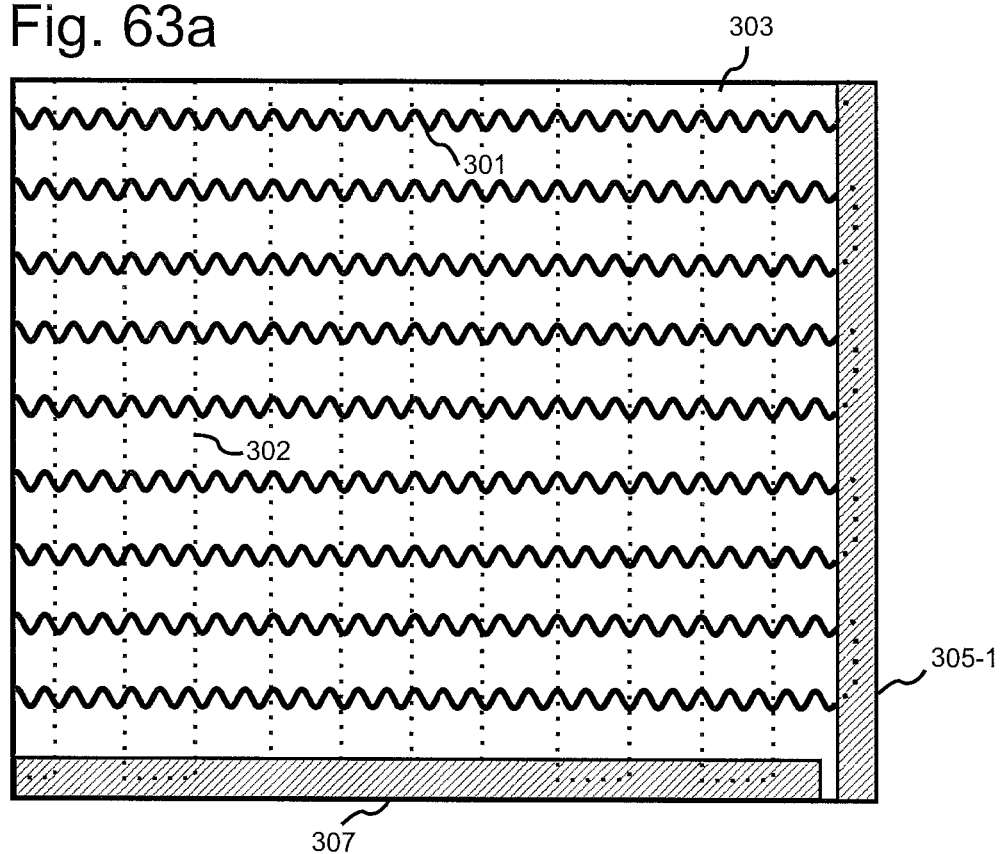
FIGS. 63a and 63b illustrates the attachment of an additional conductive adhesive copper strip on both sides of the PVB foil along the edge with the second copper busbar.
Figure 63B:
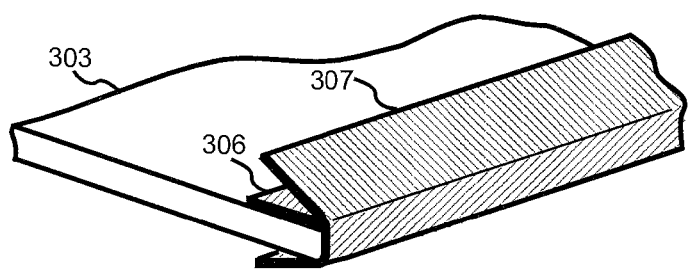

In step S311 the PVB sheet 303 is cut to the desired size. The PVB is preferably cut flush to the edges of the first and second copper busbars. In step S313 a wider conductive adhesive copper strip 307 (see FIG. 63b) is applied on the top of the second busbar 306 and the remaining width of this wider copper strip is tucked in underneath the PVB sheet 303 to present an electrical contact surface for the second busbar 306 on both surfaces of the PVB material. Thus FIG. 63a shows that both sets of wires 301 and 302 can be electrically contacted via the busbar 305 and 307 on the same side of the PVB foil 303.

Figure 64:
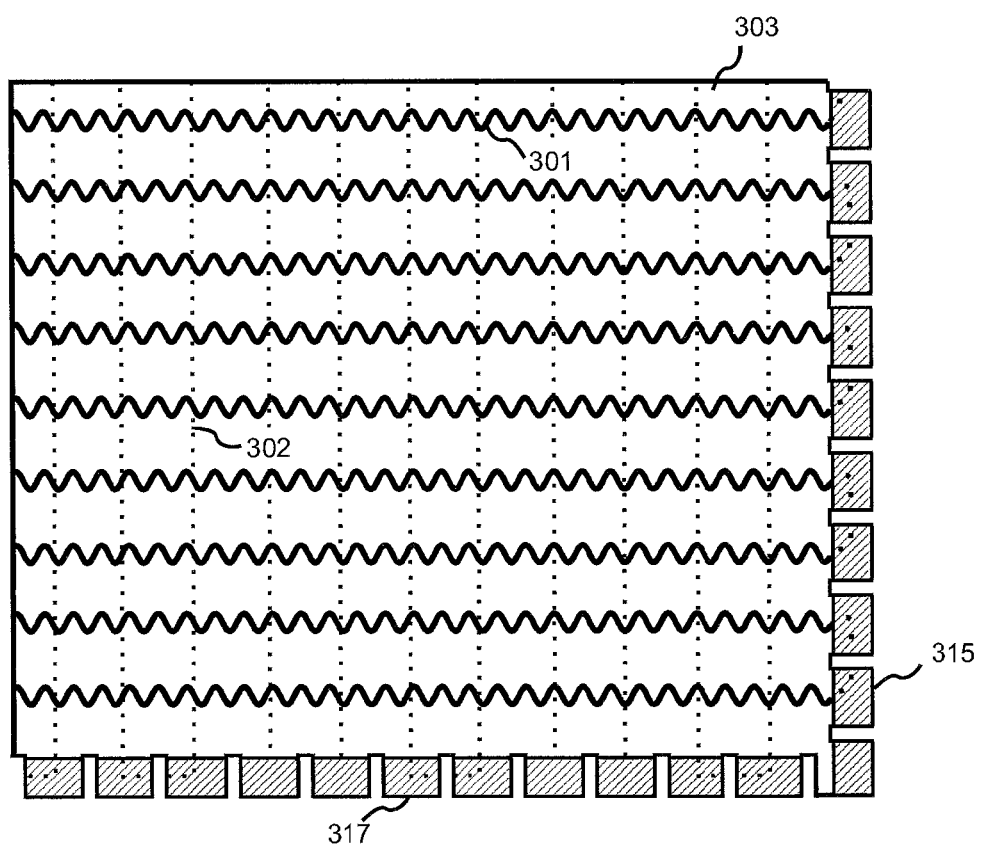
FIG. 64 illustrates the process of electrically isolating individual wires in the X-Y grid of conductors and forming a set of contact pads out of the originally continuous first and second busbars via punching out narrow strips of copper material.

In step S315 the individual wires from the set of wires 301 and 302 are electrically insulated (isolated) from their neighbours by physically removing narrow strips of the copper busbar between adjacent arms of the thin wire 301 and 302 (see FIG. 64). This can be done, for example, by punching through the PVB foil 303 with an appropriate dice or using a laser cutter or suitable etching or the like. As a result of this procedure a set of electrically isolated contact pads 315 and 317 is created—this way a dedicated contact pad is made for each individual wire belonging to the X-Y wire grid.

In step S317 the PVB foil 303 is placed between two sheets of glass of slightly dissimilar size in such a manner that the PVB foil is left exposed near the areas with the contacts pads 315 and 317 created out of the first and second busbars 305 and 307. The bottom glass 311 shown in the FIG. 65a has a size similar to the size of the PVB foil 303 itself. The top glass 310 is slightly undersized to leave sufficient space for the placement of the first and second PCB 312 and 313 above the contact pads 315 and 317 after the lamination step. The glass thickness for glass 310 and glass 311 is typically chosen from 1 mm or 4 mm; larger thicknesses are undesirable as they increase the overall weight of the laminated glass screen. In this embodiment, the bottom glass is for placement facing the LCD display (not shown) and the top glass is provided for the user touch screen.

In step S319 a temporary adhesive strip is applied to conceal the exposed areas of the PVB foil and the exposed contact pads 315 and 317. The strip is made from a material like polyimide which will not bond permanently to the PVB at elevated temperatures used during the lamination process. Following this step the whole assembly is placed in a vacuum bag and air is evacuated from it. The micro-rough surface of the PVB foil 303 provides efficient channels for evacuating air from the inside of the sandwiched construction. The assembly is heated to about 130° C. and after a holding time at the elevated temperature, the glass is cooled down and the temporary adhesive strip is removed exposing the contact pads 315 and 317. This heating step melts the PVB and bonds the glass panels 310 and 311 together sandwiching the wires 301 and 302 in place.

Figure 65A:
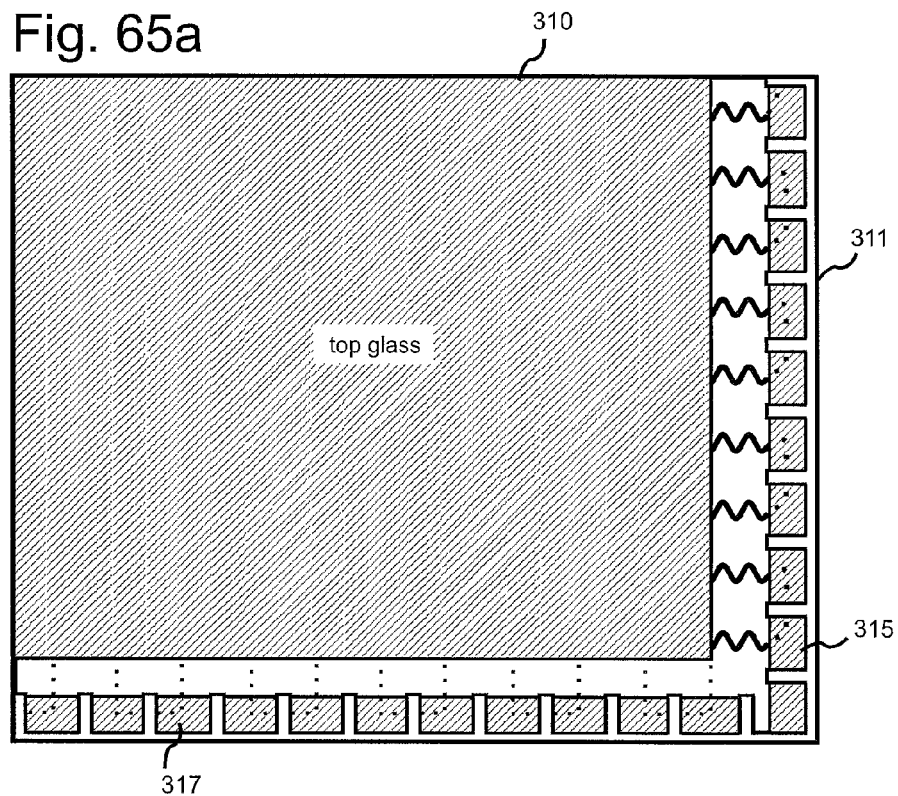
FIG. 65a illustrates the physical arrangement of the top and bottom glass before the beginning of the lamination process.
Figure 65B:
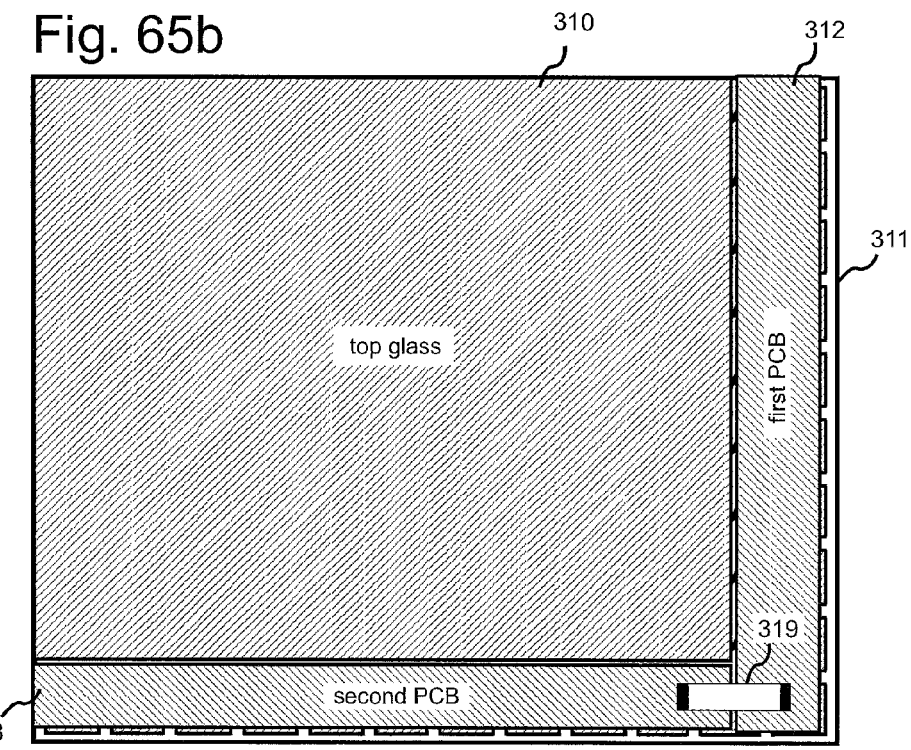
FIG. 65b illustrates the attachment of the first and second PCB to the PVB foil after the lamination of the glass panel.

In step S321 first and second digitiser PCBs 312 and 313 (carrying digitiser electronics) are attached on the top of the contact pads 315 and 317 (see FIG. 65b). The contact pads 315 and 317 are soldered to corresponding contact pads 322 and 323 of the first and second PCBs 312 and 313, as illustrated in more detail for one of the PCBs (313) in FIG. 66a. In order to facilitate the soldering procedure the PCB 313 is prepared with contact pads 323 on both surfaces of the PCB with the copper plated though hole 321 of about 1 mm in diameter arranged in the middle of the contact pads 323. The PCB is then cut to size through the middle of the holes 321 thus opening up the vertical conductive strips at each solder joint location. The other PCB 312 is prepared is a similar way. The solder joints between the PCB and the X-Y wire grid are created by soldering the contact pads 315 and 317 to the first and second PCBs 312 and 313 (respectively) with the main solder joint established between the vertical surfaces of the half-hole 321 and the edge of the corresponding contact pad 315 or 317. The electronic components carried by the PCBs are soldered to one side of the first and second PCBs 312 and 313.

Finally, in step S321, a cable connector 319 is attached between the second PCB 313 and the first PCB 312 to provide a path for digitiser control signals (see FIG. 65b). It is preferable to keep the microcontroller physically on the same PCB as is connected to the set of wires used for the detection conductors in order to avoid using the cable connector 319 to carry the analogue measurement signals to the microcontroller for analogue to digital conversion (to avoid noise being introduced through the connector 319). Typically, the detection conductors will be connected along the shorter dimension of the screen as it is preferable to have fewer detection conductors than there are excitation conductors on a typical interactive display. Preferably, the detection PCB also has an additional generic host connector (such as a USB connector) in order to provide a communication path to the host computer.

If connections are to be made to both ends of the excitation and/or detection conductors, then additional busbars may be provided on the other edges of the PVB foil and then cut and attached to the excitation/detection circuitry in the manner described above.

Modifications of Method of Manufacture for Glass Overlay Digitiser

A detailed description has been given above of a manufacturing method for a digitiser that can be implemented over a wide range of digitiser sizes. A number of modifications to the manufacturing method for the above described digitiser will now be described.

In the above described method of manufacture at step S305, an additional conductive adhesive copper busbar strip 305-1 was applied on the top of the first copper busbar 305 in order to sandwich the thin tungsten wire between the two copper strips. In an alternative embodiment, in order to improve the manufacturing yields, the ohmic contact between the tungsten wire and the copper busbar 305 can be further improved before applying the additional copper busbar strip 305-1. This can be done, for instance, by applying a small amount of solder paste via the solder mask and by heating the exposed areas containing the solder paste with an infrared (or other) heat source. The infrared heating can be done via the metallic foil mask in order to prevent unnecessary heat treatment of the PVB foil. Such an additional manufacturing step added to step S305 will allow the soldering of the tungsten wire in the exposed spots to the copper busbar 305 and thus to assure a mechanically stable and low resistance connection between the electronic circuitry located on the PCBs 312 and 313 and each tungsten wire belonging to the grid 301 and 302.

In the above described method of manufacture, a tungsten wire was used to form the excitation and detection conductors 301 and 302. Tungsten wire is preferred because of its low electrical resistance and high mechanical strength. The ultimate tensile strength (the maximum stress that a material can withstand while being stretched or pulled before breaking) for tungsten is about seven times larger than for copper, while its resistivity is only about three times higher than that of a copper wire. However for very large diagonal displays with a diagonal size exceeding 80" (200 cm) it might be preferable to start using a 20 micron thick copper wire to reduce the limitation in excitation frequency caused by the mutual cross-talk. The increase in crosstalk for long wires is caused by the increasing ratio between the self resistance of the wires and the frequency dependant impedance caused by the mutual capacitance between adjacent parallel wires.

In the embodiments described above conductors were arranged in perpendicular regular arrays. As those skilled in the art will appreciate, the excitation and detection conductors do not have to be provided in such regular and perpendicular arrays. The spacing between the conductors may be non-uniform; and/or one or more of the conductors may have one or more curves along their lengths; and/or the conductors may lie at an angle other than 90 degrees to each other. Provided the grid of conductors defines intersection points between the excitation and detection conductors over the desired measurement area of the digitiser, the processing electronics can determine the desired locations.

In the main method of manufacture discussed above a single length of PCB was used for each of the first and second PCBs 312 and 313. However each of these PCBs might be made of several pieces connected together via a suitable connector. This indeed might be practically required for large diagonal sizes of digitiser where the total length of each of the first and second PCB 312 or 313 might exceed one meter.

Figure 66A:
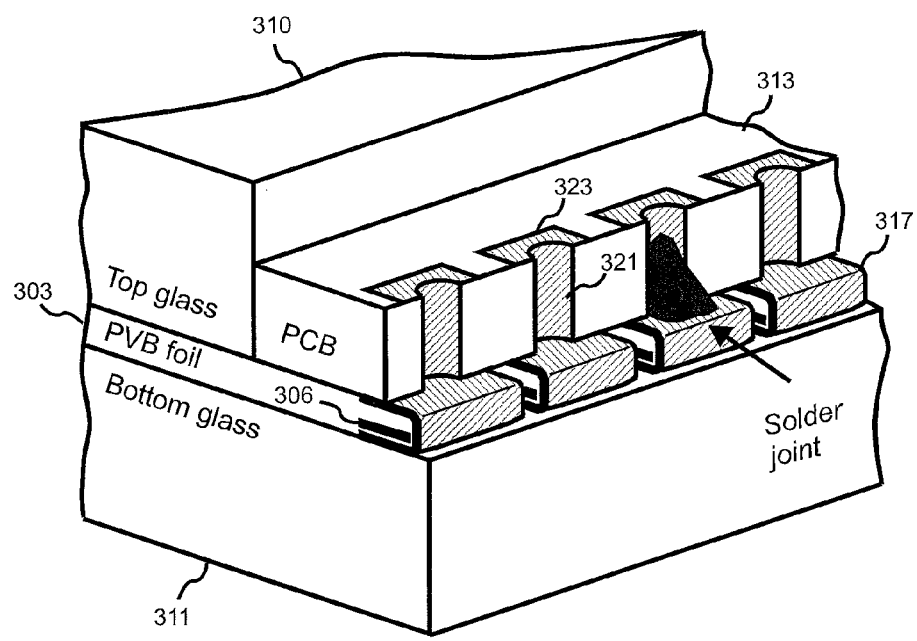
FIG. 66a illustrates a cross-section through the laminated glass panel with integrated electronics and the X-Y grid of conductors and is specifically showing a solder joint connection between the contact pads.
Figure 66B:
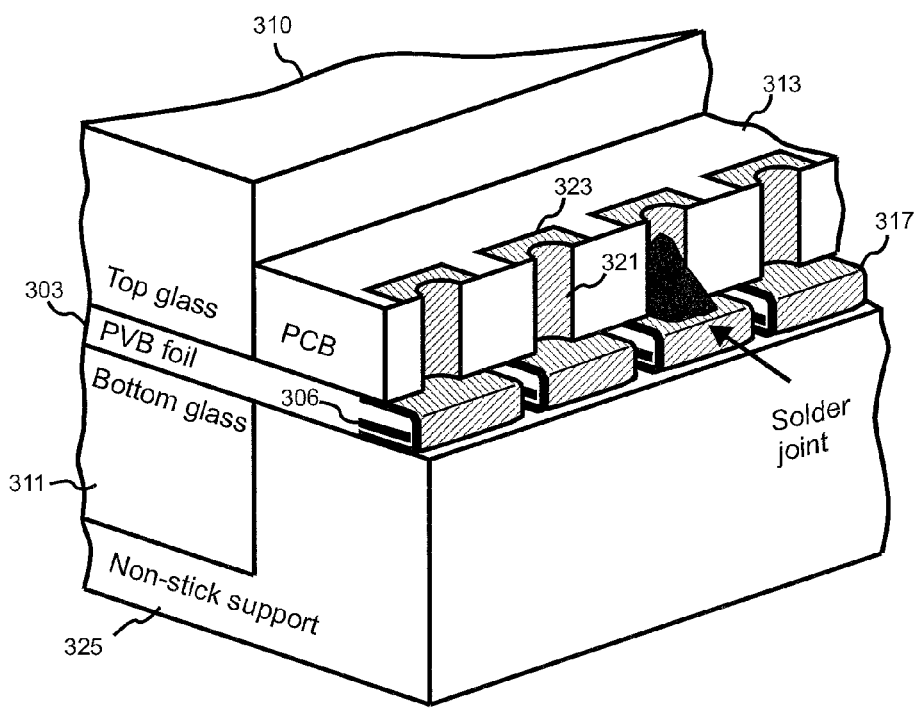
FIG. 66b illustrates the usage of an additional temporary non-stick support during the manufacturing process to allow having the same size of top and bottom glass panels.

In the main method of manufacture discussed above, the top 310 and bottom 311 glass panels had different sizes in order to provide support for the exposed area of the PVB film with the contact pads 315 and 317. This support for the PVB film is required during the lamination step and the attachment of the first PCB 312 to the contact pads 315 and the attachment of the second PCB 313 to the contact pads 317. The embodiment shown in FIG. 66b shows that during such manufacturing steps it is possible to use a temporary support structure 325, for example made of non-stick material. The non-stick support 325 can be manufactured from material like polyimide which does not bond to the PVB material at elevated temperatures of about 130° C. used during the lamination process. The support 325 can then be removed after the whole system is assembled leaving rigid PCBs 312 and 313 on a free standing PVB film 303 which retains enough flexibility and mechanical stability after the lamination process. This allows glass panels of the same size to be used for the top and bottom in the manufacture of the digitiser.

Figure 67A:
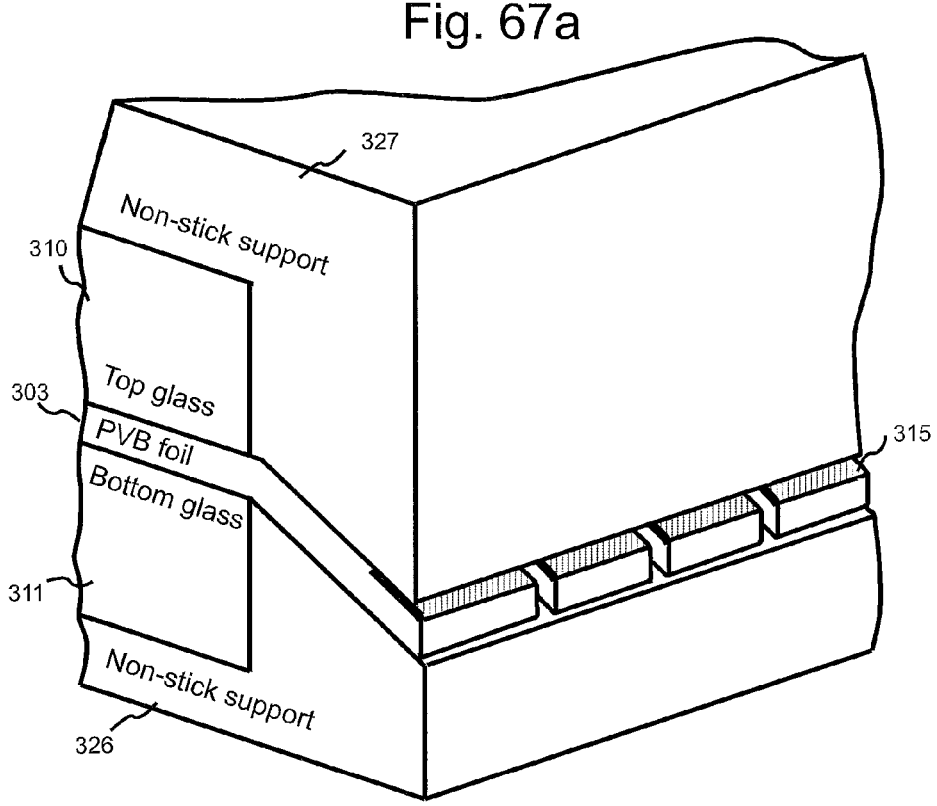
FIG. 67a illustrates the concept of moulding the PVB tail at a substantial angle to the glass surface during the lamination process in order to reduce the size of the bezel around the screen in the finished interactive display system.
Figure 67B:
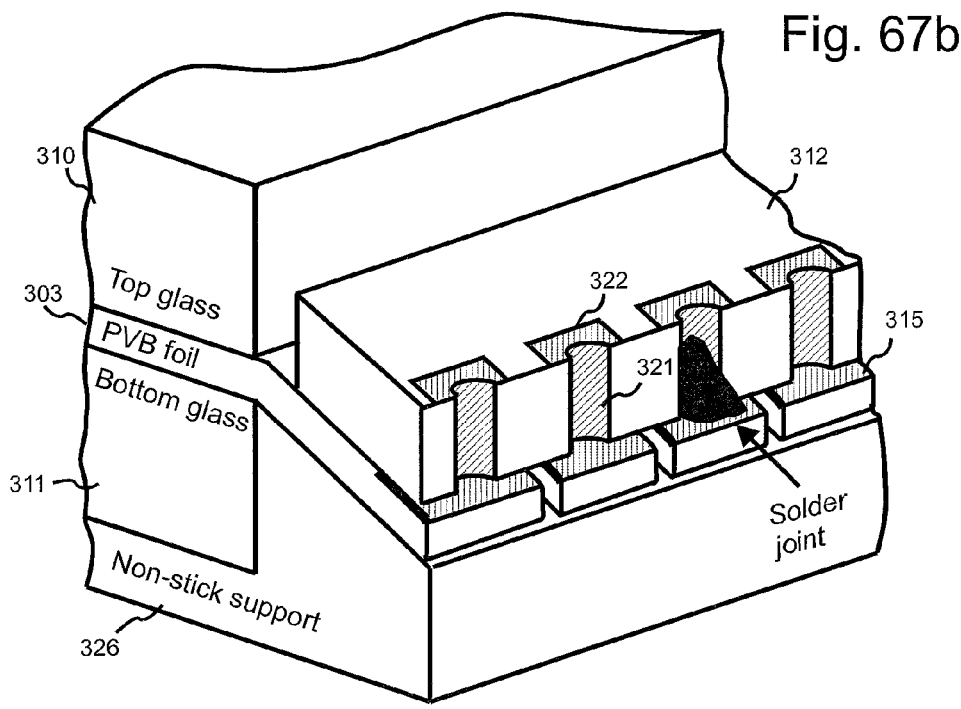
FIG. 67b illustrates the attachment of the PCB with electronics to the PVB tail shaped at an angle to the glass surface.

For an interactive display with a reduced bezel, it is possible to mount the PCBs 312 and 313 at a relatively large angle to the surface of the glass. In order to provide a larger bending radius for the PVB material it might be advantageous to mould the PVB at an angle to the glass surface during the lamination step. FIG. 67a shows an arrangement for forming a large bending radius for the PVB foil using top support 327 and bottom support 326. The top support 327 is removed after the lamination step and the first PCB 312 is attached and soldered to the contact pads 315, while the second PCB 313 is attached and soldered to the contact pads 317. Following this step the bottom support 326 is removed and the first PCB 312 and the second PCB 313 can be moved further to their mounting position inside the display mechanical support structure (not shown).

Figure 68:
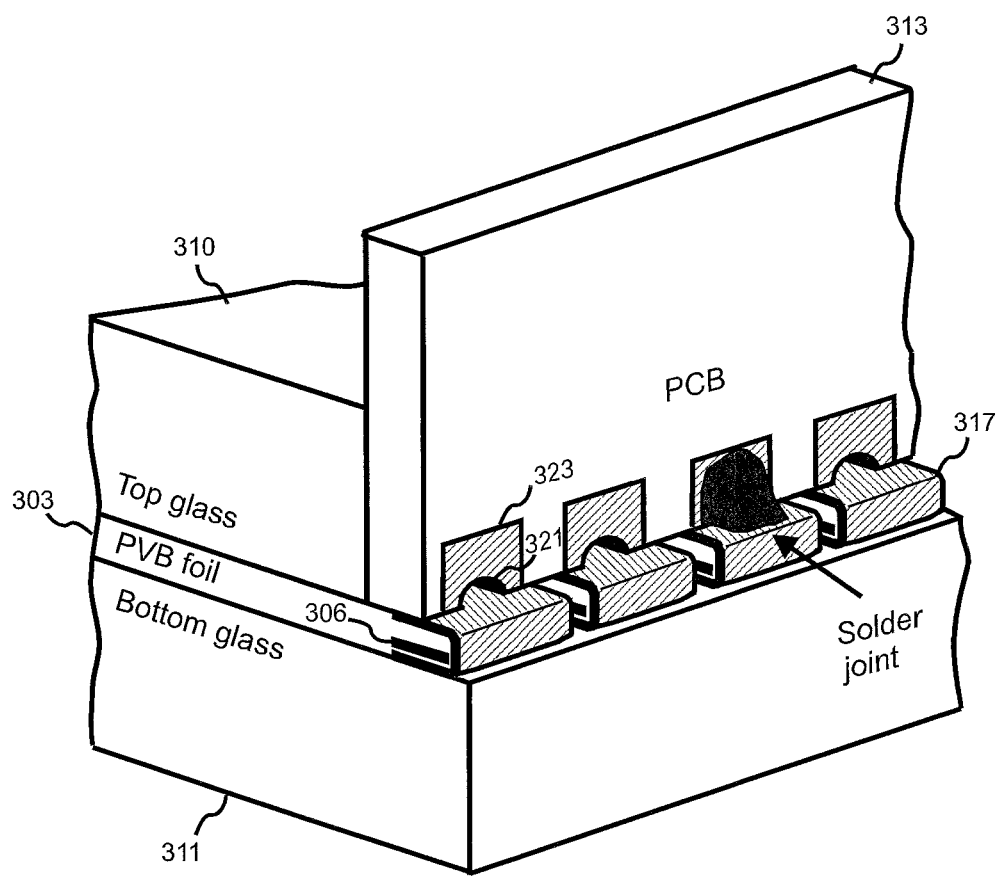
FIG. 68 illustrates the attachment of the PCB with electronics to the PVB at 90 degrees to the surface of the glass for a nearly zero width bezel interactive display mounting.

For a nearly zero width bezel around the finished interactive display, the PCBs 312 and 313 can be mounted perpendicular to the surface of the glass. FIG. 68 shows the preferred geometry for this arrangement. The second PCB 313 shown in this Figure is soldered directly to the contact pads 317. In this particular case the liquid solder material will be pulled by surface tension into the copper cavity formed by the walls of the copper plated half-hole 321 and the surface of the contact pad 317. An extra mass of solder material will also help to make the electrical contact between the contact pads 317 and 323. The provision of the copper plated half-hole at the edge of the PCB during soldering provides an optimum mechanical and electrical contact between the contact pads 323 located on the PCB and the contact pads 317 located on the PVB. With this modification the surface of the bottom glass 311 will provide a surface for interacting with a user finger and the surface of the top glass 310 will be facing the LCD matrix display (not shown).

In the main method of manufacture discussed above, the set of wires 301 and 302 forming the X-Y grid structure were laid down on opposite surfaces of the same PVB foil 303. However, in an alternative embodiment two separate PVB foils may be used, each carrying its own set of wires—set 301 or set 302. The two PVB foils can then be mounted on top of each other during the lamination process so that the sets of wires 301 and 302 can be placed orthogonally to each other. Such construction is very similar to the one shown in the FIGS. 63, 64 and 65 but can be implemented without using the wide busbar 307 which was used to provide electric contacts on both sides of the single PVB foil 303. However this modification is likely to result in higher overall costs due to the need to double the amount of the utilised PVB material.

In the main method of manufacture discussed above the bottom glass 311 was facing an active LCD matrix. The array of X-Y wires (actively grounded through the capacitors 63 (see FIG. 5) and 95 (see FIG. 11)) provides some electrostatic shielding for the electrical switching noise originated in the driving circuitry of the LCD matrix. For dense X-Y grid digitisers with wire separation of the order of 5 to 6 mm such virtual electrostatic screening by several hundred grounded wires should be efficient enough to provide a reasonable signal to noise ratio when detecting individual fingers located close to the surface of the top glass 310. However, it is possible to improve the electrostatic screening by covering the free surface (the lower surface shown in the Figures) of the bottom glass 311 with a homogeneous layer of transparent conductive film, such as a layer of ITO film. This additional electrostatic shield can be left floating (i.e. not directly connected to ground) —in this case it will be grounded to the electronic circuitry of the touch digitisers via capacitive coupling with the detection and excitation conductors. In particular, each excitation and detection conductor is grounded in the excitation and detection circuitry via a pair of capacitors and resistors and thus the capacitive coupling between this additional electrostatic shield and all the excitation and detection conductors combined together is capable of providing an adequately low impedance coupling of the conductive layer to the ground of the detection circuitry. Alternatively, an actual Ohmic contact can be made between the conductive layer and the measurement electronics using a dedicated conductor located underneath the PCB boards 312 and 313.

Adding such a conductive shielding layer, while reducing the coupled switching noise from the LCD screen and reducing unwanted mutual capacitance between adjacent conductors, nevertheless might result in reduced sensitivity of the projective capacitive X-Y grid to the presence of a finger and thus might be unattractive for digitisers which need to work with gloved fingers. For a given thickness of the final laminate construction the signal level can be optimized by placing the excitation conductor grid on the side of the PVB foil facing the free surface of the digitiser and by placing the detection conductor grid on the side of the PVB sheet facing the conductive shielding (ITO film). The actual signal to noise ratio in this case can be improved by increasing the thickness of the bottom glass 311 compared to the thickness of the top glass 310. Even better results can be obtained by placing a transparent conductive layer (such as an ITO film) on a separate thin glass or plastic layer and by introducing a small air gap of the order of one to five millimetres between this new conductive layer and the free surface of the bottom glass 311. In this case, the conductive layer can be grounded to the ground of the LCD electronics.

In the main method of manufacture discussed above the PVB foil 303 was sandwiched between the top glass 310 and the bottom glass 311. However in other embodiments only one glass panel may be used. For example, during the lamination process a non-stick support 326 may be used instead of the bottom glass 311 or a non-stick support 325 may be used instead of the top glass 310. The non-stick support is removed after the lamination and the attachment of the first and second PCBs 312 and 313 to the contact pads 315 and 317. By substituting one of the glass sheets with a removable non-stick support it is possible to achieve a twofold reduction in the overall weight of the interactive screen. This approach is specifically suited for applications for smaller diagonal size digitisers which do not require high levels of vandal proof performance.

In the main method of manufacture discussed above the top 310 and the bottom 311 panels were made from glass. Alternatively optical grade polycarbonate panels can be used for lamination. Polycarbonate panels are more easily handled even for panels with relatively small thickness down to 0.5 mm. The surface of the polycarbonate material can be hard coated to provide improved hardness and scratch resistance. The polycarbonate density is about two times less than the density of the glass and its dielectric constant is also about two times smaller compared to the dielectric constant of glass. This allows for the manufacture of significantly thinner and lighter mechanical laminate constructions and simultaneously to reduce slightly the unwanted capacitive coupling between adjacent wires in the grid.

In the main method of manufacture discussed above, a PVB foil 303 was used as an interlayer for the lamination process. Other lamination materials could be used instead of PVB, including thermoplastic glass lamination materials such as EVA (Ethyl Vinyl Acetate) and TPU (thermoplastic Polyurethane). EVA has emerged as a good alternative to PVB. The strong affinity to moisture makes PVB film difficult to be stored and processed without particular concerns on humidity. Unlike PVB material, EVA adhesive film is non-sticky and inert to water moisture. Thus production equipment and relevant processes for EVA glass lamination may, in some cases, be easier and simpler than conventional PVB lamination.

Using an EVA lamination interlayer film allows a PET layer to be laminated on the digitizer instead of the glass sheet. This enables the construction of a fully flexible laminated touch overlay or the ability to have a thinner glass laminate structure with one sheet of glass replaced with the PET layer. The commercially available rear projection PET film can be laminated in order to create virtual touch sensitive rear projection displays which are translucent when no image is being projected from the back.

In the main method of manufacture discussed above, a single wire was connected to each individual contact pad created after cutting the copper busbar at step s315. Alternatively several wires can be left wired to each individual contact pad at step s315. The mutual capacitive coupling at the crossover points between excitation and detection conductors can be increased if each excitation and detection conductor is represented by several spaced apart conductors. This approach can be specifically useful for large diagonal sized digitisers in which a dense wire grid 3 can be impractical due to the inability to measure individually an increased number of crossover points for a required update rate. In such an embodiment, the actual separation between the centres of the detection or excitation conductors may be as large as 10 mm, which will enable to construct each detection or excitation conductor as a pair of individual conductors spaced by 5 mm and connected to the same individual contact pads 315 or 317 of the grid 303.

Method of Manufacture for Front-Projected (Whiteboard) Digitiser

The main method of manufacture discussed above is specific to the manufacturing of the digitiser in the form of a transparent interactive glass screen overlay. Another example of the required digitiser includes interactive whiteboard digitisers connected to a computer. Typically a projector mounted on the ceiling projects the computer's desktop display onto the whiteboard's surface where users control the computer using a finger, stylus, or other device. The white surface of the board could be made out of a sheet of formica, melamine or polycarbonate with a typical thickness of less than 1.25 mm. A thin sheet digitiser can be mounted underneath the white surface of the board.

Figure 69:
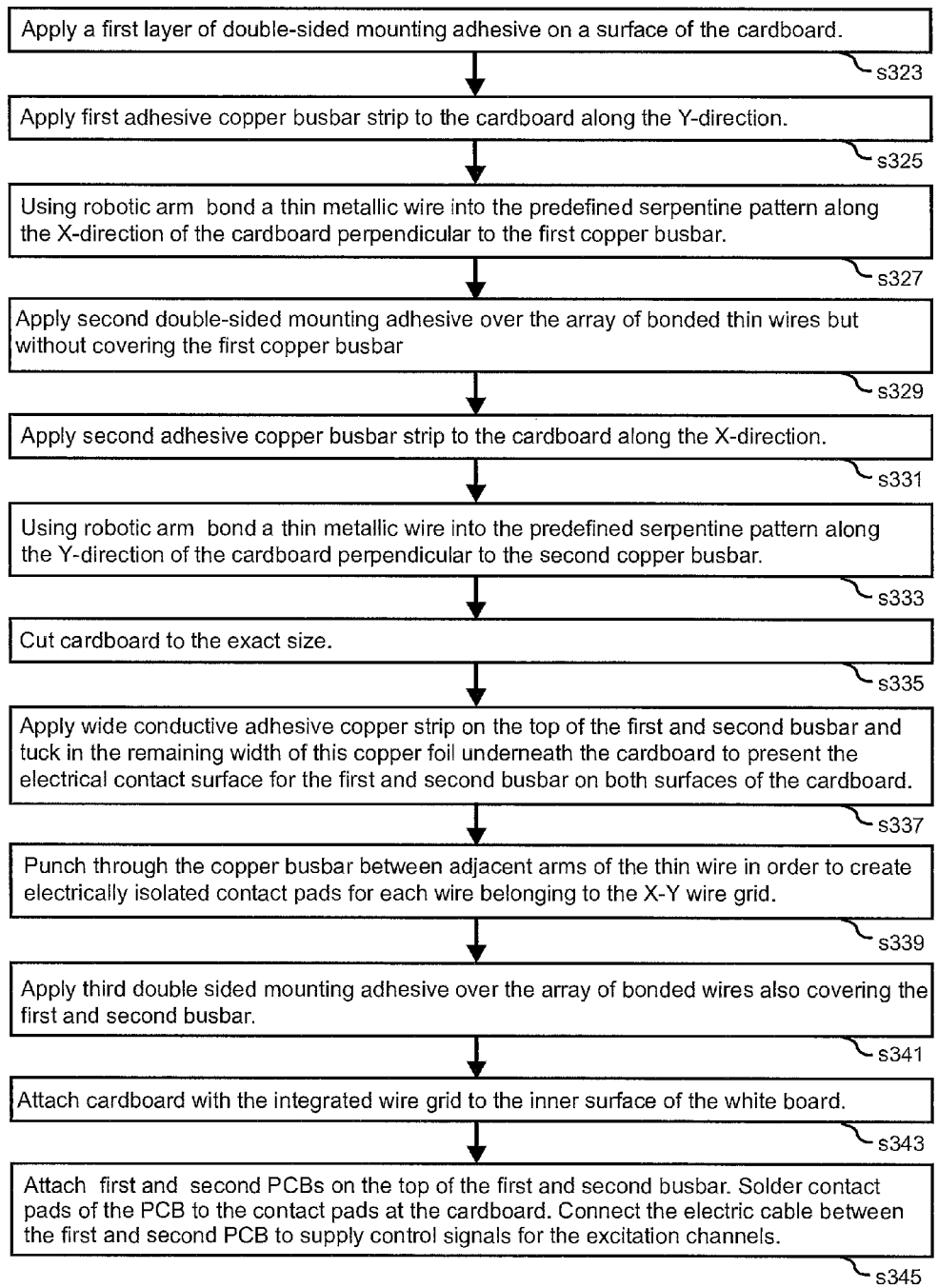
FIG. 69 is a flow chart illustrating manufacturing steps that can be used to manufacture the X-Y conductor grid digitiser structure for a whiteboard application.
Figure 70A:
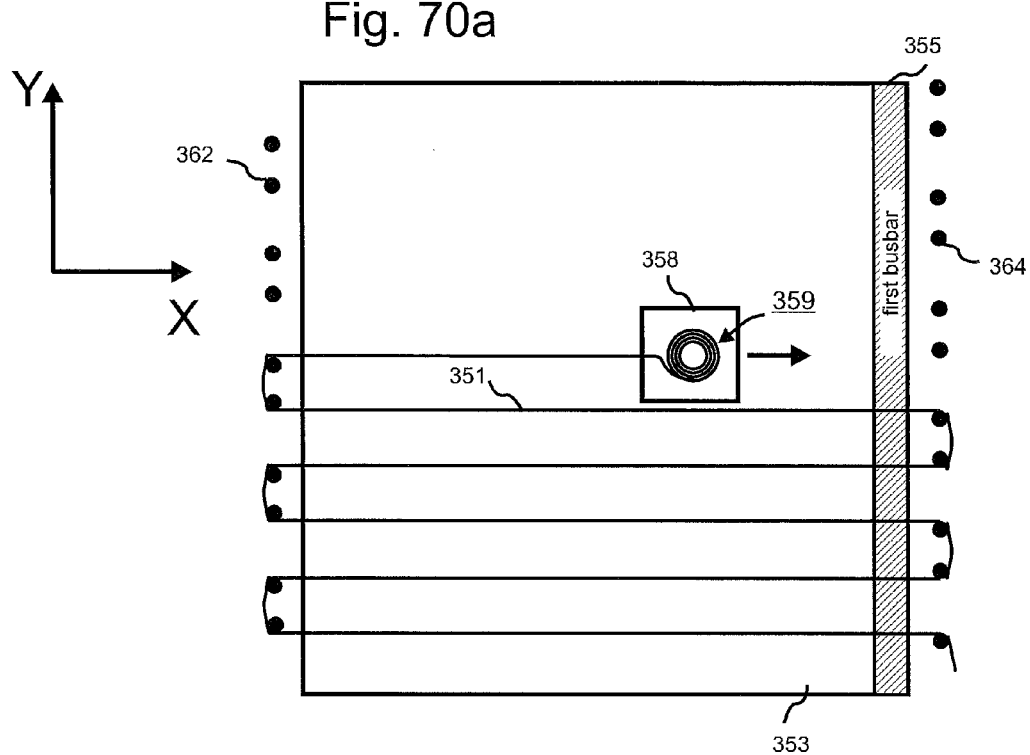
FIG. 70a schematically illustrates the laying of a first set of conductors over a cardboard substrate.
Figure 70B:
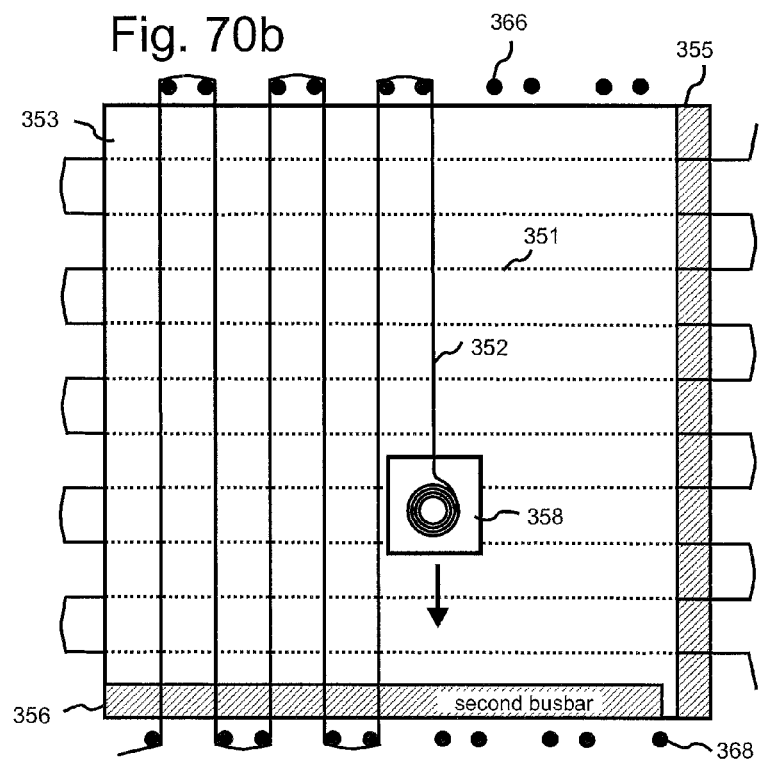
FIG. 70b illustrates the laying of a second set of conductors over the first set of conductors on the cardboard substrate.

A preferred method for manufacturing the digitiser grid for use in an interactive whiteboard with diagonal sizes ranging from 20" (50 cm) to 200" (500 cm) will now be described with reference to FIGS. 69 to 71.

As shown, in step S323 (see FIG. 69) a first layer of double-sided mounting adhesive is applied on a surface of cardboard. The cardboard with a thickness of about 0.9 mm is served as a support for the wire grid and electronics and is chosen for its low cost. It is preferred to use brown kraft paper slip sheets due to their non-porous, moisture and bacteria resistance properties. The double-sided mounting adhesive with a thickness of about 25 µm is a standard product widely used for the lamination of the printed materials.

In step S325 (see FIG. 70a) a first conductive adhesive copper busbar strip 355 is applied to the cardboard 353 along the Y-direction. The busbar used in this embodiment is of the same type as was described previously for the heated glass automotive windscreen technology. In step S327 a thin copper wire 359 with a diameter of approximately 100 µm is placed on a surface of the adhesive by a robotic arm 358 into a predefined serpentine pattern along the X-direction of the cardboard 353 substantially perpendicular to the first copper busbar 355. There is no need to use the undulating pattern shown for the transparent glass overlay digitiser in FIG. 62 as the wire grid pattern of the whiteboard digitiser is completely concealed underneath the opaque surface of the whiteboard. The capability of using straight sections of the wire 351 simplifies the laying process by pulling the wire 351 between the posts 362 and 364 as shown in the FIG. 70a. After bonding the wire 351 to the first adhesive layer the cardboard 353 with the bonded wires 351 can be pulled out of the manufacturing rig with integrated posts 362 and 364 and a new sheet of cardboard 353 can be inserted in the rig for wiring the next digitiser.

In step S329 a second double-sided mounting insulating adhesive is applied over the array of bonded thin copper wires 351, whilst avoiding to cover the first copper busbar 355. In step S331 a second conductive adhesive copper busbar strip 356 is applied to the cardboard 353 along the X-direction (see FIG. 70b). In step S333 a thin copper wire 352 is placed on a surface of the second adhesive by the robotic arm 358 into the predefined serpentine pattern along the Y-direction of the cardboard 353 perpendicular to the second copper busbar 356. Preferably the wire 352 is pulled between the posts 366 and 368 as shown in the FIG. 70b. After bonding the wire 352 to the second adhesive layer the cardboard 353 with the bonded wires 351 and 352 can be pulled out of the manufacturing rig with the integrated posts 366 and 368 and a new sheet of the cardboard 353 can be inserted between the posts for wiring the next digitiser. The second copper wire 352 does not electrically contact the first copper wire 351 because of the insulating second adhesive layer that sits between the two wires.

In step S335 the cardboard 353 is cut to the desired size, thereby simultaneously separating originally continuous wires 351 and 352 onto individual pieces of straight wire. In step 337 a couple of wider conductive adhesive copper strips 355-1 and 356-1 are applied on the top of the first and second busbars 355 and 356 respectively. The remaining width of these wider copper strips are then tucked in underneath the cardboard to present electrical contact surfaces for the first and second busbars 355 and 356 on both surfaces of the cardboard 353. This step is similar to the step S313 discussed above and is illustrated in FIG. 63b.

Figure 71A:
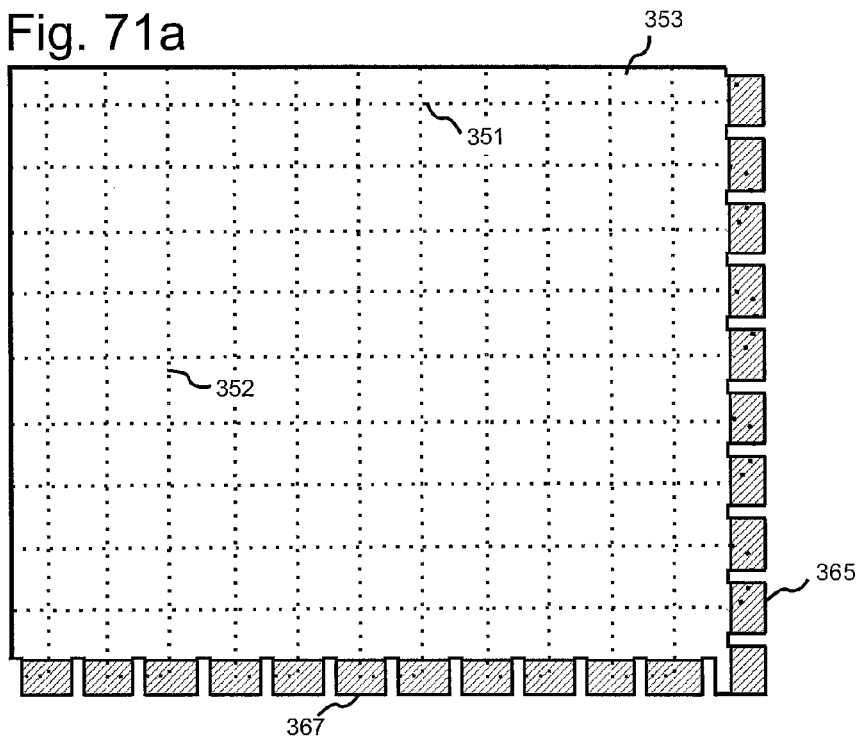
FIG. 71a illustrates the process of electrically isolating individual wires in the X-Y grid of conductors and forming a set of contact pads out of the originally continuous first and second busbars via punching out narrow strips of copper material.
Figure 71B:
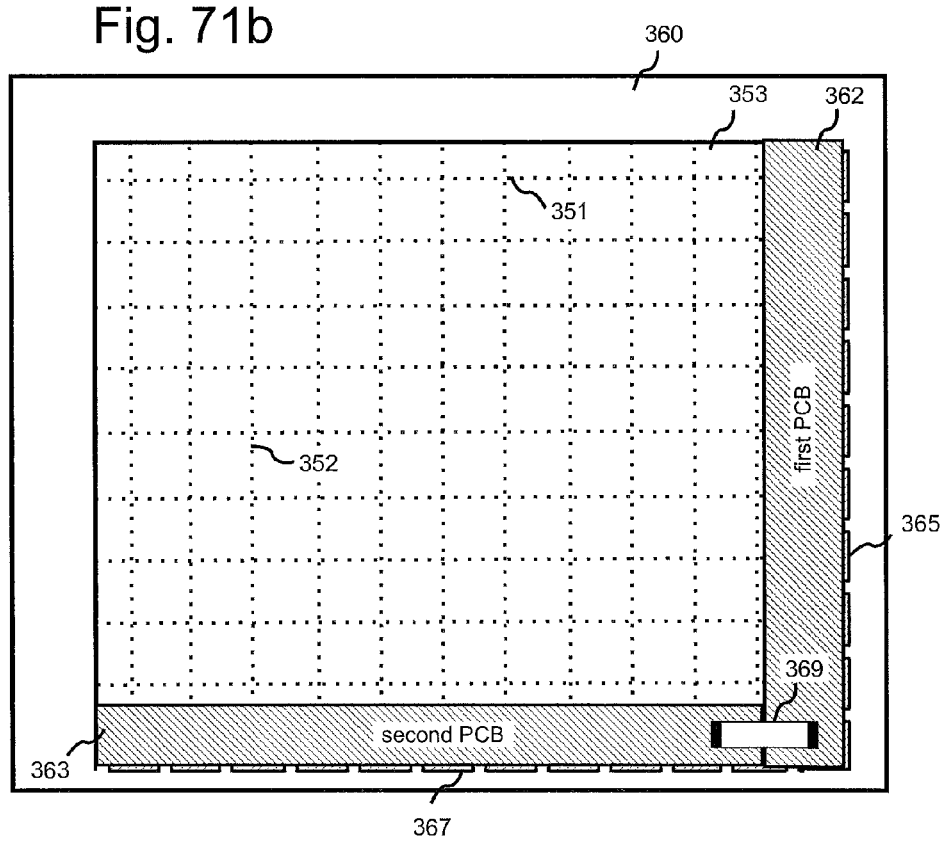
FIG. 71b illustrates the attachment of the first and second PCBs to the cardboard substrate.

In step S339 the first and second copper busbars 355 and 356 are punched through (or otherwise cut/etched) between adjacent arms of the thin wires 351 and 352 with an appropriate dice in order to create electrically isolated contact pads 365 and 367 for each wire belonging to the X-Y wire grid (see FIG. 71a).

In step S341 a third double sided mounting adhesive film is applied over the array of bonded wires, this time also covering the contact pads 365 and 367. The cardboard 353 with integrated X-Y wire grid is then attached to the inner surface of the whiteboard 360 in step S343. In step S345 the first and second PCBs 362 and 363 are attached on the top of the cardboard over the contact pads 365 and 367 (see FIG. 71b). The contact pads of the PCB are soldered to the contact pads 365 and 367 using the same approach as was described previously with reference to FIG. 66a. In this approach the copper plated half-hole at the edges of the PCBs 362 and 363 serve as additional vertical contact pads for soldering to the contact pads 365 and 367 of the X-Y grid.

In step S345 an electric cable 369 is connected between the first and second PCBs to supply control signals for operating the digitiser. As discussed above, preferably, the detection PCB carries the microcontroller and also has an additional generic host connector (such as a USB connector) in order to provide a communication path to the host computer.

Modifications of Method of Manufacture for Front-Projected (Whiteboard) Digitiser A detailed description has been given above of a manufacturing method for a whiteboard digitiser that can be implemented over a wide range of sizes. A number of modifications to this manufacturing method will now be described.

In the above method of manufacturing the whiteboard, a copper wire with diameter of approximately 100 µm was used to form the excitation and detection conductors 351 and 352. It is possible to use copper wire with either larger (e.g. 200 µm) or smaller diameter; however special care should be taken for large diagonal digitisers as using larger diameters of wire can increase unwanted capacitive coupling between adjacent wires. Other materials like tungsten can also be used instead of copper; however it is likely that copper wire will be the cheapest wire for manufacturing such digitisers.

In step 337 described above, a couple of wider conductive adhesive copper strips 355-1 and 356-1 were applied on the top of the first and second busbars 355 and 356 respectively. The remaining width of these wider copper strips were then tucked in underneath the cardboard to present electrical contact surfaces for the first and second busbars 355 and 356 on both surfaces of the cardboard 353. In an alternative embodiment, at the beginning of step 337, a fourth layer of double-sided mounting adhesive is applied on a back surface of the cardboard and a thin aluminum foil is attached to such exposed adhesive surface covering all areas of the cardboard except two narrow strips along two edges of the cardboard. The free surface area along such two edges of the cardboard is then partially covered by attaching two wider copper busbar strips 355-1 and 355-2 on the top of the first and second busbars 355 and 356 respectively and by tucking in underneath the cardboard, the remaining width of these wider copper strips. No Ohmic contact is established between the copper busbars 355-1 and 356-1 and the metallic foil on the back surface of the cardboard. This modification to step 337 allows the integration of a conductive screen onto the surface of the cardboard substrate opposite the surface of the cardboard used for the attachment of the excitation and detection wires. As discussed above, such a conductive screen located at a distance between one millimeter and five millimeters away from the grid 3 of the digitizer allows to substantially reduce the unwanted capacitive coupling between adjacent wires, to reduce the sensitivity of the digitizer to hovering fingers, and to improve signal to noise ratio in very noisy environments. Such electrically floating conductive screen will be connected to the electrical ground of the measurement system of the digitizer via the capacitive coupling between the metallic foil and all the conductors belonging to the grid. The impedance of such coupling is of the order of several Ohms at the excitation frequency and thus there is no need for establishing an active grounding connection to such a conductive screen. Nevertheless, in an alternative embodiment, the conductive foil can be connected to the electrical ground of the PCBs 362 and 367 via a dedicated link which can be established, for instance, by using additional copper busbars attached to the ground plane of the PCBs and to the surface of the metallic foil of the conductive screen. The direct Ohmic contact can be used to remove the low frequency noise coupled to the otherwise floating conductive screen.

The cardboard used in the above embodiment had a thickness of about 0.9 mm. Other thicknesses up to about 5 mm can easily be used. Other non-conductive substrates like plastic film can be used instead of cardboard; however this might result in increased difficulties in handling the assembled digitiser and/or increase the cost of its manufacture.

In the above method of manufacturing the whiteboard digitiser, the wide conductive adhesive copper strip 355-1 was attached to the first busbar 355 in the step S337 simultaneously with a similar wide conductive copper strip 356-1 attached to the second busbar 356. However it might be easier to attach the copper strip 355-1 to the first busbar 355 at the end of the step S327. In such case the second double sided mounting adhesive can be applied to the whole surface of the cardboard 353 including the surface of the first busbar 355-1 thus simplifying the manufacturing process.

In a modification to the above embodiment, an extra spacer layer may be provided between the sets of wires 351 and 352 in order to make their mutual self-capacitance (without the presence of the target) more reproducible across the surface of the X-Y digitiser. Such an extra spacer layer may be made of plastic with a thickness of about 0.4 mm and can be applied to the surface of the first adhesive just before step S329, in which the second double-sided mounting adhesive is applied over the first set of wires 351. It is also possible to use the cardboard 353 as a spacer between the wires in the X-Y grid. In such case the wires 351 and 352 would be bonded to opposite surfaces of the cardboard 353 in a manner similar to the one described for the main manufacturing method illustrated in the FIG. 61. However in this modification the cardboard thickness should be restricted to about 1 mm. In this case, the set of detection wires are preferably mounted on the surface of the cardboard 353 which closest to the writing surface of the whiteboard 360.

By using an optically clear plastic film instead of the cardboard 353 and by using an optically clear double-sided mounting adhesive film it is possible to construct an optically transparent thin digitiser with integrated X-Y wire grid and electronics. It is then possible to mount this thin film digitiser onto a rear-projection (diffusion) film in order to create a thin rear-projection digitiser which can be mounted on any glass surface—for instance it can be placed on a store window to transform the window into an Interactive Digital Signage. In this case the opposite surface of the window glass can be used by the general public to interact with the image displayed using a finger. For such an embodiment using a thin transparent digitiser the thickness of the conductive wires are preferably reduced to about 20 microns to make them practically invisible to the naked eye. Depending on the user experience, it might be desirable to modify the straight lines of the X-Y grid into the undulating pattern shown in FIG. 62. However with the rear-projection film placed in front of the digitiser, the X-Y grid will be efficiently concealed and the remaining shadow from the wires will be watered down thus reducing the visibility of any moiré pattern even if using straight wires.

Alternative Method of Manufacture

Figure 72:
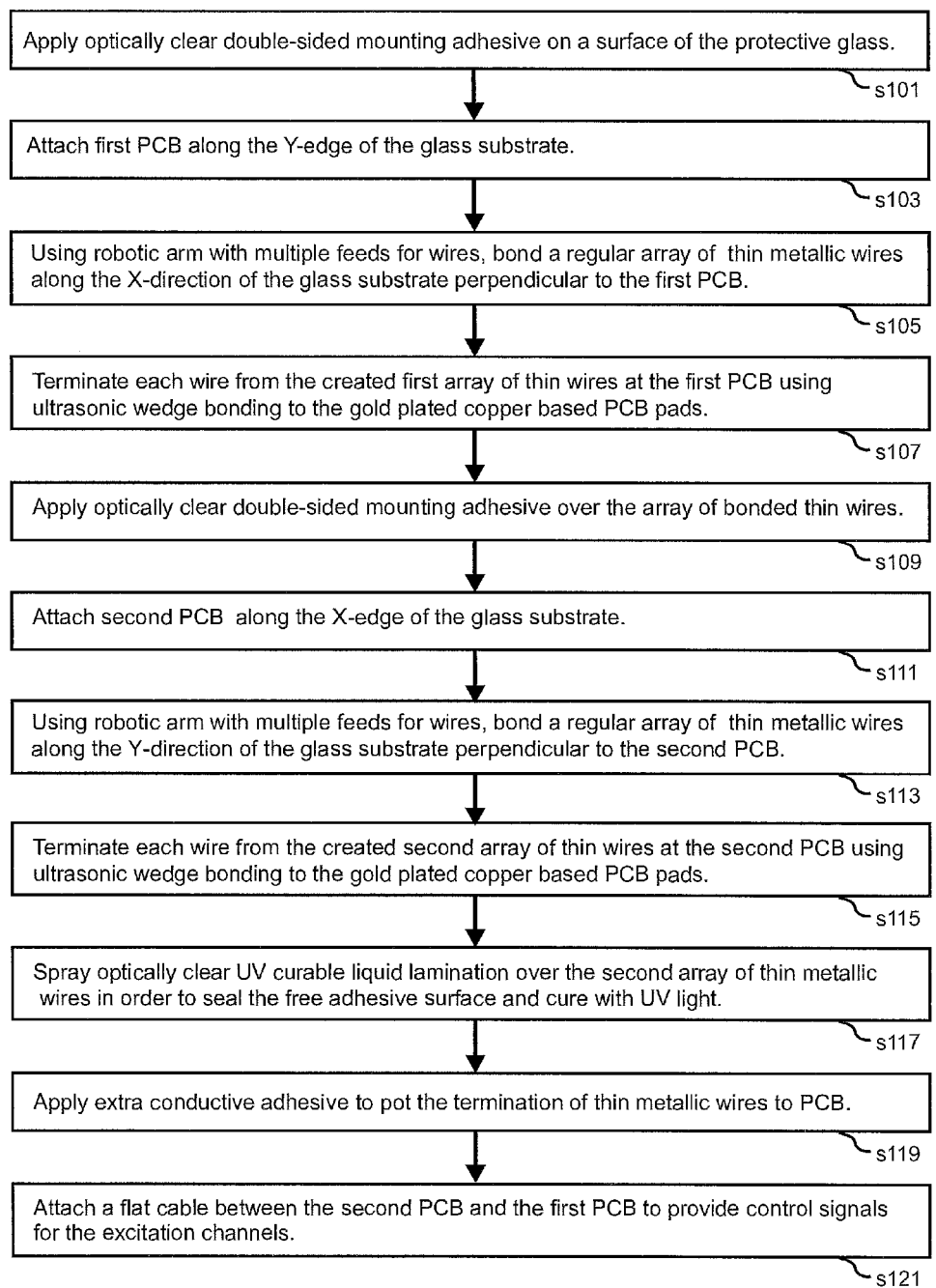
FIG. 72 is a flow chart illustrating manufacturing steps that can be used to manufacture the X-Y conductor grid structure by bonding wires directly to the PCB.
Figure 73A:
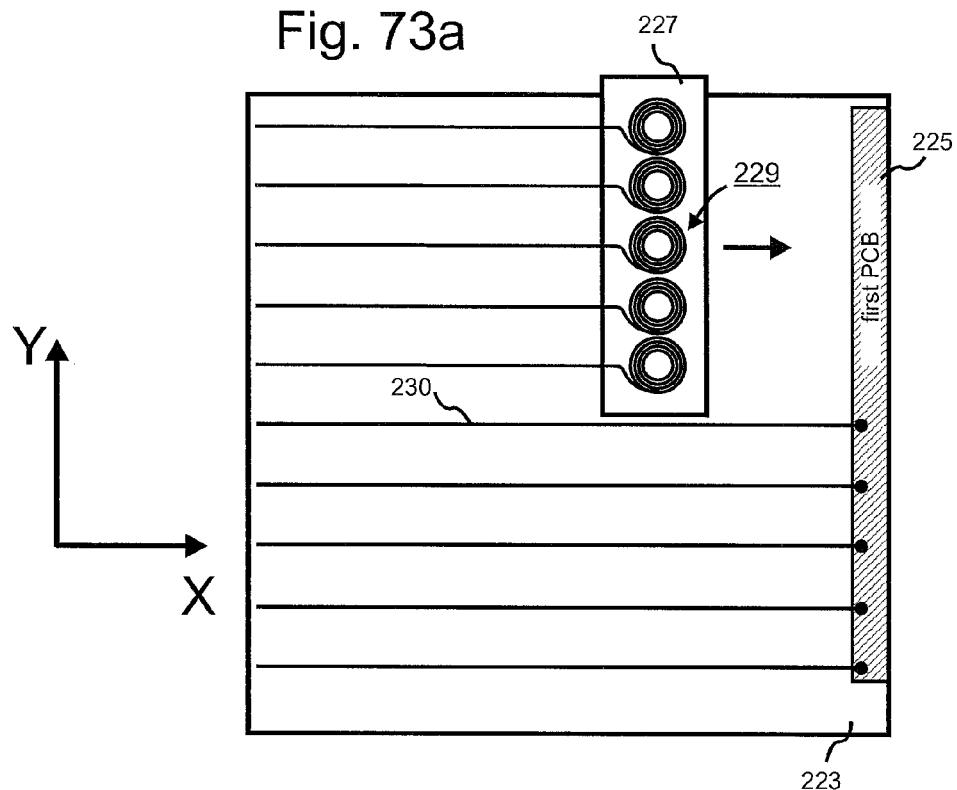
FIG. 73a schematically illustrates the laying of a first set of conductors on a substrate.
Figure 73B:
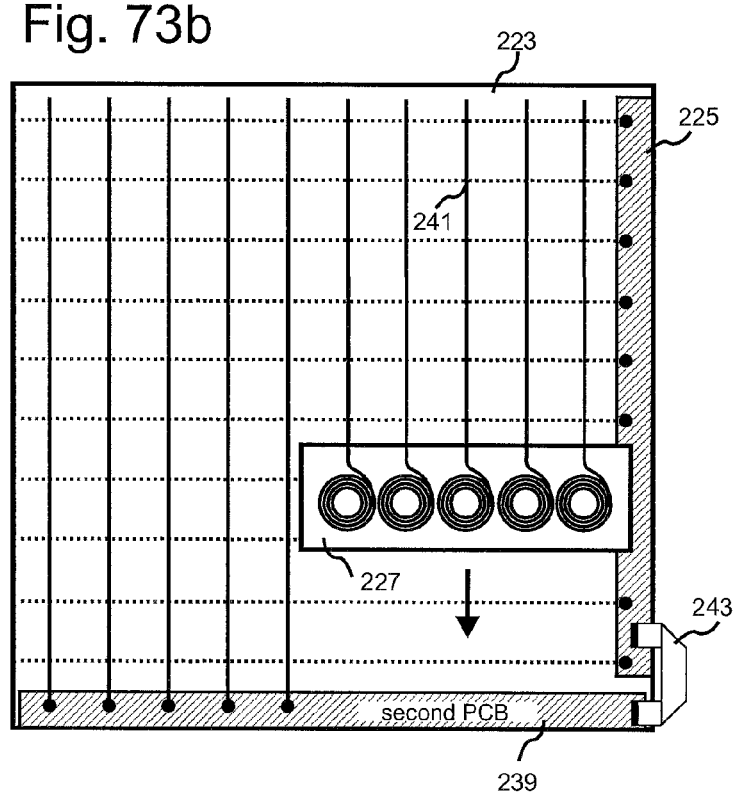
FIG. 73b illustrates the laying of a second set of conductors over the first set of conductors.
Figure 74A:
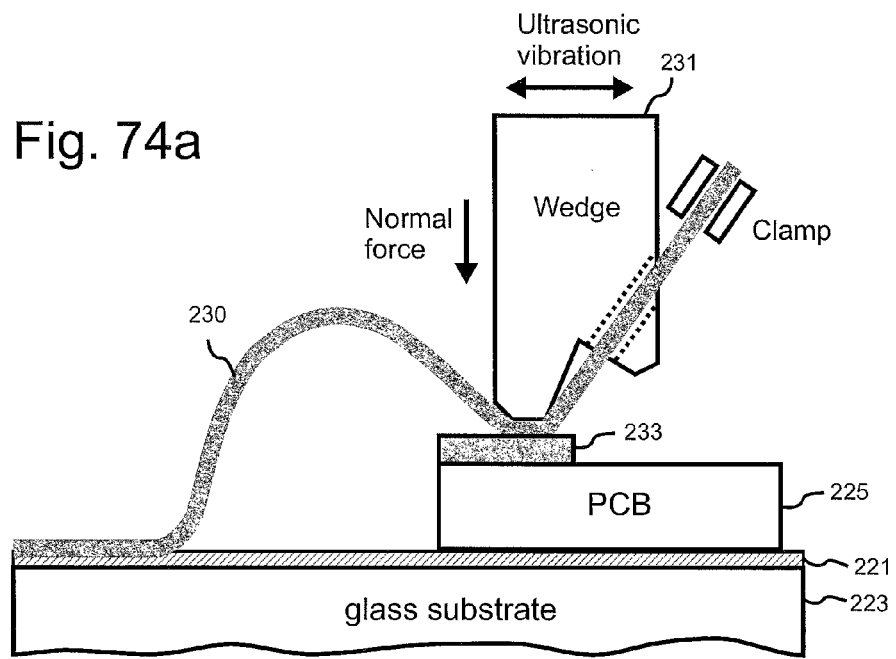
FIG. 74a illustrates the way in which ends of the conductors are ultrasonically bonded to a printed circuit board.
Figure 74B:
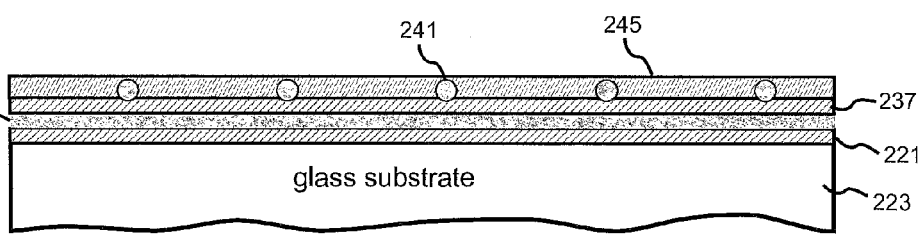
FIG. 74b illustrates a cross-section through the X-Y grid of conductors made using the technique shown in FIG. 73.

An alternative method for manufacturing the digitiser grid using thin metallic wires having a diameter between 10 micron and 20 micron will now be described with reference to FIGS. 72 to 73. A shown, in step s101 a clear double-sided mounting adhesive 221 is applied to the surface of a protective glass substrate 223. In step s103 a first printed circuit board (PCB) 225 is attached along the Y edge of the glass substrate 223. In step s105, a robotic arm 227, with multiple feeds of wires 229, bonds a regular (uniform) array of thin copper wires 230 along the X-direction of the glass substrate, perpendicular to the first PCB 225. In step s107, each wire from the created first array of thin wires is terminated at the first PCB using an ultrasonic wedge bonder 231 to cut and bond the wire 230 to a gold plated copper based PCB pad 233. Each copper wire 230 is glued along the X-direction of the glass substrate by the adhesive layer 221.

Ultrasonic bonding is a process that involves the use of force, time and ultrasonics to join two materials. The wire is pressed against the surface (both at ambient temperature) at low force and vibrated for a limited period of time to achieve the bond. Ultrasonic energy, when applied to the metal to be bonded, renders it temporarily soft and plastic. This causes the metal to flow under pressure. The acoustic energy frees molecules and dislocates them from their pinned positions and that allows the metal to flow under the low compressive forces of the bond. Thus heat at the bond site becomes a bi-product of the bonding process and so external heat is not necessary. Such ultrasonic bonding is also called a "cold weld". There are two types of ultrasonic bonding: wedge bonding and tape automated bonding (TAB). Either may be used although in this embodiment, a wedge bonder 231 is preferred as there is more control over the placement of the wires by the robotic arm 227 (in TAB bonding, the wire is already pre-aligned over the pad to which it is to be bonded).

Once all the required wires 230 have been bonded to the first PCB 225, the processing proceeds to step s109 where another optically clear double-sided mounting adhesive 237 is applied over the array of bonded wires 230. In step s111 a second PCB 239 is attached along the X edge of the glass substrate 223. In step s113 the robotic arm 227 is again used to create a second array of thin wires 241 that extend along the Y-direction perpendicular to the second PCB 239. The second array of wires 241 is held in place by the adhesive layer 237. In step s115, each wire in the second array of wires 241 is terminated at the second PCB 239 using the ultrasonic wedge bonder 231 onto a gold plated copper based PCB pad 233. In step s117 an optically clear UV curable liquid lamination 245 is sprayed over the second array of thin copper wires 241 in order to seal the exposed adhesive layer 237. This UV curable laminate layer is then cured with UV light to form a smooth clear optical surface for the display screen. In step s119 extra adhesive is provided around the termination points that terminate the arrays of conductor wires to the first and second PCBs 225 and 239. Finally, in step s129, a cable connector 243 is attached between the second PCB 239 and the first PCB 225 to provide a path for the control signals for the excitation channels. It is preferable to keep the microcontroller physically on the same PCB as the wires used for the detection conductors 7 in order to avoid using the cable 243 to carry the analogue measurement signals to the microcontroller for analogue to digital conversion (in order to avoid noise being introduced through the connector 243). Typically, the detection conductors will extend along the shorter dimension of the screen and therefore will be connected to the first PCB 225 (as it is preferable to have fewer detection conductors than there are excitation conductors on a typical television screen). Preferably, the first PCB 225 also has an additional generic host connector (such as a USB connector) in order to provide a communication path to the host computer.

In the above described embodiment, copper wire was used to form the excitation and detection conductors. Copper wire is preferred because of its low electrical resistance and therefore its ability to be used at higher excitation frequencies for large digitiser dimensions. However, ultrasonic bonding with copper wire can be troublesome due to heavier oxidation of the surface of the copper wire and unwanted material build up on the wedge bonder caused by these residuals sticking to the surface of the wedge bonder. Therefore, instead of using thin copper wires, thin aluminium wires may be used instead. Preferably, the aluminium wires have diameters between 10 microns and 20 microns so that they are practically invisible to the human eye at a distance exceeding 10 cm.

In the above described embodiment ultrasonic bonding was used to attach a piece of wire to the contact pads of the PCB. It might be advantageous to use ultrasonic soldering instead. Ultrasonic bonding uses ultrasonic energy to join parts without adding any kind of filler material while ultrasonic soldering uses a filler material, namely solder, to form a joint. An intensified ultrasonic beam generates micro vibrations with a 'brushing effect', which results in a complete removal of the oxide layer for immediate wetting with the solder alloy on the surface of the substrate. This means that the use of any 'flux' is no longer required. Ultrasonic soldering can be assisted by tinning the contact pads of the PCB before attaching PCBs 225 and 239 to the substrate 223. It is possible to use a low temperature melting solder to simplify the process, such as Indalloy 1E (Indium-tin eutectic 52% In 48% Sn) with a melting point of about 118° C. By using the Field's alloy (eutectic alloy of bismuth, indium, and tin: 32.5% Bi, 51% In, 16.5% Sn) with a melting point of about 62° C. it might be possible to make a solder joint using mainly frictional self-heating of the solder junction caused by the dissipation of the ultrasonic energy.

This application also includes the following numbered clauses:

1. A digitiser comprising:
    a grid of conductors comprising a plurality of excitation conductors and a plurality of detection conductors;
    excitation circuitry for applying excitation signals to selected excitation conductors;
    measurement circuitry for obtaining measurements from selected detection conductors; and
    processing circuitry for processing measurements obtained by the measurement circuitry to detect one or more objects positioned adjacent the grid of conductors;
    wherein the excitation circuitry is arranged to operate in a cyclic manner to select each of said excitation conductors during an excitation cycle, wherein an excitation cycle comprises a sequence of excitation intervals during each of which a different pair of neighbouring excitation conductors is selected by the excitation circuitry and to which complementary excitation signals are applied,
    wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the measurement circuitry,
    wherein the excitation circuitry is arranged to polarity modulate each excitation signal using a polarity control signal so that the polarity of the excitation signal applied to a selected conductor changes during a time that the excitation conductor is selected, or wherein the measurement circuitry is arranged to polarity modulate a detection signal obtained from each selected detection conductor using a polarity control signal so that the polarity of the detection signal changes during a time that the detection conductor is selected; and
    wherein the polarity control signal is a periodic signal and wherein half the period of the polarity control signal is less than or equal to the shorter of the excitation interval and the detection interval.

2. A digitiser comprising:
    a grid of conductors comprising a plurality of excitation conductors and a plurality of detection conductors;
    excitation circuitry for applying excitation signals to selected excitation conductors;
    measurement circuitry for obtaining measurements from selected detection conductors; and
    processing circuitry for processing measurements obtained by the measurement circuitry to detect one or more objects positioned adjacent the grid of conductors;
    wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the measurement circuitry, wherein the measurement circuitry is arranged to select neighbouring detection conductors during plural consecutive detection intervals in an overlapping manner such that during a first detection interval a given selected detection conductor is paired with a first neighbouring detection conductor and during a second detection interval the given selected detection conductor is paired with a second neighbouring detection conductor, wherein the measurement circuitry is arranged to determine differential measurements of signals obtained from the selected pairs of neighbouring detection conductors and wherein the measurement circuitry is arranged to select the detection conductors such that a detection conductor selected during a last detection interval of a detection cycle neighbours a detection conductor selected by the measurement circuitry during a first detection interval of the detection cycle.

3. A digitiser according to clause 2, wherein the measurement circuitry is arranged to polarity modulate a detection signal obtained from each selected detection conductor using a polarity control signal so that the polarity of the detection signal changes during a time that the detection conductor is selected.

4. A digitiser according to clause 3, wherein the polarity control signal is periodic and wherein the time that a detection conductor is selected is an integer multiple of the period of the polarity control signal.

5. A digitiser according to any of clauses 2 to 4, wherein the measurement circuitry is arranged so that, during an initial detection interval of a detection cycle, detection conductors are selected without overlap with detection conductors selected in a final detection interval of a preceding detection cycle.

6. A digitiser according to any of clauses 2 to 5, wherein the excitation circuitry is arranged to operate in a cyclic manner to select each of said excitation conductors during an excitation cycle, wherein an excitation cycle comprises a sequence of excitation intervals during each of which a different pair of neighbouring excitation conductors is selected by the excitation circuitry.

7. A digitiser according to clause 6, wherein the excitation circuitry is arranged to select neighbouring excitation conductors during plural consecutive excitation intervals in an overlapping manner such that during a first excitation interval a given selected excitation conductor is paired with a first neighbouring excitation conductor and during a second excitation interval the given selected excitation conductor is paired with a second neighbouring excitation conductor.

8. A digitiser according to clause 6 or 7, wherein each detection interval corresponds in duration to one excitation interval or wherein each excitation interval corresponds in duration to one detection cycle.

9. A digitiser according to any of clause 2 to 8, wherein the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle.

10. A digitiser according to clause 9, wherein the measurement circuitry comprises sample and hold circuitry for sampling and holding measurements obtained from each measurement channel and an analogue to digital converter for converting measurements held by the sample and hold circuitry into corresponding digital values, wherein the sample and hold circuitry comprises a plurality of first and second capacitors, each first and second capacitor being associated with a respective measurement channel, wherein the sample and hold circuitry is arranged such that during first measurement intervals, signals from the measurement channels are applied to the associated first capacitors and during second measurement intervals, signals from the measurement channels are applied to the associated second capacitors, and wherein during the first measurement intervals the sample and hold circuitry is arranged to couple signals stored on the second capacitors to the analogue to digital converter for conversion into corresponding digital values and during the second measurement intervals the sample and hold circuitry is arranged to couple signals stored on the first capacitors to the analogue to digital converter for conversion into corresponding digital values.

11. A digitiser according to any of clauses 2 to 10, comprising control circuitry for generating control signals for controlling selection of the excitation conductors by the excitation circuitry and for generating control signals for controlling selection of the detection conductors by the measurement circuitry.

12. A digitiser according to clause 11, wherein the control circuitry is arranged to generate said control signals on a cyclic basis and in a free running manner independently of said processing circuitry and is arranged to send a signal to the processing circuitry each measurement cycle to inform the processing circuitry that measurements are ready to be processed by the processing circuitry.

13. A digitiser comprising:
    a grid of conductors comprising a plurality of excitation conductors and a plurality of detection conductors;
    excitation circuitry for applying excitation signals to selected excitation conductors;
    measurement circuitry for obtaining measurements from selected detection conductors; and
    processing circuitry for processing measurements obtained by the measurement circuitry to detect one or more objects positioned adjacent the grid of conductors;
    wherein the excitation circuitry is arranged to operate in a cyclic manner to select each of said excitation conductors during an excitation cycle, wherein an excitation cycle comprises a sequence of excitation intervals during each of which a different pair of neighbouring excitation conductors is selected by the excitation circuitry and to which excitation signals with opposite polarity are applied, wherein the excitation circuitry is arranged to select neighbouring excitation conductors during plural consecutive excitation intervals in an overlapping manner such that during a first excitation interval a given selected excitation conductor is paired with a first neighbouring excitation conductor and during a second detection interval the given selected excitation conductor is paired with a second neighbouring excitation conductor and wherein the excitation circuitry is arranged to select the excitation conductors such that an excitation conductor selected during a last excitation interval of an excitation cycle neighbours an excitation conductor selected by the excitation circuitry during a first excitation interval of the excitation cycle.

14. A digitiser according to clause 13, wherein the excitation circuitry is arranged to polarity modulate each excitation signal using a polarity control signal so that the polarity of the excitation signal applied to a selected conductor changes during a time that the excitation conductor is selected.

15. A digitiser according to clause 14, wherein the polarity control signal is periodic and wherein the time that an excitation conductor is selected is an integer multiple of the period of the polarity control signal.

16. A digitiser according to any of clauses 13 to 15, wherein the excitation circuitry is arranged so that, during an initial excitation interval of an excitation cycle, excitation conductors are selected without overlap with excitation conductors selected in a final excitation interval of a preceding excitation cycle.

17. A digitiser according to any of clauses 13 to 16, wherein the excitation circuitry is arranged to select the excitation conductors such that an excitation conductor selected during a last excitation interval of an excitation cycle neighbours an excitation conductor selected by the excitation circuitry during a first excitation interval of the excitation cycle.

18. A digitiser according to any of clauses 13 to 17, wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the measurement circuitry.

19. A digitiser according to clause 18, wherein the measurement circuitry is arranged to select neighbouring detection conductors during plural consecutive detection intervals in an overlapping manner such that during a first detection interval a given selected detection conductor is paired with a first neighbouring detection conductor and during a second detection interval the given selected detection conductor is paired with a second neighbouring detection conductor.

20. A digitiser according to clause 18 or 19, wherein the measurement circuitry is arranged to determine differential measurements of signals obtained from the selected pairs of neighbouring detection conductors.

21. A digitiser according to any of clauses 18 to 20, wherein each detection interval corresponds in duration to one excitation interval or wherein each excitation interval corresponds in duration to one detection cycle.

22. A digitiser according to any of clauses 13 to 21, wherein the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle, wherein the measurement circuitry comprises sample and hold circuitry for sampling and holding measurements obtained from each measurement channel and an analogue to digital converter for converting measurements held by the sample and hold circuitry into corresponding digital values, wherein the sample and hold circuitry comprises a plurality of first and second capacitors, each first and second capacitor being associated with a respective measurement channel, wherein the sample and hold circuitry is arranged such that during first measurement intervals, signals from the measurement channels are applied to the associated first capacitors and during second measurement intervals, signals from the measurement channels are applied to the associated second capacitors, and wherein during the first measurement intervals the sample and hold circuitry is arranged to couple signals stored on the second capacitors to the analogue to digital converter for conversion into corresponding digital values and during the second measurement intervals the sample and hold circuitry is arranged to couple signals stored on the first capacitors to the analogue to digital converter for conversion into corresponding digital values.

23. A digitiser according to any of clauses 13 to 22, comprising control circuitry for generating control signals for controlling selection of the excitation conductors by the excitation circuitry and for generating control signals for controlling selection of the detection conductors by the measurement circuitry.

24. A digitiser according to clause 23, wherein the control circuitry is arranged to generate said control signals on a cyclic basis and in a free running manner independently of said processing circuitry and is arranged to send a signal to the processing circuitry each measurement cycle to inform the processing circuitry that measurements are ready to be processed by the processing circuitry.

25. A digitiser comprising:
a grid of conductors comprising a plurality of excitation conductors and a plurality of detection conductors;
excitation circuitry for applying excitation signals to selected excitation conductors;
measurement circuitry for obtaining measurements from selected detection conductors; and
processing circuitry for processing measurements obtained by the measurement circuitry to detect one or more objects positioned adjacent the grid of conductors;
wherein the measurement circuitry is arranged to operate in a cyclic manner to select each of said detection conductors during a detection cycle, wherein a detection cycle comprises a sequence of detection intervals during each of which a different pair of neighbouring detection conductors is selected by the detection circuitry, wherein the detection circuitry is arranged to select the detection conductors sequentially and in an overlapping manner from a start detection conductor to an end detection conductor and wherein the start detection conductor neighbours the end detection conductor within said grid.

26. A digitiser comprising:
a grid of conductors comprising a plurality of excitation conductors and a plurality of detection conductors;
excitation circuitry for applying excitation signals to selected excitation conductors;
measurement circuitry for obtaining measurements from selected detection conductors; and
processing circuitry for processing measurements obtained by the measurement circuitry to detect one or more objects positioned adjacent the grid of conductors;
wherein the measurement circuitry comprises a plurality of measurement channels each arranged to obtain measurements from a different subset of the detection conductors, wherein each measurement channel is arranged to operate in a cyclic manner to select each of the detection conductors within the corresponding subset during a detection cycle, wherein a detection cycle comprises a sequence of detection intervals during each of which a different pair of neighbouring detection conductors is selected by the measurement circuitry; wherein the measurement circuitry comprises sample and hold circuitry for sampling and holding measurements obtained from each measurement channel, wherein the sample and hold circuitry comprises a plurality of first and second capacitors, wherein each measurement channel has an associated first and second capacitor, wherein the sample and hold circuitry is arranged such that during first measurement intervals signals from the measurement channels are applied to the associated first capacitors and during second measurement intervals signals from the measurement channels are applied to the associated second capacitors, and wherein during the first measurement intervals the sample and hold circuitry is arranged to couple signals stored on the second capacitors to an analogue to digital converter for conversion into corresponding digital values and during the second measurement intervals the sample and hold circuitry is arranged to couple signals stored on the first capacitors to the analogue to digital converter for conversion into corresponding digital values.

27. A digitiser comprising:
a grid of conductors comprising a plurality of excitation conductors and a plurality of detection conductors;
excitation circuitry for applying excitation signals to selected excitation conductors;
measurement circuitry for obtaining measurements from selected detection conductors;
control circuitry for generating control signals for controlling selection of the excitation conductors by the excitation circuitry and for generating control signals for controlling selection of the detection conductors by the measurement circuitry; and processing circuitry for processing measurements obtained by the measurement circuitry to detect one or more objects positioned adjacent the grid of conductors;

wherein the control circuitry is arranged to generate said control signals on a cyclic basis and in a free running manner independently of said processing circuitry and is arranged to send a signal to the processing circuitry each measurement cycle to inform the processing circuitry that measurements are ready to be processed by the processing circuitry.

The invention claimed is:

1. A digitiser comprising:
a grid of conductors having a plurality of excitation conductors and a plurality of detection conductors;
excitation circuitry for applying excitation signals to selected excitation conductors;
measurement circuitry for obtaining measurements of signals obtained from selected detection conductors;
an analog to digital converter for converting analog measurements obtained by the measurement circuitry into digital measurement values;
a memory for storing the digital measurement values; and
processing circuitry for processing digital measurement values stored in the memory to detect one or more objects positioned adjacent the grid of conductors;
wherein the digital measurement values stored in the memory comprise digital differential measurement values and wherein the processing circuitry is arranged to:
process the digital differential measurement values stored in the memory to identify one or more possible areas of touch and, for each possible area of touch, a first start point and a first end point for the possible area of touch;
generate digital integrated measurement values by combining digital differential measurement values using the identified first start point and the first end point to restrict the integration of the digital differential measurement values to the digital differential measurement values from the identified first start point to the identified first end point;
process the digital integrated measurement values to identify one or more possible areas of touch, and for each possible area of touch, a second start point and a second end point for the possible area of touch; and
generate digital double integrated measurement values by combining digital integrated measurement values using the identified second start point and the second end point to restrict the combining of the digital integrated measurement values to the digital integrated measurement values from the identified second start point to the identified second end point.

2. A digitiser according to claim 1, wherein the processing circuitry is arranged to combine digital differential measurement values by adding or subtracting digital differential measurement values from each other.

3. A digitiser according to claim 1, wherein the processing circuitry is arranged to generate digital integrated measurement values by using digital measurement values obtained from adjacent excitation intervals or from adjacent detection intervals.

4. A digitiser according to claim 3, wherein the processing circuitry is arranged to generate digital integrated measurement values by weighting a digital measurement value obtained in one excitation interval and adding or subtracting the weighted digital measurement value with an integrated value obtained for a previous excitation interval, the weighting being such as to compensate for transients in the measurement circuitry caused by measurement signals from the previous excitation interval.

5. A digitiser according to claim 3, wherein the processing circuitry is arranged to generate digital integrated measurement values by weighting a digital measurement value obtained in one detection interval and adding or subtracting the weighted digital measurement value with an integrated measurement value obtained for a previous detection interval, the weighting being such as to compensate for transients in the measurement circuitry caused by measurement signals from the previous detection interval.

6. A digitiser according to claim 1, wherein the processing circuitry is arranged to identify possible areas of touch by identifying when the digital differential measurement values exceed a threshold level.

7. A digitiser according to claim 1, wherein the processing circuitry is arranged to identify the first start point and the first end point by identifying a positive peak and an associated negative peak in the digital differential measurement values stored in said memory and by selecting a start point and an end point such that the identified positive peak and the identified negative peak are between the first start point and the first end point.

8. A digitiser according to claim 1, wherein the processing circuitry is arranged to combine at least some of the digital differential measurement values to generate integrated measurement values relating to the mutual capacitive coupling between individual excitation conductors and individual detection conductors.

9. A digitiser according to claim 1, wherein the processing circuitry is arranged to use one of the first start point and the first end point for an area of possible touch to determine a first boundary condition for the integration and is arranged to use the other one of the start point and the end point to determine a correction to be applied to the integrated measurement values.

10. A digitiser according to claim 1, wherein the digital measurement values are stored in a two dimensional array within said memory, with successive measurements in one dimension of the array corresponding to measurements obtained from adjacent excitation intervals and with successive measurements in the other dimension of the array corresponding to measurements obtained from adjacent detection intervals.

11. A digitiser according to claim 10, wherein the processing circuitry is arranged to generate digital integrated measurement values by combining the digital measurement values along one or both the first dimension and the second dimension.

12. A digitiser according to claim 10, wherein the processing circuitry is arranged to re-order the data in the two dimensional array so that the position of each measurement value in the two dimensional array corresponds to a position of a crossover point between an excitation conductor and a detection conductor, in the grid of conductors.

13. A digitiser according to claim 12, wherein the processing circuitry is arranged to re-order the digital integrated measurement values in the two dimensional array after generating digital integrated measurement values.

14. A digitiser according to claim 1, wherein the processing circuitry is arranged to subtract a respective background measurement value from each digital differential measurement value prior to performing said generating digital integrated measurement values.

15. A digitiser according to claim 1, wherein the measurement circuitry comprises a plurality of detection switching blocks, each arranged to select a subset of detection conductors, wherein one or more of the detection switching blocks share at least one detection conductor with another detection switching block and wherein the processing circuitry is arranged to combine the digital measurement values obtained from the detection switching blocks prior to performing said generating digital integrated measurement values.

16. A digitiser according to claim 15, wherein the combining comprises adding or subtracting data values obtained by different detection switching blocks from the shared detection conductor.

17. A digitiser according to claim 15, wherein each detection switching block is arranged to provide double differential measurements and at least one single differential measurement and wherein the integration is initiated using the single differential measurement.

18. A digitiser according to claim 15, wherein the processing circuitry is is arranged to generate digital integrated measurement values separately for the digital measurement values obtained from each detection switching block.

19. A digitiser according to claim 1, wherein the measurements obtained from the digitiser comprise double differential measurements and single differential measurements distributed amongst the double differential measurements and wherein the generating digital integrated measurement values is seeded using the single differential measurements.

20. A digitiser according to claim 1, wherein the processing circuitry is arranged to re-order the digital integrated measurement values prior to processing the digital integrated measurement values to identify one or more areas of possible touch.

21. A digitizing method comprising:
proving a grid of conductors comprising a plurality of excitation conductors and a plurality of detection conductors;
applying excitation signals to selected excitation conductors;
obtaining measurements from selected detection conductors;
an analog to digital converting the obtained measurements to generate digital measurement values;
storing the generated digital measurement values in a memory; and
processing the digital measurement values stored in the memory to detect one or more objects positioned adjacent the grid of conductors;
wherein the digital measurement values stored in the memory comprise digital differential measurement values and wherein the processing includes:
processing the digital differential measurement values to identify one or more possible areas of touch and, for each possible area of touch, a first start point and a first end point for the possible area of touch;
generating digital integrated measurement values by combining the digital integrated measurement values using the identified first start point and the first end point to restrict the combining of the digital integrated measurement values to the digital integrated measurement values from the identified first start point to the identified first end point;
processing the digital integrated measurement values to identify one or more possible areas of touch, and for each possible area of touch, a second start point and a second end point for the possible area of touch; and
generating digital integrated measurement values by combining the digital integrated measurement values using the identified second start point and the second end point to restrict the combining of the digital integrated measurement values to the digital integrated measurement values from the identified second start point to the identified second end point.

22. A digitiser comprising:
a grid of conductors having a plurality of excitation conductors and a plurality of detection conductors;
excitation circuitry for applying excitation signals to selected excitation conductors;
measurement circuitry for obtaining measurements of signals obtained from selected detection conductors;
an analog to digital converter for converting analog measurements obtained by the measurement circuitry into digital measurement values;
a memory for storing the digital measurement values; and
processing circuitry for processing digital measurement values stored in the memory to detect one or more objects positioned adjacent the grid of conductors;
wherein the digital measurement values stored in the memory comprise digital differential measurement values and wherein the processing circuitry is arranged to:
process the digital differential measurement values to identify a plurality of possible areas of touch;
combine two or more neighboring possible areas of touch depending on analysis results obtained by analyzing the digital differential measurement values within the two or more neighboring possible areas of touch;
identify, for each possible area of touch including any combined possible areas of touch, a respective start point and an end point; and
generate integrated digital differential measurement values using the identified start point and the identified end point to restrict combining of the digital differential measurement values to the digital differential measurement values from the identified start point to the identified end point.

* * * * *